(12) United States Patent
Takahashi

(10) Patent No.: US 11,979,063 B2
(45) Date of Patent: May 7, 2024

(54) ROTATING ELECTRIC MACHINE

(71) Applicant: DENSO CORPORATION, Kariya (JP)

(72) Inventor: Yuki Takahashi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/915,238

(22) Filed: Jun. 29, 2020

(65) Prior Publication Data
US 2020/0336031 A1 Oct. 22, 2020

Related U.S. Application Data

(63) Continuation of application No. PCT/JP2018/048245, filed on Dec. 27, 2018.

(30) Foreign Application Priority Data

Dec. 28, 2017 (JP) ................. 2017-255071
Dec. 28, 2017 (JP) ................. 2017-255073
(Continued)

(51) Int. Cl.
*H02K 1/27* (2022.01)
*H02K 1/16* (2006.01)
(Continued)

(52) U.S. Cl.
CPC ............. *H02K 1/279* (2022.01); *H02K 1/165* (2013.01); *H02K 1/18* (2013.01); *H02K 1/2773* (2013.01);
(Continued)

(58) Field of Classification Search
CPC ........ H02K 1/2773; H02K 21/22; H02K 9/19; H02K 1/2783; H02K 1/278; H02K 1/2781;
(Continued)

(56) References Cited

U.S. PATENT DOCUMENTS

| 4,463,276 A | 7/1984 | Nakamura |
| 5,128,574 A | 7/1992 | Koizumi et al. |

(Continued)

FOREIGN PATENT DOCUMENTS

| CA | 2659088 A1 | 1/2008 |
| CN | 85103498 A | 11/1986 |

(Continued)

OTHER PUBLICATIONS

Machine translation of JP-2015211492-A. (Year: 2015).*
(Continued)

*Primary Examiner* — Michael Andrews
(74) *Attorney, Agent, or Firm* — Oliff PLC

(57) ABSTRACT

A rotating electric machine includes a field system, which includes a magnet section, and an armature. The magnet section includes a plurality of magnets that are arranged at predetermined intervals and in alignment with each other in a circumferential direction. The magnets have easy axes of magnetization oriented such that at locations closer to a d-axis, the directions of the easy axes of magnetization are more parallel to the d-axis than at locations closer to a q-axis. In the magnets, magnet magnetic paths are formed along the easy axes of magnetization. The field system further includes a field-system core that is formed of a soft-magnetic material. The field-system core has protrusions protruding to the armature side. Each of the protrusions is located closer to the q-axis than to the d-axis in the circumferential direction. Circumferential end surfaces of the protrusions respectively abut circumferential end surfaces of the magnets.

4 Claims, 59 Drawing Sheets

(30) Foreign Application Priority Data

| Dec. 28, 2017 | (JP) | 2017-255074 |
|---|---|---|
| Dec. 28, 2017 | (JP) | 2017-255075 |
| Dec. 28, 2017 | (JP) | 2017-255076 |
| Dec. 28, 2017 | (JP) | 2017-255077 |
| Dec. 28, 2017 | (JP) | 2017-255081 |
| Dec. 28, 2017 | (JP) | 2017-255084 |
| Jul. 26, 2018 | (JP) | 2018-140737 |
| Jul. 26, 2018 | (JP) | 2018-140739 |
| Jul. 26, 2018 | (JP) | 2018-140741 |
| Aug. 29, 2018 | (JP) | 2018-160893 |
| Aug. 29, 2018 | (JP) | 2018-160894 |
| Sep. 5, 2018 | (JP) | 2018-166445 |
| Oct. 30, 2018 | (JP) | 2018-204496 |

(51) Int. Cl.
   H02K 1/18         (2006.01)
   H02K 1/276        (2022.01)
   H02K 1/2781       (2022.01)
   H02K 1/279        (2022.01)
   H02K 1/30         (2006.01)
   H02K 5/20         (2006.01)
   H02K 21/22        (2006.01)
   H02P 27/06        (2006.01)

(52) U.S. Cl.
   CPC .......... H02K 1/2781 (2022.01); H02K 1/30 (2013.01); H02K 5/20 (2013.01); H02K 21/22 (2013.01); H02P 27/06 (2013.01); *H02K 5/203* (2021.01)

(58) Field of Classification Search
   CPC . H02K 1/165; H02K 1/18; H02K 1/30; H02P 27/06
   USPC .................................................. 310/156.56
   See application file for complete search history.

(56) References Cited

U.S. PATENT DOCUMENTS

| 5,478,222 | A | 12/1995 | Heidelberg et al. |
|---|---|---|---|
| 5,637,048 | A | 6/1997 | Maeda et al. |
| 5,723,933 | A | 3/1998 | Grundl et al. |
| 5,759,128 | A | 6/1998 | Mizutani et al. |
| 5,767,601 | A | 6/1998 | Uchiyama |
| 5,787,567 | A | 8/1998 | Miyazaki |
| 5,821,653 | A | 10/1998 | Kinto et al. |
| 5,880,544 | A | 3/1999 | Ikeda et al. |
| 6,501,205 | B1 | 12/2002 | Asao et al. |
| 6,700,236 | B2 | 3/2004 | Umeda et al. |
| 6,717,315 | B1 | 4/2004 | Tajima et al. |
| 6,770,999 | B2 | 8/2004 | Sakurai |
| 6,812,615 | B1 | 11/2004 | Ettridge |
| 6,882,077 | B2 | 4/2005 | Neet |
| 6,914,356 | B2 | 7/2005 | Yamamura et al. |
| 7,402,934 | B1 | 7/2008 | Gabrys |
| 7,902,707 | B2 | 3/2011 | Kawamura et al. |
| 8,004,141 | B2 | 8/2011 | Jeung |
| 8,446,060 | B1 | 5/2013 | Lugg |
| 8,552,678 | B2 | 10/2013 | Yuuki et al. |
| 8,766,468 | B1 | 7/2014 | Rilla et al. |
| 8,823,238 | B2 | 9/2014 | Greaves et al. |
| 9,172,280 | B2 | 10/2015 | Koga |
| 9,255,633 | B2 | 2/2016 | Markl |
| 9,595,851 | B2 | 3/2017 | Hazeyama et al. |
| 10,404,120 | B2 | 9/2019 | Ishizuka et al. |
| 11,110,793 | B2 | 9/2021 | Takahashi et al. |
| 2002/0050395 | A1 | 5/2002 | Kusumoto et al. |
| 2002/0180294 | A1* | 12/2002 | Kaneda ............. H02K 1/2783 310/156.43 |
| 2004/0090130 | A1 | 5/2004 | Kaneko et al. |
| 2004/0095035 | A1 | 5/2004 | Sogabe et al. |
| 2004/0119362 | A1 | 6/2004 | Neet |
| 2004/0128331 | A1 | 7/2004 | Hinds et al. |
| 2004/0263016 | A1 | 12/2004 | Neet |
| 2005/0134134 | A1 | 6/2005 | Mori et al. |
| 2006/0017345 | A1 | 1/2006 | Uchida et al. |
| 2006/0103253 | A1 | 5/2006 | Shiga et al. |
| 2006/0113857 | A1 | 6/2006 | Honkura et al. |
| 2006/0138879 | A1 | 6/2006 | Kusase et al. |
| 2006/0186753 | A1 | 8/2006 | Yang et al. |
| 2006/0197397 | A1 | 9/2006 | Stiesdal |
| 2008/0073992 | A1 | 3/2008 | Kusama |
| 2008/0093944 | A1 | 4/2008 | Takahashi et al. |
| 2008/0218007 | A1 | 9/2008 | Masuzawa et al. |
| 2008/0315691 | A1 | 12/2008 | Jeung |
| 2009/0066183 | A1 | 3/2009 | Aramaki et al. |
| 2009/0079277 | A1 | 3/2009 | Nakamura et al. |
| 2009/0127938 | A1 | 5/2009 | Sahin Nomaler et al. |
| 2009/0230353 | A1 | 9/2009 | Shimazu et al. |
| 2009/0251023 | A1 | 10/2009 | Nakano et al. |
| 2009/0267441 | A1 | 10/2009 | Hiramatsu et al. |
| 2010/0007230 | A1 | 1/2010 | Suzuki et al. |
| 2010/0117481 | A1 | 5/2010 | Greaves et al. |
| 2010/0123426 | A1 | 5/2010 | Nashiki et al. |
| 2010/0181858 | A1 | 7/2010 | Hibbs et al. |
| 2010/0194231 | A1 | 8/2010 | Rippel et al. |
| 2011/0012440 | A1* | 1/2011 | Toyota ............. H02K 1/2792 310/152 |
| 2011/0057533 | A1 | 3/2011 | Murakami et al. |
| 2011/0210558 | A1 | 9/2011 | Stiesdal |
| 2011/0285243 | A1 | 11/2011 | Taniguchi |
| 2011/0304236 | A1 | 12/2011 | Nishiyama et al. |
| 2012/0001521 | A1 | 1/2012 | Shiraki et al. |
| 2012/0038168 | A1* | 2/2012 | Morishita ............ H02K 21/00 310/156.01 |
| 2012/0181891 | A1 | 7/2012 | Yamada et al. |
| 2012/0293035 | A1 | 11/2012 | Nakamura et al. |
| 2012/0306310 | A1 | 12/2012 | Takeuchi et al. |
| 2012/0319507 | A1 | 12/2012 | Ueno et al. |
| 2013/0082560 | A1 | 4/2013 | Takeuchi et al. |
| 2013/0106238 | A1 | 5/2013 | Saiki et al. |
| 2013/0113328 | A1 | 5/2013 | Kogure et al. |
| 2013/0127289 | A1 | 5/2013 | Koga |
| 2013/0249339 | A1 | 9/2013 | Makino et al. |
| 2013/0300241 | A1 | 11/2013 | Wedman et al. |
| 2013/0334991 | A1 | 12/2013 | Yuuki et al. |
| 2014/0008473 | A1 | 3/2014 | Iwami et al. |
| 2014/0084731 | A1 | 3/2014 | Iwami et al. |
| 2014/0125182 | A1 | 5/2014 | Takahashi |
| 2014/0174856 | A1 | 6/2014 | Takagi et al. |
| 2014/0197709 | A1 | 7/2014 | Hasegawa |
| 2014/0300242 | A1 | 10/2014 | Honda |
| 2014/0312718 | A1 | 10/2014 | Li et al. |
| 2015/0028708 | A1 | 1/2015 | Matsuoka et al. |
| 2015/0089794 | A1 | 4/2015 | Dokonal et al. |
| 2015/0097453 | A1 | 4/2015 | Nishikawa et al. |
| 2015/0129711 | A1 | 5/2015 | Caubel |
| 2015/0171682 | A1 | 6/2015 | Fujisawa et al. |
| 2015/0171683 | A1 | 6/2015 | Kim et al. |
| 2015/0236556 | A1 | 8/2015 | Suwazono et al. |
| 2015/0340915 | A1 | 11/2015 | Kato et al. |
| 2016/0049835 | A1 | 2/2016 | Fukumoto et al. |
| 2016/0102705 | A1 | 4/2016 | Mei et al. |
| 2016/0126871 | A1 | 5/2016 | Uematsu |
| 2016/0149454 | A1 | 5/2016 | Haga et al. |
| 2016/0204728 | A1 | 7/2016 | Notohara et al. |
| 2016/0211707 | A1 | 7/2016 | Yamada et al. |
| 2016/0277397 | A1 | 9/2016 | Watanabe |
| 2016/0315508 | A1 | 10/2016 | Li et al. |
| 2017/0085143 | A1 | 3/2017 | Tanaka et al. |
| 2017/0093257 | A1 | 3/2017 | Hirata et al. |
| 2017/0098969 | A1 | 4/2017 | Fukumoto et al. |
| 2017/0162311 | A1 | 6/2017 | Shimbo et al. |
| 2017/0187258 | A1 | 6/2017 | Fujikawa et al. |
| 2017/0222583 | A1 | 8/2017 | Akimatsu et al. |
| 2017/0237310 | A1 | 8/2017 | Nakamura et al. |
| 2017/0271941 | A1 | 9/2017 | Kaneko et al. |
| 2017/0271945 | A1 | 9/2017 | Germann et al. |
| 2017/0288489 | A1 | 10/2017 | Shiraki et al. |

(56) References Cited

U.S. PATENT DOCUMENTS

| | | |
|---|---|---|
| 2017/0353071 A1 | 12/2017 | Saito et al. |
| 2017/0353131 A1 | 12/2017 | Usagawa et al. |
| 2018/0056329 A1 | 3/2018 | Akanuma et al. |
| 2018/0062471 A1 | 3/2018 | Shiraki et al. |
| 2018/0108464 A1 | 4/2018 | Fujikawa et al. |
| 2018/0262091 A1 | 9/2018 | Gieras et al. |
| 2018/0269733 A1 | 9/2018 | Mikami et al. |
| 2018/0287445 A1 | 10/2018 | Shizuka et al. |
| 2018/0323673 A1 | 11/2018 | Shiraki et al. |
| 2018/0336981 A1* | 11/2018 | Fujihara .................. H01F 7/02 |
| 2018/0358846 A1 | 12/2018 | Baba et al. |
| 2019/0097509 A1 | 3/2019 | Oguchi et al. |
| 2019/0157954 A1 | 5/2019 | Takahashi et al. |
| 2019/0341828 A1 | 11/2019 | Calverley et al. |
| 2019/0379252 A1 | 12/2019 | Taniguchi et al. |
| 2020/0021222 A1 | 1/2020 | Nigo |
| 2020/0161939 A1 | 5/2020 | Takahashi et al. |
| 2020/0162003 A1 | 5/2020 | Takahashi et al. |
| 2020/0244119 A1 | 7/2020 | Morishita |
| 2020/0336027 A1 | 10/2020 | Takahashi |

FOREIGN PATENT DOCUMENTS

| | | |
|---|---|---|
| CN | 1761130 A | 4/2006 |
| CN | 102684326 A | 9/2012 |
| CN | 105305756 A | 2/2016 |
| CN | 104578462 B | 7/2017 |
| CN | 107104623 A | 8/2017 |
| EP | 0668651 A1 | 8/1995 |
| EP | 2136467 A1 | 12/2009 |
| FR | 2036866 A1 | 12/1970 |
| FR | 2933544 A1 | 1/2010 |
| JP | S51-125503 U | 10/1976 |
| JP | S55-173264 U | 12/1980 |
| JP | S61-14865 U | 1/1986 |
| JP | S61-180567 U | 11/1986 |
| JP | S61-258643 A | 11/1986 |
| JP | S62-095954 A | 5/1987 |
| JP | S62-115761 U | 7/1987 |
| JP | S62-196053 A | 8/1987 |
| JP | H02-303348 A | 12/1990 |
| JP | H02-303351 A | 12/1990 |
| JP | H03-048373 U | 5/1991 |
| JP | H04-372544 A | 12/1992 |
| JP | H06-070522 A | 3/1994 |
| JP | 3001939 U | 9/1994 |
| JP | H07-059314 A | 3/1995 |
| JP | H07-212915 A | 8/1995 |
| JP | H08-242564 A | 9/1996 |
| JP | 408-275419 A | 10/1996 |
| JP | H08-265995 A | 10/1996 |
| JP | H09-308145 A | 11/1997 |
| JP | H10-271733 A | 10/1998 |
| JP | H11-018496 A | 1/1999 |
| JP | H11-206091 A | 7/1999 |
| JP | H11-215749 A | 8/1999 |
| JP | H11-308793 A | 11/1999 |
| JP | 2000-41367 A | 2/2000 |
| JP | 2000-245089 A | 9/2000 |
| JP | 2000-270502 A | 9/2000 |
| JP | 2001-112197 A | 4/2001 |
| JP | 2001-333555 A | 11/2001 |
| JP | 2002-010602 A | 1/2002 |
| JP | 2002-064028 A | 2/2002 |
| JP | 2002-171735 A | 6/2002 |
| JP | 2002-272066 A | 9/2002 |
| JP | 2002-359953 A | 12/2002 |
| JP | 2003-070197 A | 3/2003 |
| JP | 2003-104076 A | 4/2003 |
| JP | 2003-324866 A | 11/2003 |
| JP | 2004-15906 A | 1/2004 |
| JP | 2004-092715 A | 3/2004 |
| JP | 2004-120892 A | 4/2004 |
| JP | 2004-147451 A | 5/2004 |
| JP | 2004-159453 A | 6/2004 |
| JP | 2004-187344 A | 7/2004 |
| JP | 2005-065385 A | 3/2005 |
| JP | 2005-117751 A | 4/2005 |
| JP | 2005117751 A * | 4/2005 |
| JP | 2005-151667 A | 6/2005 |
| JP | 2005-253146 A | 9/2005 |
| JP | 2005-304292 A | 10/2005 |
| JP | 2005-312214 A | 11/2005 |
| JP | 2006-288187 A | 10/2006 |
| JP | 2006-320109 A | 11/2006 |
| JP | 2006-325338 A | 11/2006 |
| JP | 2007-202324 A | 8/2007 |
| JP | 2007-267565 A | 10/2007 |
| JP | 2007-274869 A | 10/2007 |
| JP | 2007-295716 A | 11/2007 |
| JP | 2008-148375 A | 6/2008 |
| JP | 2008-237021 A | 10/2008 |
| JP | 2008-245475 A | 10/2008 |
| JP | 2008-278648 A | 11/2008 |
| JP | 2009-17712 A | 1/2009 |
| JP | 2009-071939 A | 4/2009 |
| JP | 2009-084551 A | 4/2009 |
| JP | 2009-273304 A | 11/2009 |
| JP | 2009-291040 A | 12/2009 |
| JP | 2010-022192 A | 1/2010 |
| JP | 2010-041753 A | 2/2010 |
| JP | 2010-130819 A | 6/2010 |
| JP | 2010-130871 A | 6/2010 |
| JP | 2011-024324 A | 2/2011 |
| JP | 2011-244627 A | 12/2011 |
| JP | 2012-005232 A | 1/2012 |
| JP | 2012-010565 A | 1/2012 |
| JP | 2012-125088 A | 6/2012 |
| JP | 2012-165614 A | 8/2012 |
| JP | 2012-175755 A | 9/2012 |
| JP | 2012-228072 A | 11/2012 |
| JP | 2013-031336 A | 2/2013 |
| JP | 2013-051765 A | 3/2013 |
| JP | 2013-108986 A | 6/2013 |
| JP | 2013-122849 A | 6/2013 |
| JP | 2013-162668 A | 8/2013 |
| JP | 2013-207858 A | 10/2013 |
| JP | 2014-068443 A | 4/2014 |
| JP | 2014-068479 A | 4/2014 |
| JP | 2014-213622 A | 11/2014 |
| JP | 2014-239586 A | 12/2014 |
| JP | 2015-015906 A | 1/2015 |
| JP | 2015-018633 A | 1/2015 |
| JP | 2015-033173 A | 2/2015 |
| JP | 2015-092792 A | 5/2015 |
| JP | 2015-122834 A | 7/2015 |
| JP | 2015-128355 A | 7/2015 |
| JP | 2015-142484 A | 8/2015 |
| JP | 2015-177725 A | 10/2015 |
| JP | 2015-211492 A | 11/2015 |
| JP | 5805336 B1 | 11/2015 |
| JP | 2015211492 A * | 11/2015 |
| JP | 2015-216714 A | 12/2015 |
| JP | 2016-026465 A | 2/2016 |
| JP | 2016-052210 A | 4/2016 |
| JP | 2016-072457 A | 5/2016 |
| JP | 2016-092995 A | 5/2016 |
| JP | 2016-126992 A | 7/2016 |
| JP | 2016-129439 A | 7/2016 |
| JP | 2016-129483 A | 7/2016 |
| JP | 2016-178814 A | 10/2016 |
| JP | 2016-226226 A | 12/2016 |
| JP | 2017-022914 A | 1/2017 |
| JP | 2017-060321 A | 3/2017 |
| JP | 2017-070140 A | 4/2017 |
| JP | 2017-071235 A | 4/2017 |
| JP | 2017-131046 A | 7/2017 |
| JP | 2017-132378 A | 8/2017 |
| JP | 2017-169316 A | 9/2017 |
| JP | 2018-074767 A | 5/2018 |
| JP | 2018-201018 A | 12/2018 |
| JP | 2019-122223 A | 7/2019 |
| JP | 2019-122235 A | 7/2019 |
| JP | 2019-122236 A | 7/2019 |

(56) References Cited

FOREIGN PATENT DOCUMENTS

| | | |
|---|---|---|
| JP | 2019-122242 | 7/2019 |
| JP | 2019-140368 A | 8/2019 |
| JP | 2014-093835 A | 5/2020 |
| JP | 2020-108280 A | 7/2020 |
| JP | 2013-201853 A | 10/2020 |
| WO | 2002/015229 A1 | 2/2002 |
| WO | 2013/179476 A1 | 12/2013 |
| WO | 2015/097767 A1 | 7/2015 |
| WO | 2016/058870 A1 | 4/2016 |
| WO | 2016/072481 A1 | 5/2016 |
| WO | 2016/084204 A1 | 6/2016 |
| WO | 2017/163383 A1 | 9/2017 |

OTHER PUBLICATIONS

Machine translation of JP-2005117751-A. (Year: 2005).*
Jan. 7, 2021 Office Action Issued in U.S. Appl. No. 16/915,348.
Apr. 2, 2019 International Search Report issued in International Patent Application No. PCT/JP2018/048254.
Apr. 9, 2019 International Search Report issued in International Patent Application No. PCT/JP2018/048248.
Apr. 16, 2019 Search Report issued in International Patent Application No. PCT/JP2018/048247.
Apr. 9, 2019 International Search Report issued in International Patent Application No. PCT/JP2018/048246.
Oct. 23, 2018 International Search Report issued in Application No. PCT/JP2018/027409.
Oct. 16, 2018 International Search Report issued in Application No. PCT/JP2018/027408.
U.S. Appl. No. 16/914,605, filed Jun. 29, 2020 in the name of Takahashi.
U.S. Appl. No. 16/914,570, filed Jun. 29, 2020 in the name of Takahashi.
U.S. Appl. No. 16/915,027, filed Jun. 29, 2020 in the name of Takahashi.
U.S. Appl. No. 16/915,566, filed Jun. 29, 2020 in the name of Takahashi.
U.S. Appl. No. 16/915,116, filed Jun. 29, 2020 in the name of Takahashi et al.
U.S. Appl. No. 16/914,532, filed Jun. 29, 2020 in the name of Takahashi.
U.S. Appl. No. 16/748,535, filed Jan. 21, 2020 in the name of Takahashi et al.
U.S. Appl. No. 16/748,195, filed Jan. 21, 2020 in the name of Takahashi et al.
U.S. Appl. No. 16/915,348, filed Jun. 29, 2020 in the name of Takahashi et al.
Nov. 27, 2023 Notice of Allowance issued in U.S. Appl. No. 16/915,566.
Dec. 6, 2023 Notice of Allowance issued in U.S. Appl. No. 17/481,494.
Dec. 7, 2023 Notice of Allowance issued in U.S. Appl. No. 17/481,650.

* cited by examiner

COMPARATIVE EXAMPLES

FIG.83
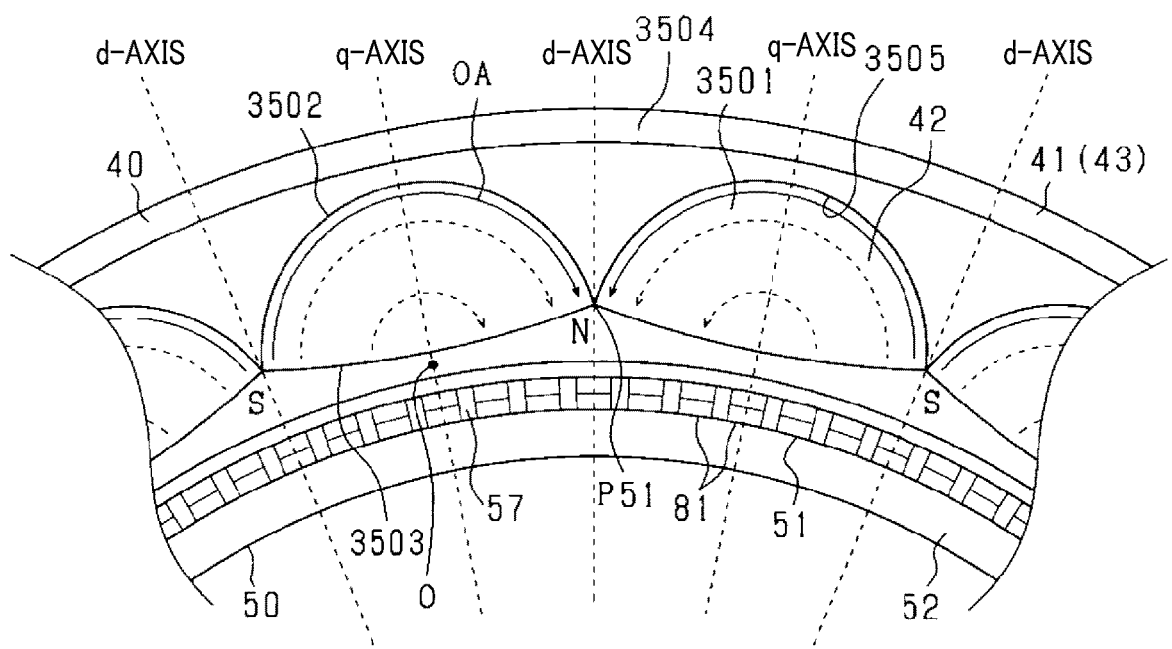
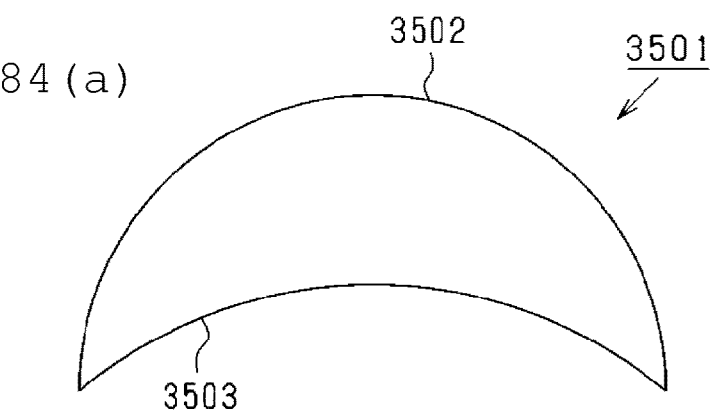
FIG. 84(a)
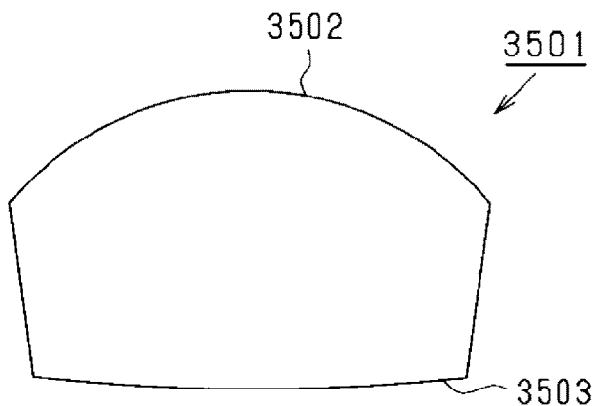
FIG. 84(b)

ROTATING ELECTRIC MACHINE

CROSS-REFERENCE TO RELATED APPLICATIONS

The present application is a continuation application of International Application No. PCT/JP2018/048245 filed on Dec. 27, 2018, which is based on and claims priority from: Japanese Patent Application No. 2017-255074 filed on Dec. 28, 2017; Japanese Patent Application No. 2017-255077 filed on Dec. 28, 2017; Japanese Patent Application No. 2017-255081 filed on Dec. 28, 2017; Japanese Patent Application No. 2017-255076 filed on Dec. 28, 2017; Japanese Patent Application No. 2017-255075 filed on Dec. 28, 2017; Japanese Patent Application No. 2017-255084 filed on Dec. 28, 2017; Japanese Patent Application No. 2017-255071 filed on Dec. 28, 2017; Japanese Patent Application No. 2017-255073 filed on Dec. 28, 2017; Japanese Patent Application No. 2018-140741 filed on Jul. 26, 2018; Japanese Patent Application No. 2018-140739 filed on Jul. 26, 2018; Japanese Patent Application No. 2018-140737 filed on Jul. 26, 2018; Japanese Patent Application No. 2018-160893 filed on Aug. 29, 2018; Japanese Patent Application No. 2018-160894 filed on Aug. 29, 2018; Japanese Patent Application No. 2018-166445 filed on Sep. 5, 2018; and Japanese Patent Application No. 2018-204496 filed on Oct. 30, 2018. The contents of these applications are hereby incorporated by reference in their entirety into the present application.

BACKGROUND

1 Technical Field

The present disclosure relates to rotating electric machines.

2 Description of Related Art

Conventionally, there are known rotating electric machines which are applied to household appliances, industrial equipment, amusement machines, agricultural and construction machines and motor vehicles. In general, the so-called slots, which are coil-receiving portions defined by teeth, are formed in a stator core (i.e., an iron core). Electrical conductors, such as copper wires or aluminum wires, are received in the slots to form a stator coil. On the other hand, in a rotor, there are generally arranged permanent magnets to form a plurality of magnetic poles whose polarities alternate in a circumferential direction of the rotor.

SUMMARY

In the rotating electric machines known in the art (see, for example, Patent Document 1: Japanese Patent Application Publication No. JP 2011-250508 A), a magnetic field generated by the stator coil passes through the permanent magnets. Therefore, the permanent magnets may become demagnetized (i.e., irreversibly demagnetized) by the external magnetic field. In particular, in the case of the permanent magnets being attached on a rotor core (i.e., an iron core), due to the influence of the magnetic field generated by the stator coil, it may become easy for a magnetic force to be generated from the rotor core that has high permeability, thereby increasing the possibility of the permanent magnets becoming demagnetized.

The present disclosure has been made in view of the above circumstances. It is, therefore, an object of the present disclosure to provide a rotating electric machine which has magnets that are resistant to demagnetization.

A plurality of embodiments disclosed in this specification employ technical solutions different from each other to achieve respective objects. Objects, features and advantageous effects disclosed in this specification will become more apparent from the following detailed description with reference to the accompanying drawings.

According to a solution 1A, there is provided a rotating electric machine comprising:
  a field system including a magnet section having a plurality of magnetic poles whose polarities alternate in a circumferential direction; and
  an armature including a multi-phase armature coil,
  wherein
  either of the field system and the armature is configured as a rotor,
  the magnet section includes a plurality of magnets that are arranged at predetermined intervals and in alignment with each other in the circumferential direction,
  the magnets have easy axes of magnetization oriented such that at locations closer to a d-axis, the directions of the easy axes of magnetization are more parallel to the d-axis than at locations closer to a q-axis, the d-axis representing centers of the magnetic poles of the magnet section, the q-axis representing boundaries between the magnetic poles,
  in the magnets, magnet magnetic paths are formed along the easy axes of magnetization,
  the field system further includes a field-system core that is located on a non-armature side of the magnet section and formed of a soft-magnetic material,
  the field-system core has protrusions that radially protrude, respectively in gaps between the magnets, to the armature side,
  each of the protrusions is located closer to the q-axis than to the d-axis in the circumferential direction, and
  circumferential end surfaces of the protrusions respectively abut circumferential end surfaces of the magnets.

According to the solution 1A, in the magnets, the easy axes of magnetization are oriented such that at locations closer to the d-axis, the directions of the easy axes of magnetization are more parallel to the d-axis than at locations closer to the q-axis. That is, in the magnets, the magnet magnetic paths are formed so as to be more parallel to the circumferential direction on the q-axis side than on the d-axis side. Therefore, with the circumferential end surfaces of the protrusions respectively abutting the circumferential end surfaces of the magnets, it becomes easy for the magnet magnetic paths of the circumferentially-adjacent magnets to be connected via the protrusions, thereby making it easy for the magnet magnetic paths to be lengthened in a pseudo manner. Accordingly, it becomes difficult for the magnets to be demagnetized. Moreover, with the magnet magnetic paths lengthened, it becomes possible to increase the magnetic flux density on the d-axis. Furthermore, it becomes easy for magnetic flux to pass through the protrusions; thus it becomes possible to reduce the thickness of the field-system core.

According to a solution 2A, in the above solution 1A, in each of the magnets, an armature-side peripheral surface and the circumferential end surfaces of the magnet constitute magnetic flux inflow/outflow surfaces. The magnet magnetic paths are arc-shaped to connect the armature-side peripheral surface and the circumferential end surfaces in each of the magnets.

According to the solution 2A, it becomes easier, with the circumferential end surfaces of the protrusions respectively abutting the circumferential end surfaces of the magnets, for the magnet magnetic paths of the circumferentially-adjacent magnets to be connected via the protrusions. Moreover, with the magnet magnetic paths arc-shaped to connect the armature-side peripheral surface and the circumferential end surfaces, it becomes easier to lengthen the magnet magnetic paths.

According to a solution 3A, in the above solution 1A or 2A, the circumferential end surfaces of the magnets are formed to be perpendicular to the respective magnet magnetic paths. The circumferential end surfaces of the protrusions are formed according to angles of the circumferential end surfaces of the magnets which they respectively abut.

Unless the protrusions are magnetically saturated, magnetic flux passes through the protrusions so as to minimize the flow distance Therefore, with the circumferential end surfaces of the magnets formed to be perpendicular to the respective magnet magnetic paths, it becomes easier for the magnet magnetic paths of the circumferentially-adjacent magnets to be connected via the protrusions.

According to a solution 4A, in any one of the above solutions 1A-3A, recesses each being radially recessed are formed in the armature-side peripheral surfaces of the magnets so as to be located closer to the q-axis than to the d-axis.

In the magnets having the magnet magnetic paths formed therein as described above, at the q-axis-side ends, armature-side portions may be easily demagnetized. In view of the above, according to the solution 4A, the recesses are formed in the armature-side peripheral surfaces of the magnets so as to be located closer to the q-axis than to the d-axis, thereby reducing those portions of the magnets which may be easily demagnetized.

According to a solution 5A, in the above solution 4A, the recesses are formed so that a radial air gap between the magnets and the armature gradually increases as the position approaches the q-axis.

With the above configuration, it becomes possible to make the surface magnetic flux density distribution of the magnets approximate to a sine waveform while reducing those portions of the magnets which may be easily demagnetized. Consequently, it becomes possible to suppress eddy current loss on the armature side and reduce cogging torque or torque ripple.

According to a solution 6A, in any one of the above solutions 1A-5A, the protrusions are formed to have a smaller radial dimension than the magnets. The magnet section further has auxiliary magnets arranged between the circumferentially-adjacent magnets and on the armature side of the protrusions in a radial direction. The auxiliary magnets have easy axes of magnetization oriented to be parallel to the circumferential direction at the q-axis. In the auxiliary magnets, magnet magnetic paths are formed along the easy axes of magnetization.

According to the solution 6A, in the auxiliary magnets, the easy axes of magnetization are oriented to be parallel to the circumferential direction at the q-axis; and the magnet magnetic paths are formed along the easy axes of magnetization. Therefore, with the magnet magnetic paths of the auxiliary magnets, the magnetic flux density of the magnets on the d-axis can be increased. Moreover, since the easy axes of magnetization of the auxiliary magnets are parallel to the circumferential direction at the q-axis, it is difficult for the auxiliary magnets to become demagnetized even under the influence of magnetic field from the armature. Accordingly, though arranged on the armature side of the protrusions at the q-axis, the auxiliary magnets are resistant to being demagnetized; thus the magnetic flux density on the d-axis can be enhanced by the auxiliary magnets. Moreover, since the auxiliary magnets are arranged in the gaps between the magnets to occupy the vacant spaces on the armature side of the protrusions, they are prevented from protruding from the magnets to the armature side.

According to a solution 7A, in any one of the above solutions 1A-6A, the armature coil has electrical conductor sections opposed to the field system and arranged at predetermined intervals in the circumferential direction. In the armature, there are provided inter-conductor members between the electrical conductor sections in the circumferential direction or no inter-conductor members are provided between the electrical conductor sections in the circumferential direction. The inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

With the above configuration, it becomes possible to reduce the influence of magnetic saturation in the armature, thereby increasing the torque.

Moreover, conventionally, there are known, for example as disclosed in Patent Document 2 (i.e., Japanese Patent Application Publication No. JP 2017-169338 A), rotating electric machines which are applied to household appliances, industrial equipment, amusement machines, agricultural and construction machines and motor vehicles. In general, the so-called slots, which are coil-receiving portions defined by teeth, are formed in a stator core (i.e., an iron core). Electrical conductors, such as copper wires or aluminum wires, are received in the slots to form a stator coil.

When the stator coil is wound in the slots, coil ends may protrude axially outward from the stator core. Despite the fact that the coil ends hardly contribute to rotational torque, the rotating magnetic field generated by a magnet section of a rotor may be directly applied to the coil ends. In this case, the magnetic field from the viewpoint of the stator coil is a wave-like alternating magnetic field; therefore eddy current would be induced to flow in the electrical conductors forming the stator coil. As a result, eddy current loss would occur and thus the temperature and/or vibration of the stator might increase. In particular, when the magnet section has a larger axial size than the stator core, it is easy for the amount of leakage magnetic flux to become large at the coil ends; thus the influence of the rotating magnetic field would become large, resulting in high eddy current loss.

The following solutions have been made in view of the above circumstances and aim to provide a rotating electric machine capable of reducing eddy current loss.

According to a solution 1B, there is provided a rotating electric machine comprising:
 a field system including a magnet section having a plurality of magnetic poles whose polarities alternate in a circumferential direction; and
 an armature including a multi-phase armature coil,
 wherein
 either of the field system and the armature is configured as a rotor,
 a radial thickness of the magnet section at both axial ends thereof is set to be smaller than a radial thickness of the magnet section at an axial central portion thereof so that a cross section of the magnet section along an axial direction of the rotor is convex toward the armature side, and smaller-thickness portions of the magnet section at the axial ends thereof are located in the axial direction to radially overlap corresponding coil ends of the armature coil.

With the above configuration, in the radial direction (i.e., direction perpendicular to axial direction), the distances (or air gaps) from the coil ends to the corresponding smaller-thickness portions become long; and it becomes possible to shorten magnet magnetic paths formed in the smaller-thickness portions and directed toward corresponding coil ends, thereby weakening magnetic flux (i.e. leakage magnetic flux) flowing from the smaller-thickness portions to the corresponding coil ends. Consequently, it becomes possible to suppress magnetic flux flowing from the magnet section to the coil ends, thereby suppressing eddy current loss in the coil ends.

Moreover, with the cross section of the magnet section shaped to be convex toward the armature side, at least part of the magnetic flux generated from the smaller-thickness portions can be concentrated on the axial central portion of the magnet section. Consequently, it becomes possible to enhance the magnetic flux flowing out from the axial central portion and thereby increase the torque in comparison with the case of no magnet section radially overlapping the coil ends and the case of the cross section of the magnet section being not convex.

According to a solution 2B, in the above solution 1B, axial end surfaces of the magnet section are formed as oblique surfaces that are oblique to a direction perpendicular to the axial direction.

With the above configuration, the magnet section can be more easily shaped by compression shaping in comparison with the case of providing steps in the magnet section. This configuration is effective particularly in the case of employing sintered magnets in the magnet section.

According to a solution 3B, in the above solution 1B or 2B, in the magnet section: easy axes of magnetization in the smaller-thickness portions are oriented to be more parallel to the axial direction than an easy axis of magnetization in the axial central portion is; and magnet magnetic paths are formed along the easy axes of magnetization.

In the magnet section, with the easy axes of magnetization in the smaller-thickness portions oriented to be more parallel to the axial direction than the easy axis of magnetization in the axial central portion is, magnetic flux from the smaller-thickness portions can be concentrated on the axial central portion, thereby increasing the torque. At the same time, it becomes possible to weaken the magnetic flux generated in the direction perpendicular to the axial direction and flowing from the smaller-thickness portions to the coil ends, thereby reducing eddy current loss in the coil ends.

According to a solution 4B, in the above solution 3B, an armature-side peripheral surface and the axial end surfaces of the magnet section constitute magnetic flux inflow/outflow surfaces. The magnet magnetic paths comprise arc-shaped magnetic paths that are formed to connect the armature-side peripheral surface and the axial end surfaces of the magnet section.

With the above configuration, it becomes difficult for magnetic flux to flow from the magnet section to the coil ends that are arranged within the axial ranges of end portions of the magnet section; meanwhile, it becomes easy for magnetic flux to flow from the armature-side peripheral surface to the armature. Consequently, it becomes possible to further increase the torque and further reduce eddy current loss in the coil ends.

According to a solution 5B, in any one of the above solutions 1B-4B, the magnet section includes a plurality of magnets arranged in the circumferential direction. The smaller-thickness portions are formed in each of the magnets. At either or both of the axial ends of the magnet section, there is provided a holding member. The holding member has an engaging portion radially engaging corresponding ones of the smaller-thickness portions of the magnets.

Consequently, with the holding member, it becomes possible to suppress radial and axial displacement and/or detachment of the magnets. Moreover, since the engaging portion of the holding member engages with the corresponding smaller-thickness portions whose radial thickness is small, it becomes possible to suppress the radial thickness of the entire field system from being increased due to the provision of the holding ring.

According to a solution 6B, in any one of the above solutions 1B-5B, the magnet section is constituted of magnets whose intrinsic coercive force is higher than or equal to 400 [kA/m] and residual flux density is higher than or equal to 1.0 [T].

Even with employment of the magnets as above, it is still possible to increase the torque while suitably reducing eddy current loss in the coil ends.

According to a solution 7B, in any one of the above solutions 1B-6B, the magnet section is constituted of magnets whose easy axes of magnetization are oriented such that at locations closer to a d-axis, the directions of the easy axes of magnetization are more parallel to the d-axis than at locations closer to a q-axis; the d-axis represents centers of the magnetic poles of the magnet section while the q-axis represents boundaries between the magnetic poles.

With employment of the magnets whose easy axes of magnetization are oriented such that at locations closer to the d-axis, the directions of the easy axes of magnetization are more parallel to the d-axis than at locations closer to the q-axis, the magnet magnetic flux on the d-axis is intensified, thereby making it possible to increase the torque. Moreover, in each of the magnetic poles of the magnet section, the surface magnetic flux change (i.e., increase or decrease in the magnetic flux) from the q-axis to the d-axis becomes gentle. Consequently, it becomes possible to suppress occurrence of sharp voltage change due to unbalanced switching and thus becomes possible to suppress eddy current loss and/or vibration of the armature.

According to a solution 8B, in the above solution 7B, in the magnets: the directions of the easy axes of magnetization are parallel or near parallel to the d-axis in d-axis-side portions of the magnets and perpendicular or near perpendicular to the q-axis in q-axis-side portions of the magnets; and arc-shaped magnet magnetic paths are formed along the easy axes of magnetization.

With the above configuration, the magnet magnetic flux on the d-axis is intensified and magnetic flux change the vicinity of the q-axis is suppressed. Consequently, it becomes possible to suitably realize such magnets as to allow the surface magnetic flux change from the q-axis to the d-axis in each of the magnetic poles to become gentle.

According to a solution 9B, in the above solution 7B or 8B, in each of the magnets: of peripheral surfaces of the magnet, an armature-side peripheral surface and q-axis-side end surfaces in the circumferential direction constitute magnetic flux inflow/outflow surfaces; and magnet magnetic paths are formed to connect the armature-side peripheral surface and the q-axis-side end surfaces.

With the above configuration, the magnet magnetic flux on the d-axis is intensified and magnetic flux change the vicinity of the q-axis is suppressed. Consequently, it becomes possible to suitably realize such magnets as to allow the surface magnetic flux change from the q-axis to the d-axis in each of the magnetic poles to become gentle.

According to a solution 10B, in any one of the above solutions 1B-9B, the armature coil has electrical conductor sections opposed to the field system and arranged at predetermined intervals in the circumferential direction. Each of electrical conductors forming the electrical conductor sections is constituted of a wire bundle in which: a plurality of wires are bundled together; and the electrical resistances between the wires are higher than the electrical resistance of each of the wires.

Consequently, it becomes possible to further reduce eddy current loss in the coil ends.

Moreover, conventionally, there are known, for example as disclosed in Patent Document 1, rotating electric machines which are applied to household appliances, industrial equipment, amusement machines, agricultural and construction machines and motor vehicles. In general, the so-called slots, which are coil-receiving portions defined by teeth, are formed in a stator core (i.e., an iron core). Electrical conductors, such as copper wires or aluminum wires, are received in the slots to form a stator coil. On the other hand, in a rotor, there are generally arranged permanent magnets to form a plurality of magnetic poles whose polarities alternate in a circumferential direction of the rotor.

The magnetic field generated by the stator coil passes through the permanent magnets. During rotation of the rotor relative to the stator, the magnetic field of the stator coil from the viewpoint of the permanent magnets is a wave-like alternating magnetic field; therefore eddy current will be induced to flow in the permanent magnets. As a result, with occurrence of the eddy current loss, the temperature of the permanent magnets may be increased, thereby lowering the magnetic flux density and thus causing the torque to drop.

The following solutions have been made in view of the above circumstances and aim to provide a rotating electric machine capable of reducing eddy current loss in a magnet section.

According to a solution 1C, there is provided a rotating electric machine comprising:
  a field system including a magnet section having a plurality of magnetic poles whose polarities alternate in a circumferential direction; and
  an armature including a multi-phase armature coil, wherein
  either of the field system and the armature is configured as a rotor,
  the magnet section includes a plurality of permanent magnets that are arranged in alignment with each other in at least one of the circumferential direction and an axial direction,
  the field system further includes a magnet insulating section that has, at least, inter-magnet members arranged between the permanent magnets adjacent to one another in the circumferential direction or the axial direction, and
  the inter-magnet members are formed of an electrically-insulative material.

With the above configuration, the magnet section is constituted of the permanent magnets; and the inter-magnet members, which are formed of an electrically-insulative material, are arranged between the permanent magnets adjacent to one another in the circumferential direction or the axial direction. Consequently, it becomes possible to suppress eddy current from flowing between the adjacent permanent magnets, thereby suppressing eddy current loss.

According to a solution 2C, in the above solution 1C, the magnet section includes a plurality of the permanent magnets arranged in alignment with each other in the circumferential direction. The inter-magnet members, which are arranged between the circumferentially-adjacent permanent magnets, engage with end surfaces of the permanent magnets in the circumferential direction.

With the above configuration, the inter-magnet members can function as a rotational-displacement stopper of the permanent magnets. Consequently, it becomes possible to prevent the permanent magnets from being displaced in the circumferential direction and thereby causing contact between the circumferentially-adjacent permanent magnets; thus it becomes possible to suitably perform electrical insulation between the permanent magnets.

According to a solution 3C, in the above solution 1C or 2C, of circumferential surfaces of the magnet section, in an armature-side circumferential surface on the armature side, there are formed recesses, which open to the armature side, along the axial direction of the rotor. The magnet insulating section further has engaging portions arranged respectively in the recesses to radially and circumferentially engage with the permanent magnets.

With the above configuration, in the armature-side circumferential surface of the magnet section, there are formed the recesses that open to the armature side; and in the recesses, there are respectively arranged the engaging portions of the magnet insulating section to radially and circumferentially engage with the permanent magnets. Therefore, the engaging portions can also function as a rotational-displacement stopper of the permanent magnets. Consequently, it becomes possible to more reliably prevent the permanent magnets from being displaced in the circumferential direction and thereby causing contact between the circumferentially-adjacent permanent magnets; thus it becomes possible to more suitably perform electrical insulation between the permanent magnets. Moreover, it also becomes possible to restrict radial displacement of the permanent magnets to the armature side, thereby preventing the permanent magnets from being detached from the magnet section to the armature side. Furthermore, with the engaging portions arranged respectively in the recesses, it becomes possible to suppress the engaging portions from protruding from the permanent magnets to the armature side in comparison with the case arranging the engaging portions between the armature-side circumferential surface of the magnet section and the armature. In addition, by forming the recesses in the magnet section, it becomes possible to reduce the volume of the magnets.

According to a solution 4C, in the above solution 3C, the recesses are formed closer to a q-axis than to a d-axis; the q-axis represents boundaries between the magnetic poles of the magnet section while the d-axis represents centers of the magnetic poles.

On the armature-side circumferential surface of the magnet section, the density of the magnetic flux directed to the armature is more easily influenced by d-axis-side portions of the permanent magnets than by q-axis-side portions of the same; therefore, it is undesirable to form the recesses in the d-axis-side portions. More specifically, if the recesses were formed in the armature-side circumferential surface of the magnet section on the d-axis side, the distance between the armature and the magnet section would be increased on the d-axis side. In other words, the air gap between the armature and the magnet section would be increased on the d-axis side. Consequently, the density of the magnetic flux directed to the armature might be lowered. Moreover, if the recesses were formed on the d-axis side, the magnet magnetic paths of the permanent magnets would be shortened; consequently, the density of the magnetic flux directed to the armature might be lowered. Accordingly, it is undesirable to form the recesses in the d-axis-side portions of the permanent magnets. Hence, it is preferable to form the recesses on the q-axis side.

In addition, in the case of the recesses being provided on the q-axis side in the permanent magnets, it becomes easy for the density of the magnetic flux directed to the armature coil to be lowered on the q-axis. However, the lowering of the density of the magnetic flux directed to the armature coil on the q-axis affects the torque less than the lowering of the density of the magnetic flux directed to the armature coil on the d-axis does in the case of providing the recesses on the d-axis side. On the other hand, with the recesses provided on the q-axis side, it becomes possible to suppress sharp change in magnetic flux in the vicinity of the q-axis. Further, by suppressing sharp change in magnetic flux in the vicinity of the q-axis, it becomes possible to suppress eddy current from being induced in the armature coil.

According to a solution 5C, in any one of the above solutions 1C-3C, the permanent magnets have easy axes of magnetization oriented such that at locations closer to a d-axis, the directions of the easy axes of magnetization are more parallel to the d-axis than at locations closer to a q-axis; the d-axis represents centers of the magnetic poles of the magnet section while the q-axis represents boundaries between the magnetic poles.

Consequently, the magnet magnetic flux on the d-axis is intensified and magnetic flux change in the vicinity of the q-axis is suppressed. As a result, it becomes possible to increase the torque while reducing eddy current loss in the armature coil.

Moreover, with the above configuration, at the q-axis-side ends of the permanent magnets, the magnet magnetic paths are shorter in armature-side portions of the permanent magnets than in non-armature-side portions of the permanent magnets; thus, the armature-side portions may be more easily demagnetized than the non-armature-side portions. Therefore, in the case of providing recesses on the q-axis side, it is possible to suppress the magnetic flux density on the d-axis from being lowered.

According to a solution 6C, in the above solution 5C, the permanent magnets are oriented to form arc-shaped magnet magnetic paths such that the directions of the easy axes of magnetization are parallel or near parallel to the d-axis in d-axis-side portions of the permanent magnets and perpendicular or near perpendicular to the q-axis in q-axis-side portions of the permanent magnets.

With the above configuration, the magnet magnetic flux on the d-axis is intensified and magnetic flux change in the vicinity of the q-axis is suppressed. Moreover, with the above configuration, at the q-axis-side ends of the permanent magnets, armature-side portions of the permanent magnets may be easily demagnetized. Therefore, in the case of providing recesses on the q-axis side, it is possible to suppress the magnetic flux density on the d-axis from being lowered.

According to a solution 7C, in any one of the above solutions 1C-6C, the magnet insulating section further has openings that open to the armature side so as to have an armature-side circumferential surface of the magnet section exposed to the armature.

If there was an insulating member provided between the permanent magnets and the armature, it would become a hindrance to magnetic flux flowing therebetween. Moreover, if there was an insulating member provided between the permanent magnets and the armature, the distance between the permanent magnets and the armature would be accordingly increased, thereby making it difficult for magnetic flux to flow therebetween. In view of the above, according to the solution 7C, the armature-side circumferential surface of the magnet section is exposed to the armature. Consequently, though there is provided the magnet insulating section to insulate between the permanent magnets, it is still possible to suppress the density of magnetic flux flowing from the permanent magnets to the armature from being lowered.

According to a solution 8C, in any one of the above solutions 1C-7C, an armature-side circumferential surface of the magnet insulating section is radially located on a non-armature side of the armature-side circumferential surface of the magnet section.

In general, the expansion coefficient of an insulating member is higher than the expansion coefficients of permanent magnets. Therefore, in consideration of the expansion coefficients as above, the armature-side circumferential surface of the magnet insulating section is radially located on the non-armature side of the armature-side circumferential surface of the magnet section. Consequently, when thermal expansion occurs, the magnet insulating section can be prevented from radially protruding from the permanent magnets to the armature side and thus from becoming a hindrance to rotation.

According to a solution 9C, in any one of the above solutions 1C-8C, the field system further includes a field-system core member that is located on a non-armature side of the magnet section and formed of a soft-magnetic material. The magnet insulating section further has an insulating layer radially located to cover a non-armature-side circumferential surface of the magnet section. With the insulating layer covering the non-armature-side circumferential surface of the magnet section, the magnet insulating section is fixed, together with the magnet section, to the field-system core member.

With the insulating layer provided to insulate between the field-system core member and the magnet section, it becomes possible to suppress eddy current from being induced between them. Consequently, it becomes possible to suppress eddy current loss in the field system.

Moreover, in the case of the rotating electric machine being of an outer rotor type where the field system is configured as the rotor, the insulating layer provided between the field-system core member and the permanent magnets can function as a damper. Consequently, even when centrifugal force is generated in the magnet section during rotation, with the insulating layer, it is still possible to prevent the permanent magnets from making contact with the field-system core member. As a result, it becomes possible to suitably insulate between the permanent magnets and the field-system core member, thereby suppressing eddy current loss in the field system.

According to a solution 10C, in any one of the above solutions 1C-9C, the magnet insulating section further has a pair of annular end plates arranged respectively on opposite axial sides of the magnet section. Each of the inter-magnet members adjacent to one another in the circumferential direction has its axial ends fixed respectively to the pair of end plates.

Consequently, with the end plates, it becomes possible to enhance the strength of the inter-magnet members, thereby suitably preventing rotational displacement of the permanent magnets.

According to a solution 11C, in any one of the above solutions 1C-10C, the permanent magnets have an intrinsic coercive force higher than or equal to 400 [kA/m] and a residual flux density higher than or equal to 1.0 [T].

Consequently, it becomes possible to increase the torque.

According to a solution 12C, in any one of the above solutions 1C-11C, the armature coil has electrical conductor sections opposed to the field system and arranged at predetermined intervals in the circumferential direction. In the armature, there are provided inter-conductor members between the electrical conductor sections in the circumferential direction or no inter-conductor members are provided between the electrical conductor sections in the circumferential direction. The inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

Consequently, it becomes possible to overcome torque limitation due to magnetic saturation.

According to a solution 13C, in any one of the above solutions 1C-12C, the armature coil has electrical conductor sections opposed to the field system and arranged at predetermined intervals in the circumferential direction. Each of electrical conductors forming the electrical conductor sections is constituted of a wire bundle in which: a plurality of wires are bundled together; and electrical resistances between the wires are higher than an electrical resistance of each of the wires.

Consequently, it becomes possible to suppress eddy current loss in the electrical conductor sections.

According to a solution 14C, in any one of the above solutions 1C-13C, the armature coil has electrical conductor sections opposed to the field system and arranged at predetermined intervals in the circumferential direction. The radial thickness of the electrical conductor sections is smaller than the circumferential width of the electrical conductor sections per phase in each magnetic pole.

Consequently, it becomes possible to increase the torque while suppressing eddy current loss in the electrical conductor sections.

Moreover, conventionally, there are known, for example as disclosed in Patent Document 1, rotating electric machines which are applied to household appliances, industrial equipment, amusement machines, agricultural and construction machines and motor vehicles. In general, the so-called slots, which are coil-receiving portions defined by teeth, are formed in a stator core (i.e., an iron core). Electrical conductors, such as copper wires or aluminum wires, are received in the slots to form a stator coil. On the other hand, in a rotor, there are generally arranged permanent magnets to form a plurality of magnetic poles whose polarities alternate in a circumferential direction of the rotor.

The magnetic field generated by the stator coil passes through the permanent magnets. During rotation of the rotor relative to the stator, the magnetic field of the stator coil from the viewpoint of the permanent magnets is a wave-like alternating magnetic field; therefore eddy current will be induced to flow in the permanent magnets. As a result, with occurrence of the eddy current loss, the temperature of the permanent magnets may be increased, thereby lowering the magnetic flux density and thus causing the torque to drop.

The following solutions have been made in view of the above circumstances and aim to provide a rotating electric machine having improved performance of cooling magnets.

According to a solution 1D, there is provided a rotating electric machine comprising:
a field system including a magnet section having a plurality of magnetic poles whose polarities alternate in a circumferential direction; and
an armature including a multi-phase armature coil,
wherein
either of the field system and the armature is configured as a rotor,
the magnet section includes a plurality of magnets that are arranged in alignment with each other in the circumferential direction,
the magnets have easy axes of magnetization oriented such that at locations closer to a d-axis, the directions of the easy axes of magnetization are more parallel to the d-axis than at locations closer to a q-axis, the d-axis representing centers of the magnetic poles of the magnet section, the q-axis representing boundaries between the magnetic poles,
in the magnets, magnet magnetic paths are formed along the easy axes of magnetization, and
the plurality of magnets include magnets each of which abuts, on at least one of circumferential sides thereof, an adjacent one of the magnets, and magnets each of which is spaced, on at least one of circumferential sides thereof, from an adjacent one of the magnets.

With the above configuration, in the magnet section, there are employed the magnets where: the easy axes of magnetization are oriented such that at locations closer to the d-axis, the directions of the easy axes of magnetization are more parallel to the d-axis than at locations closer to the q-axis; and the magnet magnetic paths are formed along the easy axes of magnetization. Here, the d-axis represents the centers of the magnetic poles of the magnet section while the q-axis represents the boundaries between the magnetic poles. With employment of the above magnets, to make the magnetic flux density distribution approximate to a sine waveform and increase the magnetic flux density on the d-axis, it is desirable to arrange the magnets in the circumferential direction so as to minimize gaps between the adjacent magnets. However, if no gaps were provided between the adjacent magnets, there would be formed no passages (or flow paths) through which fluid, such as air, can flow in the axial direction. Consequently, the performance of cooling the magnet section would be lowered.

In view of the above, according to the solution 1D, the magnets constituting the magnet section include both those magnets each of which abuts, on at least one of circumferential sides thereof, an adjacent one of the magnets and those magnets each of which is spaced, on at least one of circumferential sides thereof, from an adjacent one of the magnets. Consequently, it becomes possible to utilize the gaps provided between the adjacent magnets as flow paths and thereby improve the performance of cooling the magnet section while making the magnetic flux density distribution approximate to a sine waveform and increasing the magnetic flux density on the d-axis.

According to a solution 2D, in the above solution 1D, the number of gaps between the magnets is set to a prime number different from the number of the magnetic poles of the magnet section and the number of phases of the armature coil.

With the above configuration, by setting the number of the gaps between the magnets to a prime number different from the number of the magnetic poles and the number of phases, it becomes possible to suppress resonance from occurring between the field system and the stator.

According to a solution 3D, in the above solution 1D or 2D, the gaps between the magnets consist of a plurality of gaps arranged in the circumferential direction such that not all intervals between adjacent ones of the gaps are equal.

With the above configuration, by unequally setting the intervals between the circumferentially-adjacent gaps, it becomes possible to more reliably suppress occurrence of resonance.

According to a solution 4D, in any one of the above solutions 1D-3D, in the magnet section, there are provided passages each axially penetrating the magnet section. The passages are located closer to the q-axis than to the d-axis on the armature side, or located closer to the d-axis than to the q-axis on the non-armature side.

In the q-axis-side portions of the magnets, it is easy for the magnet magnetic paths to become short on the armature side; thus it is easy for the q-axis-side portions to become demagnetized on the armature side. On the other hand, in the d-axis-side portions of the magnets, it is easy for the magnet magnetic paths to become short on the non-armature side; thus it is easy for the d-axis-side portions to become demagnetized on the non-armature side. Therefore, the influence of removal of parts of the q-axis-side portions on the armature side and parts of the d-axis-side portions on the non-armature side on the density of magnetic flux generated from the d-axis is small. In view of the above, according to the solution 4D, the passages each axially penetrating the magnet section are provided in the q-axis-side portions on the armature side, or provided in the d-axis-side portions on the non-armature side. Consequently, it becomes possible to provide the passages that can make up flow paths through which fluid can flow while suppressing the magnetic flux density from being lowered. As a result, it becomes possible to improve the performance of the magnet section. In addition, it also becomes possible to reduce the volume of the magnets.

According to a solution 5D, there is provided a rotating electric machine comprising:
 a field system including a magnet section having a plurality of magnetic poles whose polarities alternate in a circumferential direction; and
 an armature including a multi-phase armature coil, wherein
 either of the field system and the armature is configured as a rotor,
 the magnet section includes magnets having easy axes of magnetization oriented such that at locations closer to a d-axis, the directions of the easy axes of magnetization are more parallel to the d-axis than at locations closer to a q-axis, the d-axis representing centers of the magnetic poles of the magnet section, the q-axis representing boundaries between the magnetic poles,
 in the magnets, magnet magnetic paths are formed along the easy axes of magnetization, and
 in the magnet section, there are provided passages each axially penetrating the magnet section, and
 the passages are located closer to the q-axis than to the d-axis on the armature side, or located closer to the d-axis than to the q-axis on the non-armature side.

In the q-axis-side portions of the magnets, it is easy for the magnet magnetic paths to become short on the armature side; thus it is easy for the q-axis-side portions to become demagnetized on the armature side. On the other hand, in the d-axis-side portions of the magnets, it is easy for the magnet magnetic paths to become short on the non-armature side; thus it is easy for the d-axis-side portions to become demagnetized on the non-armature side. Therefore, the influence of removal of parts of the q-axis-side portions on the armature side and parts of the d-axis-side portions on the non-armature side on the density of magnetic flux generated from the d-axis is small. In view of the above, according to the solution 5D, the passages each axially penetrating the magnet section are provided in the q-axis-side portions on the armature side, or provided in the d-axis-side portions on the non-armature side. Consequently, it becomes possible to provide the passages that can make up flow paths through which fluid can flow while suppressing the magnetic flux density from being lowered. As a result, it becomes possible to improve the performance of the magnet section. In addition, it also becomes possible to reduce the volume of the magnets.

According to a solution 6D, in any one of the above solutions 1D-5D, the magnet section has the plurality of magnets arranged in alignment with each other in the circumferential direction. The magnets are electrically insulated from each other by an insulating coat that is provided, at least, between circumferentially-adjacent ones of the magnets.

Consequently, it becomes possible to prevent eddy current from flowing between the adjacent magnets, thereby suppressing eddy current loss. That is, it becomes possible to suppress generation of heat in the magnet section.

According to a solution 7D, in any one of the above solutions 1D-6D, the armature coil has electrical conductor sections opposed to the field system and arranged at predetermined intervals in the circumferential direction. In the armature, there are provided inter-conductor members between the electrical conductor sections in the circumferential direction or no inter-conductor members are provided between the electrical conductor sections in the circumferential direction. The inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

Consequently, it becomes possible to overcome torque limitation due to magnetic saturation. Moreover, with the above configuration, in the receiving space for receiving the electrical conductor sections, gaps are reduced while the space factor of the electrical conductor sections is increased. That is, the cross-sectional areas of flow paths on the armature side, through which fluid can flow, are reduced, thereby lowering the cooling performance. Therefore, the passages (i.e. flow paths) or the gaps are provided in the magnet section to improve the cooling performance, thereby compensating the cooling performance drop on the armature side. As a result, in the rotating electric machine as a whole, it becomes possible to maintain or even improve the performance of cooling the magnet section.

According to a solution 8D, in any one of the above solutions 1D-7D, the armature coil has electrical conductor sections opposed to the field system and arranged at predetermined intervals in the circumferential direction. The radial thickness of the electrical conductor sections is smaller than the circumferential width of the electrical conductor sections per phase in each magnetic pole.

Consequently, it becomes possible to increase the torque while suppressing eddy current loss in the electrical conductor sections. Moreover, with the above configuration, in the receiving space for receiving the electrical conductor sections, gaps are reduced while the space factor of the electrical conductor sections is increased. That is, the cross-sectional areas of flow paths on the armature side, through which fluid can flow, are reduced, thereby lowering the cooling performance. Therefore, the passages (i.e. flow paths) or the gaps are provided in the magnet section to improve the cooling performance, thereby compensating the cooling performance drop on the armature side. As a result, in the rotating electric machine as a whole, it becomes possible to maintain or even improve the performance of cooling the magnet section.

According to a solution 9D, in any one of the above solutions 1D-8D, the armature coil has electrical conductor sections opposed to the field system and arranged at predetermined intervals in the circumferential direction. Each of electrical conductors forming the electrical conductor sections is constituted of a wire bundle in which: a plurality of wires are bundled together; and electrical resistances between the wires are higher than an electrical resistance of each of the wires.

Consequently, it becomes possible to suppress eddy current loss in the electrical conductor sections even if sharp change in the magnetic flux density is caused by the gaps between the magnets.

Conventionally, there are known rotating electric machines which are applied to household appliances, industrial equipment, amusement machines, agricultural and construction machines and motor vehicles. In these rotating electric machines, there are employed magnets such as those disclosed in Patent Document 3 (i.e., Japanese Patent Application Publication No. JP 2018-74767 A). According to Patent Document 3, it is possible to make the surface magnetic flux density distribution of the magnets approximate to a sine waveform. Consequently, it is possible to suppress sharp change in the magnetic flux, thereby suppressing cogging torque or torque ripple.

Moreover, there is a tendency for rotating electric machines to employ magnets having improved residual flux density and/or improved coercive force, so as to increase the torque. With such a tendency, magnets are desired which have a surface magnetic flux density distribution closer to a sine waveform in comparison with the magnets disclosed in Patent Document 3.

The following solutions have been made in view of the above circumstances and aim to provide a rotating electric machine capable of making the magnetic flux density distribution approximate to a sine waveform.

According to a solution 1E, there is provided a rotating electric machine comprising:
a field system including a magnet section having a plurality of magnetic poles whose polarities alternate in a circumferential direction; and
an armature including a multi-phase armature coil, wherein either of the field system and the armature is configured as a rotor,
the magnet section includes a plurality of magnets arranged in alignment with each other in the circumferential direction, and an annular field-system core member that is radially located on a non-armature side of the magnets and formed of a soft-magnetic material,
the magnets include, at least, first magnets in each of which a magnet magnetic path is formed parallel to a radial direction,
each of the first magnets is formed so that a radial air gap between the first magnet and the armature gradually increases as the position becomes, from a d-axis representing centers of the magnetic poles of the magnet section, closer to a q-axis representing boundaries between the magnetic poles, and
the field-system core member has protrusions radially protruding, respectively in gaps between the magnets, to the armature side, and
the protrusions are each located between the d-axis and the q-axis and formed to protrude from the first magnets to the armature side.

According to the solution 1E, the radial air gap between each of the first magnets and the armature gradually increases as the position becomes, from the d-axis representing the centers of the magnetic poles of the magnet section, closer to the q-axis representing the boundaries between the magnetic poles. Consequently, it becomes possible to make the surface magnetic flux density distribution of the magnet section approximate to a sine waveform. As a result, it becomes possible to make change in the magnetic flux gentle, thereby suppressing eddy current loss in the armature. Moreover, it also becomes possible to reduce cogging torque or torque ripple.

Moreover, according to the solution 1E, the protrusions of the field-system core member are arranged respectively in the gaps between the magnets and formed to protrude from the first magnets to the armature side. Consequently, at the circumferential ends of the first magnets, it becomes easy for the magnetic flux generated from the armature-side peripheral surfaces of the first magnets to be self-short-circuited through the protrusions; thus it becomes possible to lower the magnetic flux density at the circumferential ends of the first magnets. As a result, it becomes possible to make the surface magnetic flux density distribution of the magnet section closer to a sine waveform.

Furthermore, according to the solution 1E, the protrusions are each located between the d-axis and the q-axis and formed to protrude from the first magnets to the armature side. Consequently, it becomes easy for magnetic flux to flow through those regions where the protrusions are formed while it becomes difficult for magnetic flux to flow along the d-axis. That is, the inductance in those regions where the protrusions are formed is increased while the inductance along the d-axis is lowered; thus it becomes possible to realize inverse saliency. Consequently, though the magnetic flux is self-short-circuited and thus the magnet torque is lowered, it becomes possible to generate reluctance torque (or iron-core torque) and thereby increase the total torque.

According to a solution 2E, in the above solution 1E, each of the magnets has a rectangular cross-sectional shape and is arranged to have its lateral or longitudinal direction perpendicular to the radial direction.

According to the solution 2E, the magnets can be more easily manufactured compared to arc-shaped magnets and polar-anisotropic magnets.

According to a solution 3E, in the above solution 2E, the field system is located radially outside the armature and configured as the rotor.

According to the solution 3E, it becomes possible to easily have the radial air gap between each of the first magnets and the armature gradually narrowed as the position approaches the d-axis from the q-axis side as well as possible to easily manufacture the magnets.

According to a solution 4E, in the above solution 1E, the field system is located radially inside the armature and configured as the rotor.

In the case of the field system being located radially inside the armature, each of the first magnets may be formed to have an arc-shaped outer peripheral surface (i.e., armature-side peripheral surface) centering on the d-axis and convex toward the armature side. Consequently, the outer peripheral surfaces of the magnets may be formed as curved surfaces along the circumferential direction of the rotor, facilitating the design and arrangement of the magnets.

According to a solution 5E, there is provided a rotating electric machine comprising:

a field system including a magnet section having a plurality of magnetic poles whose polarities alternate in a circumferential direction; and an armature including a multi-phase armature coil, wherein the field system is located radially inside the armature and configured as a rotor, the magnet section includes a plurality of magnets arranged in alignment with each other in the circumferential direction, and an annular field-system core member that is radially located on a non-armature side of the magnets and formed of a soft-magnetic material, the magnets include, at least, first magnets in each of which a magnet magnetic path is formed parallel to a radial direction, each of the first magnets has a rectangular cross-sectional shape and is arranged to have its lateral or longitudinal direction perpendicular to the radial direction, the field-system core member has protrusions radially protruding, respectively in gaps between the magnets, to the armature side, and each of the protrusions has an end surface abutting an end surface of one of the first magnets in the circumferential direction.

According to the solution 5E, the protrusions of the field-system core member are arranged respectively in the gaps between the magnets. Moreover, the end surfaces of the first magnets respectively abut the end surfaces of the protrusions in the circumferential direction. Consequently, in the vicinities of the circumferential ends of the first magnets, it becomes easy for the magnetic flux generated from the armature-side peripheral surfaces (or the non-armature-side peripheral surfaces) of the first magnets to be self-short-circuited through the protrusions. That is, it becomes possible to have the density of the magnetic flux lowered as the position approaches the circumferential ends of the first magnets. Consequently, it becomes possible to make the surface magnetic flux density distribution of the magnet section approximate to a sine waveform. As a result, it becomes possible to make change in the magnetic flux gentle, thereby suppressing eddy current loss in the armature. Moreover, it also becomes possible to reduce torque ripple.

According to a solution 6E, in any one of the above solutions 1E-5E, the magnets further include, in addition to the first magnets, second magnets in each of which a magnet magnetic path is formed parallel to the circumferential direction. The first magnets are arranged at predetermined intervals in the circumferential direction. Each of the second magnets is arranged between one circumferentially-adjacent pair of the first magnets.

With the above arrangement of the magnets, though the magnetic flux is self-short-circuited through the protrusions, it still becomes possible to increase the magnetic flux density on the d-axis, thereby increasing the torque.

According to a solution 7E, in any one of the above solutions 1E-6E, the armature coil has electrical conductor sections opposed to the field system and arranged at predetermined intervals in the circumferential direction. In the armature, there are provided inter-conductor members between the electrical conductor sections in the circumferential direction or no inter-conductor members are provided between the electrical conductor sections in the circumferential direction. The inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

Consequently, it becomes possible to eliminate, on the armature side, inter-conductor members which distort the flow of magnetic flux generated by the armature coil or the magnet section. As a result, it becomes easy to maintain the surface magnetic flux density distribution of the magnet section in a sine waveform. In addition, in the case of providing the protrusions in the field system, it is possible to have the magnetic flux generated by the armature coil suitably flow through the protrusions, thereby increasing the reluctance torque.

Conventionally, IPM (Interior Permanent Magnet) rotors have been widely used in rotating electric machines. In these rotors, magnet-receiving holes are formed in a rotor core that is obtained by laminating magnetic steel sheets; and magnets are inserted respectively in the magnet-receiving holes. Moreover, there are disclosed, for example in Patent Document 4 (i.e., Japanese Patent Application Publication No. JP 2017-99071 A), magnets for use in IPM rotors. According to Patent Document 4, it is possible to realize magnets having a surface magnetic flux density distribution approximate to a sine wave. Consequently, magnetic flux change in the magnets disclosed in Patent Document 4 is gentler than that in radial magnets, making it possible to suppress eddy current loss. In addition, it is also possible to increase the magnetic flux density.

However, the magnets disclosed in Patent Document 4 are magnets which include expensive rare-earth substances. Therefore, in terms of cost, it is desirable to reduce the volume of the magnets.

The following solutions have been made in view of the above circumstances and aim to provide a rotating electric machine capable of reducing the volume of magnets while increasing the magnetic flux density.

According to a solution 1F, there is provided a rotating electric machine comprising:

a field system including a magnet section having a plurality of magnetic poles whose polarities alternate in a circumferential direction; and an armature including a multi-phase armature coil, wherein either of the field system and the armature is configured as a rotor, the magnet section includes magnets having easy axes of magnetization oriented in an arc shape such that at locations closer to a d-axis, the directions of the easy axes of magnetization are more parallel to the d-axis than at locations closer to a q-axis, the d-axis representing centers of the magnetic poles of the magnet section, the q-axis representing boundaries between the magnetic poles, in the magnets, arc-shaped magnet magnetic paths are formed along the easy axes of magnetization, the magnets have an intrinsic coercive force higher than or equal to 400 [kA/m] and a residual flux density higher than or equal to 1.0 [T], each of the magnets is provided between two circumferentially-adjacent positions of the d-axis, and a radial dimension from the armature to non-armature-side peripheral surfaces of the magnets is shorter on the d-axis side than on the q-axis side, the non-armature-side peripheral surfaces being those of peripheral surfaces of the magnets which are radially located on the non-armature side.

With the magnet section having a surface magnetic flux density distribution approximate to a sine waveform, it is possible to increase the torque; it is also possible to make change in the magnetic flux gentler and thereby more effectively suppress eddy current loss in comparison with radial magnets. Moreover, it is also possible to reduce torque ripple. On the other hand, in the case of the magnets being designed to have an intrinsic coercive force higher than or equal to 400 [kA/m] and a residual flux density higher than or equal to 1.0 [T] (i.e., to increase the magnetic flux density on the d-axis), to make the surface magnetic flux density distribution of the magnet section approximate to a sine waveform, it is desirable to provide each of the magnets between two circumferentially-adjacent positions of the d-axis and have the arc-shaped magnet magnetic paths formed in the magnets.

In the case of employing the magnets as above, to suppress magnetic flux leakage from the non-armature side of the magnet section, it is desirable for the magnets to have a given radial thickness. However, to enable the magnets to have an intrinsic coercive force higher than or equal to 400 [kA/m] and a residual flux density higher than or equal to 1.0 [T], it is generally necessary for the magnets to include expensive rare-earth substances. Consequently, the cost of the magnets may become high.

On the other hand, in the magnet section, it is easy for the magnet magnetic paths to become short in non-armature-side parts of d-axis-side portions of the magnets. Therefore, the non-armature-side parts of the d-axis-side portions of the magnets may be easily demagnetized and hardly contribute to increase in the magnetic flux density on the d-axis. Accordingly, removal of the non-armature-side parts of the d-axis-side portions from the magnets hardly affects the density of magnetic flux generated from the d-axis (i.e., hardly causes the magnetic flux density to be lowered) and hardly causes the torque to drop.

In view of the above, in the solution 1F, the magnets are configured so that the radial dimension from the armature to the non-armature-side peripheral surfaces of the magnets is shorter on the d-axis side than on the q-axis side. Consequently, it becomes possible to reduce the non-armature-side parts of the d-axis-side portions of the magnets. That is, it becomes possible to reduce those parts of the magnets which may be easily demagnetized, thereby making it possible to reduce the volume of the magnets without affecting the magnetic flux density. Hence, compared to the case of magnets having a given radial thickness over the entire circumferential range thereof, those parts of the magnets which may be easily demagnetized become smaller. As a result, it becomes possible to reduce the volume of the magnets while suppressing the magnetic flux density on the d-axis from being lowered.

Moreover, even with reduction in the radial thickness of the magnets, it still becomes possible to lengthen the magnet magnetic paths by providing each of the magnets between two circumferentially-adjacent positions of the d-axis and having the arc-shaped magnet magnetic paths formed in the magnets. That is, the magnet magnetic paths in the magnets become longer compared to radial magnets having straight magnet magnetic paths formed therein. Consequently, it becomes possible to increase the magnetic flux density on the d-axis while minimizing the radial thickness of the magnets.

According to a solution 2F, in the above solution 1F, each of the magnets is formed symmetrically with respect to the q-axis. The magnets are oriented to form the arc-shaped magnet magnetic paths such that the directions of the easy axes of magnetization are parallel or near parallel to the d-axis in d-axis-side portions of the magnets and perpendicular or near perpendicular to the q-axis in q-axis-side portions of the magnets. The magnet magnetic paths include a magnet magnetic path on an orientation arc in each of the magnets; the orientation arc centers on a center point set on the q-axis and passes through a first intersection point between the d-axis and an armature-side peripheral surface of the magnet.

According to the solution 2F, each of the magnets is formed symmetrically with respect to the q-axis. Moreover, each of the magnets is formed between two circumferentially-adjacent positions of the d-axis so as to have the magnet magnetic paths formed along the orientation arc; the orientation arc centers on the center point set on the q-axis and passes through the first intersection point between the d-axis and the armature-side peripheral surface of the magnet. Consequently, it becomes possible to sufficiently increase the lengths of the magnet magnetic paths, thereby furthering increasing the magnetic flux density on the d-axis.

According to a solution 3F, in the above solution 2F, the orientation arc is set such that a tangent line, which is tangent to the orientation arc at the first intersection point, is parallel to the d-axis.

According to the solution 3F, in each of the magnets, the orientation arc is set such that the tangent line, which is tangent to the orientation arc at the first intersection point, is parallel to the d-axis. The easy axes of magnetization of the magnets are oriented along the orientation arcs of the magnets; and the arc-shaped magnet magnetic paths are formed along the easy axes of magnetization. Consequently, it becomes possible to further increase the magnetic flux density on the d-axis. More specifically, at the first intersection point, the magnet magnetic paths become perpendicular to the armature-side peripheral surfaces of the magnets, thereby making it possible to increase the magnetic flux density on the d-axis. Moreover, the torque of the rotating electric machine depends on the magnetic flux density on the d-axis; therefore, by increasing the magnetic flux density on the d-axis, it also becomes possible to increase the torque.

According to a solution 4F, in the above solution 2F or 3F, the field system further includes a field-system core member that is located on the non-armature side of the magnet section and formed of a soft-magnetic material. The field-system core member is radially stacked on the magnets. Part or the whole of the field-system core member is radially located on the armature side of a second intersection point; the second intersection point is defined as an intersection point between the q-axis and the orientation arc in each of the magnets.

According to the solution 4F, the field-system core member is radially stacked on the magnets; and part or the whole of the field-system core member is radially located on the armature side (i.e., the magnet section side) of the second intersection point between the q-axis and the orientation arc. That is, the radial thickness of the magnets is reduced; and instead the field-system core member is provided which is formed of a soft-magnetic material. Consequently, though the magnets are made thinner, it still becomes possible to suppress magnetic flux leakage since magnetic flux can flow through the field-system core member that is formed of a soft-magnetic material. That is, it becomes difficult for the magnetic flux density on the d-axis to be lowered. As a result, it becomes possible to reduce the volume of the magnets without lowering the magnetic flux density on the d-axis.

According to a solution 5F, in the above solution 4F, the saturation flux density of the field-system core member is higher than the residual flux density of the magnets. The radial thickness of the field-system core member is smaller than a radial dimension from a third intersection point to the second intersection point; the third intersection point is defined as an intersection point between the q-axis and the non-armature-side peripheral surface in each of the magnets.

When the saturation flux density of the field-system core member is higher than the residual flux density of the magnets, it is possible to suitably suppress magnetic flux leakage even with part of the magnets replaced with the thin field-system core member formed of a soft-magnetic material. Consequently, it becomes possible to suitably suppress magnetic flux leakage while making the field-system core member thinner. As a result, it becomes possible to increase the magnetic flux density on the d-axis, thereby increasing the torque.

According to a solution 6F, in the above solution 4F or 5F, the magnets and the field-system core member are configured to satisfy the following relationship: Br×Wh≤Bs×Wsc, where Br is the residual flux density of the magnets, Wh is the distance from the center point to the first intersection point, Bs is the saturation flux density of the field-system core member and Wsc is the radial thickness of the field-system core member. Consequently, it becomes possible to more suitably suppress magnetic flux leakage.

According to a solution 7F, in the above solution 2F or 3F, the non-armature-side peripheral surfaces of the magnets are radially located on the non-armature side of a second intersection point; the second intersection point is defined as an intersection point between the q-axis and the orientation arc in each of the magnets.

Consequently, it becomes possible to suppress occurrence of magnetic flux leakage from the non-armature-side peripheral surfaces of the magnets and increase the magnetic flux density on the d-axis, thereby increasing the torque.

According to a solution 8F, in the above solution 7F, the field system further includes a magnet holding portion that holds the magnets. The magnet holding portion has non-armature-side covering parts respectively covering the non-armature-side peripheral surfaces of the magnets and armature-side covering parts respectively covering the armature-side peripheral surfaces of the magnets. The non-armature-side covering parts are thinner than the armature-side covering parts.

Consequently, it becomes easier for the non-armature-side covering parts to be magnetically saturated, thereby making it possible to suppress magnetic flux leakage from the non-armature-side peripheral surfaces of the magnets.

According to a solution 9F, in any one of the above solutions 1F-8F, each of the magnets is formed to have its radial thickness larger on the q-axis than on the d-axis side.

Consequently, in each of the magnets, there are formed a plurality of arc-shaped magnet magnetic paths that are concentric with and different in length from each other. As a result, it becomes possible to make the surface magnetic flux density distribution of the magnet section closer to a sine waveform.

According to a solution 10F, in any one of the above solutions 1F-9F, in the armature-side peripheral surfaces of the magnets, there are respectively formed recesses; each of the recesses opens to the armature side and is located closer to the q-axis than to the d-axis.

In the q-axis-side portions of the magnets, it is easy for the magnet magnetic paths to become short on the armature side; thus it is easy for the q-axis-side portions to become demagnetized on the armature side. More specifically, those parts of the q-axis-side portions of the magnets which are radially located on the armature side of the orientation arcs of the magnets may be easily demagnetized and hardly affect the magnetic flux density on the d-axis. That is, removal of these parts of the q-axis-side portions of the magnets hardly affects the density of magnetic flux generated from the d-axis. Consequently, with the recesses formed in these parts of the q-axis-side portions of the magnets, it becomes possible to reduce the volume of the magnets without lowering the magnetic flux density on the d-axis.

According to a solution 11F, in any one of the above solutions 1F-10F, each of the magnets is formed in a convex lens shape. Moreover, the non-armature-side peripheral surfaces of the magnets have a larger curvature than the armature-side peripheral surfaces of the magnets.

Consequently, it becomes possible to make the surface magnetic flux density distribution of the magnet section approximate to a sine waveform and increase the magnetic flux density on the d-axis while achieving reduction in the volume of the magnets.

Conventionally, IPM (Interior Permanent Magnet) rotors have been widely used in rotating electric machines. In these rotors, magnet-receiving holes are formed in a rotor core that is obtained by laminating magnetic steel sheets; and magnets are inserted respectively in the magnet-receiving holes. Moreover, apart from IPM rotors, SPM (Surface Permanent Magnet) rotors have been proposed for use in rotating electric machines (see, for example, Patent Document 1 and Patent Document 5 (i.e., Japanese Patent Application Publication No. JP H06-70522 A)).

In a rotating electric machine employing an SPM rotor, it is necessary to suitably fix magnets so as to prevent them from being detached during rotation of the rotor. As a magnet detachment prevention measure, one may consider covering a stator-side circumferential surface of the rotor (or stator-side peripheral surfaces of the magnets) with a metal or a high-strength resin. However, in this case, the magnetic flux surface would become further from the stator; thus the magnetic flux might be lowered. Moreover, if the stator-side circumferential surface of the rotor was covered with a metal, magnetic flux leakage and/or eddy current loss might occur.

The following solutions have been made in view of the above circumstances and aim to provide a rotating electric machine capable of suitably fixing magnets while suppressing magnetic flux from being lowered.

According to a solution 1 there is provided a rotating electric machine comprising:

- a field system including a magnet section and a cylindrical magnet holding portion, the magnet section having a plurality of magnetic poles whose polarities alternate in a circumferential direction, the magnet holding portion having the magnet section fixed to an inner circumferential surface or an outer circumferential surface thereof; and
- an armature including a multi-phase armature coil that is radially opposed to the magnet section, wherein either of the field system and the armature is configured as a rotor, the magnet section includes a plurality of magnets that are arranged in alignment with each other in the circumferential direction, each of the magnets is formed, between two circumferentially-adjacent positions of a d-axis, symmetrically with respect to a q-axis, the d-axis representing centers of the magnetic poles of the magnet section, the q-axis representing boundaries between the magnetic poles, the magnets have easy axes of magnetization oriented such that at locations closer to the d-axis, the directions of the easy axes of magnetization are more parallel to the d-axis than at locations closer to the q-axis, in the magnets, magnet magnetic paths are formed along the easy axes of magnetization, and each of the magnets has a non-armature-side peripheral surface that includes a pair of oblique surfaces formed respectively at opposite circumferential ends of the non-armature-side peripheral surface so as to be oblique toward the armature side, the magnet holding portion has protrusions radially located on the non-armature side of the magnet section and formed to radially protrude toward the magnet section, each of the protrusions is located closer to the d-axis than to the q-axis in the circumferential direction, and the protrusions are formed to be engageable with the oblique surfaces of the magnets in the circumferential direction.

Consequently, it becomes possible to suitably restrict rotational displacement of the magnets in the circumferential direction and suppress detachment of the magnets by having the protrusions and the oblique surfaces engage with each other in the circumferential direction. Moreover, the protrusions are formed to engage with the oblique surfaces provided in the non-armature-side peripheral surfaces of the magnets. Consequently, compared to the case of covering stator-side peripheral surfaces of the magnets, it becomes possible to suppress, without reducing an air gap between the rotor and the stator, the magnetic flux density from being lowered.

Moreover, each of the magnets is formed, between two circumferentially-adjacent positions of the d-axis, symmetrically with respect to the q-axis; the d-axis represents centers of the magnetic poles of the magnet section while the q-axis represents boundaries between the magnetic poles. The magnets have easy axes of magnetization oriented such that at locations closer to the d-axis, the directions of the easy axes of magnetization are more parallel to the d-axis than at locations closer to the q-axis. In the magnets, magnet magnetic paths are formed along the easy axes of magnetization. Consequently, it becomes possible to lengthen the magnet magnetic paths, thereby enhancing the magnetic flux density.

Moreover, in the non-armature-side peripheral surface of each of the magnets, there are provided the oblique surfaces respectively at opposite circumferential ends of the non-armature-side peripheral surface so as to be oblique toward the armature side and engageable with the protrusions. Consequently, with the oblique surfaces formed to be oblique toward the armature side, the radial thickness of each of the magnets at the circumferential ends thereof (i.e., on the d-axis side) becomes smaller than that at the circumferential center thereof (i.e., on the q-axis side). However, in the non-armature-side peripheral surface of each of the magnets where the magnet magnetic paths are formed as described above, d-axis-side portions may be more easily demagnetized than a q-axis-side portion. Therefore, removal of the d-axis-side portions hardly affects the magnetic flux density on the d-axis. Accordingly, with the oblique surfaces provided respectively at opposite circumferential ends of the non-armature-side peripheral surface of each of the magnets, each of the magnets becomes thinner at the circumferential ends by removal of those portions thereof which may be easily demagnetized. Consequently, it becomes possible to suppress the magnetic flux density from being lowered. In addition, it also becomes possible to reduce the volume of the magnets.

According to a solution 2G, in the above solution 1G, each of the magnets has one pole pair such that polarities at one end and the other end of the magnet in the circumferential direction are different from each other.

Consequently, it becomes possible to lengthen the magnet magnetic paths, thereby enhancing the magnetic flux density on the d-axis.

According to a solution 3G, in the above solution 1G or 2G, between the magnet holding portion and the magnets, there is provided a resin member via which the magnets are fixed to the magnet holding portion.

With the resin member provided between the magnet holding portion and the magnets, it becomes possible to have the magnets suitably bonded to the outer circumferential surface or the inner circumferential surface of the magnet holding portion, thereby preventing detachment of the magnets. Moreover, it also becomes possible to electrically insulate the magnet holding portion and the magnets from each other, thereby suppressing eddy current loss in the magnet section.

According to a solution 4G, in any one of the above solutions 1G-3G, armature-side recesses are formed, respectively in armature-side peripheral surfaces of the magnets, to open to the armature side in a radial direction. Each of the armature-side recesses is located closer to the q-axis than to the d-axis.

In the armature-side peripheral surface of each of the magnets where the magnet magnetic paths are formed as described above, a q-axis-side portion may be more easily demagnetized than d-axis-side portions. Therefore, removal of the q-axis-side portion hardly affects the magnetic flux density on the d-axis. In view of the above, in the solution 4G, in the armature-side peripheral surfaces of the magnets, the armature-side recesses are formed closer to the q-axis than to the d-axis. That is, the armature-side recesses are formed in those portions of the magnets which may be easily demagnetized. Consequently, it becomes possible to reduce the volume of the magnets without lowering the magnetic flux density on the d-axis.

According to a solution 5G, in the above solution 4 restricting members are received respectively in the armature-side recesses to restrict radial displacement of the magnets toward the armature side.

Consequently, it becomes possible to restrict radial displacement of the magnets toward the armature side, thereby suitably suppressing detachment of the magnets.

According to a solution 6G, in any one of the above solutions 1G-5G, the magnets are oriented to form the magnet magnetic paths in an arc shape such that the directions of the easy axes of magnetization are parallel or near parallel to the d-axis in d-axis-side portions of the magnets and perpendicular or near perpendicular to the q-axis in q-axis-side portions of the magnets.

In the magnets each of which is formed, between two circumferentially-adjacent positions of the d-axis, symmetrically with respect to the q-axis, it becomes possible to further lengthen the magnet magnetic paths by forming them in an arc shape as above. Consequently, it becomes possible to further enhance the magnetic flux density on the d-axis.

According to a solution 7G, in any one of the above solutions 1G-6G, the magnets are arranged such that polarities of each adjoining pair of circumferential ends of the magnets are the same.

Consequently, it becomes possible to make the magnet magnetic flux density distribution approximate to a sine waveform, thereby suppressing eddy current loss and torque ripple.

According to a solution 8G, in any one of the above solutions 1G-7G, each of the oblique surfaces is formed along one of the magnet magnetic paths.

With each of the oblique surfaces formed along one of the magnet magnetic paths, it becomes possible to lengthen the magnet magnetic paths while reducing the volume of the magnets. In addition, in the case of the magnets being formed of sintered magnets, they can be easily manufactured.

According to a solution 9; in any one of the above solutions 1G-8G, the magnets have an intrinsic coercive force higher than or equal to 400 [kA/m] and a residual flux density higher than or equal to 1.0 [T].

According to a solution 10 in any one of the above solutions 1G-9G, the armature coil has electrical conductor sections opposed to the field system and arranged at predetermined intervals in the circumferential direction. In the armature, there are provided inter-conductor members between the electrical conductor sections in the circumferential direction or no inter-conductor members are provided between the electrical conductor sections in the circumferential direction. The inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

According to a solution 11G, in any one of the above solutions 1G-10G, the armature coil has electrical conductor sections opposed to the field system and arranged at predetermined intervals in the circumferential direction. The radial thickness of the electrical conductor sections is smaller than the circumferential width of the electrical conductor sections per phase in each magnetic pole.

According to a solution 12G, in any one of the above solutions 1G-11G, the armature coil has electrical conductor sections opposed to the field system and arranged at predetermined intervals in the circumferential direction. Each of electrical conductors forming the electrical conductor sections is constituted of a wire bundle in which: a plurality of wires are bundled together; and electrical resistances between the wires are higher than an electrical resistance of each of the wires.

BRIEF DESCRIPTION OF THE DRAWINGS

The above-described objects, other objects, features and beneficial advantages according to the present disclosure will become more apparent from the following detailed description with reference to the accompanying drawings.

In the accompanying drawings:

FIG. 83 is a transverse cross-sectional view of a rotor and a stator in another example;

FIGS. 84(a) and 84(b) include transverse cross-sectional views of magnets in other examples;

DESCRIPTION OF EMBODIMENTS

Figure 1:
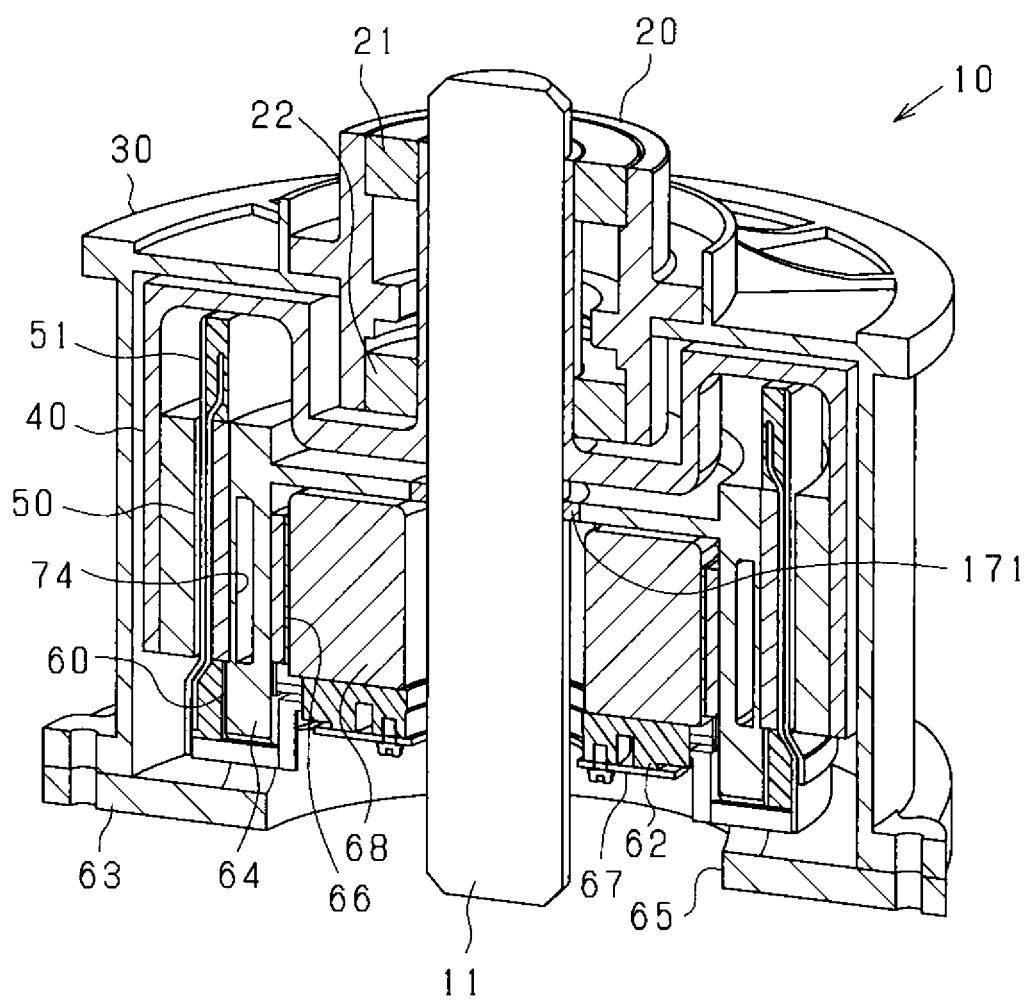
FIG. 1 is a perspective longitudinal cross-sectional view of a rotating electric machine.

Embodiments will be described with reference to the drawings. In the embodiments, parts functionally and/or structurally corresponding to each other and/or parts associated with each other will be designated by the same reference signs or by reference signs which are different in the hundreds place from each other. The corresponding parts and/or the associated parts may refer to the explanation of the other embodiments.

Rotating electric machines in the embodiments are configured to be used, for example, as vehicular power sources. However, the rotating electric machines may also be widely used for other applications, such as industrial, automotive, household, office automation and amusement applications. In addition, in the following embodiments, identical or equivalent parts will be designated by the same reference signs in the drawings, and explanation thereof will not be repeated.

First Embodiment

Figure 2:
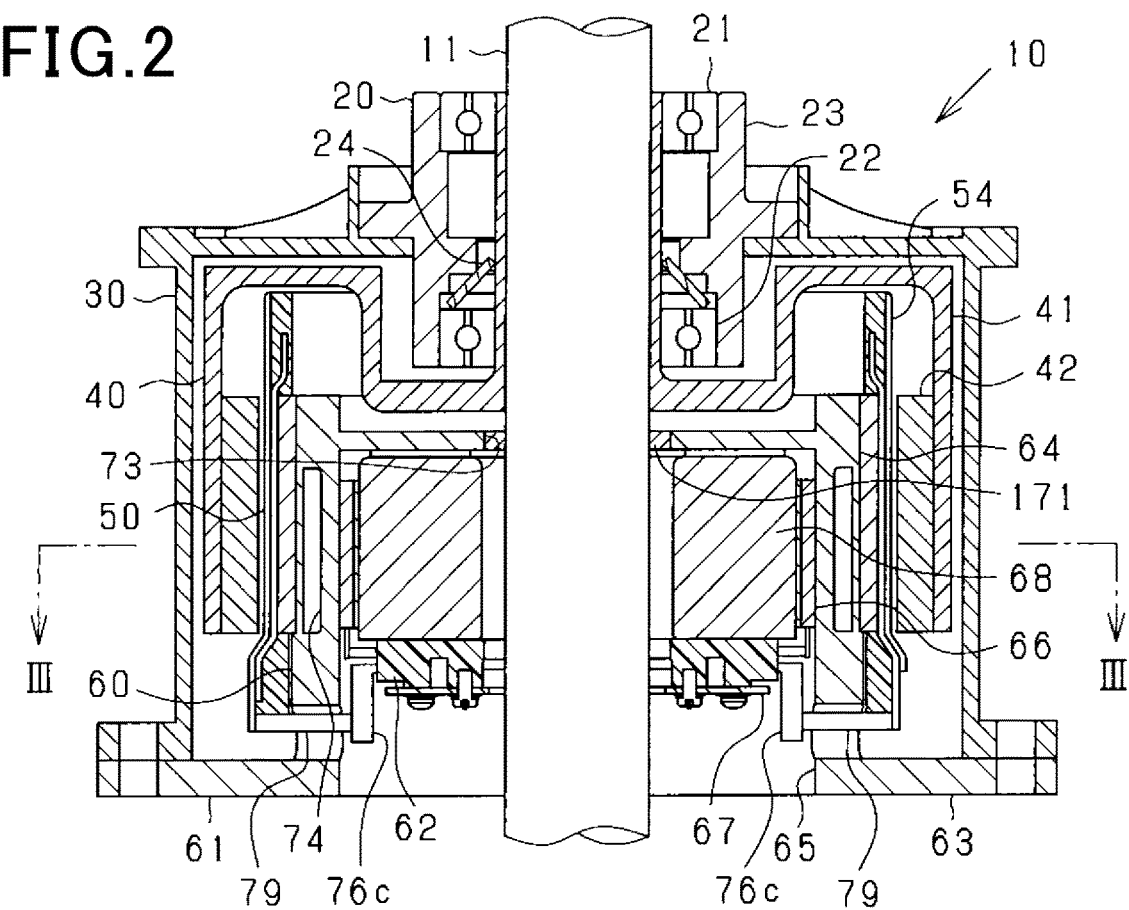
FIG. 2 is a longitudinal cross-sectional view of the rotating electric machine.
Figure 3:
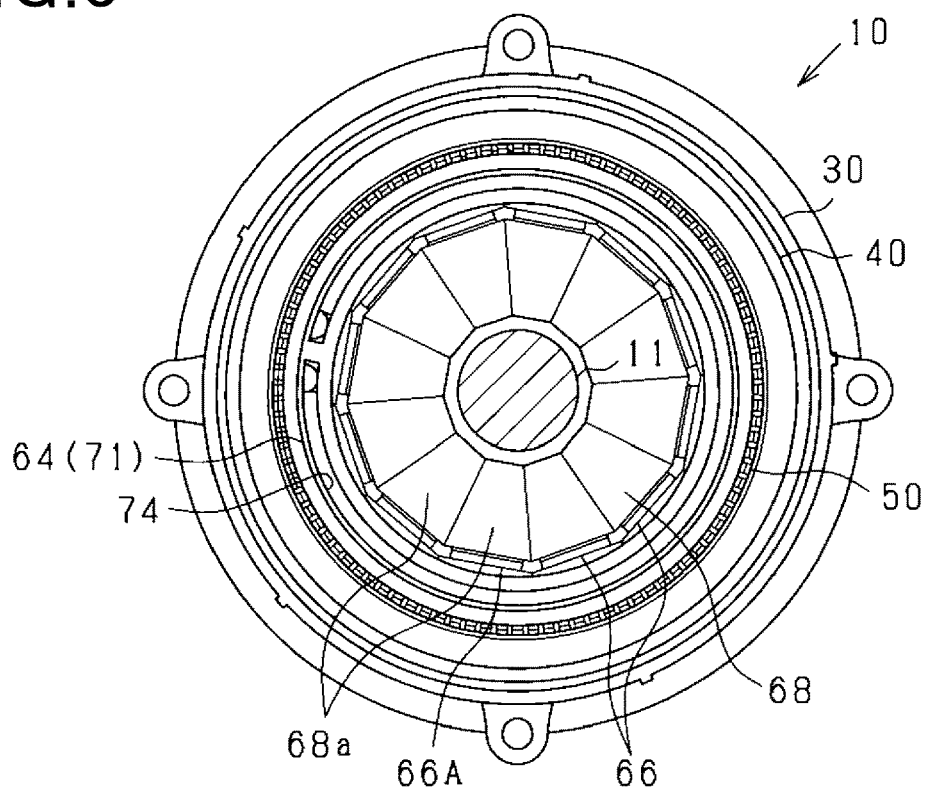
FIG. 3 is a cross-sectional view taken along the line III-III in FIG. 2.
Figure 4:
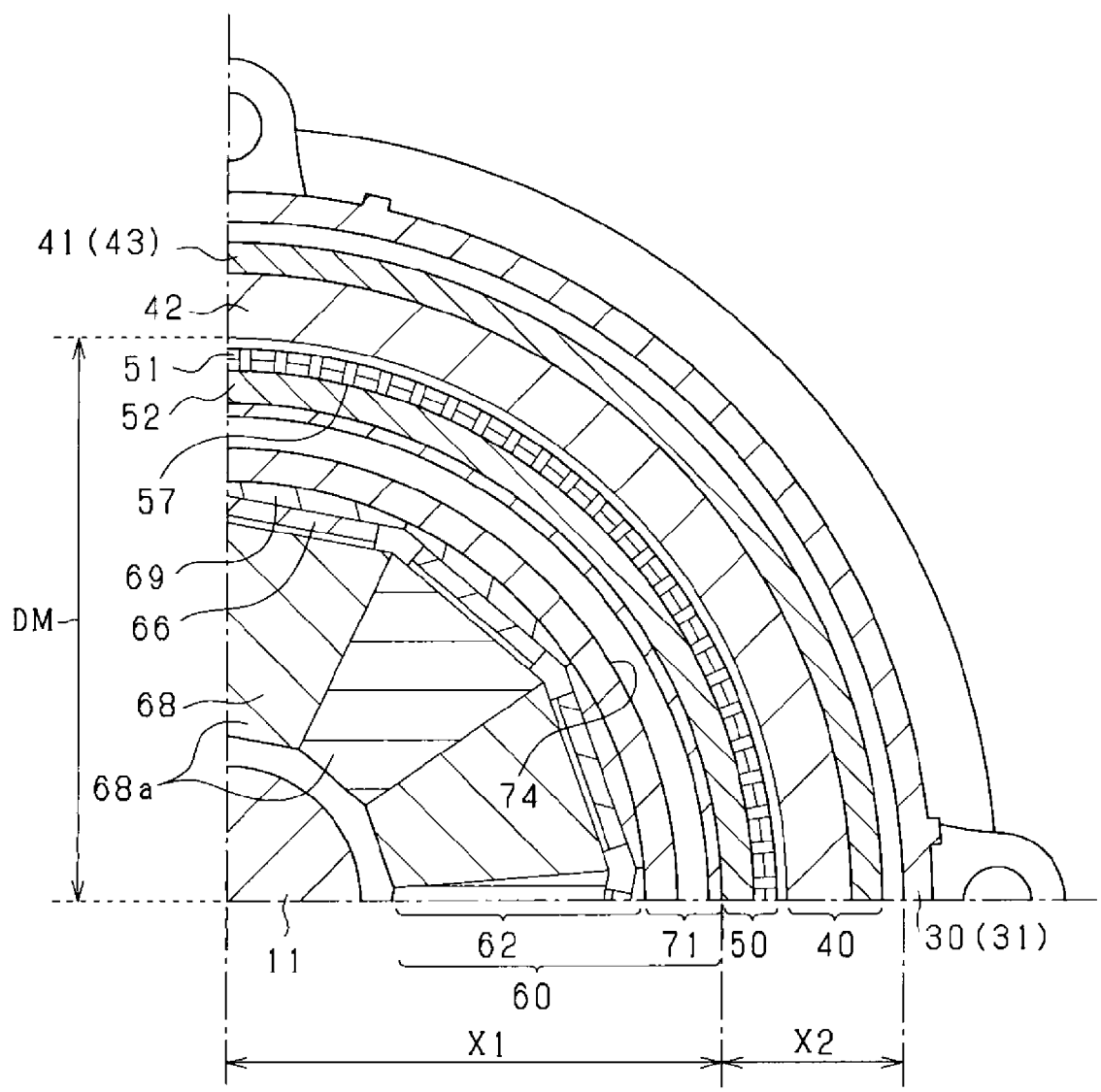
FIG. 4 is an enlarged cross-sectional view of part of FIG. 3.
Figure 5:
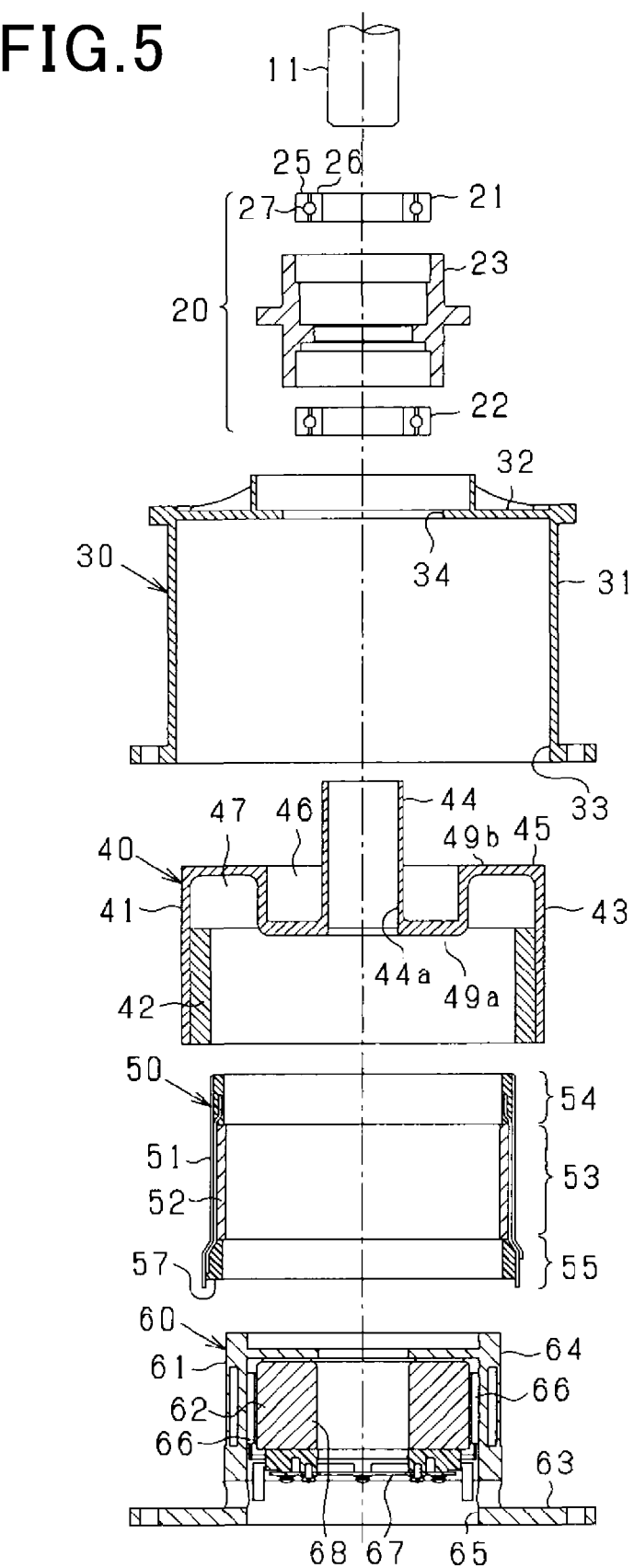
FIG. 5 is an exploded view of the rotating electric machine.

The rotating electric machine 10 according to the present embodiment is a synchronous multi-phase AC motor with an outer rotor structure (i.e., an outer rotating structure). The outline of the rotating electric machine 10 is illustrated in FIGS. 1 to 5. FIG. 1 is a perspective longitudinal cross-sectional view of the rotating electric machine 10. FIG. 2 is a longitudinal cross-sectional view along a rotating shaft 11 of the rotating electric machine 10. FIG. 3 is a traverse cross-sectional view (i.e., cross-sectional view taken along the line III-III in FIG. 2) of the rotating electric machine 10 perpendicular to the rotating shaft 11. FIG. 4 is an enlarged cross-sectional view of part of FIG. 3. FIG. 5 is an exploded view of the rotating electric machine 10. In addition, it should be noted that in FIG. 3, for the sake of simplicity, hatching lines designating cross sections of components of the rotating electric machine 10 except for the rotating shaft 11 are omitted. In the following description, the direction in which the rotating shaft 11 extends will be referred to as the axial direction; the directions extending radially from the center of the rotating shaft 11 will be referred to as radial directions; and the direction extending along a circle centering on the rotating shaft 11 will be referred to as the circumferential direction.

The rotating electric machine 10 includes a bearing unit 20, a housing 30, a rotor 40, a stator 50 and an inverter unit 60. These members are each arranged coaxially with the rotating shaft 11 and assembled in a given sequence in the axial direction to together constitute the rotating electric machine 10. The rotating electric machine 10 of the present embodiment is configured to have the rotor 40 functioning as a "field system" and the stator 50 functioning as an "armature". That is, the rotating electric machine 10 is embodied as a rotating-field type rotating electric machine.

The bearing unit 20 includes two bearings 21 and 22 arranged away from each other in the axial direction and a holding member 23 that holds both the bearings 21 and 22.

The bearings 21 and 22 are implemented by, for example, radial ball bearings each of which includes an outer ring 25, an inner ring 26 and a plurality of balls 27 disposed between the outer ring 25 and the inner ring 26. The holding member 23 is cylindrical-shaped and has both the bearings 21 and 22 assembled thereto on the radially inner side thereof. Moreover, on the radially inner side of the bearings 21 and 22, there are rotatably supported the rotating shaft 11 and the rotor 40. That is, the bearings 21 and 22 constitute a pair of bearings rotatably supporting the rotating shaft 11.

In each of the bearings 21 and 22, the balls 27 are retained by a not-shown retainer, thereby keeping the pitch between each pair of the balls 27. Moreover, each of the bearings 21 and 22 has sealing members on the upper and lower sides of the retainer in the axial direction, and has non-electrically conductive grease (i.e., non-electrically conductive urea-based grease) filled inside the sealing members. In addition, the position of the inner ring 26 is mechanically held by a spacer, and constant-pressure preloading is performed from the inner side to make it convex in the vertical direction.

The housing 30 has a circumferential wall 31 that is cylindrical in shape. The circumferential wall 31 has a first end and a second end that are opposite to each other in the axial direction. Moreover, the circumferential wall 31 has an end surface 32 at the first end and an opening 33 at the second end. The opening 33 is formed to open over the entire second end of the circumferential wall 31. The end surface 32 has a circular hole 34 formed at the center thereof. The bearing unit 20 is inserted in the hole 34 and fixed by fixtures such as screws or rivets. Inside the housing 30, i.e., in an internal space defined by the circumferential wall 31 and the end surface 32, there are received the rotor 40 and the stator 50 both of which are hollow cylindrical in shape. In the present embodiment, the rotating electric machine 10 is of an outer rotor type such that the stator 50 is arranged radially inside the cylindrical rotor 40 in the housing 30. Moreover, the rotor 40 is supported in a cantilever fashion by the rotating shaft 11 on the end surface 32 side in the axial direction.

The rotor 40 includes a hollow cylindrical magnet holder 41 and an annular magnet unit 42 provided radially inside the magnet holder 41. The magnet holder 41 is substantially cup-shaped and functions as a magnet holding member. The magnet holder 41 has a cylindrical portion 43, an attaching portion (or attachment) 44 that is also cylindrical in shape and smaller in diameter than the cylindrical portion 43, and an intermediate portion 45 connecting the cylindrical portion 43 and the attaching portion 44. On an inner circumferential surface of the cylindrical portion 43, there is mounted the magnet unit 42.

The magnet holder 41 is formed of a material having sufficient mechanical strength, such as a cold-rolled steel sheet (e.g., SPCC), forged steel or Carbon Fiber-Reinforced Plastic (CFRP).

In a through-hole 44a of the attaching portion 44, there is inserted the rotating shaft 11. The attaching portion 44 is fixed to a portion of the rotating shaft 11 which is located inside the through-hole 44a. That is, the magnet holder 41 is fixed to the rotating shaft 11 via the attaching portion 44. In addition, the attaching portion 44 may be fixed to the rotating shaft 11 by spline coupling using protrusions and recesses, key coupling, welding or crimping. Consequently, the rotor 40 rotates together with the rotating shaft 11.

To a radially outer periphery of the attaching portion 44, there are assembled both the bearings 21 and 22 of the bearing unit 20. As described above, the bearing unit 20 is fixed to the end surface 32 of the housing 30; therefore, the rotating shaft 11 and the rotor 40 are rotatably supported by the housing 30. Consequently, the rotor 40 is rotatable in the housing 30.

The attaching portion 44 is provided at only one of two opposite axial ends of the rotor 40. Therefore, the rotor 40 is supported by the rotating shaft 11 in a cantilever fashion. Moreover, the attaching portion 44 of the rotor 40 is rotatably supported by the bearings 21 and 22 of the bearing unit 20 at two different axial positions. That is, the rotor 40 is rotatably supported, at one of two opposite axial ends of the magnet holder 41, by the two bearings 21 and 22 that are located away from each other in the axial direction. Therefore, though the rotor 40 is supported by the rotating shaft 11 in the cantilever fashion, it is still possible to realize stable rotation of the rotor 40. In addition, the rotor 40 is supported by the bearings 21 and 22 at positions offset from an axially center position of the rotor 40 to one side.

In the bearing unit 20, the bearing 22 which is located closer to the center of the rotor 40 (i.e., on the lower side in the figures) and the bearing 21 which is located further from the center of the rotor 40 (i.e., on the upper side in the figures) are different in gap dimensions between the outer and inner rings 25 and 26 and the balls 27. For example, the gap dimensions in the bearing 22 which is located closer to the center of the rotor 40 are greater than the gap dimensions in the bearing 21 which is located further from the center of the rotor 40. In this case, on the closer side to the center of the rotor 40, even if deflection of the rotor 40 and/or vibration caused by imbalance due to parts tolerances act on the bearing unit 20, it is still possible to well absorb the deflection and/or the vibration. Specifically, in the bearing 22 which is located closer to the center of the rotor 40 (i.e., on the lower side in the figures), the play dimensions (or gap dimensions) are increased by preloading, thereby absorbing vibration caused by the cantilever structure. The preloading may be either fixed-position preloading or constant-pressure preloading. In the case of performing fixed-position preloading, both the outer rings 25 of the bearings 21 and 22 are joined to the holding member 23 by, for example, press-fitting or bonding. On the other hand, both the inner rings 26 of the bearings 21 and 22 are joined to the rotating shaft 11 by, for example, press-fitting or bonding. In this case, a preload can be produced by locating the outer ring 25 of the bearing 21 at a different axial position from the inner ring 26 of the bearing 21. Similarly, a preload can be produced by locating the outer ring 25 of the bearing 22 at a different axial position from the inner ring 26 of the bearing 22.

In the case of performing constant-pressure preloading, a preloading spring, such as a wave washer 24, is arranged in a region between the bearings 21 and 22 to produce a preload in the axial direction from the region toward the outer ring 25 of the bearing 22. In this case, both the inner rings 26 of the bearings 21 and 22 are joined to the rotating shaft 11 by, for example, press-fitting or bonding. The outer ring 25 of the bearing 21 or the bearing 22 is arranged with a predetermined clearance to the holding member 23. With the above configuration, a spring force is applied by the preloading spring to the outer ring 25 of the bearing 22 in a direction away from the bearing 21. Moreover, this force is transmitted via the rotating shaft 11 to the inner ring 26 of the bearing 21, pressing the inner ring 26 of the bearing 21 in the axial direction toward the bearing 22. Consequently, in each of the bearings 21 and 22, the axial positions of the outer and inner rings 25 and 26 are offset from each other, producing a preload as in the case of performing fixed-position preloading as described above.

In addition, in the case of performing constant-pressure preloading, the spring force is not necessarily applied to the outer ring 25 of the bearing 22 as shown in FIG. 2. For example, the spring force may be applied to the outer ring 25 of the bearing 21 instead. Moreover, preload can alternatively be produced in both the bearings 21 and 22 by: locating the inner ring 26 of either of the bearings 21 and 22 with a predetermined clearance to the rotating shaft 11; and joining both the outer rings 25 of the bearings 21 and 22 to the holding member 23 by, for example, press-fitting or bonding.

Furthermore, in the case of applying a force to the inner ring 26 of the bearing 21 in a direction away from the bearing 22, the force may be applied to the inner ring 26 of the bearing 22 as well in a direction away from the bearing 21. In contrast, in the case of applying a force to the inner ring 26 of the bearing 21 in a direction toward the bearing 22, the force may be applied to the inner ring 26 of the bearing 22 as well in a direction toward the bearing 21.

In addition, in the case of applying the rotating electric machine 10 to a vehicle as a vehicular power source, vibration having a component in the preload producing direction may be applied to the preload producing mechanism and/or the direction of gravity acting on the preload application target may be changed. Therefore, in the case of applying the rotating electric machine 10 to a vehicle, it is preferable to perform fixed-position preloading.

The intermediate portion 45 has both an annular inner shoulder part 49a and an annular outer shoulder part 49b. The outer shoulder part 49b is located outside the inner shoulder part 49a in the radial direction of the intermediate portion 45. Moreover, the inner shoulder part 49a and the outer shoulder part 49b are located apart from each other from each other in the axial direction of the intermediate portion 45. Consequently, the cylindrical portion 43 and the attaching portion 44 partially overlap each other in the radial direction of the intermediate portion 45. That is, the cylindrical portion 43 protrudes axially outward from a proximal end (i.e., an inner end on the lower side in the figures) of the attaching portion 44. With this configuration, it is possible to support the rotor 40 with respect to the rotating shaft 11 at a closer position to the center of gravity of the rotor 40 than in the case of configuring the intermediate portion 45 to be in the shape of a flat plate without any step. Consequently, it is possible to realize stable operation of the rotor 40.

Moreover, with the above configuration of the intermediate portion 45, there are formed both an annular bearing-receiving recess 46 and an annular coil-receiving recess 47 in the rotor 40. The bearing-receiving recess 46 is radially located on the inner side of the intermediate portion 45 to surround the attaching portion 44. The bearing-receiving recess 46 receives part of the bearing unit 20 therein. The coil-receiving recess 47 is radially located on the outer side of the intermediate portion 45 to surround the bearing-receiving recess 46. The coil-receiving recess 47 receives therein a coil end 54 of a stator coil 51 of the stator 50 which will be described later. Moreover, the bearing-receiving recess 46 and the coil-receiving recess 47 are located to be radially adjacent to each other. In other words, the bearing-receiving recess 46 and the coil-receiving recess 47 are located to have part of the bearing unit 20 and the coil end 54 of the stator coil 51 radially overlapping each other. Consequently, it becomes possible to reduce the axial length of the rotating electric machine 10.

The intermediate portion 45 is formed to project radially outward from the rotating shaft 11 side. Moreover, in the intermediate portion 45, there is formed a contact prevention portion that extends in the axial direction to prevent contact with the coil end 54 of the stator coil 51 of the stator 50. In addition, the intermediate portion 45 corresponds to a projecting portion.

The coil end 54 may be bent radially inward or radially outward, thereby reducing the axial dimension of the coil end 54 and thus the axial length of the stator 50. The direction of bending the coil end 54 may be determined in consideration of the assembling of the stator 50 to the rotor 40. Specifically, considering the fact that the stator 50 is assembled to the radially inner periphery of the rotor 40, the coil end 54 may be bent radially inward on the insertion end side to the rotor 40. Moreover, a coil end on the opposite side to the coil end 54 may be bent in an arbitrary direction; however, in terms of manufacturing, it is preferable to bend the coil end to the radially outer side where there is a space allowance.

The magnet unit 42, which serves as a magnet section, is constituted of a plurality of permanent magnets that are arranged on the radially inner side of the cylindrical portion 43 so as to have their polarities alternately changing in the circumferential direction. Consequently, the magnet unit 42 has a plurality of magnetic poles arranged in the circumferential direction. In addition, the details of the magnet unit 42 will be described later.

The stator 50 is provided radially inside the rotor 40. The stator 50 includes the stator coil 51, which is wound into a substantially cylindrical (or annular) shape, and a stator core 52 that is arranged, as a base member, radially inside the stator coil 51. The stator coil 51 is arranged to face the annular magnet unit 42 through a predetermined air gap formed therebetween. The stator coil 51 is comprised of a plurality of phase windings. Each of the phase windings is formed by connecting a plurality of electrical conductors, which are arranged in the circumferential direction, to one another at a predetermined pitch. In the present embodiment, the stator coil 51 includes both a three-phase coil comprised of U-phase, V-phase and W-phase windings and a three-phase coil comprised of X-phase, Y-phase and Z-phase windings. That is, the stator coil 51 is comprised of six phase windings.

The stator core 52 is formed by laminating magnetic steel sheets that are made of a soft-magnetic material into an annular shape. The stator core 52 is assembled to a radially inner periphery of the stator coil 51. The magnetic steel sheets are formed, for example, of silicon steel that is obtained by adding silicon by a few percent (e.g., 3%) to iron. In addition, the stator coil 51 corresponds to an armature coil and the stator core 52 corresponds to an armature core.

The stator coil 51 has a coil side part 53, which is located radially outside the stator core 52 so as to radially overlap the stator core 52, and the coil ends 54 and 55 protruding respectively from opposite axial ends of the stator core 52. The coil side part 53 radially faces both the stator core 52 and the magnet unit 42 of the rotor 40. In the state of the stator 50 having been arranged inside the rotor 40, of the coil ends 54 and 55 respectively on the opposite axial sides, the coil end 54 on the bearing unit 20 side (i.e., the upper side in the figures) is received in the coil-receiving recess 47 formed in the magnet holder 41 of the rotor 40. In addition, the details of the stator 50 will be described later.

The inverter unit 60 includes a unit base 61, which is fixed to the housing 30 by fasteners such as bolts, and a plurality of electrical components 62 assembled to the unit base 61. The unit base 61 is formed, for example, of Carbon Fiber-Reinforced Plastic (CFRP). The unit base 61 includes an end plate 63 fixed to the edge of the opening 33 of the housing 30, and a casing 64 formed integrally with the end plate 63 and extending in the axial direction. The end plate 63 has a circular opening 65 formed in a central part thereof. The casing 64 is formed to extend upward from the peripheral edge of the opening 65.

On an outer circumferential surface of the casing 64, there is assembled the stator 50. That is, the outer diameter of the casing 64 is set to be equal to or slightly smaller than the inner diameter of the stator core 52. The stator 50 and the unit base 61 are integrated into one piece by assembling the stator core 52 to the outer periphery of the casing 64. Moreover, since the unit base 61 is fixed to the housing 30, with the stator core 52 assembled to the casing 64, the stator 50 is also integrated with the housing 30 into one piece.

In addition, the stator core 52 may be assembled to the unit base 61 by, for example, bonding, shrink fitting or press-fitting. Consequently, circumferential or axial displacement of the stator core 52 relative to the unit base 61 is suppressed.

On the radially inner side of the casing 64, there is formed a receiving space for receiving the electrical components 62. In the receiving space, the electrical components 62 are arranged around the rotating shaft 11. That is, the casing 64 serves as a receiving-space forming portion. The electrical components 62 include semiconductor modules 66 for forming an inverter circuit, a control substrate 67 and a capacitor module 68.

In addition, the unit base 61 corresponds to a stator holder (or armature holder) that is provided radially inside the stator 50 and holds the stator 50. The housing 30 and the unit base 61 together constitute a motor housing of the rotating electric machine 10. In the motor housing, the holding member 23 is fixed to the housing 30 on one axial side of the rotor 40; the housing 30 and the unit base 61 are joined to each other on the other axial side of the rotor 40. For example, in an electrically-driven vehicle such as an electric vehicle, the rotating electric machine 10 is installed to the vehicle by mounting the motor housing to the vehicle side.

Figure 6:
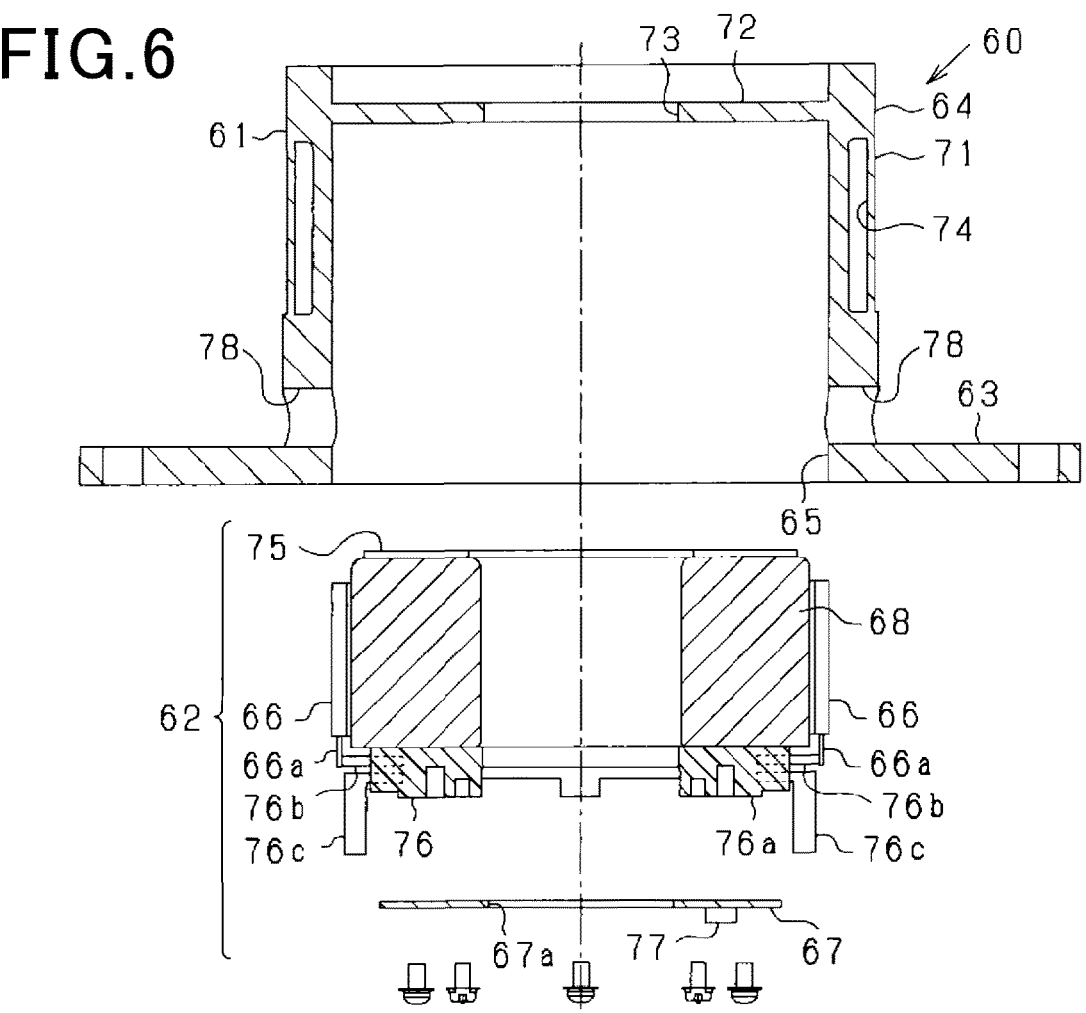
FIG. 6 is an exploded view of an inverter unit.

Hereinafter, the configuration of the inverter unit 60 will be described in detail with reference to FIG. 6, which is an exploded view of the inverter unit 60, in addition to FIGS. 1-5.

In the unit base 61, the casing 64 has a cylindrical portion 71 and an end surface 72 that is formed at one of the two opposite axial ends (i.e., the bearing unit 20-side end) of the cylindrical portion 71. At the axial end of the cylindrical portion 71 on the opposite side to the end surface 72, the cylindrical portion 71 fully opens via the opening 65 of the end plate 63. In a central part of the end surface 72, there is formed a circular hole 73 through which the rotating shaft 11 can be inserted. In the hole 73, there is provided a sealing member 171 to seal the gap between the outer circumferential surface of the rotating shaft 11 and the hole 73. The sealing member 171 may be implemented by, for example, a sliding seal formed of a resin material.

The cylindrical portion 71 of the casing 64 serves as a partition portion to partition between the rotor 40 and the stator 50 arranged on the radially outer side thereof and the electrical components 62 arranged on the radially inner side thereof. That is, the rotor 40, the stator 50 and the electrical components 62 are arranged in radial alignment with each other with the cylindrical portion 71 interposed between the rotor 40 and the stator 50 and the electrical components 62.

The electrical components 62 are electrical parts which form the inverter circuit. The electrical components 62 together perform a power running function and an electric power generation function. The power running function is a function of supplying electric current to each phase winding of the stator coil 51 in a predetermined sequence and thereby rotating the rotor 40. The electric power generation function is a function of receiving three-phase alternating current, which flows in the stator coil 51 with rotation of the rotating shaft 11, and outputting it as the generated electric power to the outside. In addition, the electrical components 62 may together perform only either one of the power running function and the electric power generation function. In the case of the rotating electric machine 10 being used as, for example, a vehicular power source, the electric power generation function may be a regenerative function, i.e., a function of outputting regenerative electric power to the outside.

Specifically, as shown in FIG. 4, the electrical components 62 include the hollow cylindrical capacitor module 68 arranged around the rotating shaft 11 and the semiconductor modules 66 arranged in circumferential alignment with each other on an outer circumferential surface of the capacitor module 68. The capacitor module 68 includes a plurality of smoothing capacitors 68a that are connected in parallel with each other. Specifically, each of the capacitors 68a is implemented by a laminated film capacitor that is formed by laminating a plurality of film capacitors. Each of the capacitors 68a has a trapezoidal cross section. The capacitor module 68 is constituted of twelve capacitors 68a that are arranged in an annular shape.

In addition, in manufacturing the capacitors 68a, a plurality of films are laminated to form a long film which has a predetermined width. Then, the long film is cut into a plurality of trapezoidal capacitor elements such that: the width direction of the long film coincides with the height direction of the trapezoidal capacitor elements; the upper bases and the lower bases of the trapezoidal capacitor elements are alternately arranged in the longitudinal direction of the long film; and all the legs of the trapezoidal capacitor elements have the same length. Thereafter, to each of the capacitor elements, electrodes are attached to form one of the capacitors 68a.

Each of the semiconductor modules 66 includes a semiconductor switching element, such as a MOSFET or an IGBT, and is substantially plate-shaped. In the present embodiment, the rotating electric machine 10 includes two three-phase coils, for each of which one inverter circuit is provided. Accordingly, a total of twelve semiconductor modules 66 are arranged in an annular shape to form a semiconductor module group 66A which is included in the electrical components 62.

The semiconductor modules 66 are sandwiched between the cylindrical portion 71 of the casing 64 and the capacitor module 68. An outer circumferential surface of the semiconductor module group 66A abuts an inner circumferential surface of the cylindrical portion 71 while an inner circumferential surface of the semiconductor module group 66A abuts an outer circumferential surface of the capacitor module 68. With this arrangement, heat generated in the semiconductor modules 66 is transmitted to the end plate 63 via the casing 64, thereby being dissipated from the end plate 63.

The semiconductor module group 66A may have a spacer 69 arranged on the outer circumferential surface thereof, i.e., arranged radially between the semiconductor modules 66 and the cylindrical portion 71. In this case, the shape of a transverse cross section of the capacitor module 68 perpendicular to the axial direction is regular dodecagonal while the inner circumferential surface of the cylindrical portion 71 is circular in cross-sectional shape. Accordingly, the spacer 69 may have an inner circumferential surface constituted of flat surfaces and an outer circumferential surface constituted of a curved surface. Moreover, the spacer 69 may be formed as one piece so as to continuously extend in an annular shape on the radially outer side of the semiconductor module group 66A. The spacer 69 may be formed of a material having high heat conductivity, for example a metal such as aluminum or a heat dissipation gel sheet. In addition, the inner circumferential surface of the cylindrical portion 71 may be modified to have the same regular dodecagonal cross-sectional shape as the capacitor module 68. In this case, each of the inner and outer circumferential surfaces of the spacer 69 would be constituted of flat surfaces.

Moreover, in the present embodiment, in the cylindrical portion 71 of the casing 64, there is formed a cooling water passage 74 through which cooling water flows. Consequently, heat generated in the semiconductor modules 66 can be dissipated to the cooling water flowing through the cooling water passage 74. That is, the casing 64 includes a water-cooling mechanism. As shown in FIGS. 3 and 4, the cooling water passage 74 is annular-shaped to surround the electrical components 62 (i.e., the semiconductor modules 66 and the capacitor module 68). More specifically, the semiconductor modules 66 are arranged along the inner circumferential surface of the cylindrical portion 71; the cooling water passage 74 is formed radially outside the semiconductor modules 66 so as to radially overlap them.

The cylindrical portion 71 has the stator 50 arranged on the radially outer side thereof and the electrical components 62 arranged on the radially inner side thereof. Therefore, both heat generated in the stator 50 and heat generated in the electrical components 62 (e.g., heat generated in the semiconductor modules 66) are transmitted to the cylindrical portion 71. Consequently, it is possible to cool both the stator 50 and the semiconductor modules 66 at the same time; thus it is possible to effectively dissipate heat generated by the heat-generating members in the rotating electric machine 10.

Moreover, at least part of the semiconductor modules 66, which constitute part or the whole of the inverter circuits for energizing the stator coil 51 and thereby driving the rotating electric machine, is arranged within a region surrounded by the stator core 52 that is located radially outside the cylindrical portion 71 of the casing 64. It is preferable that the whole of one of the semiconductor modules 66 is arranged within the region surrounded by the stator core 52. It is more preferable that the whole of each of the semiconductor modules 66 is arranged within the region surrounded by the stator core 52.

Moreover, at least part of the semiconductor modules 66 is arranged within a region surrounded by the cooling water passage 74. It is preferable that the whole of each of the semiconductor modules 66 is arranged within a region surrounded by a yoke 141.

The electrical components 62 include an insulating sheet 75 arranged on one axial end surface of the capacitor module 68 and a wiring module 76 arranged on the other axial end surface of the capacitor module 68. More specifically, the capacitor module 68 has two opposite axial end surfaces, i.e., a first axial end surface and a second axial end surface. The first axial end surface of the capacitor module 68, which is located closer to the bearing unit 20, faces the end surface 72 of the casing 64 and superposed on the end surface 72 with the insulating sheet 75 sandwiched therebetween. The second axial end surface of the capacitor module 68, which is located closer to the opening 65, has the wiring module 76 mounted thereon.

The wiring module 76 has a main body 76a, which is formed of a synthetic resin material into a discoid shape, and a plurality of busbars 76b and 76c embedded in the main body 76a. The wiring module 76 is electrically connected with the semiconductor modules 66 and the capacitor module 68 via the busbars 76b and 76c. More specifically, each of the semiconductor modules 66 has a connection pin 66a extending from an axial end surface thereof; the connection pin 66a is connected, on the radially outer side of the main body 76a, to one of the busbars 76b. On the other hand, the busbars 76c extend, on the radially outer side of the main body 76a, in the axial direction away from the capacitor module 68. To distal end portions of the busbars 76c, there are respectively connected wiring members 79 (see FIG. 2).

As described above, the capacitor module 68 has the insulating sheet 75 arranged on the first axial end surface thereof and the wiring module 76 arranged on the second axial end surface thereof. With this arrangement, there are formed heat dissipation paths of the capacitor module 68 from the first and second axial end faces of the capacitor module 68 respectively to the end surface 72 and the cylindrical portion 71. That is, there are formed both a heat dissipation path from the first axial end surface of the capacitor module 68 to the end surface 72 and a heat dissipation path from the second axial end surface of the capacitor module 68 to the cylindrical portion 71. Consequently, it becomes possible to dissipate heat generated in the capacitor module 68 via the end surfaces thereof other than the outer circumferential surface on which the semiconductor modules 66 are arranged. That is, it becomes possible to dissipate heat generated in the capacitor module 68 not only in the radial direction but also in the axial direction.

Moreover, the capacitor module 68, which is hollow cylindrical in shape, has the rotating shaft 11 arranged on the radially inner side thereof with a predetermined gap formed therebetween. Consequently, heat generated in the capacitor module 68 can also be dissipated via the hollow space formed therein. In addition, with rotation of the rotating shaft 11, air flow is created in the gap, thereby improving the cooling performance.

To the wiring module 76, there is mounted a control substrate 67 which has a discoid shape. The control substrate 67 includes a Printed Circuit Board (PCB) which has a predetermined wiring pattern formed thereon. On the PCB, there is mounted a controller 77 which is constituted of various ICs and a microcomputer. The controller 77 corresponds to a control unit. The control substrate 67 is fixed to the wiring module 76 by fixtures such as screws. In a central part of the control substrate 67, there is formed an insertion hole 67a through which the rotating shaft 11 is inserted.

The wiring module 76 has a first surface and a second surface that are opposite to each other in the axial direction, i.e., opposite to each other in the thickness direction thereof. The first surface faces the capacitor module 68. The wiring module 76 has the control substrate 67 provided on the second surface thereof. The busbars 76c of the wiring module 76 are configured to extend from one surface of the control substrate 67 to the other surface of the control substrate 67. Moreover, in the control substrate 67, there may be formed cuts to prevent interference with the busbars 76c. For example, the control substrate 67 may have the cuts formed in an outer edge portion of the discoid control substrate 67.

As described above, the electrical components 62 are received in the space surrounded by the casing 64. The housing 30, the rotor 40 and the stator 50 are arranged in layers outside the casing 64. With this arrangement, electromagnetic noise generated in the inverter circuits can be suitably shielded. More specifically, in the inverter circuits, switching control is performed on each of the semiconductor modules 66 by PWM control with a predetermined carrier frequency. Consequently, electromagnetic noise may be generated by the switching control. However, the electromagnetic noise would be suitably shielded by the housing 30, the rotor 40 and the stator 50 on the radially outer side of the electrical components 62.

Moreover, at least part of the semiconductor modules 66 is arranged within the region surrounded by the stator core 52 that is located radially outside the cylindrical portion 71 of the casing 64. With this arrangement, even if magnetic flux is generated by the semiconductor modules 66, the stator coil 51 would be less affected by the magnetic flux than in the case of the semiconductor modules 66 and the stator coil 51 being arranged without the stator core 52 interposed therebetween. Moreover, even if magnetic flux is generated by the stator coil 51, the semiconductor modules 66 would be less affected by the magnetic flux than in the aforementioned case. In addition, the above advantageous effects would be more remarkable when the whole of each of the semiconductor modules 66 is arranged in the region surrounded by the stator core 52 that is located radially outside the cylindrical portion 71 of the casing 64. Moreover, with at least part of the semiconductor modules 66 surrounded by the cooling water passage 74, it becomes difficult for heat generated in the stator coil 51 and/or the magnet unit 42 to be transmitted to the semiconductor modules 66.

In the cylindrical portion 71, there are formed through-holes 78 in the vicinity of the end plate 63. Through the through-holes 78, the wiring members 79 (see FIG. 2) are respectively inserted to electrically connect the stator 50 located outside the cylindrical portion 71 with the electrical components 62 located inside the cylindrical portion 71. As shown in FIG. 2, the wiring members 79 are respectively joined, for example by crimping or welding, to end portions of the stator coil 51 as well as to the busbars 76c of the wiring module 76. It is preferable that the wiring members 79 are implemented by, for example, busbars having joining surfaces crushed flat. The number of the through-holes 78 formed in the cylindrical portion 71 may be single or plural. In the present embodiment, two through-holes 78 are formed respectively at two different locations. Consequently, it becomes possible to easily perform wiring of coil terminals extending from the two three-phase coils. Therefore, the above formation of the through-holes 78 is suitable for making multi-phase electrical connection.

As described above, in the housing 30, as shown in FIG. 4, the rotor 40, the stator 50 and the inverter unit 60 are arranged in this order from the radially outer side to the radially inner side. More specifically, the rotor 40 and the stator 50 are arranged radially outward from the center of rotation of the rotor 40 by more than d×0.705, where d is the radius of the inner circumferential surface of the housing 30. With this arrangement, the area of a transverse cross section of a first region X1 becomes larger than the area of a transverse cross section of a second region X2. Here, the first region X1 denotes the region radially inside the inner circumferential surface of the stator 50 (i.e., the inner circumferential surface of the stator core 52) that is located radially inside the rotor 40; the second region X2 denotes the region radially extending from the inner circumferential surface of the stator 50 to the housing 30. Moreover, in a range where the magnet unit 42 of the rotor 40 and the stator coil 51 radially overlap each other, the volume of the first region X1 is larger than the volume of the second region X2.

In addition, the rotor 40 and the stator 50 together constitute a magnetic-circuit component assembly. Then, in the housing 30, the volume of the first region X1 radially inside the inner circumferential surface of the magnetic-circuit component assembly is larger than the volume of the second region X2 radially extending from the inner circumferential surface of the magnetic-circuit component assembly to the housing 30.

Next, the configurations of the rotor 40 and the stator 50 will be described in more detail.

There are known stators of rotating electric machines which are generally configured to include a stator core and a stator coil. The stator core is formed by laminating steel sheets into an annular shape. The stator core has a plurality of slots arranged in the circumferential direction. The stator coil is wound in the slots of the stator core. More specifically, the stator core has a plurality of teeth formed, at predetermined intervals, to radially extend from a yoke. Each of the slots is formed between one circumferentially-adjacent pair of the teeth. The stator coil is constituted of electrical conductors that are received in a plurality of radially-aligned layers in the slots of the stator core.

However, with the above structure of the known stators, during energization of the stator coil, with increase in the magnetomotive force of the stator coil, magnetic saturation may occur in the teeth of the stator core, causing the torque density of the rotating electric machine to be limited. More specifically, in the stator core, rotating magnetic flux, which is generated with energization of the stator coil, may concentrate on the teeth, causing the teeth to be magnetically saturated.

Moreover, there are known IPM (Interior Permanent Magnet) rotors of rotating electric machines which are generally configured to have permanent magnets arranged on the d-axis of the d-q coordinate system and a rotor core arranged on the q-axis of the d-q coordinate system. In this case, upon the stator coil in the vicinity of the d-axis being excited, exciting magnetic flux flows from the stator into the q-axis of the rotor according to Fleming's rule. Consequently, magnetic saturation may occur in a wide range in the q-axis core portions of the rotor.

Figure 7:
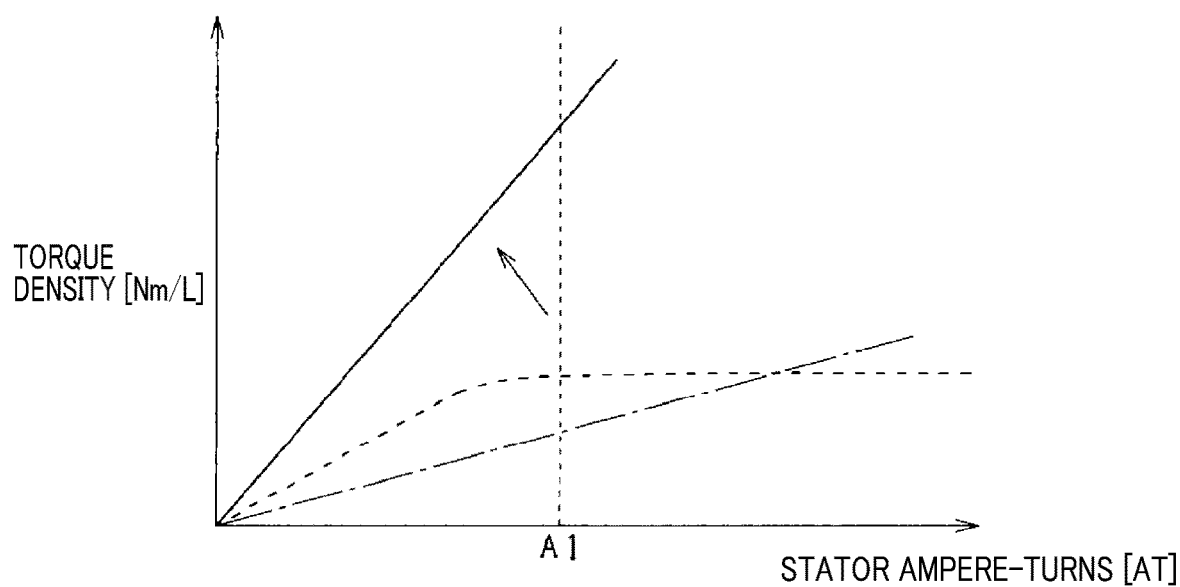
FIG. 7 is a torque diagram illustrating the relationship between the ampere-turns of a stator coil and torque density.

FIG. 7 is a torque diagram illustrating the relationship between the ampere-turns [AT], which represents the magnetomotive force of the stator coil, and the torque density [Nm/L]. A dashed line indicates characteristics of a conventional IPM rotor rotating electric machine. As shown in FIG. 7, in the conventional rotating electric machine, with increase in the magnetomotive force in the stator, magnetic saturation occurs at two locations, i.e., the teeth between the slots and the q-axis core portions, causing increase in the torque to be limited. Hence, in the conventional rotating electric machine, the design value of the ampere-turns is limited by A1.

In view of the above, in the present embodiment, to overcome the limitation due to the magnetic saturation, the following structures are employed in the rotating electric machine 10. Specifically, as a first measure, to eliminate magnetic saturation occurring in the teeth of the stator core in the stator, a slot-less structure is employed in the stator 50; moreover, to eliminate magnetic saturation occurring in the q-axis core portions of an IPM rotor, an SPM (Surface Permanent Magnet) rotor is employed. However, with the first measure, though it is possible to eliminate the above-described two locations where magnetic saturation occurs, torque may decrease in a low-electric current region (see the one-dot chain line in FIG. 7). Therefore, as a second measure, to enhance the magnetic flux of the SPM rotor and thereby suppress decrease in the torque, a polar anisotropic structure is employed in which magnet magnetic paths in the magnet unit 42 of the rotor 40 are lengthened to increase the magnetic force.

Moreover, as a third measure, to suppress decrease in the torque, a flat conductor structure is employed in which the radial thickness of the electrical conductors in the coil side part 53 of the stator coil 51 of the stator 50 is reduced. Here, with employment of the above-described polar anisotropic structure for increasing the magnetic force, higher eddy current may be generated in the stator coil 51 that faces the magnet unit 42. However, with the third measure, it is possible to suppress, by virtue of the radially-thin flat conductor structure, generation of radial eddy current in the stator coil 51. Consequently, with the above first to third structures, it becomes possible to considerably improve the torque characteristics with employment of the high-magnetic force magnets while suppressing generation of high eddy current due to the high-magnetic force magnets, as indicated a solid line in FIG. 7.

Furthermore, as a fourth measure, the magnet unit is employed in which magnetic flux density distribution approximate to a sine wave is realized using the polar anisotropic structure. Consequently, it becomes possible to improve the sine wave matching percentage with the later-described pulse control and thereby increase the torque while more effectively suppressing eddy current loss (i.e., copper loss due to eddy current) with gentler magnetic flux change than radial magnets.

Hereinafter, the sine wave matching percentage will be described. The sine wave matching percentage can be determined based on comparison between the actual waveform of the surface magnetic flux density distribution, which is measured by tracing the surfaces of the magnets using a magnetic flux probe, and a sine wave that has the same period and peak values as the actual waveform. Specifically, the sine wave matching percentage is defined as the ratio of the amplitude of the primary waveform, which is the fundamental wave of the rotating electric machine, to the amplitude of the actual waveform, i.e., the amplitude of the fundamental wave with harmonic components added thereto. With increase in the sine wave matching percentage, the waveform of the surface magnetic flux density distribution approximates the shape of the sine wave. Upon supply of electric current of the primary sine wave from an inverter to the rotating electric machine that includes the magnets with the improved sine wave matching percentage, high torque can be generated due to the waveform of the surface magnetic flux density distribution of the magnets approximate to the shape of the sine wave. In addition, instead of being actually measured, the surface magnetic flux density distribution may be estimated by, for example, an electromagnetic field analysis using Maxwell's equations.

Furthermore, as a fifth measure, the stator coil 51 is designed to have a wire conductor structure in which wires are bundled together. Consequently, with the wires connected in parallel with each other, it becomes possible to allow high electric current to flow through the electrical conductors. Moreover, since the cross-sectional area of each of the wires is small, it becomes possible to more effectively suppress, than the third measure of reducing the radial thickness of the electrical conductors, generation of eddy current in the electrical conductors that are expanded in the circumferential direction of the stator 50 due to the flat conductor structure. In addition, forming each of the electrical conductors by twisting the wires, with respect to the magnetomotive force of the electrical conductors, it becomes possible to cancel eddy currents, which are induced by magnetic flux generated according to the right-hand rule with respect to the electric current supply direction, by each other.

As above, by further taking the fourth and fifth measures, it becomes possible to employ the high-magnetic force magnets provided by the second measure while suppressing eddy current loss due to the high magnetic force and thereby increasing the torque.

Figure 8:
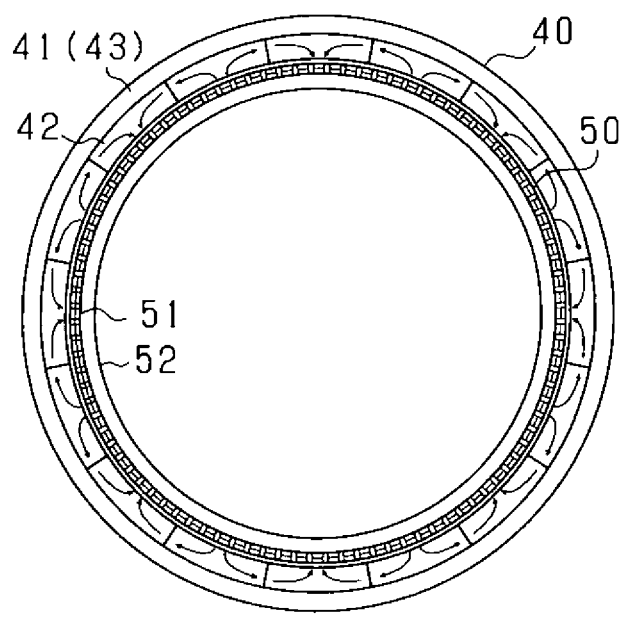
FIG. 8 is a transverse cross-sectional view of a rotor and a stator.
Figure 9:
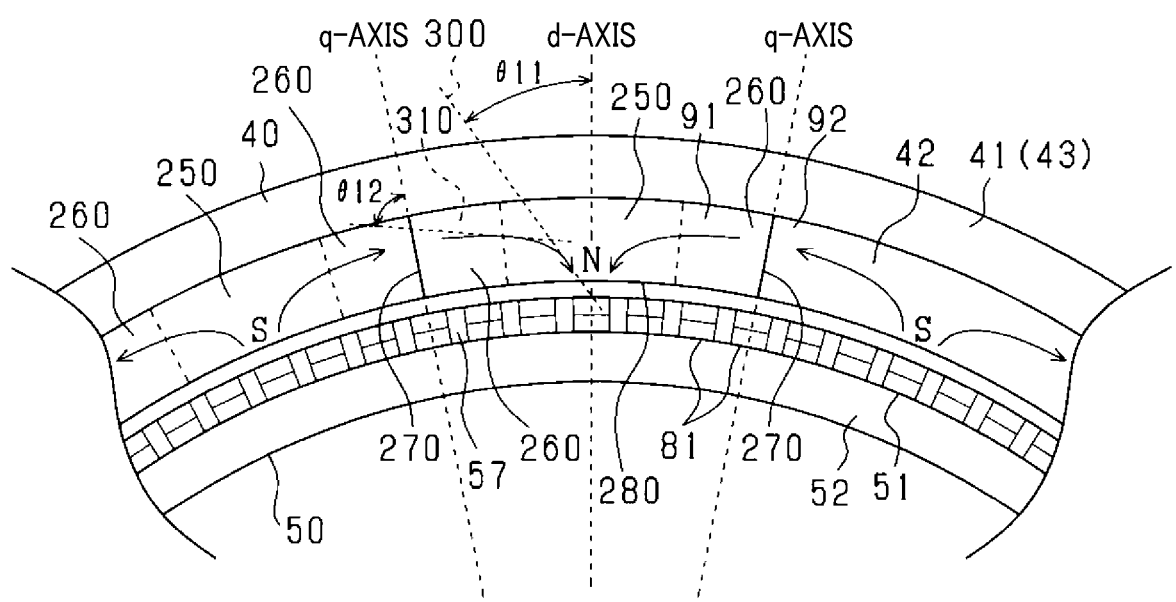
FIG. 9 is an enlarged view of part of FIG. 8.
Figure 10:
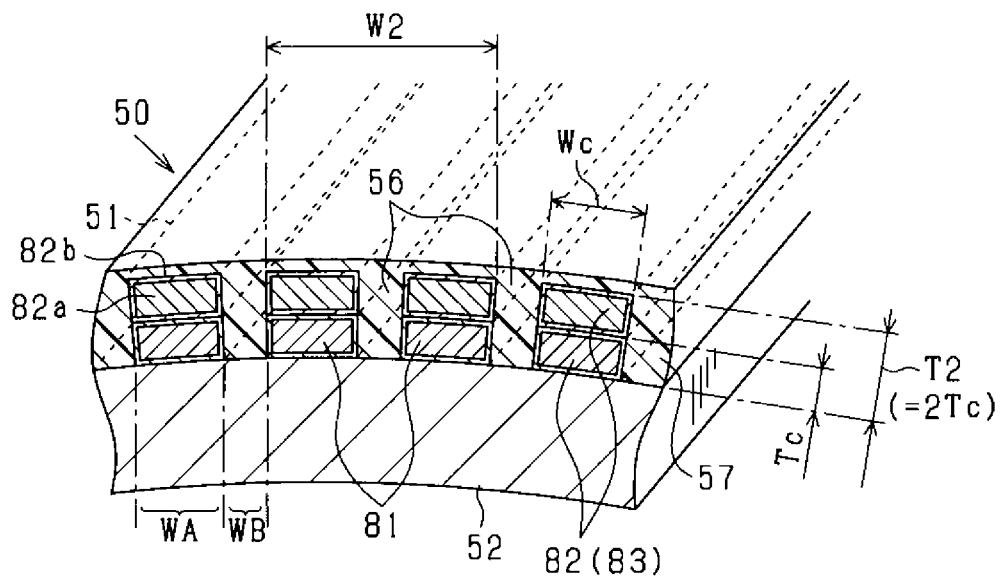
FIG. 10 is a transverse cross-sectional view of the stator.
Figure 11:
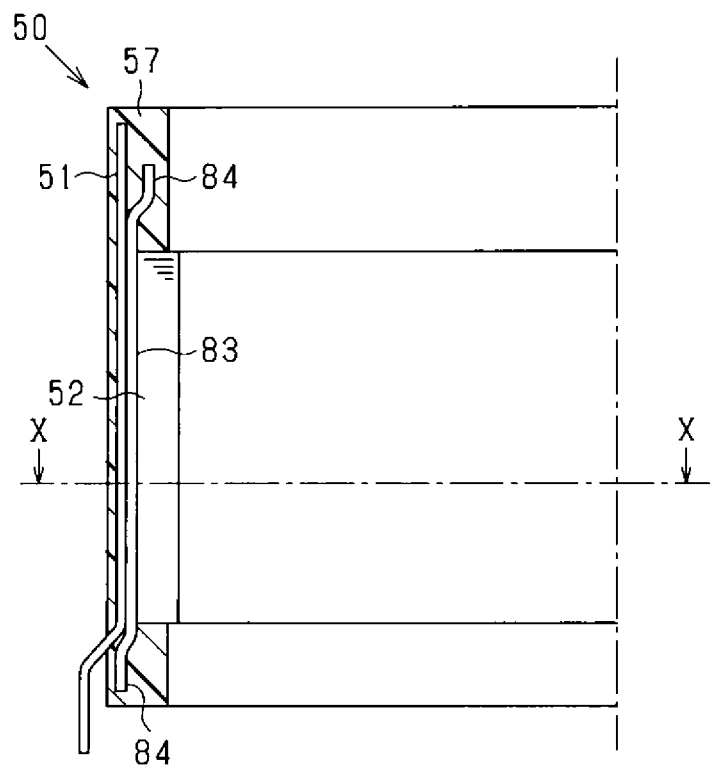
FIG. 11 is a longitudinal cross-sectional view of the stator.
Figure 12:
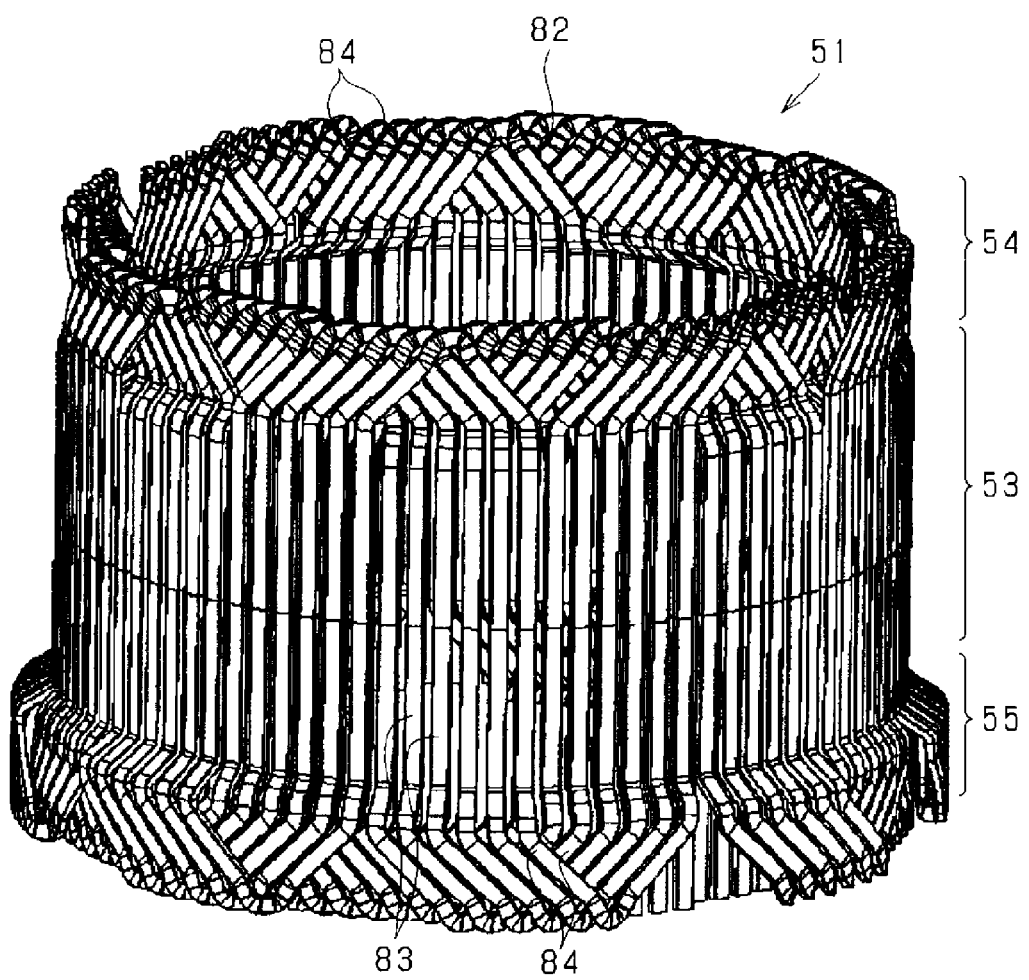
FIG. 12 is a perspective view of the stator coil.

Hereinafter, the slot-less structure of the stator 50, the flat conductor structure of the stator coil 51 and the polar anisotropic structure of the magnet unit 42 will be described in detail. First, the slot-less structure of the stator 50 and the flat conductor structure of the stator coil 51 will be described. FIG. 8 is a transverse cross-sectional view of both the rotor 40 and the stator 50. FIG. 9 is an enlarged view of part of the rotor 40 and the stator 50 shown in FIG. 8. FIG. 10 is a transverse cross-sectional view of the stator 50 which is taken along the line X-X in FIG. 11. FIG. 11 is a longitudinal cross-sectional view of the stator 50. FIG. 12 is a perspective view of the stator coil 51. In addition, in FIGS. 8 and 9, the magnetization directions of the magnets in the magnet unit 42 are indicated by arrows.

As shown in FIGS. 8-11, the stator core 52 is formed, by laminating a plurality of magnetic steel sheets in the axial direction, to have a hollow cylindrical shape with a predetermined radial thickness. The stator coil 51 is assembled to the radially outer periphery, i.e., the rotor 40-side periphery of the stator core 52. That is, the outer circumferential surface of the stator core 52 on the rotor 40 side constitutes an electrical conductor mounting part (or electrical conductor area). The outer circumferential surface of the stator core 52 is shaped as a smooth curved surface. A plurality of electrical conductor groups 81 are arranged on the outer circumferential surface of the stator core 52 at predetermined intervals in the circumferential direction. The stator core 52 functions as a back yoke to form part of a magnetic circuit for rotating the rotor 40. The stator 50 has a configuration (i.e., slot-less structure) such that between each circumferentially-adjacent pair of the electrical conductor groups 81, there is no tooth formed of a soft-magnetic material (i.e., no iron core). In the present embodiment, each of gaps 56 between the electrical conductor groups 81 is occupied by the resin material of a sealing member 57. That is, in the stator 50, inter-conductor members provided between the electrical conductor groups 81 in the circumferential direction are constituted of the sealing member 57 that is formed of a nonmagnetic material. Before the sealing by the sealing member 57, on the radially outer side of the stator core 52, the electrical conductor groups 81 are arranged at predetermined intervals in the circumferential direction with the gaps 56, which are inter-conductor regions, formed therebetween. Consequently, the stator 50 is constructed which has the slot-less structure. In other words, each of the electrical conductor groups 81 consists of two electrical conductors 82 as will be described later; the gap 56 formed between each circumferentially-adjacent pair of the electrical conductor groups 81 is occupied by only nonmagnetic materials. These nonmagnetic materials include, in addition to the resin material of the sealing member 57, nonmagnetic gas such as air and nonmagnetic liquid. In addition, the sealing member 57 will also be referred to as the inter-conductor member (or conductor-to-conductor member) hereinafter.

The configuration having teeth provided between electrical conductor groups 81 arranged in the circumferential direction is a configuration where: each of the teeth has a predetermined radial thickness and a predetermined circumferential width; and part of the magnetic circuit, i.e., magnet magnetic paths are formed between the electrical conductor groups 81. In contrast, the configuration having no teeth provided between the electrical conductor groups 81 is a configuration where the above magnetic circuit is not formed between the electrical conductor groups 81.

As shown in FIG. 10, the stator coil (or armature coil) 51 is formed to have a predetermined thickness T2 (hereinafter, to be also referred to as the first dimension) and a predetermined width W2 (hereinafter, to be also referred to as the second dimension). The thickness T2 is represented by the minimum distance between a radially outer side surface and a radially inner side surface of the stator coil 51. The width W2 is represented by the circumferential length of each part of the stator coil 51 which functions as one of the plurality of phases of the stator coil 51 (three phases in the embodiment: the three phases of U, V and W or the three phases of X, Y and Z). Specifically, in FIG. 10, one circumferentially-adjacent pair of the electrical conductor groups 81 functions as one of three phases, for example the U phase; the distance between two ends of the pair of the electrical conductor groups 81 in the circumferential direction represents the width W2. Moreover, the thickness T2 is set to be smaller than the width W2.

In addition, it is preferable that the thickness T2 is smaller than the sum of widths of two electrical conductor groups 81 present within the width W2. Moreover, in the case of the cross-sectional shape of the stator coil 51 (more specifically, the electrical conductors 82) being a perfect circle, ellipse or polygon, in a cross section of each of the electrical conductors 82 along the radial direction of the stator 50, the maximum radial length of the cross section may be designated by W12 and the maximum circumferential length of the cross section may be designated by W11.

As shown in FIGS. 10 and 11, the stator coil 51 is sealed by the sealing member 57 that is formed of a synthetic resin material that is a sealing material (or molding material). That is, the stator coil 51 is molded together with the stator core 52 by the molding material. In addition, a resin is a nonmagnetic material or an equivalent of a nonmagnetic material; thereof, the saturation flux density Bs of a resin can be regarded as being equal to zero, i.e., Bs=0.

As seen from the transverse cross-sectional view of FIG. 10, the gaps 56 between the electrical conductor groups 81 are filled with the synthetic resin material forming the sealing member 57. The sealing member 57 constitutes an electrically insulating member interposed between the electrical conductor groups 81. In other words, the sealing member 57 functions as an electrically insulating member in the gaps 56. The sealing member 57 is provided, on the radially outer side of the stator core 52, in a region encompassing all the electrical conductor groups 81, i.e., in a region whose radial thickness is larger than the radial thickness of the electrical conductor groups 81.

Moreover, as seen from the longitudinal cross-sectional view of FIG. 11, the sealing member 57 is provided in regions encompassing turn portions 84 of the stator coil 51. On the radially inner side of the stator coil 51, the sealing member 57 is provided in regions encompassing at least part of axially opposite end surfaces of the stator core 52. In this case, except for end portions of the phase windings, i.e., except for connection terminals connected with the inverter circuits, the stator coil 51 is substantially entirely resin-sealed.

With the sealing member 57 provided in the regions encompassing the end surfaces of the stator core 52, it is possible to press, by the sealing member 57, the laminated steel sheets of the stator core 52 axially inward. Consequently, with the sealing member 57, it is possible to maintain the laminated state of the steel sheets. In addition, in the present embodiment, the inner circumferential surface of the stator core 52 is not resin-sealed. As an alternative, the entire stator core 52 including the inner circumferential surface thereof may by resin-sealed.

In the case of the rotating electric machine 10 being used as a vehicular power source, it is preferable that the sealing member 57 is formed of a highly heat-resistant fluorocarbon resin, epoxy resin, PPS resin, PEEK resin, LCP resin, silicon resin, PAI resin or PI resin. In terms of suppressing occurrence of cracking due to a difference in coefficient of linear expansion, it is preferable that the sealing member 57 is formed of the same material as insulating coats of the electrical conductors of the stator coil 51. That is, it is preferable that silicon resins, whose coefficients of linear expansion are generally higher than twice those of other resins, are excluded from candidates for the material of the sealing member 57. Furthermore, in electrical products having no combustion engine, such as an electrical vehicle, a PPO resin, a phenol resin or an FRP resin, which have heat resistance of about 180° C., may be used as the material forming the sealing member 57. In addition, in fields where the ambient temperature of the rotating electric machine 10 is lower than 100° C., the material for forming the sealing member 57 is not limited to the aforementioned candidates.

The torque of the rotating electric machine 10 is proportional to the amplitude of magnetic flux. In the case of a stator core having teeth, the maximum amount of magnetic flux in the stator is limited depending on the saturation flux density at the teeth. In contrast, in the case of a stator core having no teeth, the maximum amount of magnetic flux in the stator is not limited. Therefore, the slot-less structure is advantageous in terms of increasing electric current supplied to the stator coil 51 and thereby increasing the torque of the rotating electric machine 10.

In the present embodiment, the inductance of the stator 50 is lowered by employing the tooth-less structure (or slot-less structure) in the stator 50. Specifically, the inductance of a stator of a conventional rotating electric machine, which has electrical conductors received in slots partitioned by teeth, is, for example, about 1 mH. In contrast, the inductance of the stator 50 according to the present embodiment is lowered to be 5-60 pH. Consequently, in the present embodiment, it becomes possible to lower the mechanical time constant Tm through the reduction in the inductance of the stator 50 while configuring the rotating electric machine 10 to have an outer rotor structure. That is, it becomes possible to achieve both increase in the torque and reduction in the mechanical constant Tm. In addition, the mechanical time constant Tm can be calculated by the following equation:

$$Tm=(J\times L)/(Kt\times Ke)$$

where J is the inertia, L is the inductance, Kt is the torque constant and Ke is the counterelectromotive force constant. From the above equation, it is clear that the mechanical time constant Tm decreases with decrease in the inductance L.

Each of the electrical conductor groups 81 on the radially outer side of the stator core 52 is comprised of a plurality of electrical conductors 82 that each have a flat rectangular cross section and are arranged in alignment with each other in a radial direction of the stator core 52. Moreover, each of the electrical conductors 82 is oriented so that in a transverse cross section thereof, (the radial dimension<the circumferential dimension). Consequently, each of the electrical conductor groups 81 becomes thinner in the radial direction. Meanwhile, the regions of the electrical conductors are expanded flat to those regions which would be conventionally occupied by teeth, thereby realizing a flat conductor region structure. Consequently, increase in the amount of heat generated by the electrical conductors, which would otherwise be caused by the reduction in the radial dimension and thus reduction in the cross-sectional area of each of the electrical conductors, is suppressed by suppressing reduction in the cross-sectional area of each of the electrical conductors through the increase in the circumferential dimension. In addition, with a configuration of arranging a plurality of electrical conductors in circumferential alignment with each other and connecting them in parallel with each other, though the cross-sectional area of each of the electrical conductors is reduced by an amount corresponding to the thickness of insulating coats of the electrical conductors, it is still possible to achieve the same effects as described above. It should be noted that hereinafter, each of the electrical conductor groups 81 and each of the electrical conductors 82 will also be referred to as "conductive member".

In the present embodiment, with the slot-less structure of the stator 50, it becomes possible to set the conductor regions occupied by the stator coil 51 to be greater than non-conductor regions not occupied by the stator coil 51 in each turn in the circumferential direction. In addition, in a conventional rotating electric machine for a vehicle, the ratio of the conductor regions to the non-conductor regions in each turn in the circumferential direction is generally lower than or equal to 1. In contrast, in the present embodiment, the electrical conductor groups 81 are configured to have the conductor regions equal to the non-conductor regions or greater than the non-conductor regions. Specifically, as shown in FIG. 10, the circumferential width WA of each of the conductor regions occupied by the electrical conductors 82 (or, straight portions 83 to be described later) is set to be larger than the circumferential width WB of each of the inter-conductor regions between the adjacent electrical conductors 82.

In the stator coil 51, the radial thickness of the electrical conductor groups 81 is set to be smaller than the circumferential width of the electrical conductor groups 81 per phase in each magnetic pole. More specifically, each of the electrical conductor groups 81 consists of two radially-stacked electrical conductors 82. In each region corresponding to one magnetic pole, there are provided two circumferentially-adjacent electrical conductor groups 81 per phase. Then, the following relationship is satisfied: Tc×2<Wc×2, where Tc is the radial thickness of each of the electrical conductors 82 and Wc is the circumferential width of each of the electrical conductors 82. In addition, in an alternative configuration, each of the electrical conductor groups 81 consists of two radially-stacked electrical conductors 82; in each region corresponding to one magnetic pole, there is provided only one electrical conductor group 81 per phase. In this case, the following relationship is satisfied: Tc×2<Wc. That is, in the stator coil 51, for the electrical conductor units (i.e., electrical conductor groups 81) arranged at predetermined intervals in the circumferential direction, the radial thickness of each of the electrical conductor units is set to be smaller than the circumferential width of one or more electrical conductor units provided per phase in each region corresponding to one magnetic pole.

In other words, the radial thickness Tc of each of the electrical conductors 82 is preferably set to be smaller than the circumferential width Wc of each of the electrical conductors 82. Further, the radial thickness (i.e., 2Tc) of each of the electrical conductor groups 81, which consists of two radially-stacked electrical conductors 82, is preferably set to be smaller than the circumferential width Wc of each of the electrical conductor groups 81.

The torque of the rotating electric machine 10 is approximately in inverse proportion to the radial thickness of the electrical conductor groups 81. Therefore, the torque of the rotating electric machine 10 can be increased by reducing the radial thickness of the electrical conductor groups 81 on the radially outer side of the stator core 52. This is because with reduction in the radial thickness of the electrical conductor groups 81, the distance from the magnet unit 42 of the rotor 40 to the stator core 52 (i.e., the distance across a portion containing no iron) is shortened, thereby lowering the magnetic reluctance. Consequently, it is possible to increase the magnetic flux generated by the permanent magnets and crossing the stator core 52, thereby increasing the torque.

Moreover, with reduction in the radial thickness of the electrical conductor groups 81, it becomes easier for leakage magnetic flux from the electrical conductor groups 81 to be recovered by the stator core 52. Consequently, it becomes possible to suppress the magnetic flux from leaking outside without being effectively used for improvement of the torque. That is, it becomes possible to suppress the magnetic force from being lowered due to leakage of the magnetic flux and increase the magnetic flux generated by the permanent magnets and crossing the stator core 52, thereby increasing the torque.

Each of the electrical conductors 82 is implemented by a covered electrical conductor that includes a conductor body 82a and an insulating coat 82b covering the surface of the conductor body 82a. Therefore, electrical insulation is secured between each radially-stacked pair of the electrical conductors 82 and between the electrical conductors 82 and the stator core 52. As will be described later, the conductor body 82a is constituted of a bundle of wires 86. In the case of each of the wires 86 being a coated wire, the insulating coat 82b may be constituted of the self-fusing coats of the wires 86. Otherwise, the insulating coat 82b may be constituted of an insulating member provided separately from the coats of the wires 86b. In addition, the electrical insulation of the phase windings formed of the electrical conductors 82 is secured, except for exposed portions of the phase windings for making electrical connection, by the insulating coats 82b of the electrical conductors 82. These exposed portions of the phase windings include, for example, input/output terminal portions, and neutral terminal portions when the phase windings are star-connected. In each of the electrical conductor groups 81, the radially-adjacent electrical conductors 82 are fixed to each other by the self-fused insulating coats of the electrical conductors and/or an insulating resin applied separately from the insulating coats. Consequently, it is possible to prevent electrical breakdown form occurring due to the electrical conductors 82 rubbing against each other and to suppress vibration and noise.

Figure 13:
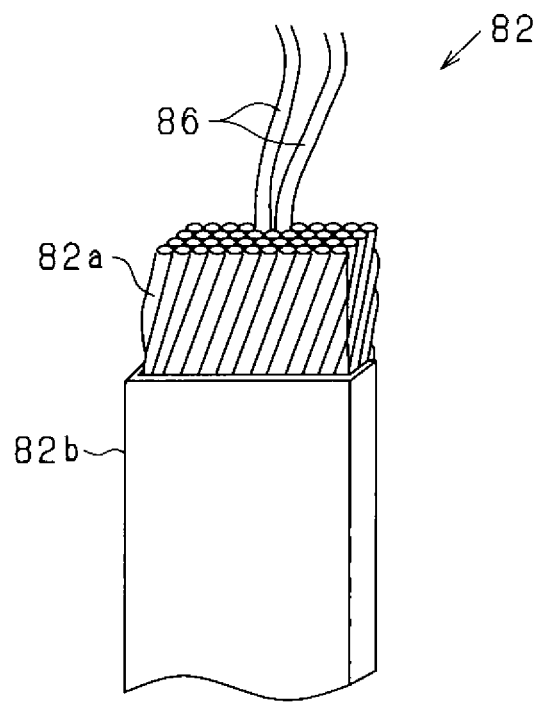
FIG. 13 is a perspective view illustrating the configuration of an electrical conductor.
Figure 14:
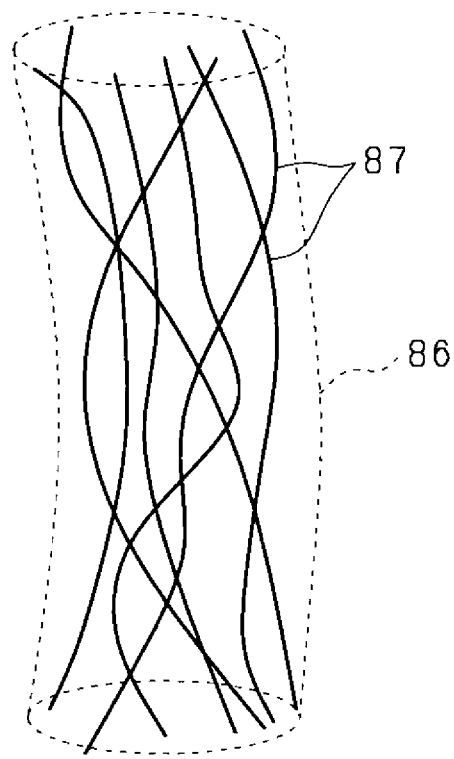
FIG. 14 is a schematic diagram illustrating the configuration of a wire.

In the present embodiment, the conductor body 82a of each of the electrical conductors 82 is constituted of a bundle of wires 86. Specifically, as shown in FIG. 13, the conductor body 82a is formed, by twisting the wires 86, into the shape of a twine. Moreover, as shown in FIG. 14, each of the wires 86 is constituted of a bundle of electrically conductive fibers 87. The fibers 87 are implemented by, for example, CNT (carbon nanotube) fibers. The CNT fibers are micro fibers which are obtained by substituting at least part of carbon with boron. The fibers 87 may alternatively be implemented by other carbon micro fibers, such as Vapor Grown Carbon Fibers (VGCF). However, it is preferable for the fibers 87 to be implemented by CNT fibers. In addition, the surface of each of the wires 86 is covered with an electrically-insulative polymer coat, such as an enamel coat. Moreover, it is preferable that the surface of each of the wires 86 is covered with an enamel coat, such as a polyimide coat or an amide-imide coat.

The electrical conductors 82 together form windings of n phases in the stator coil 51. In each of the electrical conductors 82 (more specifically, each of the conductor bodies 82a), all the wires 86 are adjacent to and in contact with one another. Moreover, in each of the electrical conductors 82, there is at least one place per phase where the wires 86 are twisted together. The electrical resistances between the twisted wires 86 are higher than the electrical resistance of each of the wires 86. Specifically, for each adjacent pair of the wires 86, a first electrical resistivity in the direction in which the wires 86 adjoin each other is higher than a second electrical resistivity in the longitudinal direction of each of the wires 86. In addition, each of the electrical conductors 82 may be constituted of a wire bundle in which the wires 86 are covered with an insulating member having extremely high first electrical resistivity. Moreover, the conductor body 82a of each of the electrical conductors 82 is constituted of the wires 86 that are twisted together.

Since the conductor body 82a is constituted of the wires 86 that are twisted together, it becomes possible to suppress generation of eddy current in each of the wires 86, thereby reducing eddy current in the conductor body 82a. Moreover, each of the wires 86 is twisted to have portions where the magnetic field application directions are opposite to each other; therefore, the counterelectromotive forces generated in these portions are canceled by each other. Consequently, it becomes possible to achieve further reduction in the eddy current. In particular, since each of the wires 86 is constituted of the electrically conductive fibers 87, it becomes possible to make each element of the wire 86 extremely thin and considerably increase the number of twists in the wire 86, thereby more effectively reducing the eddy current.

In addition, the method of insulating between the wires 86 is not limited to employment of the above electrically-insulative polymer coat. As an alternative, it may be possible to make it difficult for electric current to flow between the wires 86 by increasing the contact resistance therebetween. That is, when the resistance between the twisted wires 86 is higher than the resistance of each of the wires 86, it is possible to achieve the above effect by virtue of the electric potential difference caused by the resistance difference. For example, the contact resistance between the wires 86 may be preferably increased by: arranging the manufacturing equipment for manufacturing the wires 86 and the manufacturing equipment for manufacturing the stator 50 (or armature) of the rotating electric machine 10 to be separate from each other; and having the wires 86 oxidized during the delivery time and operation intervals.

As described above, the electrical conductors 82 each have a flat rectangular cross section and are arranged in radial alignment with each other. The shape of each of the electrical conductors 82 is maintained by: covering the surface of each of the wires 86 forming the electrical conductor 82 with a self-fusing insulating layer; and having the self-fusing insulating layers of the wires 86 fused. As an alternative, the shape of each of the electrical conductors 82 may be maintained by: twisting together the wires 86 with or without self-fusing insulating layers respectively covering the surfaces thereof; and fixing the twisted wires 86 together in a desired shape using a synthetic resin. The thickness of the insulating coat 82*b* of each of the electrical conductors 82 may be set to be, for example, 80-100 µm and thus larger than the thicknesses of insulating coats of generally-used electrical conductors which are 5-40 µm. In this case, it is possible to ensure electrical insulation between the electrical conductors 82 and the stator core 52 without interposing insulating paper therebetween.

It is preferable for the insulating coats 82*b* of the electrical conductors 82 to be configured to have higher insulating performance than the insulating layers of the wires 86 and to be capable of making inter-phase insulation. For example, in the case of the polymer insulating layers of the wires 86 having a thickness of, for example, about 5 µm, it is preferable for the insulating coats 82*b* of the electrical conductors 82 to have a thickness of 80-100 µm, thereby securing suitable inter-phase insulation.

Moreover, each of the electrical conductors 82 may be constituted of a bundle of wires 86 that are bundled together without being twisted. That is, each of the electrical conductors 82 may have any one of a configuration where the wires 86 are twisted over the entire length of the electrical conductor 82, a configuration where the wires 86 are twisted for only part of the entire length of the electrical conductor 82 and a configuration where the wires 86 are bundled together without being twisted over the entire length of the electrical conductor 82. To sum up, each of the electrical conductors 82 forming the electrical conductor units is constituted of a wire bundle where a plurality of wires 86 are bundled together and the electrical resistances between the bundled wires 86 are higher than the electrical resistance of each of the wires 86.

The electrical conductors 82 are bent so as to be arranged in a predetermined pattern in the circumferential direction of the stator coil 51. Consequently, each phase winding of the stator coil 51 is formed. As shown in FIG. 12, straight portions 83 of the electrical conductors 82, each of which extends straight in the axial direction, together constitute the coil side part 53 of the stator coil 51; turn portions 84 of the electrical conductors 82, each of which protrudes from the coil side part 53 toward one side in the axial direction, together constitute the coil end 54 of the stator coil 51; turn portions 84 of the electrical conductors 82, each of which protrudes from the coil side part 53 toward the other side in the axial direction, together constitute the coil end 55 of the stator coil 51. Each of the electrical conductors 82 is configured as a wave-wound continuous electrical conductor where the straight portions 83 are formed alternately with the turn portions. The straight portions 83 of the electrical conductors 82 are located to radially face the magnet unit 42. Each pair of the straight portions 83, which belong to the same phase and are spaced at a predetermined interval in the circumferential direction, are connected with each other by one of the turn portions 84 on an axially outer side of the magnet unit 42. In addition, the straight portions 83 correspond to "magnet facing portions".

In the present embodiment, the stator coil 51 is wound in a distributed winding manner into an annular shape. In the coil side part 53 of the stator coil 51, for each phase, the straight portions 83 of each of the electrical conductors 82 belonging to the phase are arranged in the circumferential direction at intervals corresponding to one pole pair of the magnet unit 42. In the coil ends 54 and 55 of the stator coil 51, for each phase, the straight portions 83 of each of the electrical conductors 82 belonging to the phase are connected with one another by the substantially V-shaped turn portions 84 of the electrical conductor 82. For each pair of the straight portions 83 corresponding to one pole pair, the directions of electric currents respectively flowing in the straight portions 83 of the pair are opposite to each other. Moreover, those pairs of the straight portions 83 which are connected by the respective turn portions 84 in the coil end 54 are different from those pairs of the straight portions 83 which are connected by the respective turn portions 84 in the coil end 55. The connection of the straight portions 83 by the turn portions 84 in the coil ends 54 and 55 is repeated in the circumferential direction, forming the stator coil 51 into the substantially hollow cylindrical shape.

More specifically, each phase winding of the stator coil 51 is formed of two pairs of the electrical conductors 82. The first three-phase coil (U, V and W phases) and the second three-phase coil (X, Y and Z phases), which together constitute the stator coil 51, are provided in two radial layers. Let S be the number of phases of the stator coil 51 (i.e., 6 in the embodiment), and let m be the number of the electrical conductors 82 per phase. Then, the number of the electrical conductors 82 per pole pair is equal to 2×S×m=2Sm. In the present embodiment, S is equal to 6, m is equal to 4, and the rotating electric machine has 8 pole pairs (or 16 poles). Accordingly, the total number of the electrical conductors 82 arranged in the circumferential direction of the stator core 52 is equal to 6×4×8=192.

As shown in FIG. 12, in the coil side part 53 of the stator coil 51, the straight portions 83 of the electrical conductors 82 are stacked in two radially-adjacent layers. In the coil ends 54 and 55 of the stator coil 51, for each radially-stacked pair of the straight portions 83 of the electrical conductors 82, those two turn portions 84 of the electrical conductors 82 which are respectively connected with the pair of the straight portions 83 extend respectively toward opposite sides in the circumferential direction. That is, for each radially-adjacent pair of the electrical conductors 82, the orientations of the turn portions 84 of one of the pair of the electrical conductors 82 are opposite to those of the turn portions 84 of the other of the pair of the electrical conductors 82 except for end portions of the stator coil 51.

Figure 15A:
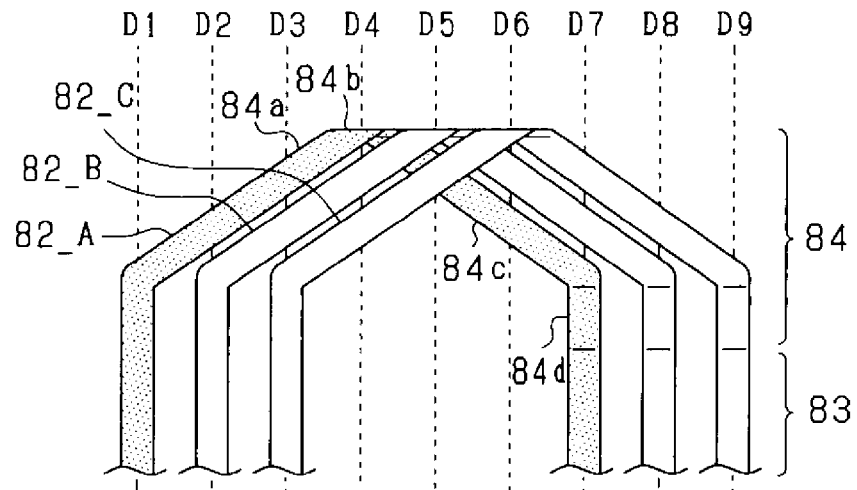
FIGS. 15(a) and 15(b) are diagrams illustrating the layout of electrical conductors at the nth layer.
Figure 15B:
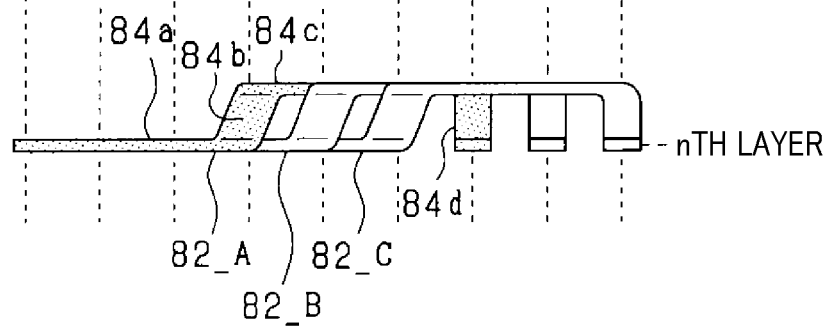

Hereinafter, the winding structure of the electrical conductors 82 forming the stator coil 51 will be described in more detail. In the present embodiment, the wave-shaped electrical conductors 82 are arranged in a plurality (e.g., two) of radially-adjacent layers. FIG. 15(*a*) and FIG. 15(*b*) together illustrate the layout of the electrical conductors 82 at the nth layer. Specifically, FIG. 15(*a*) shows the shapes of the electrical conductors 82 viewed from the radially outer side of the stator coil 51. FIG. 15(*b*) shows the shapes of the electrical conductors 82 viewed from one axial side of the stator coil 51. In FIG. 15(*a*) and FIG. 15(*b*), the positions at which the electrical conductor groups 81 are arranged are respectively designated by D1, D2, D3, . . . , and D9. Moreover, for the sake of convenience of explanation, there are illustrated only three electrical conductors 82, i.e., a first electrical conductor 82_A, a second electrical conductor 82_B and a third electrical conductor 82_C.

In each of the electrical conductors 82_A to 82_C, all the straight portions 83 are located at the nth layer, i.e., located at the same radial position. Each pair of the straight portions 83, which are circumferentially apart from each other by six positions (corresponding to 3×m pairs), is connected by one of the turn portions 84. More specifically, in each of the electrical conductors 82_A to 82_C, all of the seven straight portions 83 are arranged, on the same circle centering on the axis of the rotor 40, to be adjacent to one another in the circumferential direction of the stator coil 51. Moreover, each pair of ends of the straight portions 83 are connected by one of the turn portions 84. For example, in the first electrical conductor 82_A, two straight portions 83, which are arranged respectively at the positions D1 and D7, are connected by one turn portion 84 that has an inverted V-shape. The second electrical conductor 82_B is circumferentially offset from the first electrical conductor 82_A by one position at the same nth layer. The third electrical conductor 82_C is circumferentially offset from the second electrical conductor 82_B by one position at the same nth layer. In this case, since all the electrical conductors 82_A to 82_C are arranged at the same layer, the turn portions 84 of these electrical conductors may interfere with one another. Therefore, in the present embodiment, each of the turn portions 84 of the electrical conductors 82_A to 82_C has part thereof radially offset to form an interference prevention part.

Specifically, each of the turn portions 84 of the electrical conductors 82_A to 82_C is configured to include an oblique part 84a, an apex part 84b, an oblique part 84c and a return part 84d. The oblique part 84a circumferentially extends on the same circle (first circle). The apex part 84b extends from the oblique part 84a radially inward (i.e., upward in FIG. 15(*b*)) of the first circle to reach another circle (second circle). The oblique part 84c circumferentially extends on the second circle. The return part 84d returns from the second circle to the first circle. The apex part 84b, the oblique part 84c and the return part 84d together correspond to the interference prevention part. In addition, each of the turn portions 84 may alternatively be configured to have the oblique part 84c offset from the oblique part 84a radially outward.

That is, in each of the turn portions 84 of the electrical conductors 82_A to 82_C, the oblique part 84a and the oblique part 84c are located respectively on opposite sides of the apex part 84b that is circumferential centered in the turn portion 84. Moreover, the oblique part 84a and the oblique part 84c are different from each other in radial position (i.e., position in the direction perpendicular to the paper surface of FIG. 15(*a*); position in the vertical direction in FIG. 15(*b*)). For example, the turn portion 84 of the first electrical conductor 82_A first extends in the circumferential direction from the position D1 at the nth layer which is the start position, then is bent radially (e.g., radially inward) at the apex part 84b that is circumferentially centered in the turn portion 84, then is further bent circumferentially to extend again in the circumferential direction, and thereafter is bent radially (e.g., radially outward) at the return part 84d to reach to the position D7 at the nth layer which is the end position.

With the above configuration, the oblique parts 84a of the electrical conductors 82_A to 82_C are arranged from the upper side in the vertical direction in the order of the first electrical conductor 82_A, the second electrical conductor 82_B and the third electrical conductor 82_C. The arrangement order of the electrical conductors 82_A to 82_C is inverted at the apex parts 84b so that the oblique parts 84c of the electrical conductors 82_A to 82_C are arranged from the upper side in the vertical direction in the order of the third electrical conductor 82_C, the second electrical conductor 82_B and the first electrical conductor 82_A. Consequently, it becomes possible to arrange the electrical conductors 82_A to 82_C in the circumferential direction without causing interference therebetween.

Moreover, each of the electrical conductor groups 81 consists of a plurality of radially-stacked electrical conductors 82. For each of the electrical conductor groups 81, the turn portions 84 of the electrical conductors 82 of the group may be arranged more radially apart from each other than the straight portions 83 of the electrical conductors 82 are. Furthermore, in the case of the electrical conductors 82 of the same group being bent to the same radial side at the boundaries between the straight portions 83 and the turn portions 84, it is necessary to prevent electrical insulation from being degraded due to interference between the radially-adjacent electrical conductors 82.

Figure 16:
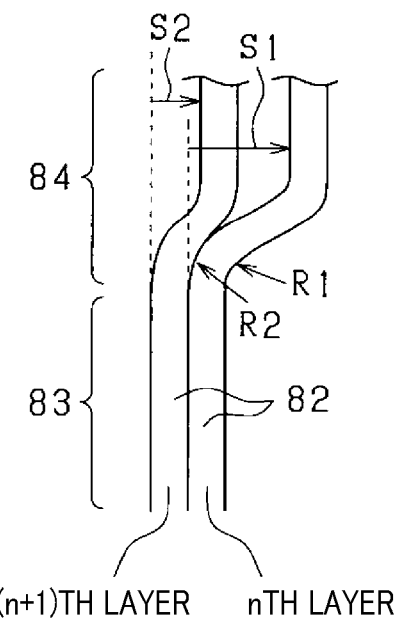
FIG. 16 is a side view illustrating electrical conductors at the nth layer and the (n+1)th layer.

For example, at the positions D7-D9 in FIG. 15(*a*) and FIG. 15(*b*), the radially-stacked electrical conductors 82 are bent radially at the return parts 84d of the respective turn portions 84 thereof. In this case, as shown in FIG. 16, the radius of curvature of the bend of the nth-layer electrical conductor 82 may be set to be different from the radius of curvature of the bend of the (n+1)th-layer electrical conductor 82. More specifically, the radius of curvature R1 of the radially inner (i.e., the nth layer) electrical conductor 82 may be set to be smaller than the radius of curvature R2 of the radially outer (i.e., the (n+1)th layer) electrical conductor 82.

Moreover, the amount of radial shift of the nth-layer electrical conductor 82 may be set to be different from the amount of radial shift of the (n+1)th-layer electrical conductor 82. More specifically, the amount of radial shift S1 of the radially inner (i.e., the nth layer) electrical conductor 82 may be set to be larger than the amount of radial shift S2 of the radially outer (i.e., the (n+1)th layer) electrical conductor 82.

With the above configuration, even with the radially-stacked electrical conductors 82 bent in the same direction, it is still possible to reliably prevent interference between the electrical conductors 82. Consequently, it is possible to ensure high insulation properties.

Next, the structure of the magnet unit 42 of the rotor 40 will be described in detail. In the present embodiment, the magnet unit 42 is constituted of permanent magnets whose residual flux density Br is higher than or equal to 1.0 [T] and intrinsic coercive force Hcj is higher than or equal to 400 [kA/m]. More particularly, in the present embodiment, the permanent magnets are implemented by sintered magnets that are obtained by shaping and solidifying a granular magnetic material by sintering. The intrinsic coercive force Hcj of the permanent magnets on the J-H curve is higher than or equal to 400 [kA/m], and the residual flux density Br of the permanent magnets is higher than or equal to 1.0 [T]. When 5000-10000 [AT] is applied by interphase excitation, if the magnetic length of one pole pair, i.e., the magnetic length of one N pole and one S pole, in other words, the length of a magnetic flux flow path extending between one pair of N and S poles through the inside of the employed permanent magnets is equal to 25 [mm], Hcj is equal to 10000 [A] and thus the permanent magnets are not demagnetized.

In other words, the magnet unit 42 is configured so that: the saturation flux density Js is higher than or equal to 1.2 [T]; the grain size is smaller than or equal to 10 [μm]; and Js×α is higher than or equal to 1.0 [T], where α is the orientation ratio.

Hereinafter, supplemental explanation will be given of the magnet unit 42. The magnet unit 42 (i.e., magnets) is characterized in that 2.15 [T]≥Js≥1.2 [T]. In other words, as the magnets of the magnet unit 42, NdFe11TiN magnets, Nd2Fe14B magnets, Sm2Fe17N3 magnets or L10-type FeNi magnets may be employed. In addition, SmCo5 magnets which are generally called samarium-cobalt magnets, FePt magnets, Dy2Fe14B magnets and CoPt magnets cannot employed as the magnets of the magnet unit 42. On the other hand, magnets, which are formed of the same-type compounds, such as Dy2Fe14B and Nd2Fe14B, to have high coercive force of dysprosium that is a heavy rare-earth element while only slightly losing high Js characteristics of neodymium, may satisfy 2.15 [T]≥Js≤1.2 [T]. In this case, these magnets may be employed as the magnets of the magnet unit 42. In addition, these magnets may be referred to, for example, as [Nd1−xDyx]2Fe14B magnets. Furthermore, the magnets of the magnet unit 42 may be formed of two or more types of materials having different compositions, such as FeNi plus Sm2Fe17N3. For example, magnets, which are formed by adding a small amount of Dy2Fe14B whose Js is lower than 1 [T] to Nd2Fe14B whose Js is equal to 1.6 [T] to improve the coercive force, may be employed as the magnets of the magnet unit 42.

Moreover, in the case of the rotating electric machine being operated at a temperature outside the temperature range of human activities, such as a temperature higher than or equal to 60° C. exceeding the temperature of a desert, or being used as an electric motor in a vehicle where the temperature reaches 80° C. in summer, it is preferable for the magnets of the magnet unit 42 to contain a component having a low temperature coefficient, such as FeNi or Sm2Fe17N3. This is because when the rotating electric machine is operated in a temperature range from about −40° C. (within the temperature range of human activities in Northern Europe) to 60° C. or higher (exceeding the temperature of a desert) or to the heatproof temperature of coil enamel coats (e.g., 180-240° C.), the motor characteristics of the rotating electric machine in the motor operation depends greatly on the temperature coefficient of the magnets of the magnet unit 42; consequently, it becomes difficult to ensure optimal control with the same motor driver. The temperature coefficients of L10-type FeNi and Sm2Fe17N3 are lower than half the temperature coefficient of Nd2Fe14B. Therefore, forming the magnets of the magnet unit 42 with L10-type FeNi or Sm2Fe17N3, it is possible to effectively reduce the burden on the motor driver.

The magnet unit 42 is also characterized in that the grain size in a fine powder state before orientation is smaller than or equal to 10 μm and larger than or equal to the single-domain grain size. In general, the coercive force of magnets can be increased by reducing the size of the grains of the powder to the order of several hundred nanometers. Therefore, in recent years, powders have been used whose grains are reduced in size as small as possible. However, if the grain size was too small, the BH product of the magnets would be lowered due to, for example, oxidization. Therefore, it is preferable that the grain size is larger than or equal to the single-domain grain size. That is, to increase the coercive force, the grains of the powder may be reduced in size preferably to the extent that the grain size is not smaller than the single-domain grain size. In addition, the term "grain size" used hereinafter denotes the grain size in a fine powder state in an orientation step of the magnet manufacturing process.

Furthermore, each of first magnets 91 and second magnets 92 of the magnet unit 42 is implemented by a sintered magnet that is formed by sintering, i.e., heating and consolidating magnetic powder. The sintering is performed so as to satisfy the conditions that: the saturation magnetization Js of the magnet unit 42 is higher than or equal to 1.2 T; the grain size of the first and second magnets 91 and 92 is smaller than or equal to 10 μm; and Js×α is higher than or equal to 1.0 T (Tesla), where α is the orientation ratio. Moreover, each of the first and second magnets 91 and 92 is sintered so as to satisfy the following conditions as well. In the orientation step of the magnet manufacturing process, orientation is performed on the first and second magnets 91 and 92. Consequently, the first and second magnets 91 and 92 have the orientation ratio unlike the magnetic force direction defined by a magnetization step for isotropic magnets. In the present embodiment, the orientation ratio of the first and second magnets 91 and 92 is set to be so high as to satisfy Jr≥Js×α≥1.0 [T] with the saturation magnetization Js of the magnet unit 42 being higher than or equal to 1.2 [T]. For example, in the case of each of the first and second magnets 91 and 92 having six easy axes of magnetization, if five of the six easy axes are oriented in the same direction A10 and the remaining one is oriented in a direction B10 that is inclined by 90 degrees to the direction A10, then α=⅚. Otherwise, if the remaining easy axis is oriented in a direction B10 that is inclined by 45 degrees to the direction A10, then the component of the remaining easy axis in the direction A10 is equal to cos 45°=0.707 and thus α=(5+0.707)/6. As described previously, in the present embodiment, the first and second magnets 91 and 92 are formed by sintering. However, provided that the above conditions are satisfied, the first and second magnets 91 and 92 may alternatively be formed by other methods, such as a method of forming MQ3 magnets.

In the present embodiment, permanent magnets are employed whose easy axes of magnetization are controlled by orientation. Consequently, it becomes possible to increase the magnetic circuit length inside the magnets in comparison with the magnetic circuit length inside conventional linearly-oriented magnets of 1.0 [T] or higher. That is, it becomes possible to achieve the same magnetic circuit length per pole pair with a smaller volume of the magnets in comparison with conventional linearly-oriented magnets. Moreover, even if the permanent magnets are subjected to a severe high-temperature condition, it is still possible to maintain the reversible demagnetization range. Furthermore, the inventor of the present application has found a configuration with which it is possible to realize characteristics approximate to those of polar anisotropic magnets using conventional magnets.

In addition, an easy axis of magnetization denotes a crystal orientation in a magnet along which it is easy for the magnet to be magnetized. The orientation of easy axes of magnetization in a magnet is represented by the direction in which the orientation ratio is higher than or equal to 50%; the orientation ratio indicates the degree of alignment of the easy axes of magnetization. Otherwise, the orientation of easy axes of magnetization in a magnet is the direction which represents the average orientation of the magnet.

As shown in FIGS. 8 and 9, the magnet unit 42 is annular-shaped and arranged on the inner side of the magnet holder 41 (more specifically, on the radially inner side of the cylindrical portion 43). The magnet unit 42 is constituted of the first and second magnets 91 and 92 each of which is a polar anisotropic magnet. The polarity of the first magnets 91 is different from the polarity of the second magnets 92. The first magnets 91 are arranged alternately with the second magnets 92 in the circumferential direction. The first magnets 91 form N poles in the vicinity of the stator coil 51 while the second magnets 92 form S poles in the vicinity of the stator coil 51. The first and second magnets 91 and 92 are permanent magnets constituted of rare-earth magnets such as neodymium magnets.

As shown in FIG. 9, in each of the first and second magnets 91 and 92, the magnetization direction extends in an arc shape between the d-axis (i.e., direct-axis) and the q-axis (i.e., quadrature-axis) in the well-known d-q coordinate system. The d-axis represents the center of the magnetic pole while the q-axis represents the boundary between one pair of N and S poles (in other words, the magnetic flux density is 0T on the q-axis). Moreover, in each of the first and second magnets 91 and 92, on the d-axis, the magnetization direction becomes coincident with a radial direction of the annular magnet unit 42; on the q-axis, the magnetization direction becomes coincident with the circumferential direction of the annular magnet unit 42. More specifically, as shown in FIG. 9, each of the first and second magnets 91 and 92 is configured to have a first part 250 and two second parts 260 located respectively on opposite sides of the first part 250 in the circumferential direction of the magnet unit 42. That is, the first portion 250 is located closer than the second parts 260 to the d-axis; the second portions 260 are located closer than the first part 250 to the q-axis. The magnet unit 42 is configured so that the direction of the easy axis of magnetization 300 of the first part 250 is more parallel than the direction of the easy axis of magnetization 310 of each of the second parts 260 to the d-axis. In other words, the magnet unit 42 is configured so that the angle θ11 between the d-axis and the easy axis of magnetization 300 of the first part 250 is smaller than the angle θ12 between the q-axis and the easy axis of magnetization 310 of each of the second parts 260.

More specifically, the angle θ11 is the angle between the d-axis and the easy axis of magnetization 300 with the direction from the stator 50 (or armature) toward the magnet unit 42 along the d-axis being defined as positive. The angle θ12 is the angle between the q-axis and the easy axis of magnetization 310 with the direction from the stator 50 toward the magnet unit 42 along the q-axis being defined as positive. In the present embodiment, both the angle θ11 and the angle θ12 are smaller than 90°. Here, each of the easy axes of magnetization 300 and 310 is defined as follows. In each of the parts of the magnets 91 and 92, in the case of one easy axis of magnetization being oriented in the direction A11 and another easy axis of magnetization being oriented in the direction B11, the absolute value of the cosine of an angle θ between the direction A11 and the direction B11 (i.e., |cos θ|) is defined as the easy axis of magnetization 300 or 310.

That is, in each of the first and second magnets 91 and 92, the direction of the easy axis of magnetization on the d-axis side (or in the d-axis-side portion) is different from the direction of the easy axis of magnetization on the q-axis side (or in the q-axis-side portions). On the d-axis side, the direction of the easy axis of magnetization is close to a direction parallel the d-axis. In contrast, on the q-axis side, the direction of the easy axis of magnetization is close to a direction perpendicular to the q-axis. Consequently, arc-shaped magnetic paths are formed in the magnet along the direction of the easy axis of magnetization. In addition, in each of the first and second magnets 91 and 92, on the d-axis side, the easy axis of magnetization may be oriented to be parallel to the d-axis; on the q-axis side, the easy axis of magnetization may be oriented to be perpendicular to the q-axis.

Moreover, in each of the magnets 91 and 92, a stator-side peripheral surface on the stator 50 side (i.e., lower side in FIG. 9) and end surfaces on the q-axis side in the circumferential direction constitute magnetic flux acting surfaces through which magnetic flux flows into or out of the magnet. The magnetic paths are formed in the magnet to connect the magnetic flux acting surfaces (i.e., the stator-side peripheral surface and the q-axis-side end surfaces) of the magnet.

Figure 17:
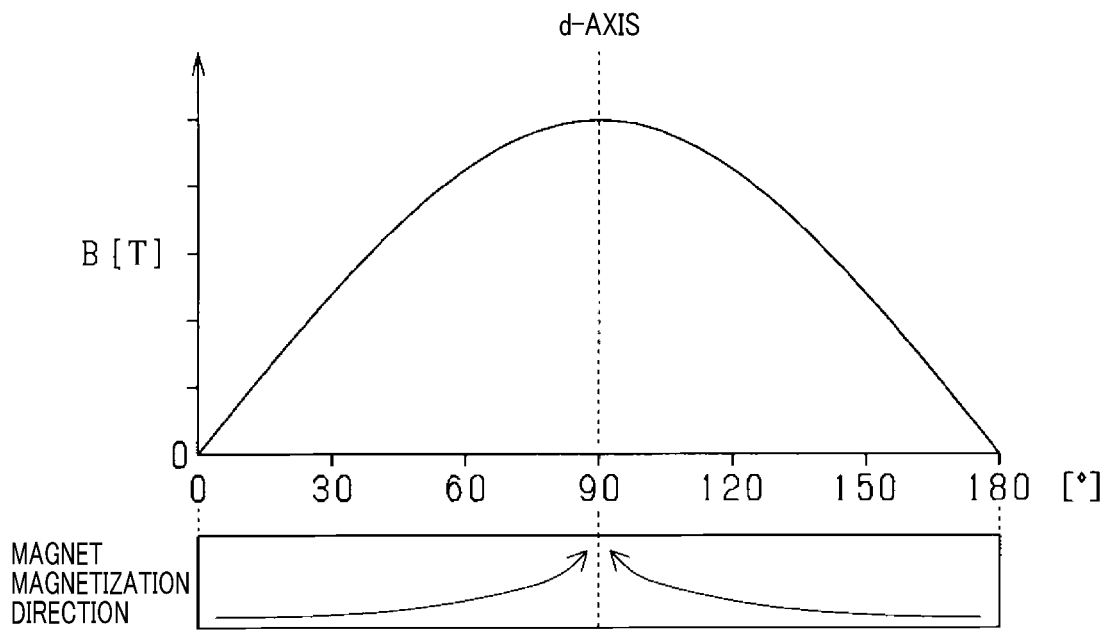
FIG. 17 is a diagram illustrating the relationship between electrical angle and magnetic flux density in magnets of an embodiment.
Figure 18:
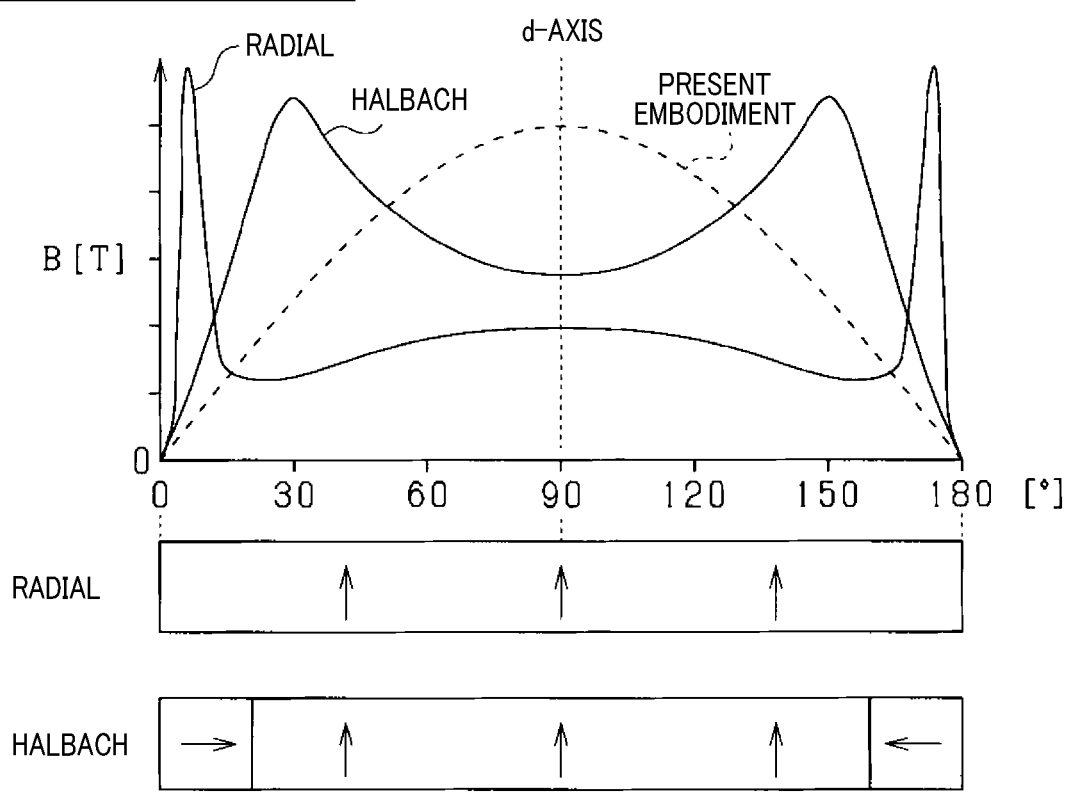
FIG. 18 is a diagram illustrating the relationship between electrical angle and magnetic flux density in magnets of comparative examples.

In the magnet unit 42, magnetic flux flows along the arc-shaped magnetic paths between the adjacent N and S poles, i.e., between the adjacent magnets 91 and 92. Therefore, the magnet magnetic paths are lengthened in comparison with the case of employing, for example, radial anisotropic magnets. Consequently, as shown in FIG. 17, the magnetic flux density distribution becomes approximate to a sine wave. As a result, as shown in FIG. 18, unlike the magnetic flux density distribution in a comparative example where radial anisotropic magnets are employed, it becomes possible to concentrate magnetic flux on the magnetic pole center side, thereby increasing the torque of the rotating electric machine 10. Moreover, it can be seen that the magnetic flux density distribution in the magnet unit 42 according to the present embodiment is also different from the magnetic flux density distribution in a comparison example where magnets are arranged in a conventional Halbach array. In addition, in each of FIGS. 17 and 18, the horizontal axis represents electrical angle and the vertical axis represents magnetic flux density; 90° on the horizontal axis represents the d-axis (i.e., the magnetic pole center) and 0° and 180° on the horizontal axis represent the q-axis.

Accordingly, with the configuration of the magnets 91 and 92 according to the present embodiment, the magnet magnetic flux on the d-axis is intensified and the magnetic flux change in the vicinity of the q-axis is suppressed. Consequently, it becomes possible to suitably realize the magnets 91 and 92 where the surface magnetic flux gradually changes from the q-axis to the d-axis in each magnetic pole.

The sine wave matching percentage of the magnetic flux density distribution may be, for example, 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave matching percentage is about 30%. Moreover, setting the sine wave matching percentage to be higher than or equal to 60%, it is possible to reliably increase the amount of magnetic flux at the central portion of the waveform in comparison with the case of employing magnets arranged in a magnetic flux concentration array such as a Halbach array.

As shown in FIG. 18, in the comparative example where radial anisotropic magnets are employed, the magnetic flux density changes sharply in the vicinity of the q-axis. The sharp change in the magnetic flux density causes the amount of eddy current generated in the stator coil 51 to increase. Moreover, the magnetic flux on the stator coil 51 side also changes sharply. In contrast, in the present embodiment, the waveform of the magnetic flux density distribution is approximate to a sine wave. Consequently, the change in the magnetic flux density in the vicinity of the q-axis is gentler than in the comparative example where radial anisotropic magnets are employed. As a result, it becomes possible to suppress generation of eddy current.

In the magnet unit 42, in each of the magnets 91 and 92, in the vicinity of the d-axis (i.e., the magnetic pole center), magnetic flux is generated in a direction perpendicular to the magnetic flux acting surface 280 on the stator 50 side. The generated magnetic flux flows along the arc-shaped magnetic paths that extend away from the d-axis as they extend away from the magnetic flux acting surface 280 on the stator 50 side. Moreover, the closer the direction of the magnetic flux is to a direction perpendicular to the magnetic flux acting surface 280 on the stator 50 side, the stronger the magnetic flux is. In this regard, in the rotating electric machine 10 according to the present embodiment, the radial thickness of the electrical conductor groups 81 is reduced as described previously. Consequently, the radial center position of the electrical conductor groups 81 becomes closer to the magnetic flux acting surfaces of the magnet unit 42, thereby allowing the stator 50 to receive the stronger magnet magnetic flux from the rotor 40.

Furthermore, the stator 50 has the hollow cylindrical stator core 52 arranged on the radially inner side of the stator coil 51, i.e., on the opposite side of the stator coil 51 to the rotor 40. Therefore, the magnetic flux flowing out from the magnetic flux acting surfaces of the magnets 91 and 92 is attracted by the stator core 52 to circulate through the stator core 52 that constitutes part of the magnetic circuit. Consequently, it becomes possible to optimize the direction and paths of the magnet magnetic flux.

Next, a method of manufacturing the rotating electric machine 10, more particularly a process of assembling the bearing unit 20, the housing 30, the rotor 40, the stator 50 and the inverter unit 60 will be described with reference to FIG. 5. In addition, the inverter 60 includes the unit base 61 and the electrical components 62 as shown in FIG. 6. Therefore, the assembling process includes a step of assembling the unit base 61 and the electrical components 62. In the following explanation, the assembly of the stator 50 and the inverter unit 60 will be referred to as the first unit while the assembly of the bearing unit 20, the housing 30 and the rotor 40 will be referred to as the second unit.

The manufacturing method according to the present embodiment includes:

a first step of mounting the electrical components 62 to the radially inner periphery of the unit base 61;

a second step of mounting the unit base 61 to the radially inner periphery of the stator 50, thereby forming the first unit;

a third step of inserting the attaching portion 44 of the rotor 40 into the bearing unit 20 that has been assembled to the housing 30, thereby forming the second unit;

a fourth step of mounting the first unit to the radially inner periphery of the second unit; and a fifth step of fastening the housing 30 and the unit base 61 to each other, wherein these steps are performed in the sequence of the first step→the second step→the third step→the fourth step→the fifth step.

With the above manufacturing method, the bearing unit 20, the housing 30, the rotor 40, the stator 50 and the inverter unit 60 are first assembled into a plurality of subassemblies and then the subassemblies are further assembled together to form the rotating electric machine 10. Consequently, it becomes possible to realize ease of handling and complete inspection for each unit, thereby making it possible build a suitable assembly line. As a result, it becomes possible to easily cope with multi-product production.

In the first step, a heat conducting member with high heat conductivity may be attached, for example by coating or bonding, to the radially inner periphery of the unit base 61 or the radially outer periphery of the electrical components 62. Then, the electrical components 62 may be mounted to the unit base 61 so that the heat conducting member is interposed between the radially inner periphery of the unit base 61 and the radially outer periphery of the electrical components 62. Consequently, with the heat conducting member, it is possible to more effectively transfer heat generated in the semiconductor modules 66 to the unit base 61.

In the third step, the insertion of the rotor 40 may be performed keeping coaxiality between the housing 30 and the rotor 40. Specifically, a jig may be used to position the outer circumferential surface of the rotor 40 (i.e., the outer circumferential surface of the magnet holder 41) or the inner circumferential surface of the rotor 40 (or the inner circumferential surface of the magnet unit 42) with respect to, for example, the inner circumferential surface of the housing 30. Then, the assembling of the housing 30 and the rotor 40 may be performed with either of the housing 30 and the rotor 40 sliding along the jig. Consequently, it is possible to assemble the heavy-weight components without imposing unbalanced load on the bearing unit 20. As a result, it is possible to ensure reliability of the bearing unit 20.

In the fourth step, the assembling of the first and second units may be performed keeping coaxiality between them. Specifically, a jig may be used to position the inner circumferential surface of the unit base 61 with respect to the inner circumferential surface of the attaching portion 44 of the rotor 40. Then, the assembling of the first and second units may be performed with either of them sliding along the jig. Consequently, it is possible to perform the assembling of the first and second units without causing interference between the rotor 40 and the stator 50 that are arranged with the minute air gap formed therebetween. As a result, it is possible to prevent detects, such as damage to the stator coil 51 or to the permanent magnets, from occurring during the assembling of the first and second units.

Alternatively, the above steps may be performed in the sequence of the second step→the third step→the fourth step→the fifth step→the first step. In this case, the delicate electrical components 62 are assembled to the other components of the rotating electric machine 10 in the final step. Consequently, it is possible to minimize stress induced in the electrical components 62 during the assembly process.

Figure 19:
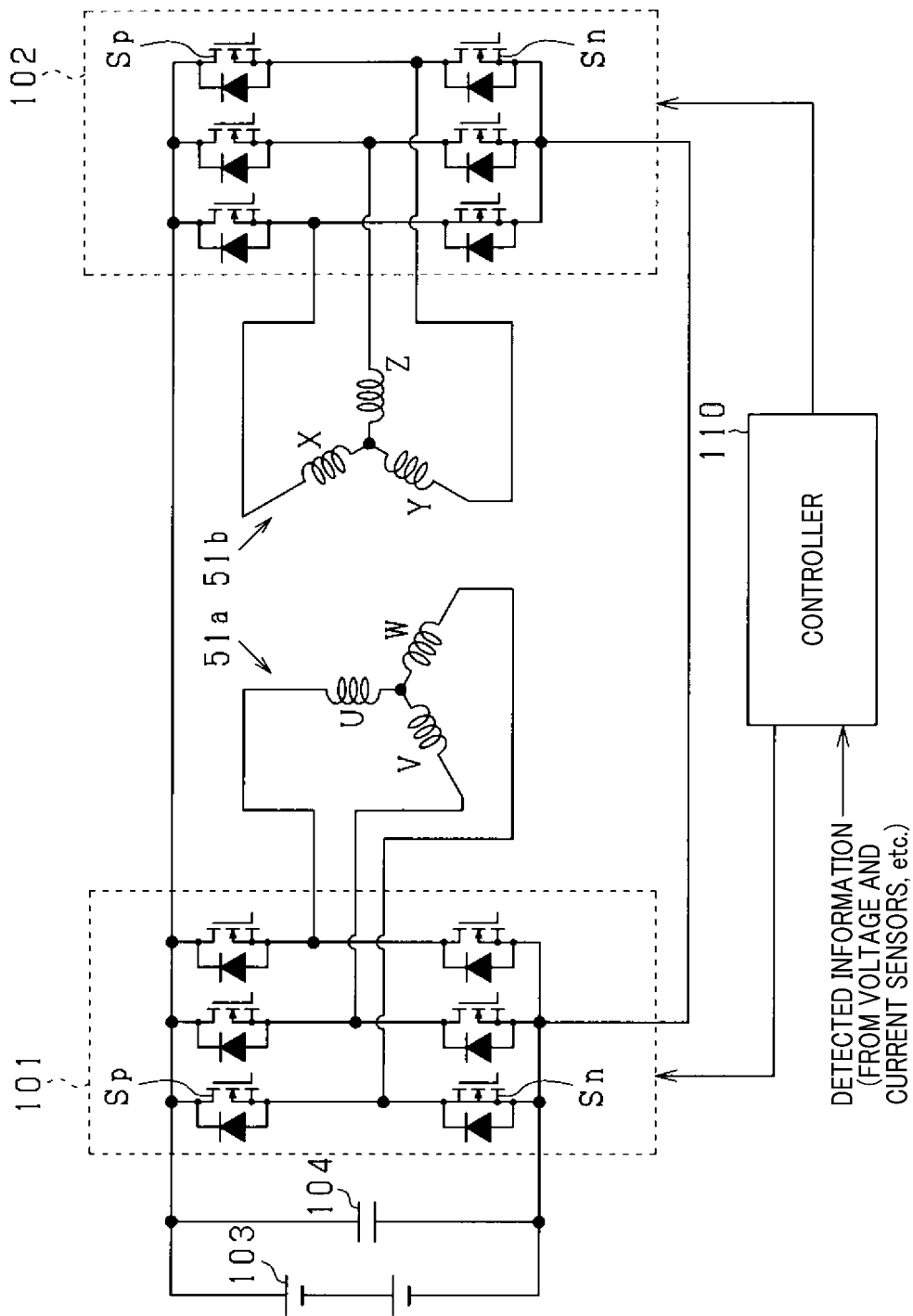
FIG. 19 is an electric circuit diagram of a control system of the rotating electric machine.
Figure 20:
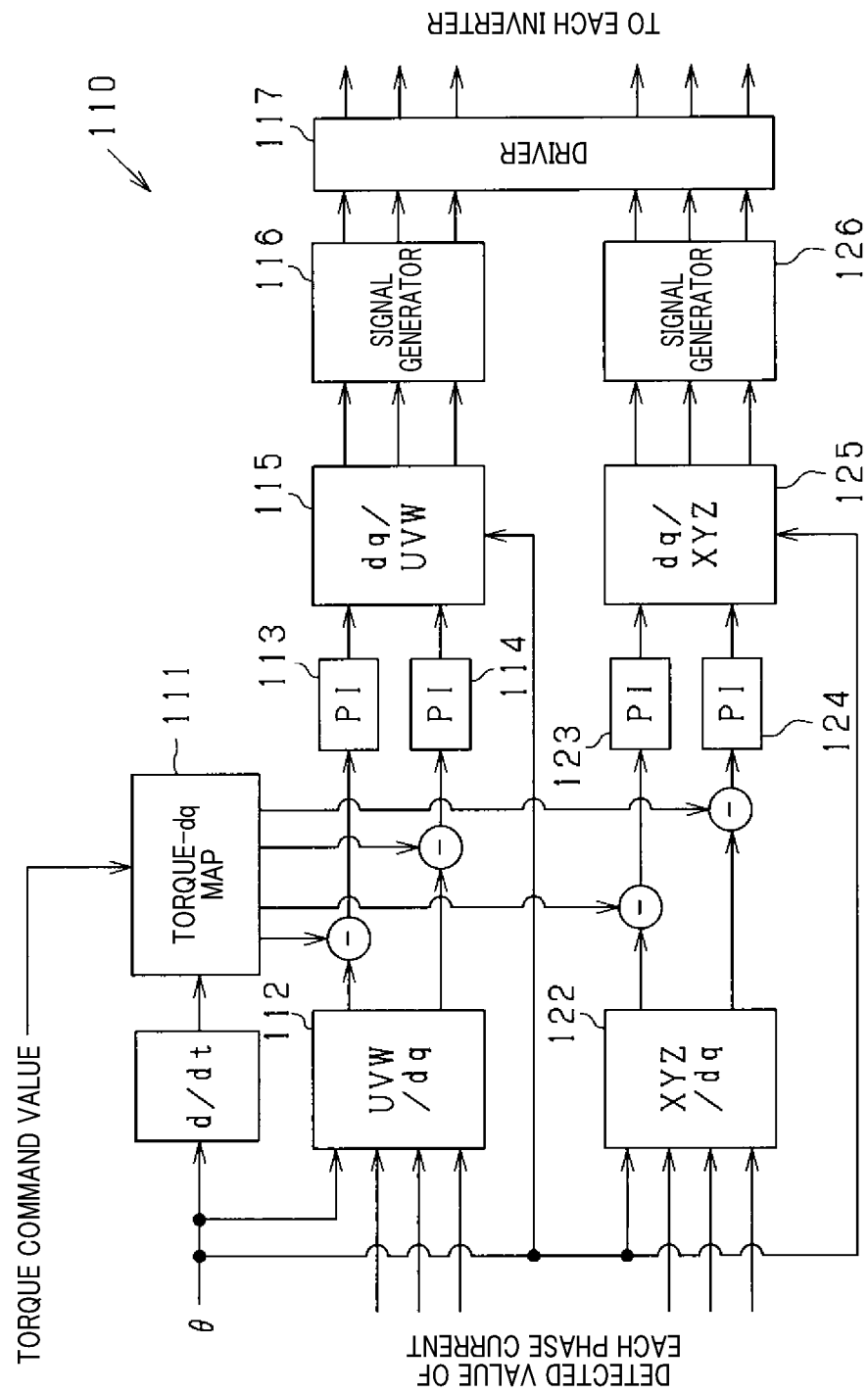
FIG. 20 is a functional block diagram illustrating a current feedback control process performed by a controller.

Next, the configuration of a control system for controlling the rotating electric machine 10 will be described. FIG. 19 is an electric circuit diagram of the control system of the rotating electric machine 10. FIG. 20 is a functional block diagram illustrating a current feedback control process performed by a controller 110 of the control system.

As shown in FIG. 19, the stator coil 51 is comprised of a pair of three-phase coils 51a and 51b. Moreover, the three-phase coil 51a is comprised of the U-phase, V-phase and W-phase windings and the three-phase coil 51b is comprised of the X-phase, Y-phase and Z-phase windings. In the control system, there are provided, as electric power converters, a first inverter 101 and a second inverter 102 respectively for the three-phase coils 51a and 51b. In each of the inverters 101 and 102, there is formed a full bridge circuit having a plurality of pairs of upper and lower arms. The number of pairs of the upper and lower arms in each of the inverters 101 and 102 is equal to the number of the phase windings of each of the three-phase coils 51a and 51b. Each of the upper and lower arms has a switch (or semiconductor switching element) provided therein. Electric current supplied to each phase winding of the stator coil 51 is regulated by turning on/off the switch of each of the upper and lower arms.

A DC power supply 103 and a smoothing capacitor 104 are connected in parallel to each of the inverters 101 and 102. The DC power supply 103 is implemented by, for example, an assembled battery that is obtained by connecting a plurality of battery cells in series with each other. In addition, each of the switches of the inverters 101 and 102 corresponds to one of the semiconductor modules 66 shown in FIG. 1. The smoothing capacitor 104 corresponds to the capacitor module 68 shown in FIG. 1.

The controller 110 includes a microcomputer which is configured with a CPU and various memories. Based on various types of detected information on the rotating electric machine 10 and power running drive and electric power generation requests, the controller 110 performs energization control by turning on and off the switches of the 101 and 102. The controller 110 corresponds to the controller 77 shown in FIG. 6. The detected information on the rotating electric machine 10 includes, for example, a rotation angle (or electrical angle information) of the rotor 40 detected by an angle detector such as a resolver, a power supply voltage (or inverter input voltage) detected by a voltage sensor, and phase currents detected by respective current sensors. The controller 110 generates and outputs operation signals for operating the switches of the inverters 101 and 102. In addition, in the case of the rotating electric machine 10 being used as a vehicular power source, the power generation request may be a regenerative drive request.

The first inverter 101 includes, for each of the U, V and W phases, one serially-connected unit consisting of an upper-arm switch Sp and a lower-arm switch Sn. A high potential-side terminal of the upper-arm switch Sp is connected to a positive terminal of the DC power supply 103. A low potential-side terminal of the lower-arm switch Sn is connected to a negative terminal of the DC power supply 103 (or ground). To an intermediate junction point between the upper-arm switch Sp and the lower-arm switch Sn, there is connected a first end of a corresponding one of the U-phase, V-phase and W-phase windings. The U-phase, V-phase and W-phase windings are star-connected (or Y-connected) to define a neutral point therebetween, at which second ends of these phase windings are connected with each other.

The second inverter 102 has a similar configuration to the first inverter 101. Specifically, the second inverter 102 includes, for each of the X, Y and Z phases, one serially-connected unit consisting of an upper-arm switch Sp and a lower-arm switch Sn. A high potential-side terminal of the upper-arm switch Sp is connected to the positive terminal of the DC power supply 103. A low potential-side terminal of the lower-arm switch Sn is connected to the negative terminal of the DC power supply 103 (or ground). To an intermediate junction point between the upper-arm switch Sp and the lower-arm switch Sn, there is connected a first end of a corresponding one of the X-phase, Y-phase and Z-phase windings. The X-phase, Y-phase and Z-phase windings are star-connected (or Y-connected) to define a neutral point therebetween, at which second ends of these phase windings are connected with each other.

FIG. 20 shows both the current feedback control process for controlling the U-phase, V-phase and W-phase currents and the current feedback control process for controlling the X-phase, Y-phase and Z-phase currents. First, the current feedback control process for the U-phase, V-phase and W-phase currents will be described.

In FIG. 20, a current command value setter 111 is configured to set, using a torque-dq map, both a d-axis current command value and a q-axis current command value on the basis of a power running torque command value or an electric power generation torque command value to the rotating electric machine 10 and an electrical angular speed ω obtained by differentiating the electrical angle θ with respect to time. In addition, the current command value setter 111 is provided for both control of the U-phase, V-phase and W-phase currents and control of the X-phase, Y-phase and Z-phase currents. In the case of the rotating electric machine 10 being used as a vehicular power source, the electric power generation torque command value is a regenerative torque command value.

A dq converter 112 is configured to convert current detected values (three phase currents), which are detected by the current sensors provided for respective phases, into d-axis current and q-axis current which are current components in a Cartesian two-dimensional rotating coordinate system whose d-axis indicates a field direction (or direction of an axis of a magnetic field).

A d-axis current feedback controller 113 is configured to calculate a d-axis command voltage as a manipulated variable for feedback-controlling the d-axis current to the d-axis current command value. A q-axis current feedback controller 114 is configured to calculate a q-axis command voltage as a manipulated variable for feedback-controlling the q-axis current to the q-axis current command value. These feedback controllers 113 and 114 are configured to calculate, using a PI feedback method, the command voltages on the basis of the differences of the d-axis current and the q-axis current from the respective current command values.

A three-phase converter 115 is configured to covert the d-axis and q-axis command voltages into U-phase, V-phase and W-phase command voltages. In addition, the above units 111-115 together correspond to a feedback controller for performing feedback control of fundamental currents by a dq conversion method. The U-phase, V-phase and W-phase command voltages are the feedback-controlled values.

An operation signal generator 116 is configured to generate, using a well-known triangular-wave carrier comparison method, the operation signals for the first inverter 101 on the basis of the U-phase, V-phase and W-phase command voltages. Specifically, the operation signal generator 116 generates the operation signals (or duty signals) for operating the upper-arm and lower-arm switches Sp and Sn of the U, V and W phases by PWM control based on comparison in amplitude between signals, which are obtained by normalizing the U-phase, V-phase and W-phase command voltages with the power supply voltage, and a carrier signal such as a triangular-wave signal.

For the X, Y and W phases, there is provided a configuration similar to the above-described configuration provided for the U, V and W phases. Specifically, a dq converter 122 is configured to convert current detected values (three phase currents), which are detected by the current sensors provided for respective phases, into d-axis current and q-axis current which are current components in the Cartesian two-dimensional rotating coordinate system whose d-axis indicates the field direction.

A d-axis current feedback controller 123 is configured to calculate a d-axis command voltage. A q-axis current feedback controller 124 is configured to calculate a q-axis command voltage. A three-phase converter 125 is configured to covert the d-axis and q-axis command voltages into X-phase, Y-phase and Z-phase command voltages. An operation signal generator 126 is configured to generate the operation signals for the second inverter 102 on the basis of the X-phase, Y-phase and Z-phase command voltages. Specifically, the operation signal generator 126 generates the operation signals (or duty signals) for operating the upper-arm and lower-arm switches Sp and Sn of the X, Y and Z phases by PWM control based on comparison in amplitude between signals, which are obtained by normalizing the X-phase, Y-phase and Z-phase command voltages with the power supply voltage, and a carrier signal such as a triangular-wave signal.

A driver 117 is configured to turn on and off the switches Sp and Sn of the inverters 101 and 102 based on the switch operation signals generated by the operation signal generators 116 and 126.

Next, a torque feedback control process will be described. This process is performed mainly for reducing losses and thereby increasing the output of the rotating electric machine 10 in operating conditions where the output voltages of the inverters 101 and 102 become high, such as in a high-rotation region and a high-output region. The controller 110 selectively performs either one of the torque feedback control process and the current feedback control process according to the operating condition of the rotating electric machine 10.

Figure 21:
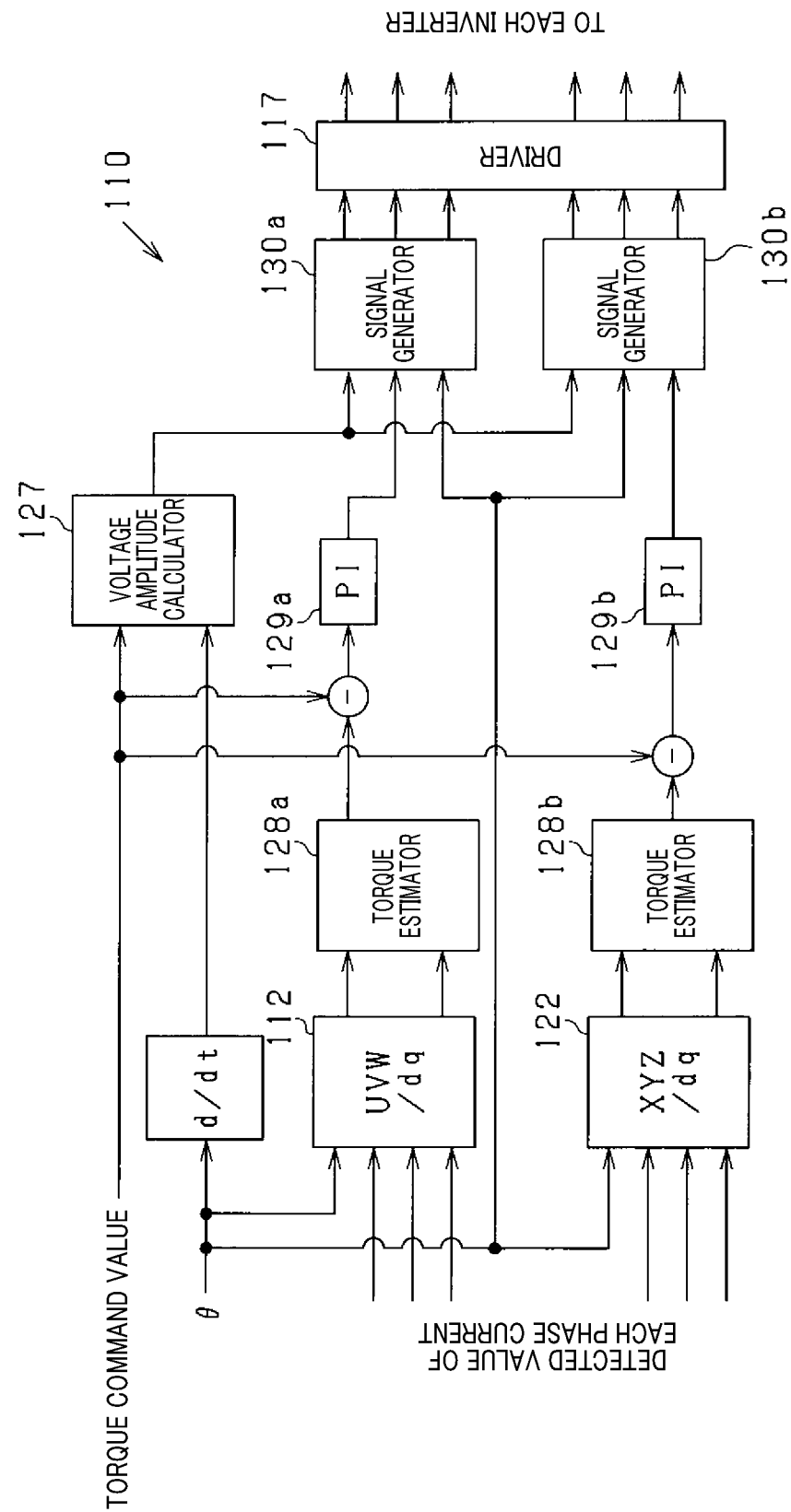
FIG. 21 is a functional block diagram illustrating a torque feedback control process performed by the controller.

FIG. 21 shows both the torque feedback control process corresponding to the U, V and W phases and the torque feedback control process corresponding to the X, Y and Z phases. In addition, in FIG. 21, functional blocks identical to those in FIG. 20 are designated by the same reference numerals as in FIG. 20 and descriptions of them will be omitted hereinafter. First, the torque feedback control process for the U, V and W phases will be described.

A voltage amplitude calculator 127 is configured to calculate a voltage amplitude command, which indicates a command value of the amplitudes of voltage vectors, on the basis of the power running torque command value or the electric power generation torque command value to the rotating electric machine 10 and the electrical angular speed ω obtained by differentiating the electrical angle θ with respect to time.

A torque estimator 128a is configured to calculate a torque estimated value corresponding to the U, V and W phases on the basis of the d-axis current and q-axis current obtained by the dq converter 112. In addition, the torque estimator 128a may calculate the voltage amplitude command on the basis of map information associating the d-axis and q-axis currents with the voltage amplitude command.

A torque feedback controller 129a is configured to calculate a voltage phase command, which indicates command values of the phases of the voltage vectors, as a manipulated variable for feedback-controlling the torque estimated value to the power running torque command value or the electric power generation torque command value. More specifically, the torque feedback controller 129a calculates, using a PI feedback method, the voltage phase command on the basis of the difference of the torque estimated value from the power running torque command value or the electric power generation torque command value.

An operation signal generator 130a is configured to generate the operation signals for the first inverter 101 on the basis of the voltage amplitude command, the voltage phase command and the electrical angle θ. Specifically, the operation signal generator 130a first calculates U-phase, V-phase and W-phase command voltages on the basis of the voltage amplitude command, the voltage phase command and the electrical angle θ. Then, the operation signal generator 130a generates the operation signals for operating the upper-arm and lower-arm switches Sp and Sn of the U, V and W phases by PWM control based on comparison in amplitude between signals, which are obtained by normalizing the calculated U-phase, V-phase and W-phase command voltages with the power supply voltage, and a carrier signal such as a triangular-wave signal.

In addition, as an alternative, the operation signal generator 130a may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

For the X, Y and W phases, there is provided a configuration similar to the above-described configuration provided for the U, V and W phases. Specifically, a torque estimator 128b is configured to calculate a torque estimated value corresponding to the X, Y and Z phases on the basis of the d-axis current and q-axis current obtained by the dq converter 122.

A torque feedback controller 129b is configured to calculate a voltage phase command as a manipulated variable for feedback-controlling the torque estimated value to the power running torque command value or the electric power generation torque command value. More specifically, the torque feedback controller 129b calculates, using a PI feedback method, the voltage phase command on the basis of the difference of the torque estimated value from the power running torque command value or the electric power generation torque command value.

An operation signal generator 130b is configured to generate the operation signals for the second inverter 102 on the basis of the voltage amplitude command, the voltage phase command and the electrical angle θ. Specifically, the operation signal generator 130b first calculates X-phase, Y-phase and Z-phase command voltages on the basis of the voltage amplitude command, the voltage phase command and the electrical angle θ. Then, the operation signal generator 130b generates the operation signals for operating the upper-arm and lower-arm switches Sp and Sn of the X, Y and Z phases by PWM control based on comparison in amplitude between signals, which are obtained by normalizing the calculated X-phase, Y-phase and Z-phase command voltages with the power supply voltage, and a carrier signal such as a triangular-wave signal. The driver 117 is configured to turn on and off the switches Sp and Sn of the inverters 101 and 102 based on the switch operation signals generated by the operation signal generators 130a and 130b.

In addition, as an alternative, the operation signal generator 130b may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

In the rotating electric machine 10, galvanic corrosion may occur in the bearings 21 and 22 due to generation of shaft current. For example, when energization of the stator coil 51 is switched by the switching operation, magnetic flux distortion may occur due to a slight switching-timing deviation (or unbalanced switching), causing galvanic corrosion to occur in the bearings 21 and 22 that support the rotating shaft 11. More specifically, the magnetic flux distortion, which occurs depending on the inductance of the stator 50, induces an axial electromotive force. Due to the axial electromotive force, electrical breakdown may occur in the bearings 21 and 22, allowing galvanic corrosion to progress therein.

Therefore, in the present embodiment, three galvanic corrosion countermeasures are taken which will be described hereinafter. As the first galvanic corrosion countermeasure, the inductance of the stator 50 is lowered with employment of the core-less structure and the magnet unit 42 is configured to make change in the magnet magnetic flux gentle. As the second galvanic corrosion countermeasure, the rotating shaft 11 is supported in a cantilever fashion by the bearings 21 and 22. As the third galvanic corrosion countermeasure, the annular stator coil 51 is molded, together with the stator core 52, in a molding material. Hereinafter, each of the three galvanic corrosion countermeasures will be described in more detail.

First, as the first galvanic corrosion countermeasure, the tooth-less structure is employed for the stator 50 so that no teeth are interposed between the circumferentially adjacent electrical conductor groups 81. Instead, the sealing member 57, which is formed of a nonmagnetic material, is interposed between the electrical conductor groups 81 (see FIG. 10). Consequently, it becomes possible to lower the inductance of the stator 50. Further, with reduction in the inductance of the stator 50, even if a switching-timing deviation occurs during energization of the stator coil 51, it is possible to suppress occurrence of magnetic flux distortion due to the switching-timing deviation. As a result, it is possible to suppress occurrence of galvanic corrosion in the bearings 21 and 22. In addition, the d-axis inductance is preferably lower than the q-axis inductance.

Moreover, each of the magnets 91 and 92 is configured to have the easy axis of magnetization oriented such that the direction of the easy axis of magnetization is more parallel to the d-axis on the d-axis side than on the q-axis side (see FIG. 9). Consequently, the magnet magnetic flux on the d-axis is intensified and the surface magnetic flux change (i.e., increase or decrease in the magnetic flux) from the q-axis to the d-axis becomes gentle in each magnetic pole. As a result, it becomes possible to suppress occurrence of sharp voltage change due to unbalanced switching, thereby contributing to suppression of galvanic corrosion.

As the second galvanic corrosion countermeasure, in the rotating electric machine 10, both the bearings 21 and 22 are arranged on one axial side of the axial center position of the rotor 40 (see FIG. 2). With this arrangement, it is possible to reduce the influence of galvanic corrosion in comparison with the case of bearings being arranged respectively on opposite axial sides of a rotor. More specifically, in the case of supporting a rotor by bearings arranged respectively on opposite axial sides of the rotor, with generation of high-frequency magnetic flux, a closed circuit may be formed which extends through the rotor, the stator and the bearings (i.e., the bearings arranged respectively on opposite axial sides of the rotor), causing galvanic corrosion to occur in the bearings due to shaft current. In contrast, in the present embodiment, with the rotor 40 supported in a cantilever fashion by the bearings 21 and 22, no closed circuit is formed in the rotating electric machine 10; consequently, occurrence of galvanic corrosion due to shaft current is suppressed.

Moreover, the rotating electric machine 10 has the following configuration for arranging both the bearings 21 and 22 on one axial side of the axial center position of the rotor 40. That is, in the intermediate portion 45 of the magnet holder 41 which radially projects, there is formed a contact prevention portion that extends in the axial direction to prevent contact with the stator 50 (see FIG. 2). Therefore, even if a closed circuit of shaft current is formed through the magnet holder 41, it is possible to increase the length of the closed circuit and thus the circuit resistance. Consequently, it is possible to more reliably suppress occurrence of galvanic corrosion in the bearings 21 and 22.

Furthermore, on one axial side of the rotor 40, the holding member 23 of the bearing unit 20 is fixed to the housing 30; on the other axial side of the rotor 40, the housing 30 and the unit base 61 (i.e., stator holder) are joined to each other (see FIG. 2). With this configuration, it becomes possible to suitably arrange both the bearings 21 and 22 on one side of the rotor 40 in the axial direction of the rotating shaft 11. Moreover, with this configuration, the unit base 61 is connected with the rotating shaft 11 via the housing 30. Consequently, it becomes possible to arrange the unit base 61 at a position electrically separated from the rotating shaft 11. In addition, interposing an insulating member, such as a resin member, between the unit base 61 and the housing 30, the unit base 61 and the rotating shaft 11 are further electrically separated from each other. Consequently, it is possible to more reliably suppress occurrence of galvanic corrosion in the bearings 21 and 22.

In the rotating electric machine 10 according to the present embodiment, the shaft voltage applied to the bearings 21 and 22 is lowered by the one-side arrangement of the bearings 21 and 22. Moreover, the electric potential difference between the rotor 40 and the stator 50 is reduced. Consequently, it becomes possible to reduce the electric potential difference acting on the bearings 21 and 22 without using electrically conductive grease in the bearings 21 and 22. In general, electrically conductive grease contains fine particles such as carbon, and thus may cause acoustic noise to occur. In this regard, in the present embodiment, non-electrically conductive grease is used in the bearings 21 and 22. Consequently, it becomes possible to suppress generation of acoustic noise in the bearings 21 and 22. In the case of the rotating electric machine 10 being used in, for example, an electrically-driven vehicle such as an electric vehicle, it is necessary to take countermeasures against acoustic noise. According to the present embodiment, it is possible to take suitable countermeasures against acoustic noise.

As the third galvanic corrosion countermeasure, the stator coil 51 is molded, together with the stator core 52, by a molding material, thereby suppressing displacement of the stator coil 51 in the stator 50 (see FIG. 11). In particular, in the rotating electric machine 10 according to the present embodiment, no inter-conductor members (i.e., no teeth) are interposed between the circumferentially adjacent electrical conductor groups 81 of the stator coil 51. Therefore, displacement of the stator coil 51 may occur. In this regard, molding the stator coil 51 together with the stator core 52, it becomes possible to suppress displacement of the electrical conductors forming the stator coil 51. Consequently, it becomes possible to suppress magnetic flux distortion due to displacement of the stator coil 51; thus it also becomes possible to suppress occurrence of galvanic corrosion in the bearings 21 and 22 due to magnetic flux distortion.

Moreover, the unit base 61, which serves as a housing member to fix the stator core 52, is formed of carbon fiber reinforced plastic (CFRP). Consequently, it becomes possible to suppress electric discharge to the unit base 61 in comparison the case of the unit base 61 being formed of aluminum or the like. As a result, it is possible to more reliably suppress occurrence of galvanic corrosion in the bearings 21 and 22.

In addition, as a further countermeasure for galvanic corrosion of the bearings 21 and 22, at least one of the outer and inner rings 25 and 26 of each of the bearings 21 and 22 may be formed of a ceramic material or an insulating sleeve may be provided outside the outer ring 25.

Hereinafter, other embodiments will be described focusing on the differences thereof from the first embodiment.

Second Embodiment

In the present embodiment, the polar anisotropic structure of the magnet unit 42 of the rotor 40 is modified in comparison with that described in the first embodiment. The polar anisotropic structure according to the present embodiment will be described in detail hereinafter.

Figure 22:
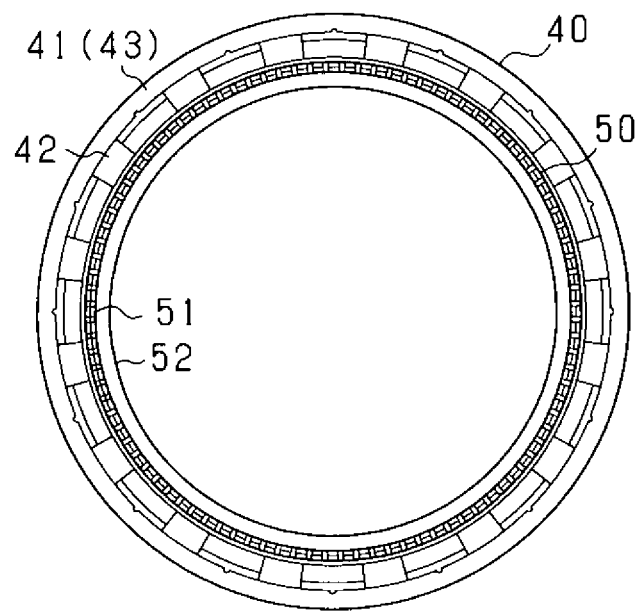
FIG. 22 is a transverse cross-sectional view of a rotor and a stator in a second embodiment.
Figure 23:
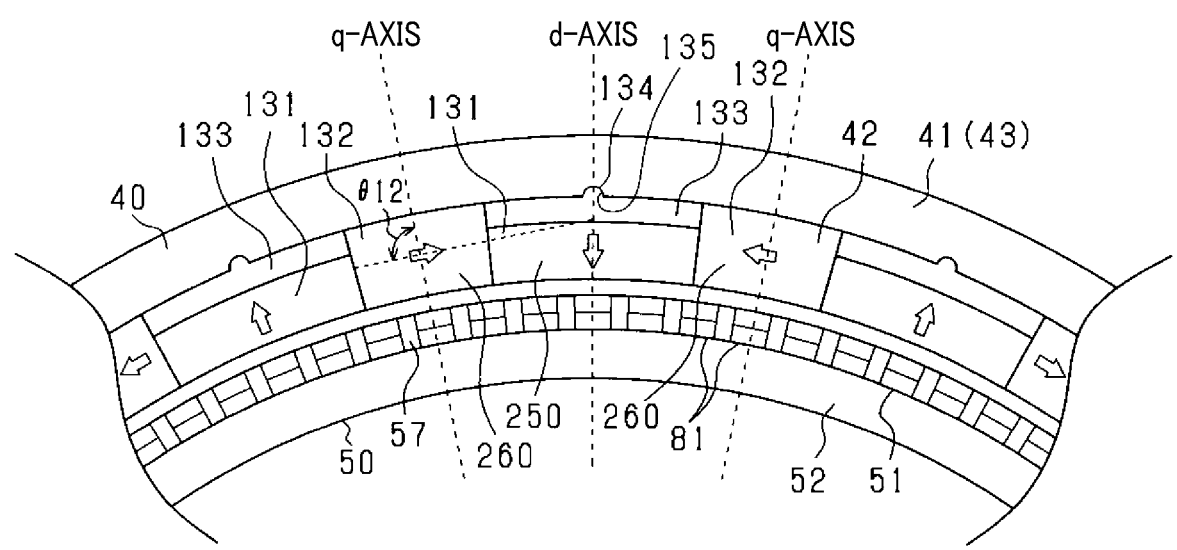
FIG. 23 is an enlarged view of part of FIG. 22.

As shown in FIGS. 22 and 23, in the present embodiment, the magnet unit 42 is configured with a magnet array called a Halbach array. Specifically, the magnet unit 42 includes first magnets 131 each having its magnetization direction (or the direction of the magnetization vector thereof) coincident with a radial direction and second magnets 132 each having its magnetization direction (or the direction of the magnetization vector thereof) coincident with the circumferential direction. The first magnets 131 are arranged at predetermined intervals in the circumferential direction. Each of the second magnets 132 is arranged between one circumferentially-adjacent pair of the first magnets 131. In addition, the first and second magnets 131 and 132 are permanent magnets constituted of rare-earth magnets such as neodymium magnets.

The first magnets 131 are arranged apart from one another in the circumferential direction so that on the side facing the stator 50 (i.e., the radially inner side), the polarities of the first magnets 131 alternate between N and S in the circumferential direction. Moreover, the second magnets 132 are arranged adjacent to the first magnets 131 in the circumferential direction so that the polarities of the second magnets 132 alternate in the circumferential direction. The cylindrical portion 43 is provided to surround the magnets 131 and 132. The cylindrical portion 43, which functions as a back core, may be formed of a soft-magnetic material. In the second embodiment, the relationship of the easy axes of magnetization of the magnet unit 42 to the d-axis and the q-axis on the d-q coordinate system is the same as in the first embodiment.

Moreover, magnetic members 133, each of which is formed a soft-magnetic material, are arranged on the radially outer side of the respective first magnets 131, on the side of the respective first magnets 131 facing the cylindrical portion 43 of the magnet holder 41. More specifically, the magnetic members 133 may be formed, for example, of a magnetic steel sheet, soft iron or green compact core material. The circumferential length of the magnetic members 133 is set to be equal to the circumferential length of the first magnets 131 (more specifically, the circumferential length of outer peripheral portions of the first magnets 131). In a state of each pair of the first magnets 131 and the magnetic members 133 being integrated into one piece, the radial thickness of the integrated piece is equal to the radial thickness of the second magnets 132. In other words, the radial thickness of the first magnets 131 is smaller than the radial thickness of the second magnets 132 by the radial thickness of the magnetic members 133. The first magnets 131, the second magnets 132 and the magnetic members 133 are fixed to one another by, for example, an adhesive. In the magnet unit 42, the radially outer side of the first magnets 131 is the opposite side to the stator 50. The magnetic members 133 are arranged on the opposite side of the first magnets 131 to the stator 50 (i.e., on the non-stator side of the first magnets 131).

On an outer peripheral portion of each of the magnetic members 133, there is formed a key 134 as a protrusion protruding radially outward, i.e., protruding toward the cylindrical portion 43 of the magnet holder 41. Moreover, in the inner circumferential surface of the cylindrical portion 43, there are formed keyways 135 as recesses for respectively receiving the keys 134 of the magnetic members 133. The protruding shape of the keys 134 conforms to the recessed shape of the keyways 135. The number of the keys 134 formed in the magnetic members 133 is equal to the number of the keyways 135 formed in the cylindrical portion 43. With engagement between the keys 134 and the keyways 135, the displacement of the first and second magnets 131 and 132 relative to the magnet holder 41 in the circumferential direction (or rotational direction) is suppressed. In addition, keys 134 and keyways 135 (i.e., protrusions and recesses) may be arbitrarily formed in the cylindrical portion 43 of the magnet holder 41 and the magnetic members 133. For example, as an alternative, each of the magnetic members 133 may have a keyway 135 formed in the outer peripheral portion thereof; on the inner circumferential surface of the cylindrical portion 43, there may be formed keys 134 to be respectively received in the keyways 135 of the magnetic members 133.

In the magnet unit 42 according to the present embodiment, with the alternate arrangement of the first magnets 131 and the second magnets 132, it becomes possible to increase the magnetic flux density in the first magnets 131. Consequently, it becomes possible to cause one-side concentration of magnetic flux to occur in the magnet unit 42, thereby intensifying magnetic flux on the side closer to the stator 50.

Moreover, with the magnetic members 133 arranged on the radially outer side, i.e., on the non-stator side of the first magnets 131, it becomes possible to suppress local magnetic saturation on the radially outer side of the first magnets 131; thus it becomes possible to suppress demagnetization of the first magnets 131 due to magnetic saturation. As a result, it becomes possible to increase the magnetic force of the magnet unit 42. That is, the magnet unit 42 according to the present embodiment can be regarded as being formed by replacing those portions of the first magnets 131 where it is easy for demagnetization to occur with the magnetic members 133.

Figure 24A:
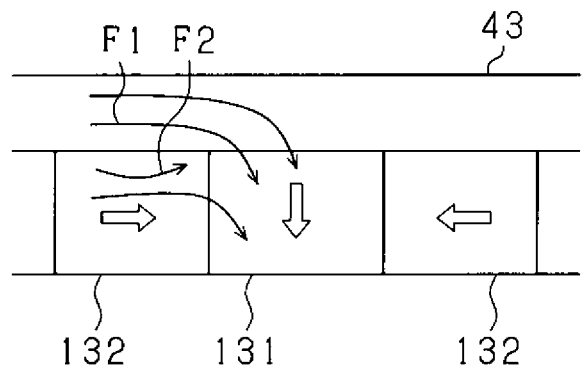
FIGS. 24(a) and 24(b) are diagrams illustrating flows of magnetic flux in magnet units.
Figure 24B:
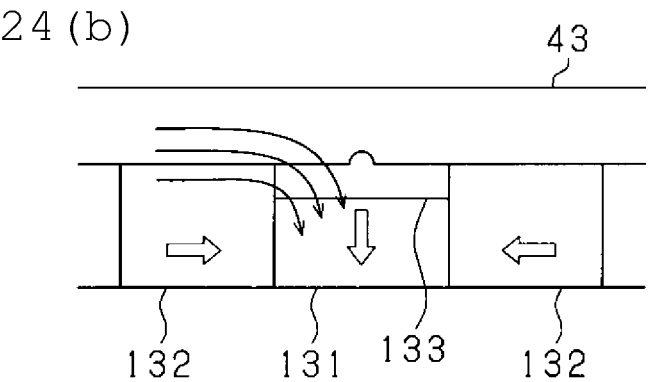

FIG. 24(a) and FIG. 24(b) illustrate flows of magnetic flux respectively in different magnet units 42. Specifically, FIG. 24(a) illustrates the flow of magnetic flux in a magnet unit 42 that has a conventional configuration without magnetic members 133. FIG. 24B illustrates the flow of magnetic flux in the magnet unit 42 according to the present embodiment which is configured to have the magnetic members 133. In addition, in FIG. 24(a) and FIG. 24(b), both the cylindrical portion 43 of the magnet holder 41 and the magnet unit 42 are developed to be straight in shape; the lower side corresponds to the stator side whereas the upper side corresponds to the non-stator side.

With the configuration shown in FIG. 24(a), the magnetic flux acting surfaces of the first magnets 131 and side surfaces of the second magnets 132 are arranged in contact with the inner circumferential surface of the cylindrical portion 43. Moreover, the magnetic flux acting surfaces of the second magnets 132 are arranged in contact with corresponding side surfaces of the first magnets 131. With the above arrangement, in the cylindrical portion 43, there is generated a resultant magnetic flux of magnetic flux F1, which flows through a magnetic path on the radially outer side of the second magnets 132 to enter the magnetic flux acting surfaces of the first magnets 131, and magnetic flux that flows substantially parallel to the cylindrical portion 43 and attracts magnetic flux F2 of the second magnets 132.

Consequently, in the cylindrical portion 43, local magnetic saturation may occur in the vicinities of the contact surfaces between the first magnets 131 and the second magnets 132.

In contrast, with the configuration shown in FIG. 24(b), on the opposite side of the first magnets 131 to the stator 50, there are provided the magnetic members 133 between the magnetic flux acting surfaces of the first magnets 131 and the inner circumferential surface of the cylindrical portion 43, allowing magnetic flux to flow through the magnetic members 133. Consequently, it becomes possible to suppress occurrence of magnetic saturation in the cylindrical portion 43, thereby improving the resistance of the magnet unit 42 to demagnetization.

Moreover, with the configuration shown in FIG. 24(b), it is possible to eliminate, unlike in FIG. 24(a), the magnetic flux F2 which facilitates magnetic saturation. Consequently, it is possible to effectively improve the permeance of the entire magnetic circuit. Furthermore, it is possible to maintain the magnetic circuit characteristics even in a severe high-temperature condition.

In the present embodiment, the magnet magnetic paths through the inside of the magnets are lengthened in comparison with radial magnets in a conventional SPM rotor. Consequently, the magnet permanence is increased, thereby making it possible to increase the magnetic force and thus the torque. Moreover, the magnetic flux is concentrated on the center of the d-axis, thereby making it possible to increase the sine wave matching percentage. In particular, setting the electric current waveform, by PWM control, to be a sine wave or a trapezoidal wave or using 120° excitation switching ICs, it is possible to more effectively increase the torque.

In addition, in the case of the stator core 52 being formed of magnetic steel sheets, the radial thickness of the stator core 52 may be set to be larger than or equal to ½ of the radial thickness of the magnet unit 42. For example, the radial thickness of the stator core 52 may be set to be larger than or equal to ½ of the radial thickness of the first magnets 131 arranged on the magnetic pole centers in the magnet unit 42. Moreover, the radial thickness of the stator core 52 may be set to be smaller than the radial thickness of the magnet unit 42. In this case, since the magnet magnetic flux is about 1 [T] and the saturation flux density of the stator core 52 is equal to 2 [T], setting the radial thickness of the stator core 52 to be larger than or equal to ½ of the radial thickness of the magnet unit 42, it is possible to prevent magnetic flux leakage to the inner peripheral side of the stator core 52.

In magnets with a Halbach structure or a polar anisotropic structure, the magnetic paths are quasi-arc-shaped; therefore it is possible to increase magnetic flux in proportion to the thickness of those magnets which handle the circumferential magnetic flux. With such a configuration, it is considered that the magnetic flux flowing to the stator core 52 does not exceed the circumferential magnetic flux. That is, in the case of using an iron-based metal whose saturation flux density is 2 [T] with respect to the magnet magnetic flux being 1 [T], setting the thickness of the stator core 52 to be larger than or equal to half the thickness of the magnets, it is possible to suitably reduce both the size and weight of the rotating electric machine without causing magnetic saturation of the stator core 52. On the other hand, the magnet magnetic flux is generally lower than or equal to 0.9 [T] since a demagnetizing field from the stator 50 acts on the magnet magnetic flux. Therefore, setting the thickness of the stator core to be larger than or equal to half the thickness of the magnets, it is possible to suitably keep the permeability high.

Third Embodiment

In the third embodiment, the configurations of the magnet unit 42 and the cylindrical portion 43 in the first embodiment are modified. Hereinafter, the configurations of the magnet unit 42 and the cylindrical portion 43 will be mainly described in detail.

Figure 25:
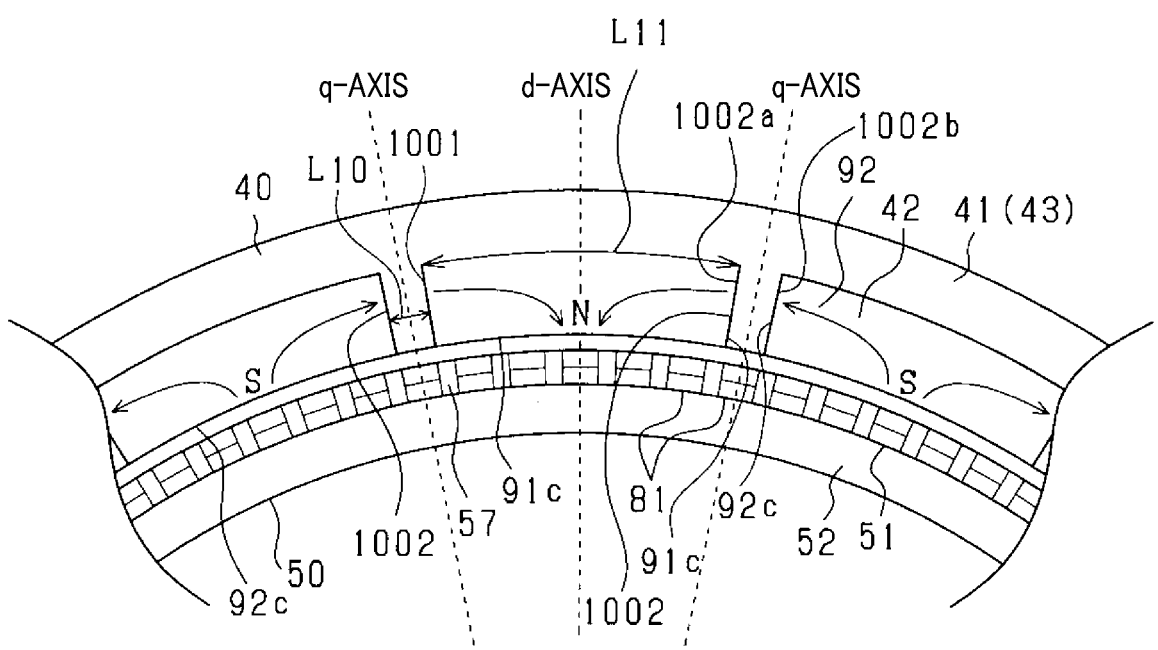
FIG. 25 is a transverse cross-sectional view of a rotor and a stator in a third embodiment.

As shown in FIG. 25, in the third embodiment, the magnet unit 42 is configured with a plurality of magnets 91 and 92 that are arranged in the circumferential direction. Moreover, in the third embodiment, the magnets 91 and 92 are spaced at predetermined intervals in the circumferential direction. Consequently, between the magnets 91 and 92 adjacent to one another in the circumferential direction, there are formed gaps 1001 each axially extending in the axial direction.

Moreover, each of the gaps 1001 between the magnets is provided so as to center on the q-axis. That is, each of the magnets 91 and 92 is formed to extend in an arc shape in the circumferential direction centering on the d-axis. The circumferential width of each of the magnets 91 and 92 is set so that q-axis-side ends of each of the magnets 91 and 92 are respectively separated from the magnets 91 or 92 adjacent thereto.

In the third embodiment, the cylindrical portion 43 is formed of a soft magnetic material to function as a back yoke. That is, the cylindrical portion 43 corresponds to a field-system core (or rotor core) provided on the non-stator side (or non-armature side) of the magnet unit 42.

The cylindrical portion 43 has protrusions 1002 that radially protrude, respectively in the gaps 1001 between the magnets, to the stator side. Each of the protrusions 1002 is located closer to the q-axis than to the d-axis in the circumferential direction. More particularly, in the third embodiment, each of the protrusions 1002 is provided so as to be symmetrical in the circumferential direction with respect to the q-axis. Moreover, each of the protrusions 1002 is provided to have two circumferential end surfaces 1002a and 1002b thereof respectively abutting a circumferential end surface 91a of one of the first magnets 91 and a circumferential end surface 92a of one of the second magnets 92. That is, the protrusions 1002 are formed so that the circumferential width L10 of each of the protrusions 1002 is equal to the circumferential width of each of the gaps 1001 between the magnets. In other words, the circumferential width L11 of each of the magnets 91 and 92 is set according to the dimensions of gaps between the circumferentially-adjacent protrusions 1002. Moreover, in the third embodiment, the radial dimension (or thickness) of the protrusions 1002 is set to be equal to the radial thickness of the magnets 91 and 92.

Each of the circumferential end surfaces 91a and 92a of the magnets 91 and 92 and the circumferential end surfaces 1002a and 1002b of the protrusions 1002 is formed in a planar shape along the radial direction. Therefore, in the case of the circumferential end surfaces 1002a and 1002b of the protrusions 1002 respectively abutting the circumferential end surfaces 91a and 92a of the magnets 91 and 92, the protrusions 1002 are in intimate contact with the respective magnets 91 and 92 without any gaps formed therebetween.

Moreover, the magnet magnetic paths (or easy axes of magnetization) of the magnets 91 and 92 are formed to make, at circumferential ends thereof, angles near parallel (e.g., angles in the range of 0-45°) with the circumferential direction. The circumferential end surfaces 91a and 92a of the magnets 91 and 92, which constitute magnetic flux acting surfaces, are formed to cross the respective magnet magnetic paths (or easy axes of magnetization). Therefore, magnetic flux flows into or out of the magnets 91 and 92 in such a manner as to cross the circumferential end surfaces 1002*a* and 1002*b* of the protrusions 1002 respectively abutting the circumferential end surfaces 91*a* and 92*a* of the magnets 91 and 92.

Furthermore, in the third embodiment, the circumferential end surfaces 91*a* and 92*a* of the magnets 91 and 92 may be formed as oblique surfaces to the radial direction so that the circumferential end surfaces 91*a* and 92*a* are perpendicular (or near perpendicular) to the respective magnet magnetic paths (or easy axes of magnetization). Alternatively, the easy axes of magnetization of the magnets 91 and 92 may be oriented to form the magnet magnetic paths such that the magnet magnetic paths (or easy axes of magnetization) of the magnets 91 and 92 are perpendicular (or near perpendicular) to the respective circumferential end surfaces 91*a* and 92*a* of the magnets 91 and 92. In addition, with perpendicular angles being equal to 90, near-perpendicular angles are angles in the range of, for example, 60-120°.

According to the third embodiment, it is possible to achieve the following advantageous effects.

In the third embodiment, the magnets 91 and 92 are oriented such that at locations closer to the d-axis, the directions of the easy axes of magnetization are more parallel to the d-axis than at locations closer to the q-axis. That is, the magnet magnetic paths are formed in the magnets 91 and 92 so as to be more parallel to the circumferential direction on the q-axis side than on the d-axis side. Moreover, in the third embodiment, the circumferential end surfaces 1002*a* and 1002*b* of the protrusions 1002 are arranged to respectively abut the circumferential end surfaces 91*a* and 92*a* of the magnets 91 and 92. Consequently, it becomes easy for the magnet magnetic paths of the circumferentially-adjacent magnets 91 and 92 to be connected via the protrusions 1002, thereby making it easy for the magnet magnetic paths to be lengthened in a pseudo manner. Accordingly, it becomes difficult for the magnets 91 and 92 to be demagnetized. Moreover, with the magnet magnetic paths lengthened, it becomes possible to increase the magnetic flux density on the d-axis. Furthermore, it becomes easy for magnetic flux to pass through the protrusions 1002; thus it becomes possible to reduce the thickness of the cylindrical portion 43 that functions as the field-system core.

Moreover, as described previously, in each of the first magnets 91, the stator-side peripheral surface 91*c*, which is the armature-side peripheral surface, and the circumferential end surfaces 91*a* constitute the magnetic flux acting surfaces through which magnetic flux flows into or out of the first magnet 91; and the arc-shaped magnet magnetic paths are formed to connect the magnetic flux acting surfaces. Similarly, in each of the second magnets 92, the stator-side peripheral surface 92*c* and the circumferential end surfaces 92*a* constitute the magnetic flux acting surfaces through which magnetic flux flows into or out of the second magnet 92; and the arc-shaped magnet magnetic paths are formed to connect the magnetic flux acting surfaces. Therefore, with the circumferential end surfaces 1002*a* and 1002*b* of the protrusions 1002 respectively abutting the circumferential end surfaces 91*a* and 92*a* of the magnets 91 and 92, it becomes easy to lengthen the magnet magnetic paths via the protrusions 1002.

In the third embodiment, the circumferential end surfaces 91*a* and 92*a* of the magnets 91 and 92 are formed to cross the respective magnet magnetic paths; and the circumferential end surfaces 1002*a* and 1002*b* of the protrusions 1002 are formed according to the angles of the circumferential end surfaces 91*a* and 92*a* of the magnets 91 and 92 which the circumferential end surfaces 1002*a* and 1002*b* respectively abut. More particularly, in the present embodiment, the circumferential end surfaces 91*a* and 92*a* of the magnets 91 and 92 and the circumferential end surfaces 1002*a* and 1002*b* of the protrusions 1002 are formed along the radial direction. Unless the protrusions 1002 formed of a soft-magnetic material are magnetically saturated, magnetic flux passes through the protrusions 1002 so as to minimize the flow distance Therefore, with the circumferential end surfaces 91*a* and 92*a* of the magnets 91 and 92 and the circumferential end surfaces 1002*a* and 1002*b* of the protrusions 1002 formed to cross the respective magnet magnetic paths, it becomes easy for the magnet magnetic paths of the circumferentially-adjacent magnets 91 and 92 to be connected via the protrusions 1002.

Moreover, by making magnetic flux pass through the protrusions 1002 and thereby causing the protrusions 1002 to be magnetically saturated, it is possible to increase the inductance. Therefore, it is possible to eliminate (or lower) the inverse saliency by adjusting the circumferential width of each of the protrusions 1002.

In the third embodiment, the protrusions 1002 engage with the magnets 91 and 92 in the circumferential direction. Therefore, the protrusions 1002 can suitably function as a rotational-displacement stopper of the magnets 91 and 92 during rotation of the rotor 40.

Hereinafter, modifications will be described where the above-described configurations are partially modified.

(First Modification)

Figure 26:
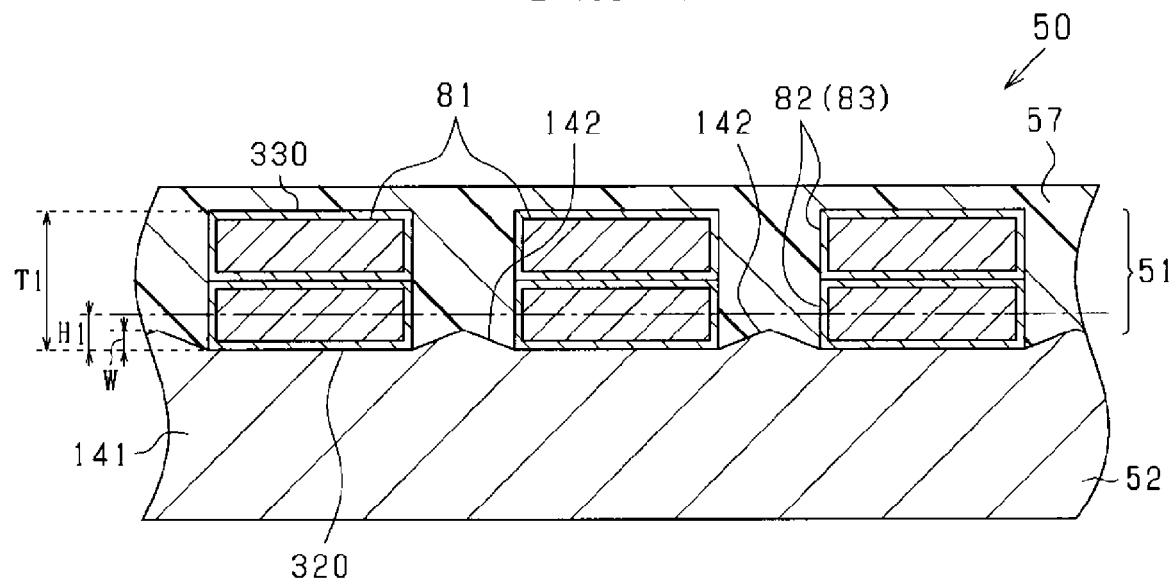
FIG. 26 is a cross-sectional view of a stator in a first modification.

In the above-described embodiments, the outer circumferential surface of the stator core 52 is configured as a smooth curved surface; on the outer circumferential surface of the stator core 52, the electrical conductor groups 81 are arranged at predetermined intervals. As an alternative, as shown in FIG. 26, the stator core 52 may include an annular yoke 141, which is located on the radially opposite side of the stator coil 51 to the rotor 40 (i.e., on the lower side of the stator coil 51 in the figure), and protrusions 142 each of which protrudes from the yoke 141 so as to be located between one circumferentially-adjacent pair of the straight portions 83. That is, the protrusions 142 are formed at predetermined intervals on the radially outer side, i.e., on the rotor 40 side of the yoke 141. The electrical conductor groups 81 forming the stator coil 51 engage with the protrusions 142 in the circumferential direction. That is, the protrusions 142 serve as positioning members for circumferential positioning the electrical conductor groups 81. In addition, the protrusions 142 also correspond to "inter-conductor members".

As shown in FIG. 26, the radial thickness of the protrusions 142 from the yoke 141, i.e., the distance W from inner side surfaces 320 of the straight portions 83, which adjoin the yoke 141, to the tops of the protrusions 142 in the radial direction of the yoke 141 is set to be smaller than ½ of the radial thickness of those of the straight portions 83 radially stacked in layers which radially adjoin the yoke 141 (i.e., smaller than H1 in the figure). In other words, the radial range corresponding to ¾ of T1 may be occupied by the nonmagnetic member (i.e., sealing member 57), where T1 is the dimension (or thickness) of the electrical conductor groups 81 (i.e., the conductive members) in the radial direction of the stator coil 51 (or the stator core 52) (twice the thickness of each of the electrical conductors 82, in other words, the minimum distance from the surfaces 320 of the electrical conductor groups 81 adjoining the stator core 52 to the surfaces 330 of the electrical conductor groups 81 facing the rotor 40). Limiting the thickness of the protrusions 142 as above, it becomes possible to prevent the protrusions 142 from functioning as teeth between the circumferentially-adjacent electrical conductor groups 81 (more specifically, the straight portions 83) and thus prevent magnetic paths from being formed by teeth. In addition, the protrusions 142 are not necessarily provided in all of the gaps formed between the circumferentially-adjacent electrical conductor groups 81. For example, as an alternative, there may be provided only one protrusion 142 which is located in the gap formed between one circumferentially-adjacent pair of the electrical conductor groups 81. As another alternative, there may be provided a plurality of protrusions 142 which are arranged at equal intervals in the circumferential direction so as to be respectively received in every predetermined number of the gaps formed between the circumferentially-adjacent electrical conductor groups 81. The shape of the protrusions 142 may be an arbitrary shape such as a rectangular or arc-like shape.

Moreover, on the outer circumferential surface of the stator core 52, the straight portions 83 may alternatively be provided in a single layer. Accordingly, in a broad sense, the radial thickness of the protrusions 142 from the yoke 141 may be set to be smaller than ½ of the radial thickness of each of the straight portions 83.

In addition, the protrusions 142 may be shaped so as to protrude from the yoke 141 within the range of an imaginary circle which centers on the axis of the rotating shaft 11 and extends through the radial center position of each of the straight portions 83 that radially adjoin the yoke 141. In other words, the protrusions 142 may be shaped so as not to protrude radially outside (i.e., to the rotor 40 side of) the imaginary circle.

With the above configuration, the radial thickness of the protrusions 142 is limited so that the protrusions 142 do not function as teeth between the circumferentially-adjacent straight portions 83. Consequently, it becomes possible to arrange the circumferentially-adjacent straight portions 83 closer to one another than in the case of providing teeth between the circumferentially-adjacent straight portions 83. As a result, it becomes possible to increase the cross-sectional area of each conductor body 82a, thereby reducing the amount of heat generated with energization of the stator coil 51. Moreover, since no teeth are provided in the stator 50, it is possible to prevent occurrence of magnetic saturation in the stator core 52, thereby making it possible to increase the energization current of the stator coil 51. In this case, however, it is possible to suitably cope with the problem that the amount of heat generated with energization of the stator coil 51 increases with the energization current. In addition, in the stator coil 51, each of the turn portions 84 has part thereof radially offset to form an interference prevention part. With the interference prevention parts of the turn portions 84, it becomes possible to arrange the turn portions 84 radially away from each other. Consequently, it becomes possible to improve heat dissipation at the turn portions 84. As above, it becomes possible to improve heat dissipation in the stator 50.

In addition, in the case of the yoke 141 of the stator core 52 being located away from the magnet unit 42 (i.e., the magnets 91 and 92) of the rotor 40 by a predetermined distance or more, the radial thickness of the protrusions 142 is not subjected to H1 shown in FIG. 26. Specifically, when the yoke 141 is located away from the magnet unit 42 by 2 mm or more, the radial thickness of the protrusions 142 may be set to be larger than H1. For example, when the radial thickness of each of the straight portions 83 is larger than 2 mm and each of the electrical conductor groups 81 consists of two radially-stacked electrical conductors 82, the protrusions 142 may be provided within a range from the yoke 141 to the radial center position of the straight portion 83 not adjoining the yoke 141, i.e., to the radial center position of the second electrical conductor 82 counting from the yoke 141. In this case, setting the radial thickness of the protrusions 142 to be not larger than (H1×3/2), it is possible to achieve the above-described advantageous effects by increasing the conductor cross-sectional area in the electrical conductor groups 81.

Figure 27:
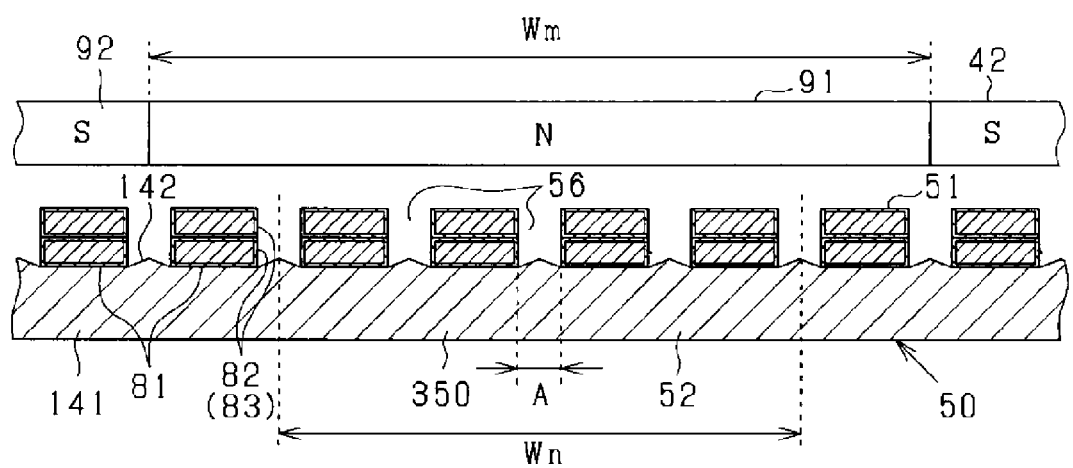
FIG. 27 is a cross-sectional view of another stator in the first modification.

Moreover, the stator core 52 may alternatively have a configuration as shown in FIG. 27. It should be noted that: the sealing resin 57 is omitted from FIG. 27; however, the sealing resin 57 may be included in the configuration shown in FIG. 27. In addition, in FIG. 27, for the sake of simplicity, both the magnet unit 42 and the stator core 52 are shown developed in a straight line.

In the configuration shown in FIG. 27, the stator 50 has, as the inter-conductor members, protrusions 142 each being formed between one circumferentially-adjacent pair of the electrical conductors 82 (i.e., the straight sections 83). The stator 50 also has a circumferentially-extending portion 350 that magnetically functions together with one magnetic pole (N or S pole) of the magnet unit 42 when the stator coil 51 is energized. The portion 350 has a circumferential length Wn. The protrusions 142 are formed of such a magnetic material as to satisfy the following relationship:

$$Wt \times Bs \le Wm \times Br \quad (1)$$

where Wt is the total width (i.e., the sum of circumferential widths) of the protrusions 142 present in the circumferential range of Wn, Bs is the saturation flux density of the protrusions 142, Wm is the circumferential width of each magnetic pole of the magnet unit 42 and Br is the residual flux density of the magnet unit 42.

In addition, the circumferential range Wn is set to include a plurality of circumferentially-adjacent electrical conductor groups 81 whose energization periods overlap each other. The references (or boundaries) in setting the range Wn may be preferably set to the centers of the gaps 56 formed between the electrical conductor groups 81. For example, in the configuration shown in FIG. 27, the circumferential range Wn is set to include four electrical conductor groups 81 located closest to the magnetic pole center of an N pole in the circumferential direction. The ends (start and end points) of the range Wn are respectively set to the centers of two of all the gaps 56 formed between the electrical conductor groups 81.

Moreover, in the configuration shown in FIG. 27, at each end of the range Wn, half of one protrusion 142 is included in the range Wn. Therefore, it can be considered that in the range Wn, there are included a total of four protrusions 142. Accordingly, the total width Wt of the protrusions 142 included in the range Wn can be calculated as follows: Wt=½A+A+A+A+½A=4A, where A is the width of each of the protrusions 142 (i.e., the dimension of each of the protrusions 142 in the circumferential direction of the stator 50, in other words, the interval between each adjacent pair of the electrical conductor groups 81).

Specifically, in the present embodiment, the three-phase coils of the stator coil 51 are wound in a distributed winding manner. In the stator coil 51, the number of the protrusions 142, i.e., the number of the gaps 56 formed between the electrical conductor groups 81 per magnetic pole of the magnet unit 42 is set to (number of phases×Q), where Q is the number of those of the electrical conductors 82 of each phase which are in contact with the stator core 52. In the case of the electrical conductors 82 being stacked in the radial direction of the rotor 40 to form the electrical conductor groups 81, Q is equal to the number of those electrical conductors 82 of the electrical conductor groups 81 of each phase which are located on the inner peripheral side in the electrical conductor groups 81. In this case, when the phase windings of the three-phase coils of the stator coil 51 are energized in a predetermined sequence, in each magnetic pole, the protrusions 142 corresponding to two phases are excited. Accordingly, in the range of each magnetic pole of the magnet unit 42, the total circumferential width Wt of the protrusions 142 that are excited by energization of the stator coil 51 is equal to (number of excited phases×Q×A=2×2×A), where A is the circumferential width of each of the protrusions 142 (or the circumferential width of each of the gaps 56).

Moreover, upon specifying the total width Wt as above, in the stator core 52, the protrusions 142 are formed of such a magnetic material as to satisfy the above relationship (1). In addition, the total width Wt is also equal to the circumferential width of that portion in each magnetic pole whose relative permeability may become higher than 1. Moreover, giving a margin, the total width Wt may be determined to be the circumferential width of the protrusions 142 in each magnetic pole. More specifically, since the number of the protrusions 142 per magnetic pole of the magnet unit 42 is equal to (number of phases×Q), the circumferential width (i.e., the total circumferential width Wt) of the protrusions 142 in each magnetic pole may be determined to be (number of phases×Q×A=3×2×A=6A).

In addition, the distributed winding manner is such that there is one pole pair of the stator coil 51 for each pole pair period of the magnetic poles (i.e., N and S poles). One pole pair of the stator coil 51 is constituted of two straight portions 83 where electric currents respectively flow in opposite directions and which are electrically connected with each other via one turn portion 84, and the one turn portion 84. Satisfying the above condition, a short pitch winding may be regarded as being equivalent to a full pitch winding wound in the distributed winding manner.

Next, examples of the stator coil 51 being wound in a concentrated winding manner will be illustrated. The concentrated winding manner is such that the width of each magnetic pole pair is different from the width of each pole pair of the stator coil 51. The examples include an example where three electrical conductor groups 81 are provided with respect to each magnetic pole pair, an example where three electrical conductor groups 81 are provided with respect to two magnetic pole pairs, nine electrical conductor groups 81 are provided with respect to four magnetic pole pairs, and an example where nine electrical conductor groups 81 are provided with respect to five magnetic pole pairs.

In the case of the stator coil 51 being wound in the concentrated winding manner, when the phase windings of the three-phase coils of the stator coil 51 are energized in a predetermined sequence, two of the phase windings are excited at the same time. Consequently, the protrusions 142 corresponding to the two exited phase windings are also excited. Accordingly, in the range of each magnetic pole of the magnet unit 42, the circumferential width Wt of the protrusions 142 that are excited by energization of the stator coil 51 is equal to (A×2). Moreover, upon specifying the width Wt as above, the protrusions 142 are formed of such a magnetic material as to satisfy the above relationship (1). In addition, in the case of the stator coil 51 being wound in the concentrated winding manner, the parameter A is represented by the sum of circumferential widths of the protrusions 142 in a region surrounded by the electrical conductor groups 81 of the same phase. Moreover, the parameter Wm is represented by (the entire circumference of the surface of the magnet unit 42 facing the air gap)×(number of phases) ÷(distribution number of the electrical conductor groups 81).

In the case of magnets whose BH products are higher than or equal to 20 [MGOe (KJ/m$^3$)], such as neodymium magnets, samarium-cobalt magnets or ferrite magnets, Bd is higher than or equal to 1.0 [T]. In the case of iron, Br is higher than or equal to 2.0 [T]. Therefore, in the case of the rotating electric machine being configured as a high-output motor, in the stator core 52, the protrusions 142 may be formed of such a magnetic material as to satisfy the relationship of Wt<½×Wm.

Moreover, in the case of each of the electrical conductors 82 including an outer coat 182 as will be described later, the electrical conductors 82 may be arranged in the circumferential direction of the stator core 52 to have the outer coats 182 thereof in contact with one another. In this case, the parameter Wt may be considered to be equal to 0 or the sum of thicknesses of the outer coats 182 of two adjoining electrical conductors 82.

In the configurations shown in FIGS. 26 and 27, the inter-conductor members (i.e., the protrusions 142) are disproportionately small with respect to the magnet magnetic flux on the rotor 40 side. In addition, the rotor 40 is configured as a low-inductance and flat SPM rotor; thus the rotor 40 has no saliency in terms of magnetic reluctance. With these configurations, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

(Second Modification)

Figure 28:
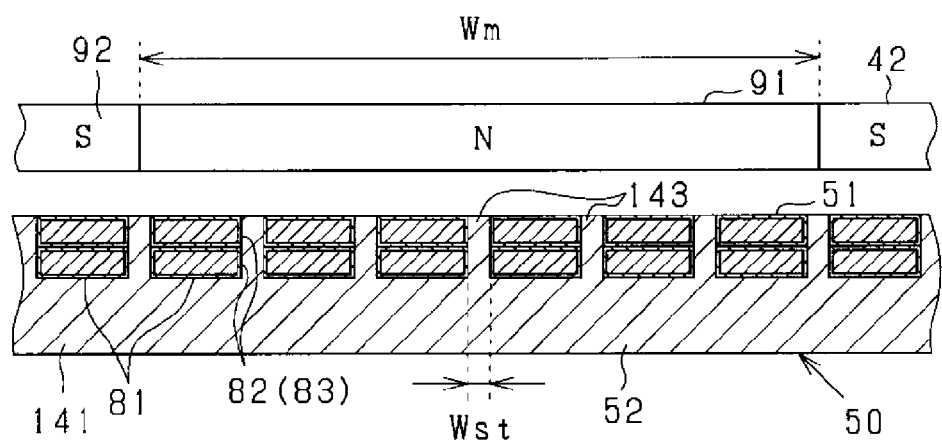
FIG. 28 is a cross-sectional view of a stator in a second modification.

The stator 50, which employs the inter-conductor members satisfying the above relationship (1), may alternatively have a configuration as shown in FIG. 28. In this configuration, tooth-shaped portions 143 are provided, as the inter-conductor members, on the outer circumferential surface (i.e., the upper surface in the figure) of the stator core 52. The tooth-shaped portions 143 each protrude from the yoke 141 and are arranged at predetermined intervals in the circumferential direction. The tooth-shaped portions 143 have a radial thickness equal to the radial thickness of the electrical conductor groups 81. Side surfaces of the tooth-shaped portions 143 are arranged to abut the electrical conductors 82 of the electrical conductor groups 81. Alternatively, there may be formed gaps between the tooth-shaped portions 143 and the electrical conductors 82 in the circumferential direction.

The tooth-shaped portions 143 are limited in circumferential width. That is, there are provided pole teeth (i.e., stator teeth) that are disproportionately thin with respect to the volume of the magnets. With this configuration, the tooth-shaped portions 143 can be reliably saturated by a magnet magnetic flux of 1.8 T or higher, thereby lowering the permeance and thus the inductance.

The magnetic flux on the magnet unit 42 side can be expressed as (Sm×Br), where Sm is the area of the stator-side magnetic flux acting surface per magnetic pole and Br is the residual flux density of the magnet unit 42. On the other hand, supposing that the tooth-shaped portions 143 corresponding to two phases are excited in each magnetic pole by energization of the stator coil 51, then the magnetic flux on the stator 50 side can be expressed as (St×m×2×Bs), where St is the area of the rotor-side surface of each tooth-shaped portion 143 and m is the number of the electrical conductors 82 per phase. In this case, the inductance can be lowered by limiting the dimensions of the tooth-shaped portions 143 so as to satisfy the following relationship:

$$St \times m \times 2 \times Bs < Sm \times Br \quad (2)$$

In addition, in the case of the tooth-shaped portions 143 having the same axial dimension as the magnet unit 42, the above relationship (2) can be replaced with the following relationship:

$$Wst \times m \times 2 \times Bs < Wm \times Br \quad (3)$$

where Wm is the circumferential width of the magnet unit 42 per magnetic pole and Wst is the circumferential width of each tooth-shaped portion 143.

More specifically, supposing that Bs=2 T, Br=1 T and m=2, the above relationship (3) can be reduced to the relationship of (Wst<Wm/8). In this case, the inductance can be lowered by setting the circumferential width Wst of each tooth-shaped portion 143 to be smaller than ⅛ of the circumferential width Wm of the magnet unit 42 per magnetic pole. In addition, in the case of m being equal to 1, the circumferential width Wst of each tooth-shaped portion 143 may be set to be smaller than ¼ of the circumferential width Wm of the magnet unit 42 per magnetic pole.

In addition, in the above relationship (3), (Wst×m×2) corresponds to the total circumferential width of the tooth-shaped portions 143 that are excited by energization of the stator coil 51 in the range of each magnetic pole of the magnet unit 42.

In the configuration shown in FIG. 28, the inter-conductor members (i.e., the tooth-shaped portions 143) are disproportionately small with respect to the magnet magnetic flux on the rotor 40 side as in the configurations shown in FIGS. 26 and 27. Consequently, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.
(Third Modification)

Figure 29:
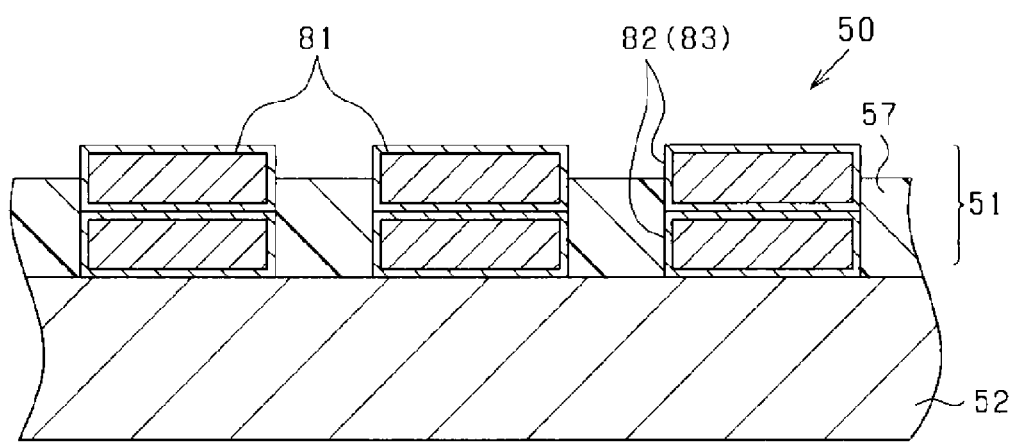
FIG. 29 is a cross-sectional view of a stator in a third modification.

In the above-described embodiments, the sealing member 57 is provided, on the radially outer side of the stator core 52, in a region covering all the electrical conductor groups 81, i.e., in a region whose radial thickness is larger than the radial thickness of each electrical conductor group 81. As an alternative, as shown in FIG. 29, the sealing member 57 may be provided so that the electrical conductors 82 are partially exposed from the sealing member 57. More specifically, those of the electrical conductors 82 which are arranged radially outermost in the electrical conductor groups 81 are partially exposed, on the radially outer side, i.e., on the rotor 40 side, from the sealing member 57. In this case, the radial thickness of the sealing member 57 may be set to be equal to or smaller than the radial thickness of each electrical conductor group 81.
(Fourth Modification)

Figure 30:
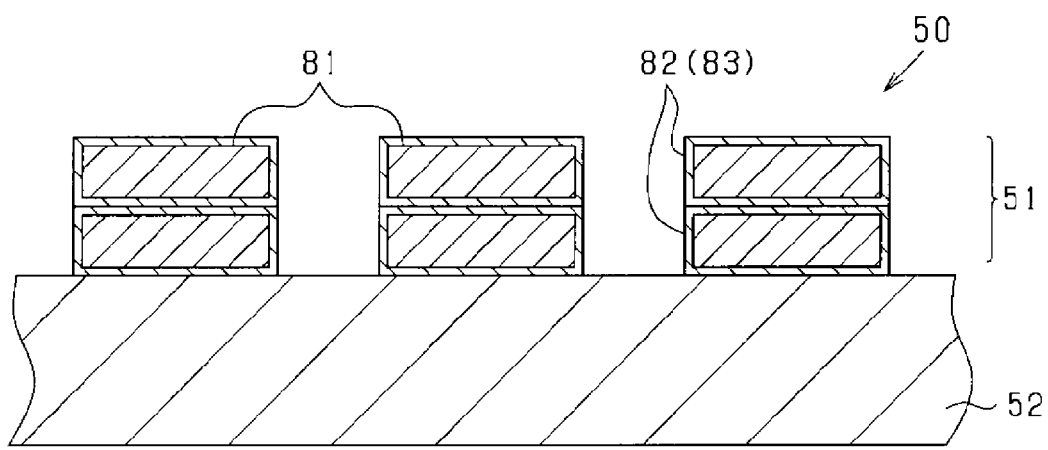
FIG. 30 is a cross-sectional view of a stator in a fourth modification.

As shown in FIG. 30, in the stator core 50, the electrical conductor groups 81 may not be sealed by any sealing member 57. That is, the stator core 50 may have no sealing member 57 employed therein to cover the stator coil 51. In this case, the gaps between the circumferentially-aligned electrical conductor groups 81 are not occupied by any inter-conductor members, remaining void. In other words, no inter-conductor members are provided between the circumferentially-aligned electrical conductor groups 81. In addition, air, which can be regarded as a nonmagnetic material or an equivalent of a nonmagnetic material satisfying Bs=0, may be filled in the gaps.
(Fifth Modification)

In the case of forming the inter-conductor members in the stator 50 with a nonmagnetic material, the nonmagnetic material may be implemented by a non-resin material, for example a nonmagnetic metal material such as SUS 304 which is an austenitic stainless steel.
(Sixth Modification)

The stator 50 may include no stator core 52. In this case, the stator 50 is configured with the stator coil 51 shown in FIG. 12. In addition, in the case of the stator 50 including no stator core 52, the stator coil 51 may be sealed with a sealing material. Alternatively, the stator 50 may include, instead of the stator core 52 formed of a soft-magnetic material, a stator coil holder that is annular in shape and formed of a nonmagnetic material such as a synthetic resin.
(Seventh Modification)

Figure 31:
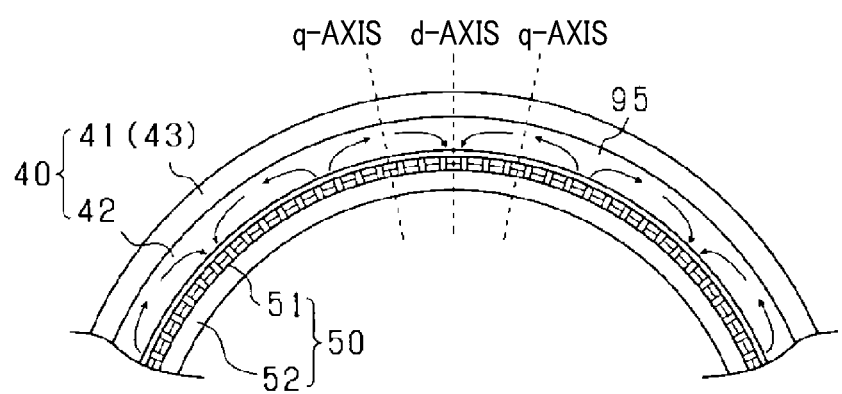
FIG. 31 is a transverse cross-sectional view of a rotor and a stator in a seventh modification.

In the first embodiment, the magnet unit 42 of the rotor 40 is configured with the plurality of magnets 91 and 92 arranged in the circumferential direction. As an alternative, the magnet unit 42 may be configured with an annular magnet which is a permanent magnet. Specifically, as shown in FIG. 31, the annular magnet 95 is fixed to the radially inner periphery of the cylindrical portion 43 of the magnet holder 41. In the annular magnet 95, there are formed a plurality of magnetic poles the polarities of which alternate between N and S in the circumferential direction. Moreover, both the d-axis and the q-axis are defined in the one-piece structured annular magnet 95. Furthermore, in the annular magnet 95, arc-shaped magnet magnetic paths are formed so as to be oriented in a radial direction at the d-axis in each of the magnetic poles and oriented in the circumferential direction at the q-axis between each adjacent pair of the magnetic poles.

In addition, in the annular magnet 95, arc-shaped magnet magnetic paths may be formed such that the easy axis of magnetization is oriented to be parallel to or near parallel to the d-axis in d-axis-side portions, and oriented to be perpendicular to or near perpendicular to the q-axis in q-axis-side portions.
(Eighth Modification)

In this modification, part of the control method of the controller 110 is modified. Accordingly, the differences of this modification from the above-described first embodiment will be mainly described.

Figure 32:
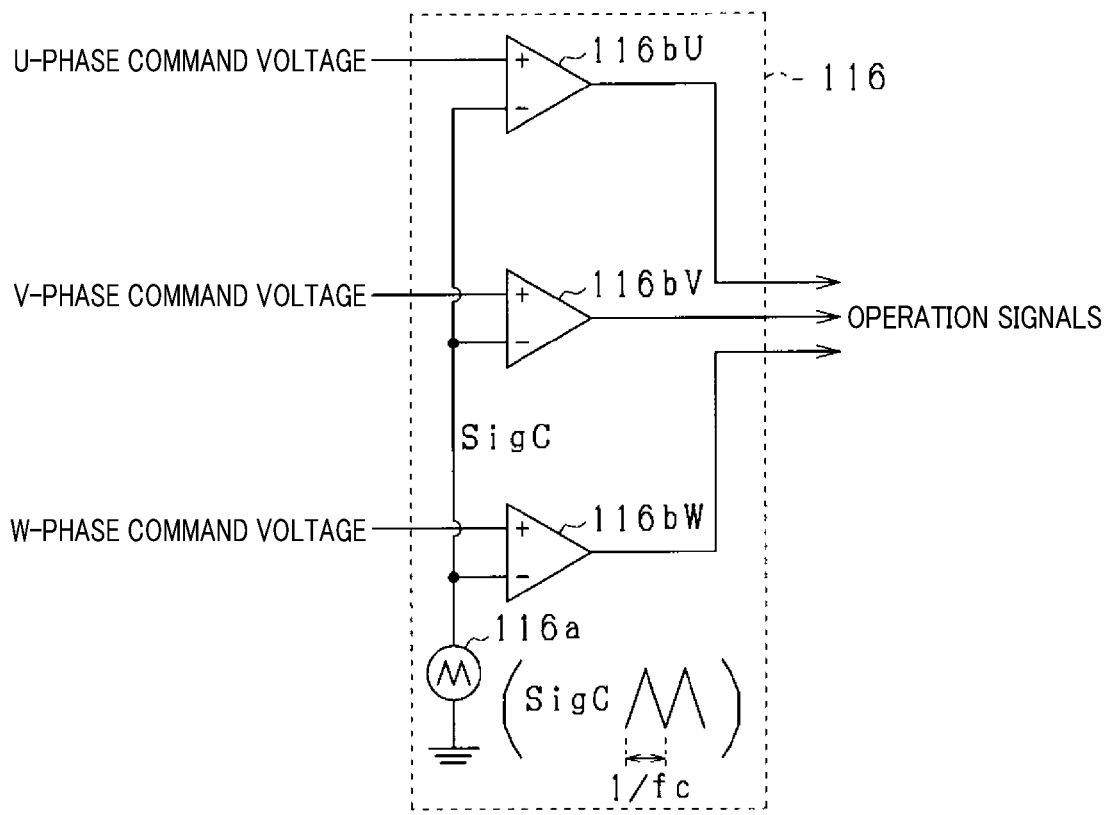
FIG. 32 is a functional block diagram illustrating part of a process performed by an operation signal generator in an eighth modification.

First, the processes performed by the operation signal generators 116 and 126 shown in FIG. 20 and the operation signal generators 130a and 130b shown in FIG. 21 will be described with reference to FIG. 32. In addition, the processes performed by the operation signal generators 116, 126, 130a and 130b are basically the same; therefore, only the process performed by the operation signal generator 116 will be described hereinafter.

The operation signal generator 116 includes a carrier signal generator 116a and U-phase, V-phase and W-phase comparators 116bU, 116bV and 116bW. In the present embodiment, the carrier signal generator 116a generates and outputs a triangular-wave signal as a carrier signal SigC.

The carrier signal SigC generated by the carrier signal generator 116a is inputted to each of the U-phase, V-phase and W-phase comparators 116bU, 116bV and 116bW. Moreover, the U-phase, V-phase and W-phase command voltages calculated by the three-phase converter 115 are respectively inputted to the U-phase, V-phase and W-phase comparators 116bU, 116bV and 116bW. The U-phase, V-phase and W-phase command voltages are each in the form of, for example, a sine wave and offset in phase from each other by 120° in electrical angle.

The U-phase, V-phase and W-phase comparators 116bU, 116bV and 116bW generate, by PWM (Pulse-Width Modulation) control based on comparison in amplitude between the U-phase, V-phase and W-phase command voltages and the carrier signal SigC, the operation signals for operating the upper-arm and lower-arm switches Sp and Sn of the U, V and W phases in the first inverter 101. More specifically, the U-phase, V-phase and W-phase comparators 116bU, 116bV and 116bW generate the operation signals for operating the switches Sp and Sn of the U, V and W phases by the PWM control based on comparison in amplitude between signals, which are obtained by normalizing the U-phase, V-phase and W-phase command voltages with the power supply voltage, and the carrier signal SigC. Then, the driver 117 turns on and off the switches Sp and Sn of the U, V and W phases in the first inverter 101 based on the operation signals generated by the U-phase, V-phase and W-phase comparators 116bU, 116bV and 116bW of the operation signal generator 116.

The controller 110 performs a process of varying the carrier frequency fc of the carrier signal SigC, i.e., varying the switching frequency of the switches Sp and Sn. Specifically, the carrier signal fc is set to be higher in a low-torque region or a high-rotation region of the rotating electric machine 10 and to be lower in a high-torque region of the rotating electric machine 10. Such a setting is performed for suppressing the controllability of electric current flowing in each phase winding from being lowered.

The inductance of the stator 50 can be lowered by employing a core-less structure for the stator 50. However, with the lowering of the inductance of the stator 50, the electrical time constant of the rotating electric machine 10 is accordingly lowered. Consequently, ripple of electric current flowing in each phase winding of the stator coil 51 may be increased and thus the controllability of the electric current may drop, causing the electric current control to diverge. Moreover, the influence of the controllability drop may become more remarkable when the electric current (e.g., the effective value of the electric current) flowing in each phasing winding is within a low-current region than when the electric current is within a high-current region. To cope with this problem, in this modification, the controller 110 varies the carrier frequency fc.

The process of varying the carrier frequency fc will be described with reference to FIG. 33. This process is repeatedly performed, as the process of the operation signal generator 116, by the controller 110 in a predetermined control cycle.

First, in step S10, the controller 110 determines whether electric current flowing in each phase winding 51a is within the low-current region. This determination is made for determining whether the current torque of the rotating electric machine 10 is within the low-torque region. In addition, this determination can be made using, for example, either of the following first and second methods.

[First Method]

According to the first method, a torque estimation value of the rotating electric machine 10 is first calculated on the basis of the d-axis and q-axis currents obtained by the dq converter 112. Then, a determination is made as to whether the calculated torque estimation value is lower than a torque threshold value. If the calculated torque estimation value is lower than the torque threshold value, it is determined that the electric current flowing in each phase winding 51a is within the low-current region. In contrast, if the calculated torque estimation value is higher than or equal to the torque threshold value, it is determined that the electric current flowing in each phase winding 51a is within the high-current region. In addition, the torque threshold value may be set to, for example, ½ of a starting torque (or locked torque) of the rotating electric machine 10.

[Second Method]

According to the second method, a determination is made as to whether the rotation angle of the rotor 40 detected by the rotation angle detector is greater than or equal to a speed threshold value. If the rotation angle of the rotor 40 is greater than or equal to the speed threshold value, it is determined that the rotational speed of the rotor 40 is within the high-rotation region, i.e., the electric current flowing in each phase winding 51a is within the low-current region. In addition, the speed threshold value may be set to, for example, the rotational speed value at which the maximum torque of the rotating electric machine 10 becomes equal to the torque threshold value.

Referring back to FIG. 33, if the determination in step S10 results in a "NO" answer, i.e., if the electric current flowing in each phase winding is within the high-current region, the process proceeds to step S11. In step S1, the controller 110 sets the carrier signal fc to a first frequency fL. Then, the process terminates.

In contrast, if the determination in step S10 results in a "YES" answer, i.e., if the electric current flowing in each phase winding is within the low-current region, the process proceeds to step S12. In step S12, the controller 110 sets the carrier signal fc to a second frequency fH that is higher than the first frequency fL. Then, the process terminates.

As described above, in the present modification, the carrier frequency fc is set to be higher when the electric current flowing in each phase winding is within the low-current region than when the electric current is within the high-current region. Accordingly, the switching frequency of the switches Sp and Sn is set to be higher when the electric current flowing in each phase winding is within the low-current region than when the electric current is within the high-current region. Consequently, when the electric current flowing in each phase winding is within the low-current region, it is possible to suppress increase in ripple of the electric current flowing in each phase winding, thereby suppressing the controllability of the electric current from being lowered.

On the other hand, when the electric current flowing in each phase winding is within the high-current region, the amplitude of the electric current is higher than when the electric current is within the low-current region. Therefore, the increase in ripple of the electric current due to the lowering of the inductance affects the controllability of the electric current less. Accordingly, it is allowed to set the carrier frequency fc to be lower when the electric current flowing in each phase winding is within the high-current region than when the electric current is within the low-current region, thereby reducing switching loss in the inverters 101 and 102.

Moreover, the following further modifications may be made in addition to the present modification.

Figure 33:
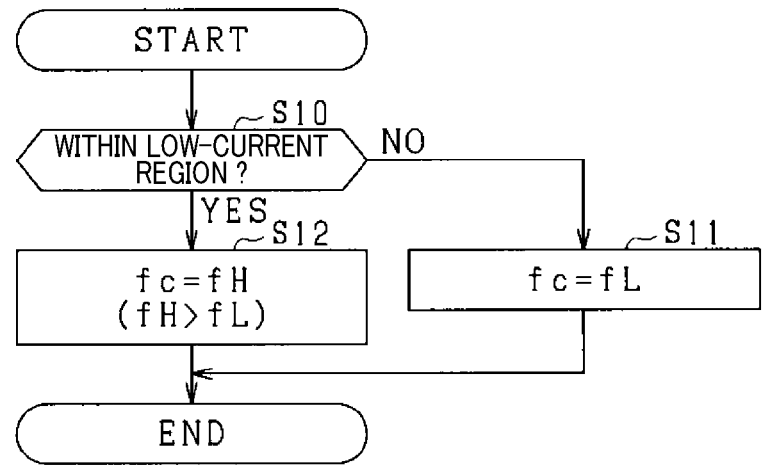
FIG. 33 is a flow chart illustrating a process of varying a carrier frequency.

(1) In the process shown in FIG. 33, in the case of the carrier frequency fc having been set to the first frequency fL, when the determination in step S10 results in a "YES"

answer, the carrier frequency fc may be gradually increased from the first frequency fL to the second frequency fH.

In contrast, in the case of the carrier frequency fc having been set to the second frequency fH, when the determination in step S10 results in a "NO" answer, the carrier frequency fc may be gradually decreased from the second frequency fH to the first frequency fL.

(2) The operation signals for operating the switches may be generated by a SVM (Space Vector Modulation) control instead of the PWM control. In this case, it is also possible to apply the above-described process of varying the switching frequency.

(Ninth Modification)

Figure 34A:
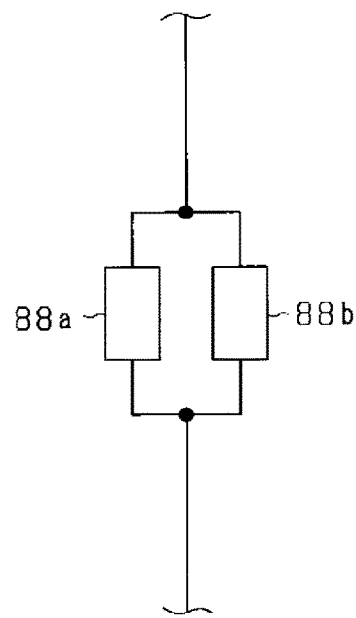
FIGS. 34(a)-34(c) are diagrams illustrating the manners of connecting electrical conductors forming an electrical conductor group in a ninth modification.
Figure 34B:
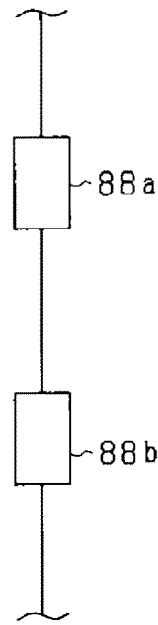

In the above-described embodiments, there are provided two pairs of electrical conductors per phase, which constitute the electrical conductor groups 81. Moreover, as shown in FIG. 34(a), first and second electrical conductors 88a and 88b, each of which consists of one pair of electric conductors, are connected in parallel with each other. As an alternative, as shown in FIG. 34(b), the first and second electrical conductors 88a and 88b may be connected in series with each other.

Figure 35:
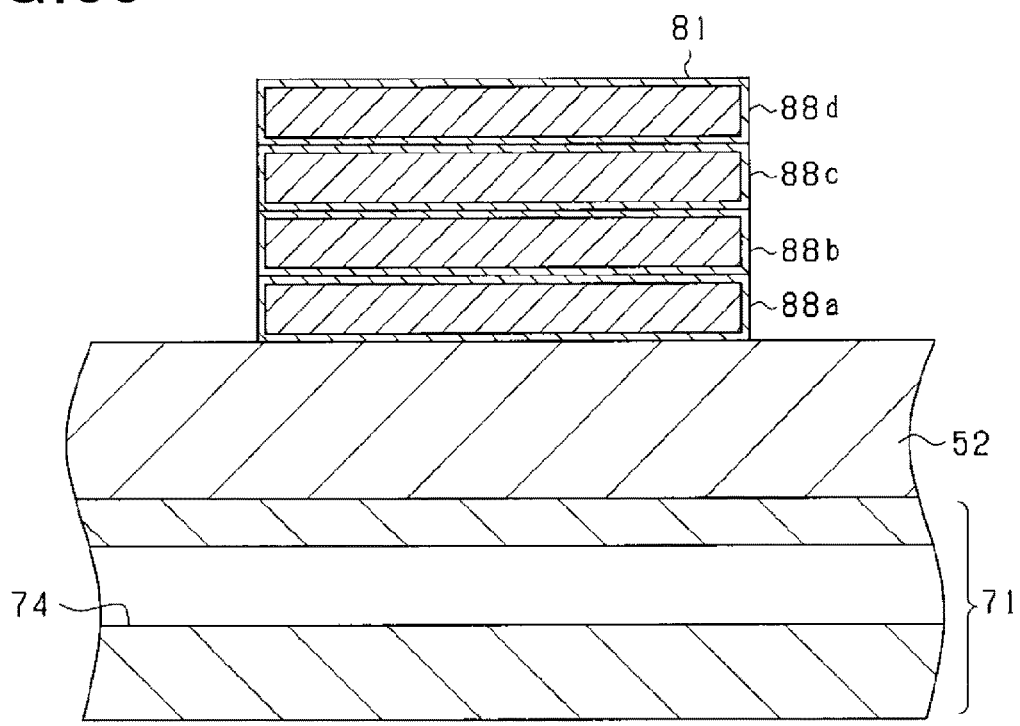
FIG. 35 is a diagram illustrating a configuration of radially stacking four pairs of electrical conductors in the ninth modification.

Moreover, three or more pairs of multi-layer electrical conductors may be radially stacked. For example, FIG. 35 illustrates a configuration where first, second, third and fourth electrical conductors 88a, 88b, 88c and 88d, each of which consists of one pair of electric conductors, are radially stacked. More specifically, the first, second, third and fourth electrical conductors 88a, 88b, 88c and 88d are arranged in this order from the stator core 52 side so as to be in radial alignment with each other.

Figure 34C:
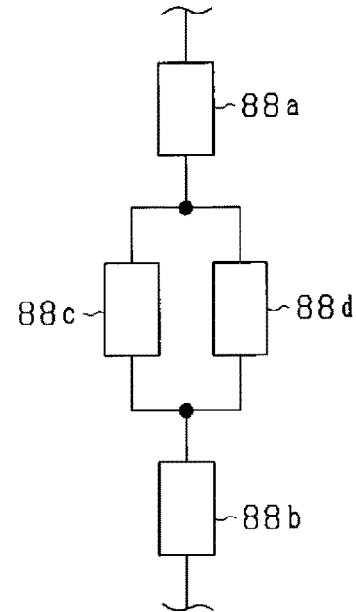

Moreover, as shown in FIG. 34(c), the third and fourth electrical conductors 88c and 88d may be connected in parallel with each other to form a parallel-connected unit; further, the first and second electrical conductors 88a and 88b may be respectively connected to opposite ends of the parallel-connected unit. With the parallel connection, it is possible to lower the electric current density of the parallel-connected electrical conductors, thereby reducing heat generated in these electrical conductors during energization thereof. Furthermore, in the configuration where the hollow cylindrical stator coil is assembled to the housing (i.e., the unit base 61) which has the cooling water passage 74 formed therein, the first and second electrical conductors 88a and 88b, which are not connected in parallel, are located closer than the parallel-connected third and fourth electrical conductors 88c and 88d to the stator core 52 that abuts the unit base 61. Consequently, it becomes possible to equalize the cooling performances of the electrical conductors 88a-88d in the multi-layer conductor structure.

In addition, the radial thickness of the electrical conductor groups 81, which are constituted of the electrical conductors 88a-88d, may be set to be smaller than the circumferential width per phase in each magnetic pole.

(Tenth Modification)

Figure 36:
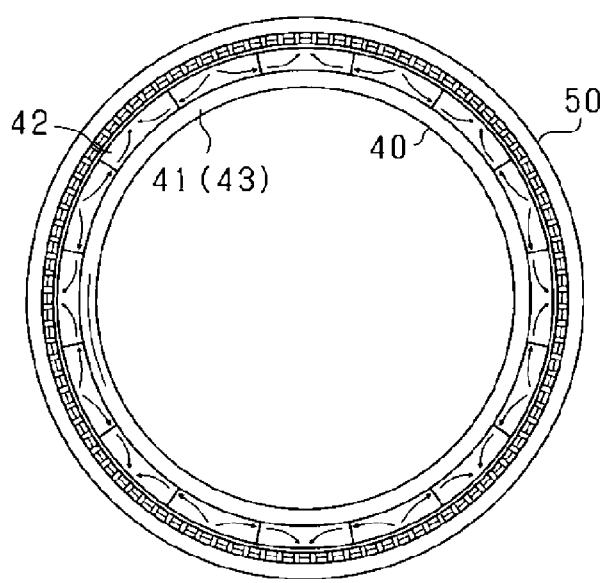
FIG. 36 is a transverse cross-sectional view of both a rotor and a stator of an inner rotor type rotating electric machine in a tenth modification.
Figure 37:
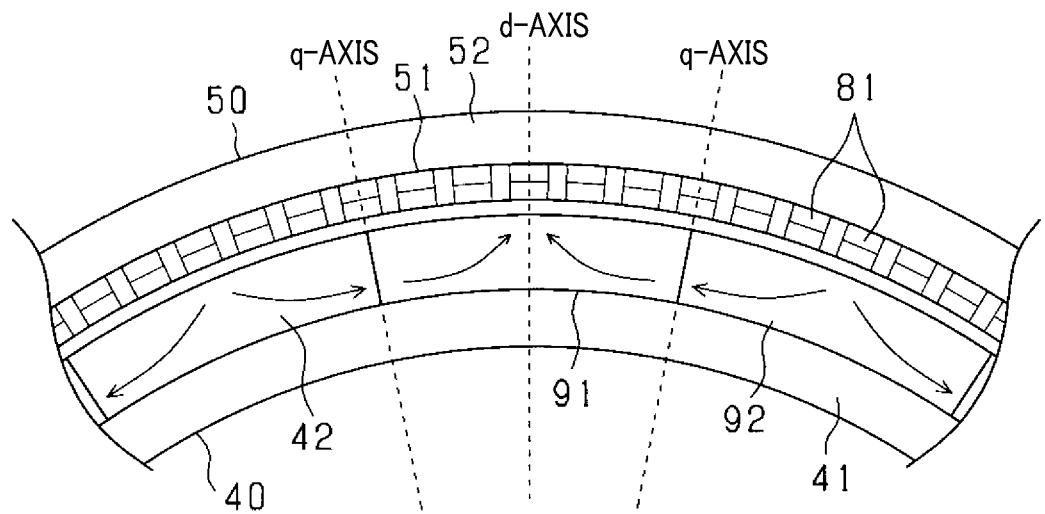
FIG. 37 is an enlarged view of part of FIG. 36.

The rotating electric machine 10 may alternatively be configured to have an inner rotor structure (i.e., inner rotating structure). In this case, in the housing 30, the rotor 40 is arranged radially inside the stator 50. Moreover, in this case, the inverter unit 60 may be provided at either or both of axial ends of the rotor 40 and the stator 50. FIG. 36 is a transverse cross-sectional view of both the rotor 40 and the stator 50. FIG. 37 is an enlarged view of part of FIG. 36.

The configuration of the inner rotor type rotating electric machine 10 shown in FIGS. 36 and 37 is identical to the configuration of the outer rotor type rotating electric machine 10 shown in FIGS. 8 and 9 except for the radial positional relationship between the rotor 40 and the stator 50. Specifically, in the inner rotor type rotating electric machine 10, the stator 50 also includes a stator coil 51 having a flat conductor structure, and a tooth-less stator core 52. The stator coil 51 is assembled to the radially inner periphery of the stator core 52. Moreover, the stator 50 may have any of the following configurations (A)-(C) as in the case of the outer rotor structure.

(A) In the stator 50, inter-conductor members are provided between the electrical conductor sections in the circumferential direction. The inter-conductor members are formed of such a magnetic material as to satisfy the following relationship: Wt×Bs≤Wm×Br, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 50, inter-conductor members are provided between the electrical conductor sections in the circumferential direction. The inter-conductor members are formed of a nonmagnetic material.

(C) In the stator 50, no inter-conductor members are provided between the electrical conductor sections in the circumferential direction.

Moreover, the configuration of the magnets 91 and 92 of the magnet unit 42 in the inner rotor type rotating electric machine is similar to that in the outer rotor type rotating electric machine. That is, the magnet unit 42 is configured with the magnets 91 and 92 each of which is oriented such that the direction of the easy axis of magnetization is more parallel to the d-axis on the d-axis side than on the q-axis side; the d-axis represents the centers of the magnetic poles while the q-axis represents the boundaries between the magnetic poles. The details of the magnetization directions in the magnets 91 and 92 are the same as described previously. In addition, the magnet unit 42 may alternatively be configured with an annular magnet 95 (see FIG. 31).

Figure 38:
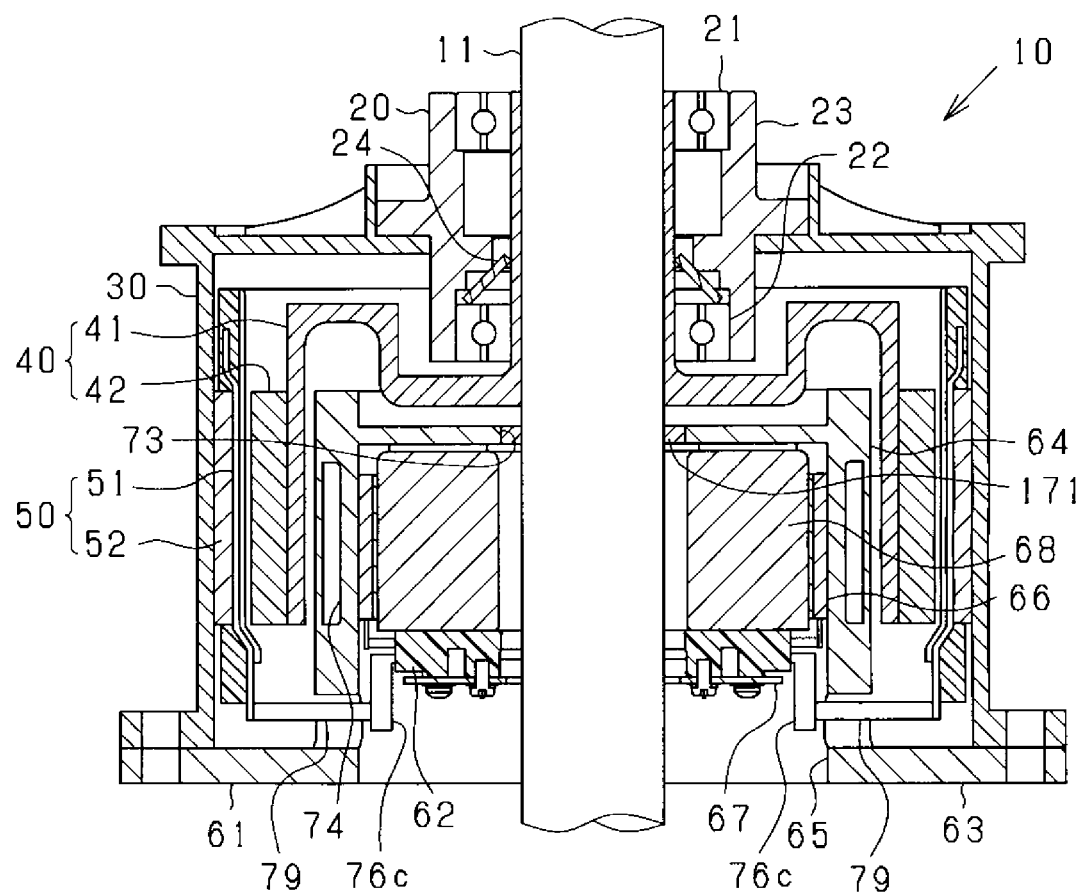
FIG. 38 is a longitudinal cross-sectional view of the inner rotor type rotating electric machine in the tenth modification.

FIG. 38 is a longitudinal cross-sectional view of the inner rotor type rotating electric machine 10, which corresponds to FIG. 2 described above. Hereinafter, the differences of the configuration shown in FIG. 38 from the configuration shown in FIG. 2 will be briefly described. In the inner rotor type rotating electric machine 10 shown in FIG. 38, the annular stator 50 is fixed to the inner periphery of the housing 30. The rotor 40 is rotatably provided inside the stator 50 with a predetermined air gap formed therebetween. The rotor 40 is supported in a cantilever fashion via the bearings 21 and 22 that are arranged on one axial side of the axially center position of the rotor 40 as in the configuration shown in FIG. 2. The inverter unit 60 is provided inside the magnet holder 41 of the rotor 40.

Figure 39:
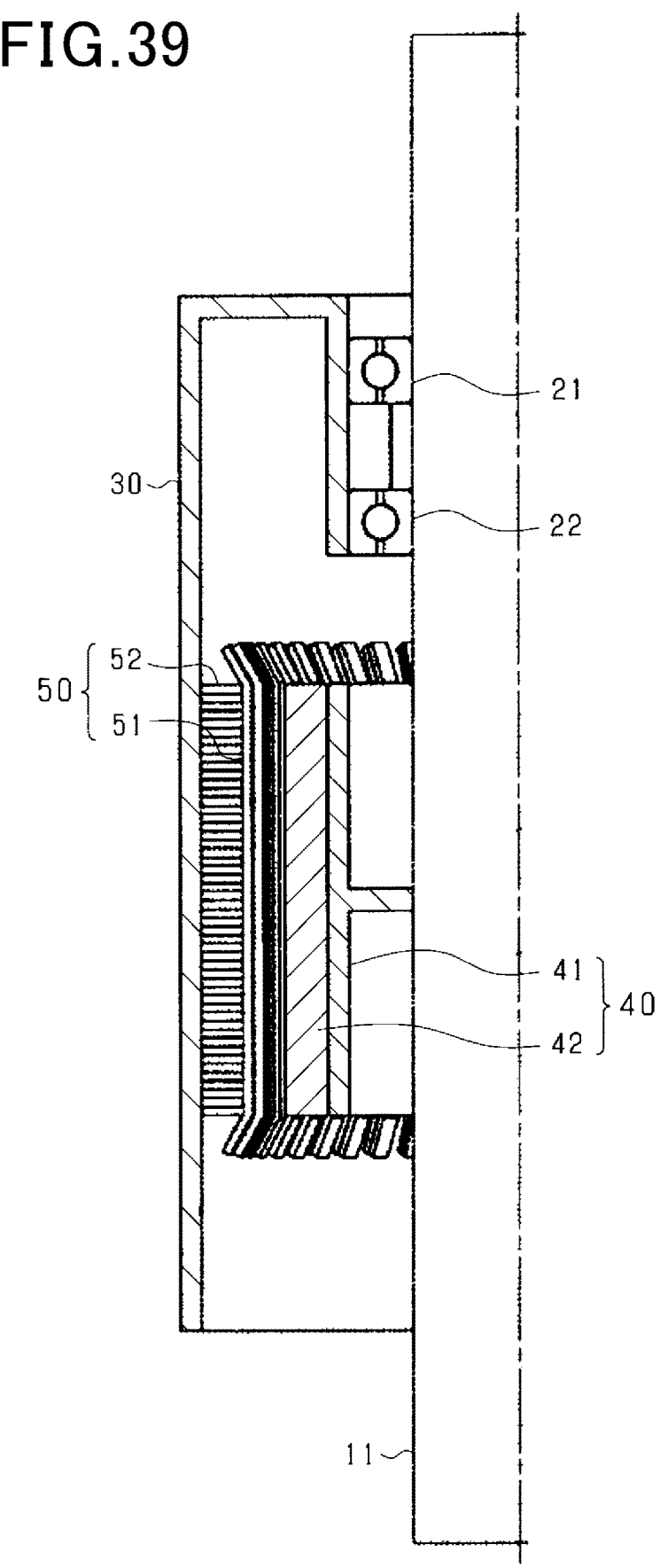
FIG. 39 is a longitudinal cross-sectional view illustrating the overall configuration of another inner rotor type rotating electric machine in the tenth modification.

FIG. 39 shows an alternative configuration of the inner rotor type rotating electric machine 10. In this configuration, in the housing 30, the rotating shaft 11 is rotatably supported directly by the bearings 21 and 22. The rotor 40 is fixed on the rotating shaft 11. The bearings 21 and 22 are arranged on one axial side of the axially center position of the rotor 40 as in the configuration shown in FIG. 2. The rotor 40 includes the magnet holder 41 and the magnet unit 42.

The rotating electric machine 10 shown in FIG. 39 differs from the rotating electric machine 10 shown in FIG. 38 in that no inverter unit 60 is provided radially inside the rotor 40. The magnet holder 41 is located radially inside the magnet unit 42 and connected to the rotating shaft 11. The stator 50 includes the stator coil 51 and the stator core 52. The stator 50 is mounted to the housing 30.

(Eleventh Modification)

Figure 40:
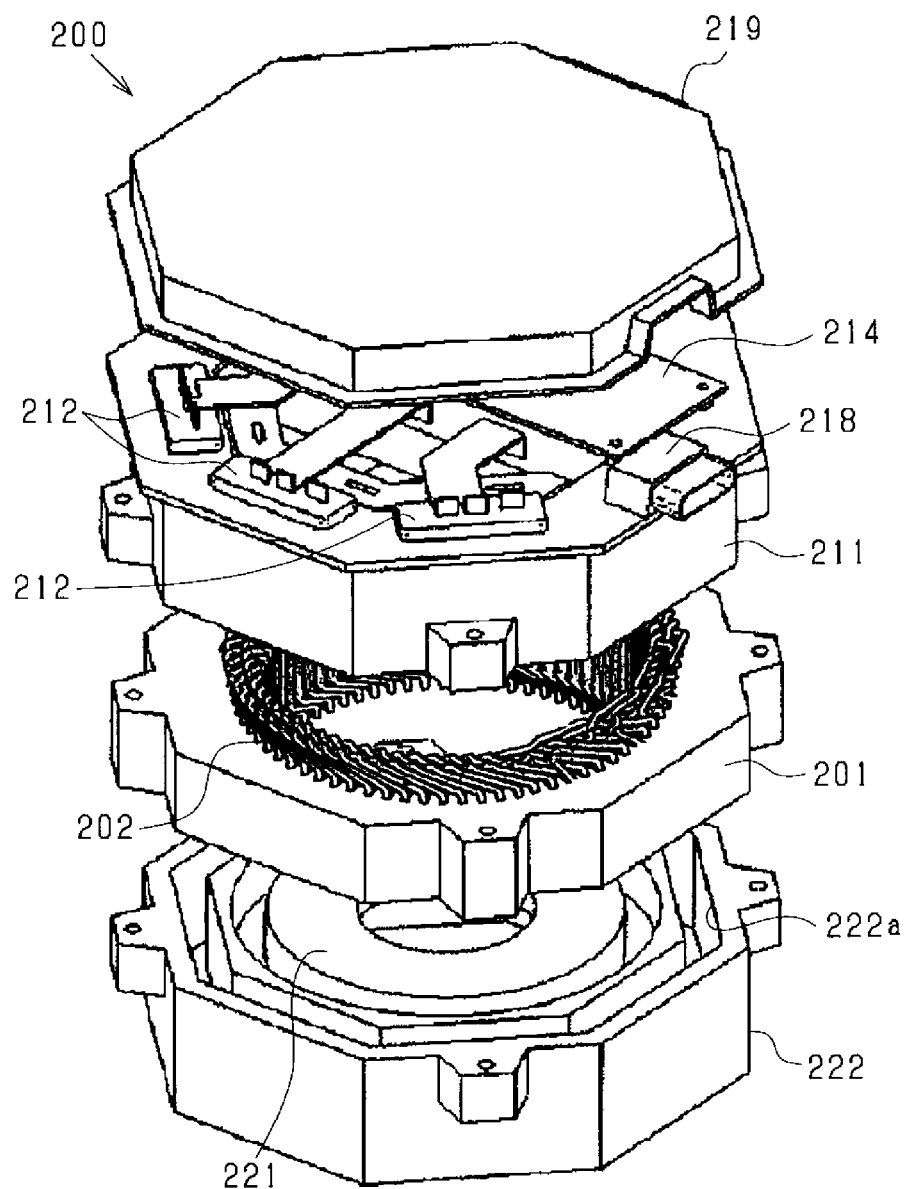
FIG. 40 is a diagram illustrating the configuration of an inner rotor type rotating electric machine in an eleventh modification.
Figure 41:
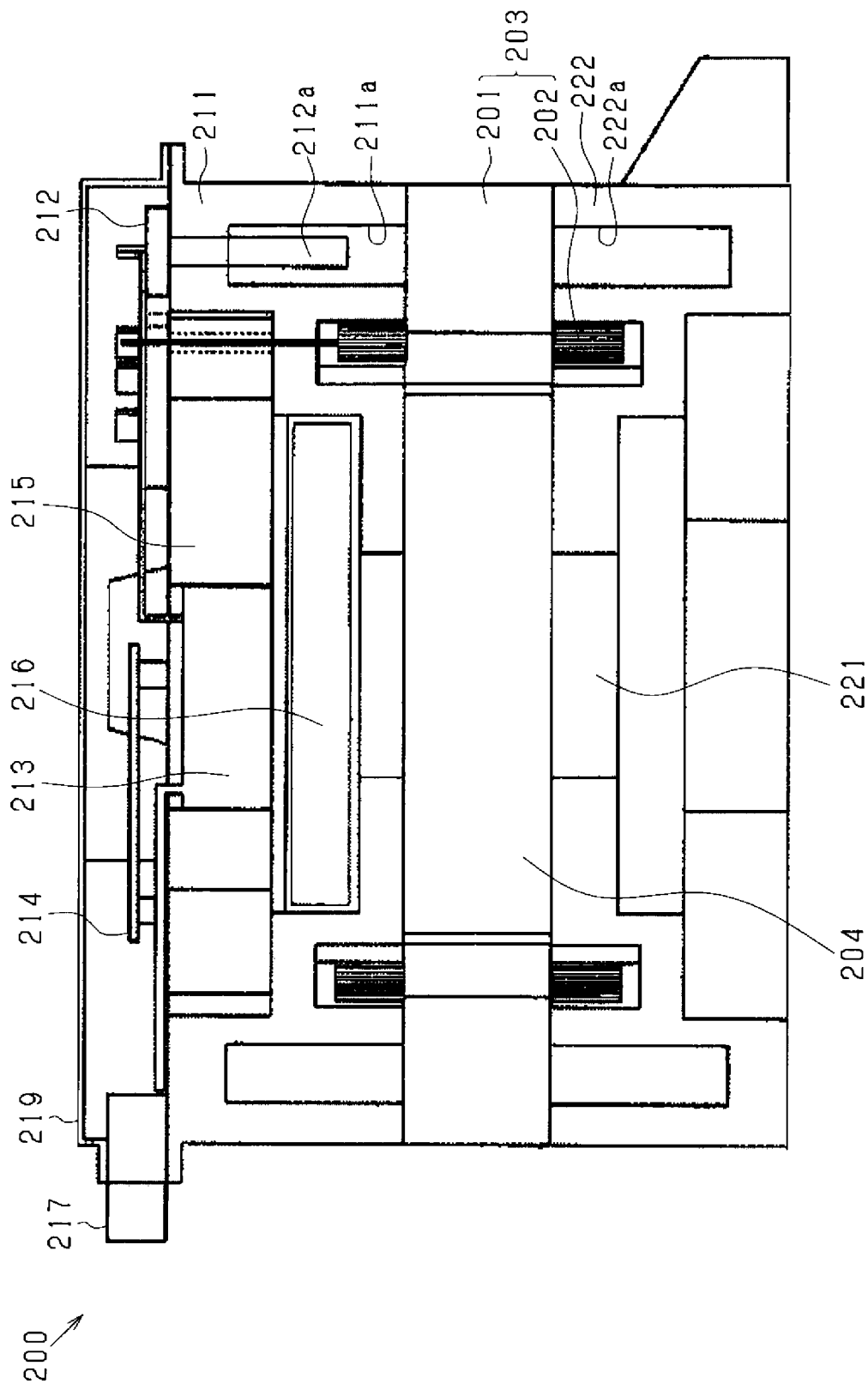
FIG. 41 is a diagram illustrating the configuration of the inner rotor type rotating electric machine in the eleventh modification.

Another alternative configuration of an inner rotor type rotating electric machine will be described. FIG. 40 is an exploded perspective view of an inner rotor type rotating electric machine 200. FIG. 41 is a side cross-sectional view of the inner rotor type rotating electric machine 200. Hereinafter, the vertical direction denotes the vertical direction in FIGS. 40 and 41.

As shown in FIGS. 40 and 41, the rotating electric machine 200 includes a stator 203, which includes an annular stator core 201 and a multi-phase stator coil 202, and a rotor 204 that is rotatably disposed radially inside the stator core 201. The stator 203 functions as an armature while the rotor 204 functions as a field system. The stator core 201 is formed by laminating a plurality of silicon steel sheets. The stator coil 202 is mounted to the stator core 201. The rotor 204 includes, though not shown in the figures, a rotor core and a magnet unit constituted of a plurality of permanent magnets. In the rotor core, there are formed a plurality of magnet insertion holes at equal intervals in the circumferential direction. In each of the magnet insertion holes, there is inserted one of the permanent magnets. The permanent magnets are magnetized so that the magnetization directions of adjacent magnetic poles alternately change. In addition, the arrangement of the permanent magnets of the magnet unit may be the same as or similar to the Halbach array shown in FIG. 23. Alternatively, the permanent magnets of the magnet unit may have polar anisotropic characteristics as shown in FIG. 9 or FIG. 31; the polar anisotropic characteristics are such that the orientation direction (i.e., the magnetization direction) extends in an arc shape between the d-axis at the center of each of the magnetic poles and the q-axis at the boundary between each adjacent pair of the magnetic poles.

The stator 203 may have any of the following configurations (A)-(C).

(A) In the stator 203, inter-conductor members are provided between the electrical conductor sections in the circumferential direction. The inter-conductor members are formed of such a magnetic material as to satisfy the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 203, inter-conductor members are provided between the electrical conductor sections in the circumferential direction. The inter-conductor members are formed of a nonmagnetic material.

(C) In the stator 203, no inter-conductor members are provided between the electrical conductor sections in the circumferential direction.

In the rotor 204, the magnet unit is configured with the permanent magnets where the easy axis of magnetization is oriented such that the direction of the easy axis of magnetization is more parallel to the d-axis on the d-axis side than on the q-axis side.

At one axial end of the rotating electric machine 200, there is arranged an annular inverter case 211 so that a lower end surface of the inverter case 211 abuts an upper end surface of the stator core 201. In the inverter case 211, there are provided: a plurality of power modules 212 forming an inverter circuit; a smoothing capacitor 213 for suppressing voltage/current ripple caused by switching operation of semiconductor switching elements; a control substrate 214 including a controller; current sensors 215 for detecting phase currents; and a resolver stator 216 that is a stator part of a resolver for detecting the rotational speed of the rotor 204. The power modules 212 include the respective semiconductor switching elements, which are implemented by, for example, IGBTs, and diodes.

On a peripheral portion of the inverter case 211, there are provided a power connector 217 connected to a DC circuit of a battery mounted in a vehicle, and a signal connector 218 used for exchange of various signals between the rotating electric machine 200 and a vehicle-side controller. The inverter case 211 is covered by a top cover 219. DC power from the in-vehicle battery is inputted via the power connector 217, converted into AC power by the switching of the power modules 212, and supplied to each phase winding of the stator coil 202.

On an opposite axial side of the stator core 201 to the inverter case 211, there are provided: a bearing unit 221 for rotatably supporting a rotating shaft of the rotor 204; and an annular rear case 222 that receives the bearing unit 221 therein. The bearing unit 221, which includes a pair of bearings, is arranged on one axial side of an axially center position of the rotor 204. It should be noted the bearing unit 221 may alternatively include bearings respectively arranged on opposite axial sides of the stator core 201 to rotatably support the rotating shaft. The rotating electric machine 200 is configured to be mounted to a mounting part, such as a gear case or a transmission case, of the vehicle by bolt-fastening the rear case 222 to the mounting part.

In the inverter case 211, there is formed a coolant passage 211a through which a coolant flows. The coolant passage 211a is constituted of an annular recess that is formed in the lower end surface of the inverter case 211 and closed by the upper end surface of the stator core 201. Moreover, the coolant passage 211a is formed so as to surround a coil end of the stator coil 202. In the coolant passage 211a, there are inserted module cases 212a of the power modules 212. In the rear case 222, there is formed a coolant passage 222a so as to surround another coil end of the stator coil 202. The coolant passage 222a is constituted of an annular recess that is formed in the upper end surface of the rear case 222 and closed by the lower end surface of the stator core 201.

(Twelfth Modification)

Figure 42:
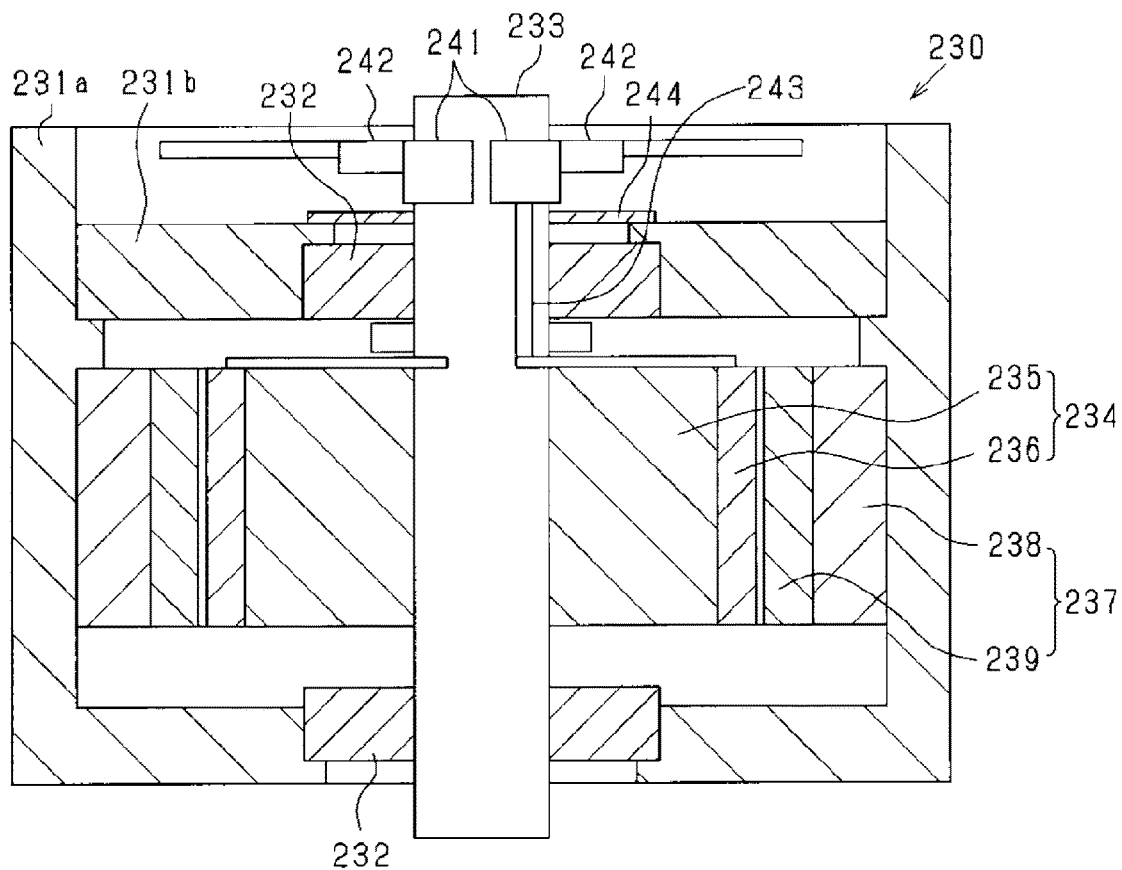
FIG. 42 is a diagram illustrating the configuration of a rotating-armature type rotating electric machine in a twelfth modification.

In the above-described embodiments and modifications, the rotating-field type rotating electric machines are illustrated. In contrast, this modification illustrates a rotating-armature type rotating electric machine 230. FIG. 42 shows the configuration of the rotating-armature type rotating electric machine 230.

In the rotating electric machine 230 shown in FIG. 42, each of housings 231a and 231b has one bearing 232 fixed thereto. A rotating shaft 233 is rotatably supported by the bearings 232. In addition, the bearings 232 may be implemented by, for example, oil-retaining bearings that are formed by impregnating oil into a porous metal. On the rotating shaft 233, there is fixed a rotor 234 that functions as an armature. The rotor 234 includes a rotor core 235 and a multi-phase rotor coil 236 fixed to an outer periphery of the rotor core 235. In the rotor 234, the rotor core 235 has a slot-less structure and the rotor coil 236 has a flat conductor structure. That is, the rotor coil 236 has a flat structure such that each region per phase is longer in a circumferential direction than in a radial direction.

On a radially outer side of the rotor 234, there is provided a stator 237 that functions as a field system. The stator 237 has a stator core 238 fixed to the housing 231a and a magnet unit 239 fixed to an inner periphery of the stator core 238.

The magnet unit 239 is configured to include a plurality of magnetic poles whose polarities alternate in the circumferential direction. Similar to the above-described magnet unit 42, the magnet unit 239 is also configured to have the easy axis of magnetization oriented such that the direction of the easy axis of magnetization is more parallel to the d-axis on the d-axis side than on the q-axis side. The magnet unit 239 includes sintered neodymium magnets whose intrinsic coercive force is higher than or equal to 400 [kA/m] and residual flux density is higher than or equal to 1.0 [T].

The rotating electric machine 230 according to the present modification is configured as a two-pole, three-coil, brushed and coreless motor. The rotor coil 236 is divided into three sub-coils, and the magnet unit 239 has two magnetic poles. In addition, brushed motors have, depending on the application, various ratios of the number of poles to the number of coils, such as 2:3, 4:10 and 4:21.

To the rotating shaft 233, there is also fixed a commutator 241. On the radially outer side of the commutator 241, there are arranged a plurality of brushes 242. The commutator 241 is electrically connected to the rotor coil 236 via electrical conductors 243 embedded in the rotating shaft 233. Consequently, DC current flows into and out of the rotor coil 236 via the commutator 241, the brushes 242 and the electrical conductors 243. The commutator 241 is circumferentially divided, according to the number of phases of the rotor coil 236, into a plurality of commutator segments. In addition, the brushes 242 may be electrically connected to a DC power supply, such as a storage battery, via electrical wiring or a terminal block.

On the rotating shaft 233, there is provided, as a sealing member, a resin washer 244 between the commutator 241 and the bearing 232. With the resin washer 244, oil seeping from the bearing 232, which is implemented by an oil-retaining bearing, is suppressed from flowing to the commutator 241 side.

(Thirteenth Modification)

In the rotating electric machines 10 according to the above-described embodiments and modifications, the electrical conductors 82 forming the stator coil 51 may be configured to have a plurality of insulating coats. For example, each of the electrical conductors 82 may be formed by bundling a plurality of wires each having an insulating coat into a wire bundle and then covering the wire bundle with an outer insulating coat. In this case, the insulating coats respectively covering the wires constitute inner insulating coats with respect to the outer insulating coat covering the entire wire bundle. Moreover, it is preferable to configure the outer insulating coat to have higher insulating capability than the inner insulating coats. Specifically, the outer insulating coat may have a larger thickness than the inner insulating coats. For example, the thickness of the outer insulating coat may be set to 100 μm while the thickness of each of the inner insulating coats is set to 40 μm. Moreover, the outer insulating coat may be formed of a material having lower permittivity than the inner insulating coats. That is, the insulating capability of the outer insulating coat may be set to be higher than the insulating capability of the inner insulating coats using at least one of the above methods. In addition, each of the wires may be formed of an aggregate of a plurality of electrically conductive bodies.

Setting the insulating capability of the outer insulating coat to be higher in each of the electrical conductors 82, the rotating electric machine 10 is made to be suitable for use in a high-voltage vehicular system. Moreover, it is possible to suitably drive the rotating electric machine 10 in a low atmospheric pressure high-altitude area.

(Fourteenth Modification)

Figure 43:
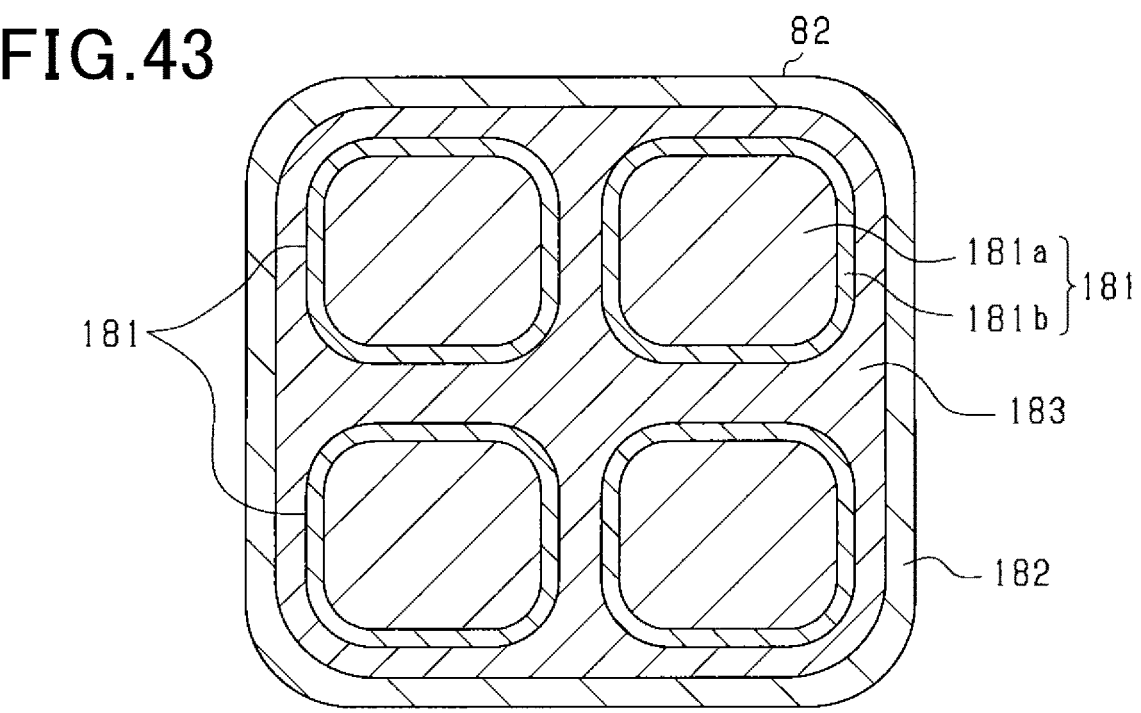
FIG. 43 is a cross-sectional view illustrating the configuration of electrical conductors in a fourteenth modification.

Electrical conductors 82, which have a plurality of insulating coats, may be configured so that an outer insulating coat and an inner insulating coat are different from each other in at least one of coefficient of linear expansion and adhesion strength. FIG. 43 shows the configuration of electrical conductors 82 according to the present modification.

As shown in FIG. 43, in this modification, each of the electrical conductors 82 includes a plurality (e.g., four) of wires 181, a resin-made outer coat 182 (i.e., outer insulating coat) covering all of the plurality of wires 181, and an intermediate layer 183 (i.e., intermediate insulating coat) filled around each of the wires 181 within the outer coat 182. Each of the wires 181 includes a wire body 181a formed of copper and a wire coat 181b (i.e., inner insulating coat) formed of an insulating material and covering the wire body 181a. In the stator coil, the inter-phase insulation is made by the outer coats 182 of the electrical conductors 82. In addition, each of the wires 181 may be formed of an aggregate of a plurality of electrically conductive bodies.

In each of the electrical conductors 82, the intermediate layer 183 has a coefficient of linear expansion higher than a coefficient of linear expansion of the wire coats 181b of the wires 181 and lower than a coefficient of linear expansion of the outer coat 182. That is, in each of the electrical conductors 82, the coefficients of linear expansion of the plurality of insulating coats increase from the inner side to the outer side. In general, the coefficient of linear expansion of the outer coat 182 is higher than the coefficient of linear expansion of the wire coats 181b. Interposing the intermediate layer 183 between the wire coats 181b and the outer coat 182 and setting the coefficient of linear expansion of the intermediate layer 183 as above, the intermediate layer 183 can function as a cushion member to prevent the wire coats 181b and the outer coat 182 from being cracked at the same time.

In each of the electrical conductors 82, the wire coat 181b is adhered to the wire body 181a in each of the wires 181 and the intermediate layer 183 is adhered to both the wire coats 181b of the wires 181 and the outer coat 182. Moreover, in each of the electrical conductors 82, the adhesion strengths decrease from the inner side to the outer side. Specifically, the adhesion strength between the wire body 181a and the wire coat 181b in each of the wires 181 is higher than both the adhesion strength between the wire coats 181b of the wires 181 and the intermediate layer 183 and the adhesion strength between the intermediate layer 83 and the outer coat 182. Further, the adhesion strength between the wire coats 181b of the wires 181 and the intermediate layer 183 is higher than or equal to the adhesion strength between the intermediate layer 183 and the outer coat 182. In addition, the adhesion strength between two insulating coats can be determined based on the tensile strength required to tear them off from each other. Setting the adhesion strengths in each of the electrical conductors 82 as above, when a temperature difference between the inner and outer sides occurs due to heating or cooling, it is possible to prevent cracking from occurring on both the inner and outer sides at the same time.

In the rotating electric machine, heat generation and temperature change occur mainly as copper loss at the wire bodies 181a of the wires 181 in each of the electrical conductors 82 and iron loss in the core. That is, these two types of losses occur at the wire bodies 181a of the wires 181 in each of the electrical conductors 82 or outside the electrical conductors 82; there is no heat source in the intermediate layers 183 of the electrical conductors 82. In this case, in each of the electrical conductors 82, with the adhesion strengths set as described above, the intermediate layer 83 can function as a cushion member to prevent the wire coats 181b of the wires 181 and the outer coat 182 from being cracked at the same time. Therefore, the rotating electric machine can be suitably used in an environment where it is required to withstand great pressure and temperature changes, such as in a vehicle.

Each of the wires 181 may be enamel-coated. In this case, each of the wires 181 has the wire coat 181b formed of a resin such as a PA, PI or PAI resin. The outer coat 182, which is provided outside the wires 181, may also be formed of a resin such as a PA, PI or PAI resin. In this case, it is preferable for the outer coat 182 to have a larger thickness than the wire coats 181b of the wires 181. Consequently, it is possible to prevent the insulating coats from being damaged due to the difference in coefficients of linear expansion. On the other hand, in terms of improving the conductor density of the rotating electric machine, it is preferable to form the outer coat 182 with a resin having lower permittivity than the PA, PI or PAI resin, such as a PPS, PEEK, fluorine, polycarbonate, silicone, epoxy, polyethylene naphthalate or LCP resin. In this case, with the smaller or same thickness of the outer coat 182 in comparison with the case of using the PA, PI or PAI resin, it is possible to improve the insulating capability of the outer coat 182, thereby improving the space factors of the electrical conductor sections. In general, the aforementioned resins have higher insulating capability than enamel-formed insulating coats. As a matter of course, the permittivity may be degraded depending on the forming state and impurities. Among the aforementioned resins, a PPS or PEEK resin, whose coefficient of linear expansion is higher than those of enamel-formed insulating coats but lower than those of other resins, is particularly suitable for forming the second-layer outer coat.

Moreover, it is preferable that the adhesion strengths between the two types of insulating coats (i.e., the intermediate insulating coat and the outer insulating coat) provided outside the wires 181 and the enamel-formed insulating coats of the wires 181 are lower than the adhesion strength between the copper wire and the enamel-formed insulating coat in each of the wires 181. Consequently, it is possible to prevent the enamel-formed insulating coats of the wires 181 and the two types of insulating coats provided outside the wires 181 from being damaged at the same time.

In the case of a stator having a water-cooled, liquid-cooled or air-cooled structure, it is basically considered that thermal stress and/or impact stress act first on the outer coat 182. However, even when the wire coats 181b of the wires 181 are formed of a different resin from the two types of insulating coats provided outside the wires 181, it is possible to have portions of the wires 181 not adhered to the two types of insulating coats, thereby reducing the aforementioned thermal stress and/or impact stress. Specifically, the outer coat 182 may be formed, using a fluorine, polycarbonate, silicone, epoxy, polyethylene naphthalate or LCP resin, outside the wires 181 with a void space provided between the wires 181 and the outer coat 182. In this case, it is preferable to bond the outer coat 182 and the wire coats 181b of the wires 181 to each other using an adhesive which has low permittivity and low coefficient of linear expansion, such as an epoxy adhesive. In this case, it is possible to enhance the mechanical strength, prevent the inner and outer insulating coats from being damaged due to friction caused by vibration of the electrical conductor sections and prevent the outer insulating coat from being damaged due to the difference in coefficient of linear expansion between the inner and outer insulating coats.

In addition, in the step of fixing the electrical conductors 82 which is generally performed as a final insulation step of the manufacturing process of the stator, it is preferable to use a resin having excellent formability and similar properties (e.g., permittivity, coefficient of linear expansion, etc.) to the enamel-formed insulating coats, such as an epoxy, PPS, PEEK or LCP resin.

In general, resin potting is performed using a urethane or silicone resin. However, these resins have a coefficient of linear expansion considerably different from those of the other resins used; therefore thermal stress may be induced which may shear these resins. Therefore, these resins are not suitable for applications of 60V or higher on which strict insulation regulations are internationally imposed. In this regard, performing injection molding with an epoxy, PPS, PEEK or LCP resin as the final insulation step, it is possible to satisfy the above requirements.

(Fifteenth Modification)

The shapes of the magnets 91 and 92 and the protrusions 1002 in the above-described third embodiment may be modified. For example, the circumferential end surfaces 91a and 92a of the magnets 91 and 92 may be formed to be oblique to the radial direction. More preferably, the circumferential end surfaces 91a and 92a of the magnets 91 and 92 may be formed to be oblique to the radial direction such that the circumferential end surfaces 91a and 92a are perpendicular (or near perpendicular) to the respective magnet magnetic paths (or easy axes of magnetization). This modification will be described in detail with reference to FIG. 44.

Figure 44:
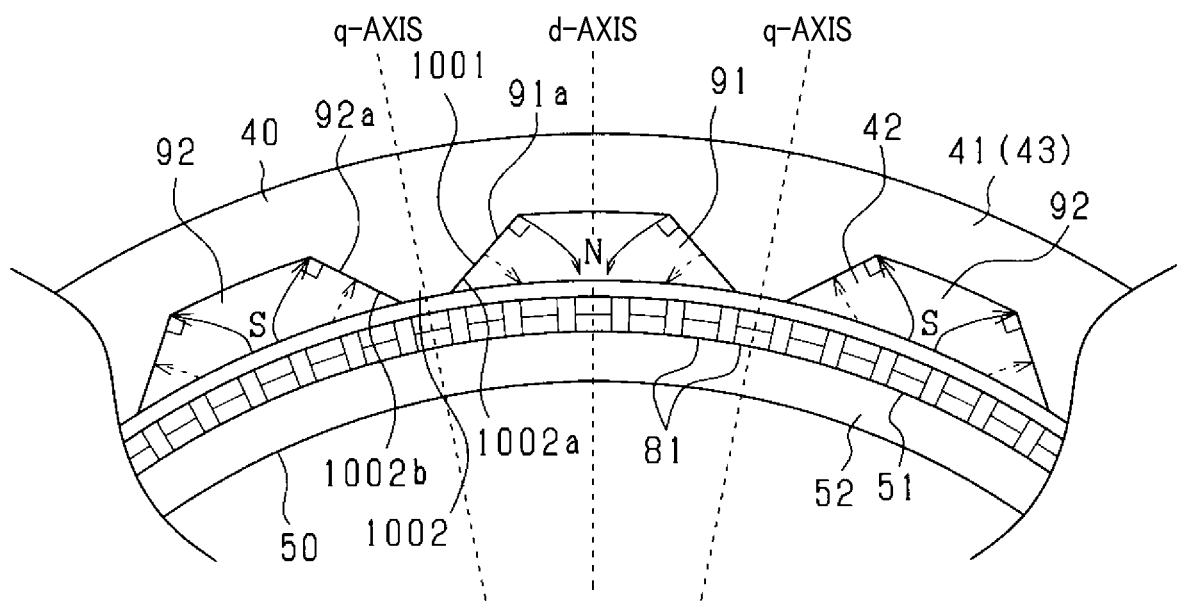
FIG. 44 is a transverse cross-sectional view of a rotor and a stator in a fifteenth modification.

As shown in FIG. 44, in this modification, at the circumferential ends of the magnets 91 and 92, the magnet magnetic paths (or easy axes of magnetization) make an angle of 45° with the radial direction. Therefore, the circumferential end surfaces 91a and 92a of the magnets 91 and 92 are formed to be oblique at an angle of 45° to the radial direction. Moreover, the circumferential end surfaces 1002a and 1002b of the protrusions 1002 are formed to be oblique to the radial direction at an angle corresponding to the oblique angle of the circumferential end surfaces 91a and 92a (e.g., at an angle of 45° in FIG. 44).

(Sixteenth Modification)

The shapes of the magnets 91 and 92 and the protrusions 1002 in the above-described third embodiment may be modified. For example, in the stator-side peripheral surfaces of the magnets 91 and 92, there may be formed recesses that are radially recessed. More preferably, in the stator-side peripheral surfaces, recesses may be formed to be closer to the q-axis than to the d-axis. This modification will be described in detail with reference to FIG. 45.

Figure 45:
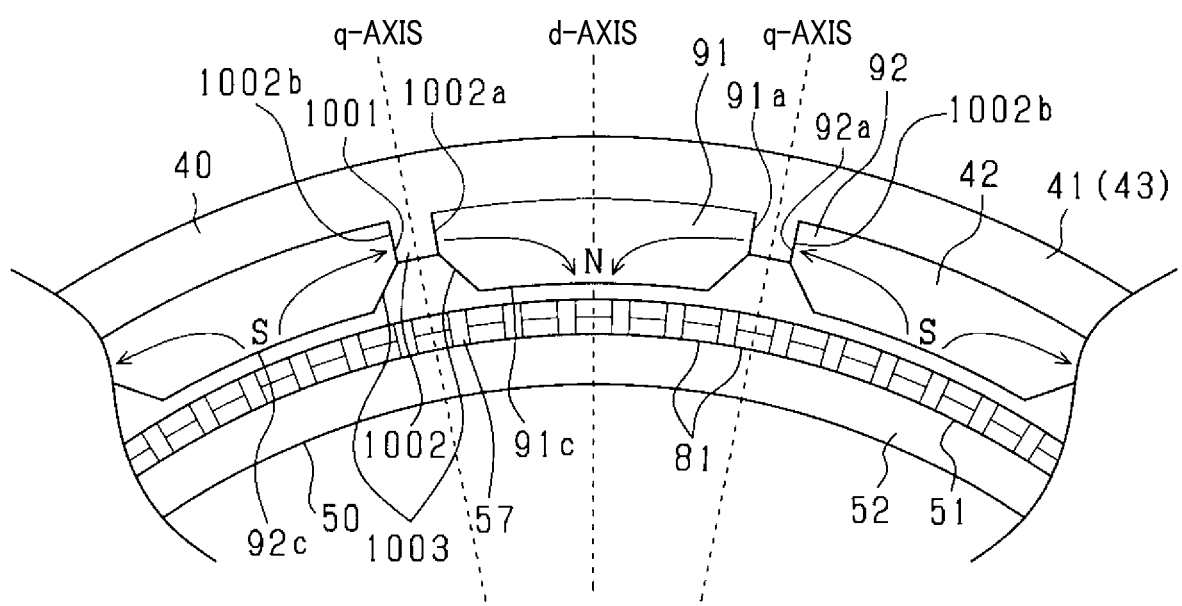
FIG. 45 is a transverse cross-sectional view of a rotor and a stator in a sixteenth modification.

As shown in FIG. 45, in this modification, recesses 1003 each being radially recessed are formed in the stator-side peripheral surfaces 91c and 92c at the q-axis-side ends of the magnets 91 and 92. At the q-axis-side ends, it is easy for the magnet magnetic paths of the magnets 91 and 92 to become shorter on the stator side than on the non-stator side. Therefore, in the magnets 91 and 92 oriented as described above, at the q-axis-side ends, stator-side portions are portions which may be easily demagnetized. In view of the above, the recesses 1003 are formed in the stator-side peripheral surfaces 91c and 92c of the magnets 91 and 92 at the q-axis-side ends, thereby reducing those portions of the magnets 91 and 92 which may be easily demagnetized and thus making the magnets 91 and 92 resistant to demagnetization. Moreover, it becomes possible to reduce the volume of the magnets. Moreover, with the recesses 1003 formed as described, the radial air gap between the magnets 91 and 92 and the stator 50 becomes larger on the q-axis side than on the d-axis side. Consequently, it becomes possible to make the surface magnetic flux density distribution of the magnets 91 and 92 approximate to a sine waveform.

Furthermore, as shown in FIG. 45, in this modification, the recesses 1003 are formed by providing oblique surfaces that are oblique at a predetermined angle (e.g., 45°) to the radial direction, so as to chamfer stator-side corners of the magnets 91 and 92. With the recesses 1003 formed as described above, the radial air gap between the magnets 91 and 92 and the stator 50 gradually increases as the position approaches the q-axis. Consequently, it becomes possible to make the surface magnetic flux density distribution of the magnets 91 and 92 more closely to a sine waveform.

Moreover, it is preferable for the recesses 1003 to be formed to have oblique surfaces (or curved surfaces) extending along the respective magnet magnetic paths (or easy axes of magnetization). Here, the expression "oblique surfaces (or curved surfaces) extending along the respective magnet magnetic paths (or easy axes of magnetization) denotes surfaces parallel or near parallel to the respective magnet magnetic paths (or easy axes of magnetization).

Furthermore, it is preferable for the recesses 1003 to be formed so that the radial dimension of the recesses 1003 is equal to the radial dimension of the circumferential end surfaces 91a and 92a of the magnets 91 and 92, as shown in FIG. 45.

Figure 46A:
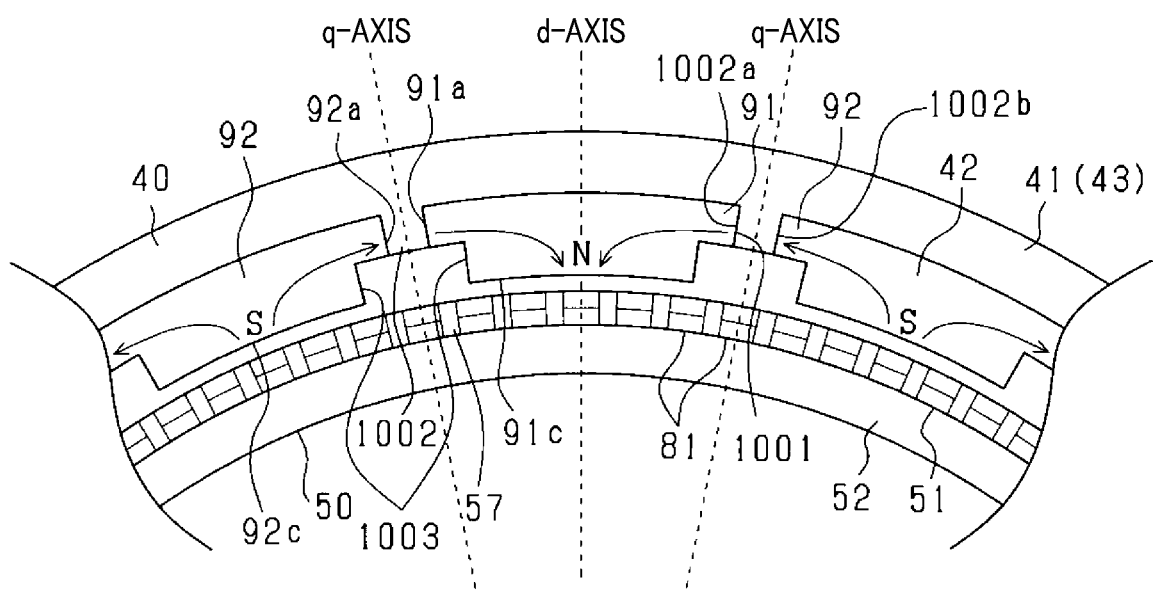
FIGS. 46(a) and 46(b) include transverse cross-sectional views of rotor-stator sets in other examples.
Figure 46B:
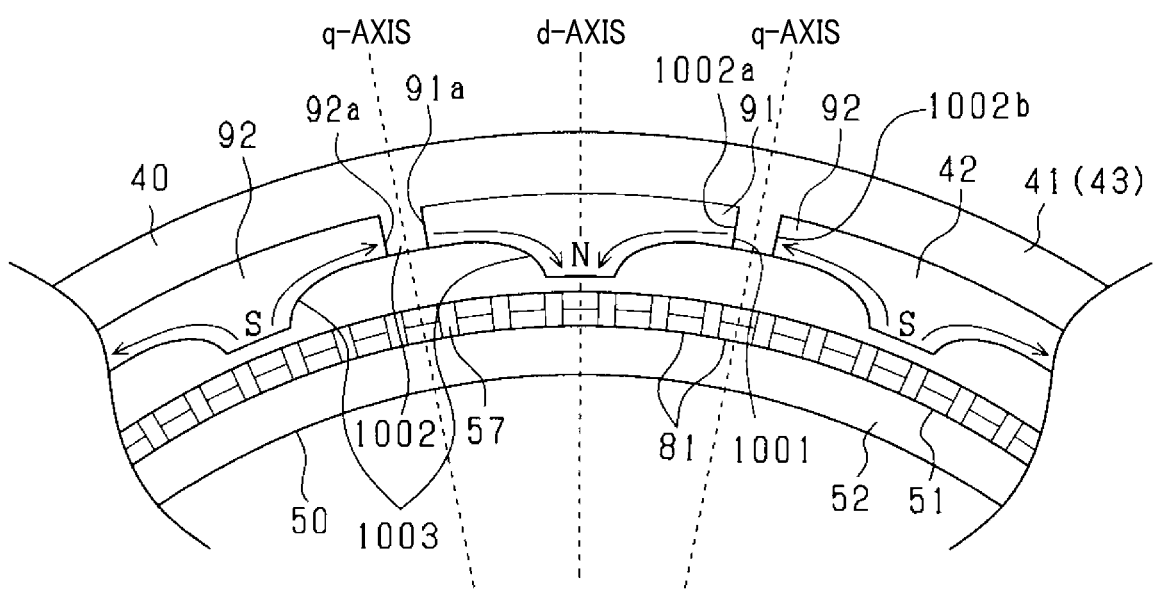

As an alternative, as shown in FIG. 46(a), the recesses 1003 may be formed by stepping stator-side portions of the magnets 91 and 92 at the q-axis-side ends. As another alternative, as shown in FIG. 46(b), the recesses 1003 may be formed with curved surfaces instead of the flat surfaces. In addition, in this case, it is preferable for the curved surfaces to extend along the respective magnet magnetic paths.

Figure 47:
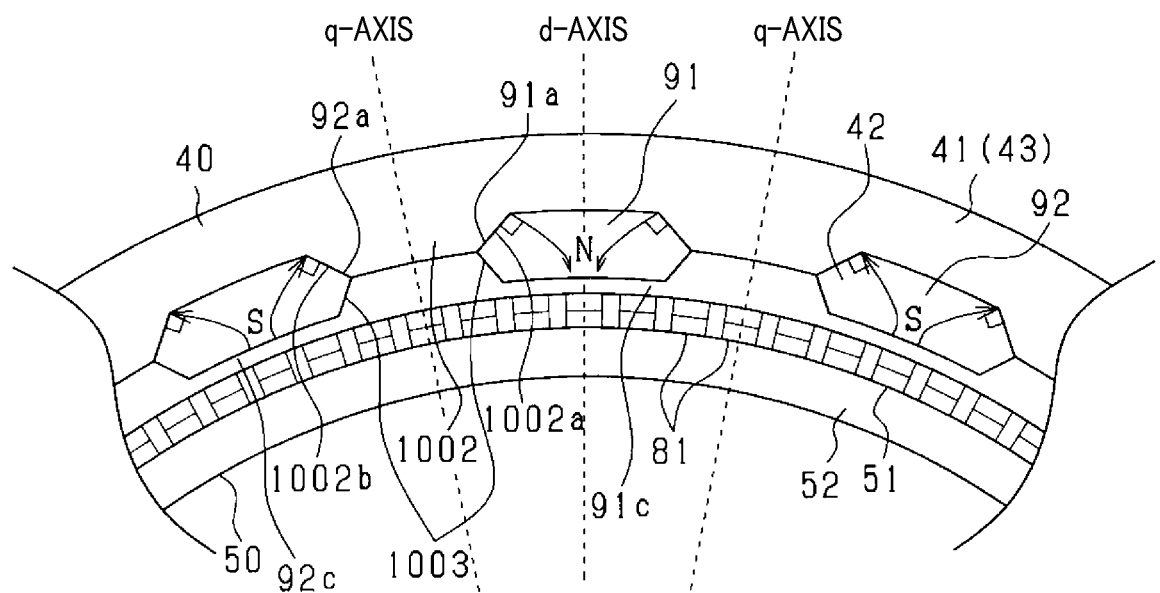
FIG. 47 is a transverse cross-sectional view of a rotor and a stator in another example.

Moreover, it is possible to combine the fifteenth modification and the sixteenth modification. For example, as shown in FIG. 47, it is possible to form the circumferential end surfaces 91a and 92a of the magnets 91 and 92 to be oblique to the radial direction while forming the recesses 1003 in the stator-side peripheral surfaces 91c and 92c of the same at the circumferential ends.

(Seventeenth Modification)

In the magnet unit 42 in the above-described third embodiment, auxiliary magnets may be provided between the circumferentially-adjacent magnets 91 and 92 and on the stator side of the protrusions 1002 in the radial direction.

The auxiliary magnets are magnets which have their respective easy axes of magnetization oriented to be more parallel to the circumferential direction than the easy axes of magnetization of the magnets 91 and 92 on the d-axis side are and in which magnet magnetic paths are formed along the easy axes of magnetization of the auxiliary magnets. This modification will be described in detail with reference to FIG. 48.

Figure 48:
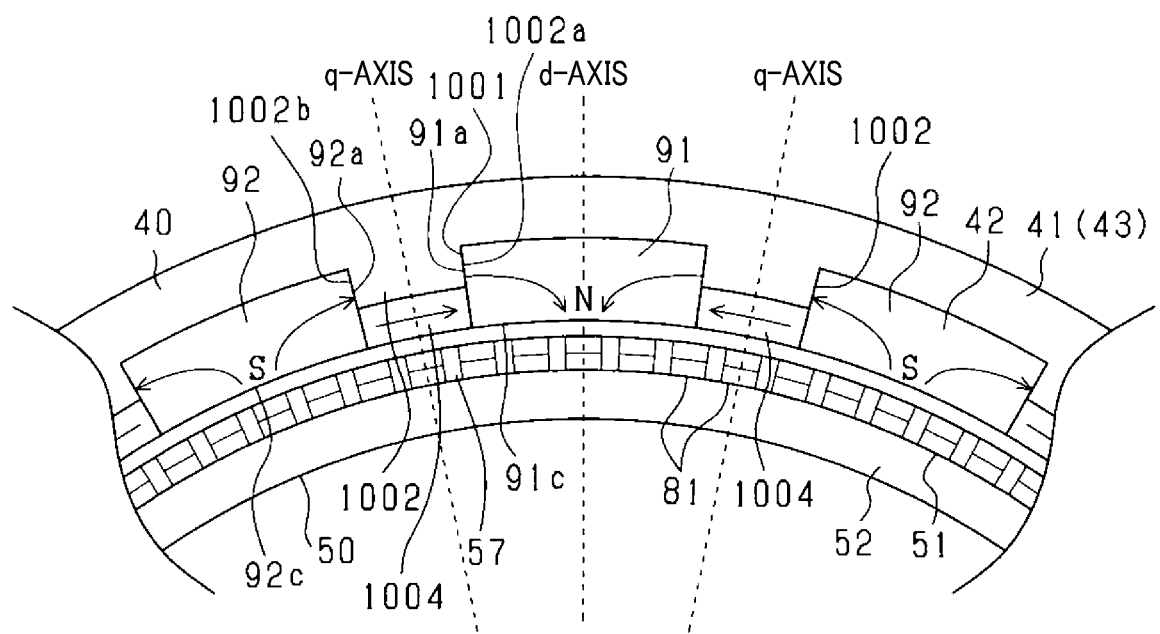
FIG. 48 is a transverse cross-sectional view of a rotor and a stator in a seventeenth modification.

As shown in FIG. 48, in this modification, the protrusions 1002 are formed to have a smaller radial dimension than the magnets 91 and 92. Moreover, auxiliary magnets 1004 are provided between the circumferentially-adjacent magnets 91 and 92 and on the stator side of the protrusions 1002 in the radial direction. The auxiliary magnets 1004 are magnets which have their respective easy axes of magnetization linearly oriented to be parallel to the circumferential direction at the q-axis and in which linear magnet magnetic paths are formed along the easy axes of magnetization. The circumferential width of each of the auxiliary magnets 1004 is set to be equal to the circumferential width of each of the gaps 1001 between the magnets 91 and 92. The circumferential ends of the auxiliary magnets 1004 are respectively in contact with the circumferential ends of the magnets 91 and 92. Moreover, the sum of the radial dimension of the auxiliary magnets 1004 and the radial dimension of the protrusions 1002 is equal to the radial dimension of the magnets 91 and 92. Therefore, the auxiliary magnets 1004 are prevented from protruding from the magnets 91 and 92 to the stator side. Furthermore, the auxiliary magnets 1004 are provided over the entire axial range of the magnets 91 and 92.

The magnetic flux density of the magnets 91 and 92 on the d-axis can be increased by magnetic flux of the auxiliary magnets 1004. Moreover, the magnet magnetic paths of the auxiliary magnets 1004 are linear magnet magnetic paths which become parallel to the circumferential direction at the q-axis. Therefore, even under the influence of magnetic field from the stator 50, it is difficult for the auxiliary magnets 1004 to become demagnetized. Accordingly, though arranged on the stator side of the protrusions 1002 at the q-axis, the auxiliary magnets 1004 are resistant to being demagnetized; thus the magnetic flux density on the d-axis can be enhanced by the auxiliary magnets 1004. Moreover, since the auxiliary magnets 1004 are arranged in the gaps 1001 between the magnets 91 and 92 to occupy the vacant spaces on the stator side of the protrusions 1002, they are prevented from protruding from the magnets 91 and 92 to the stator side.

Figure 49:
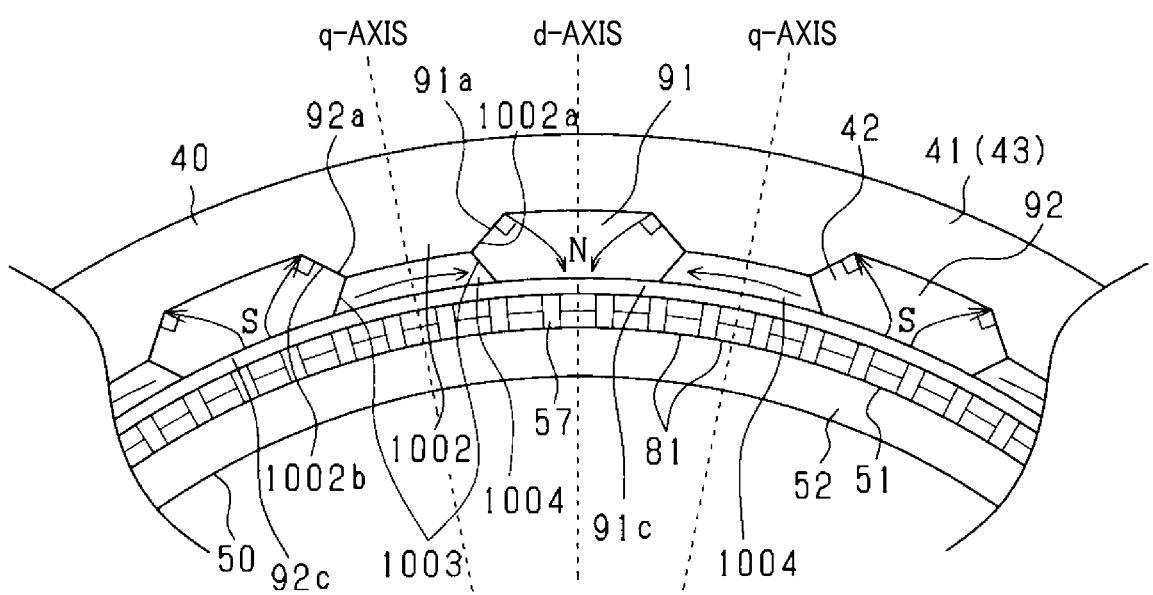
FIG. 49 is a transverse cross-sectional view of a rotor and a stator in another example.

In addition, the seventeenth modification may be combined with the fifteenth modification or the sixteenth modification. For example, as shown in FIG. 49, it is possible to form the circumferential end surfaces 91a and 92a of the magnets 91 and 92 to be oblique to the radial direction while forming the recesses 1003 in the stator-side peripheral surfaces 91c and 92c of the same at the circumferential ends and arranging the auxiliary magnets 1004 in the recesses 1003. Moreover, in this case, it is preferable to design the shape of the circumferential ends of the auxiliary magnets 1004 to conform to the shape of the recesses 1003, as shown in FIG. 49. In other words, it is preferable for the auxiliary magnets 1004 to be shaped to fill the gaps between the magnets 91 and 92.

(Eighteenth Modification)

The magnet unit 42 and the cylindrical portion 43 illustrated in any of the third embodiment and the fifteenth to the seventeenth modifications may be applied to the inner rotor type rotating electric machine described in the eleventh modification or the twelfth modification.

Figure 50A:
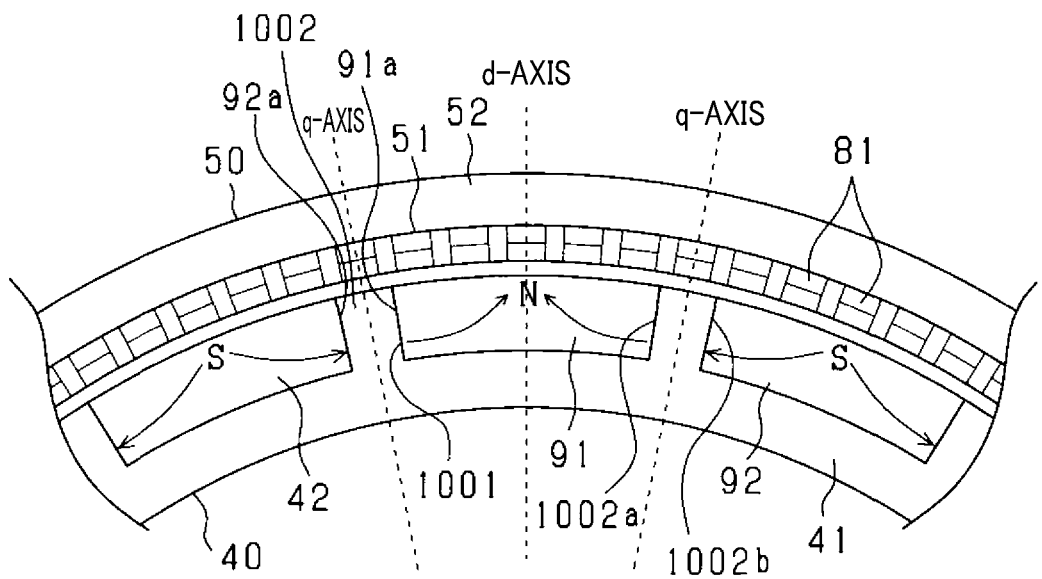
FIGS. 50(a) and 50(b) include transverse cross-sectional views of rotor-stator sets in an eighteenth modification.
Figure 50B:
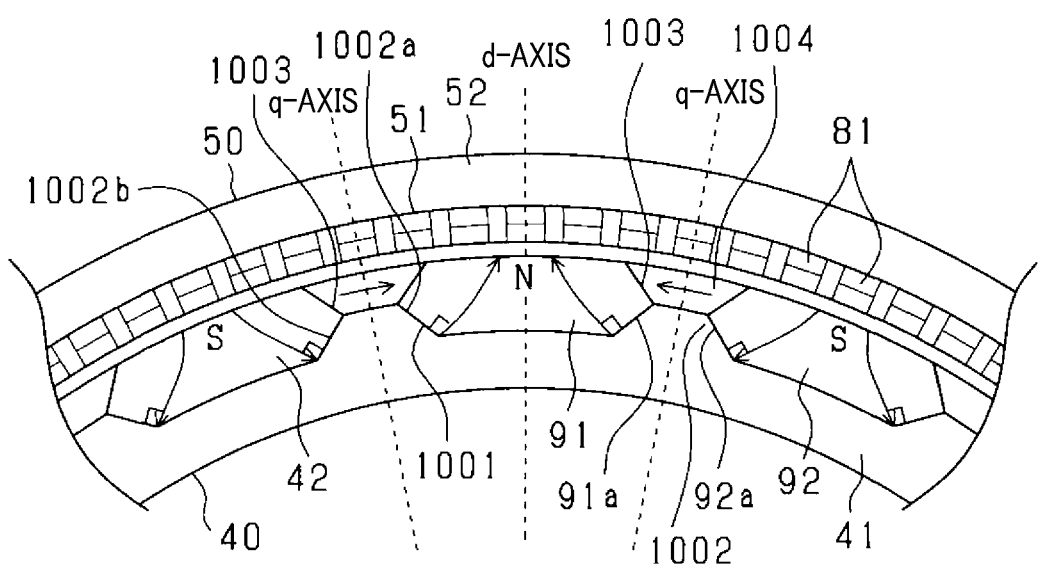

For example, as shown in FIG. 50(a), the magnet unit 42 and the cylindrical portion 43 illustrated in the third embodiment may be applied to an inner rotor type rotating electric machine. Similarly, as shown in FIG. 50(b), the magnet unit 42 and the cylindrical portion 43 illustrated in the seventeenth modification may also be applied to an inner rotor type rotating electric machine.

Other modifications will be described hereinafter.

The radial distance DM from the armature-side surface of the magnet unit 42 to the axis of the rotor may be set to be greater than or equal to 50 mm. Specifically, as shown in, for example, FIG. 4, the radial distance DM from the radially inner surface of the magnet unit 42 (more specifically, the radially inner surfaces of the first and second magnets 91 and 92) to the axis of the rotor 40 may be set to be greater than or equal to 50 mm.

As slot-less rotating electric machines, small-scale rotating electric machines have been known whose outputs are from several tens of watts to several hundreds of watts and which are used for model applications. However, the inventor of the present application have found no examples where large-scale rotating electric machines for industrial applications, whose outputs generally exceed 10 kW, employ a slot-less structure. Therefore, the inventor has investigated the reasons.

Recent mainstream rotating electric machines can be classified into the following four types: brushed motors, squirrel cage induction motors, permanent magnet synchronous motors and reluctance motors.

Brushed motors are supplied with exciting current via brushes. However, in the case of large-scale brushed motors, the sizes of brushes are large and maintenance is troublesome. Therefore, with remarkable developments in semiconductor technologies, large-scale brushed motors have been replaced with brushless motors such as induction motors. On the other hand, some small-scale brushed motors employ a coreless structure due to low inertia and economic benefits.

Squirrel cage induction motors generate torque by having the magnetic field, which is created by a primary-side stator coil, received by a secondary-side rotor core and causing induced current to intensely flow to a squirrel cage-shaped electrical conductor to create a counteracting magnetic field. Therefore, configuring both the rotor and the stator to include no core is not necessarily beneficial in terms of minimization of the sizes and improvement of the efficiencies of squirrel cage induction motors.

Reluctance motors generate torque utilizing the reluctance change in a core. Therefore, in terms of basic principles, it is undesirable to eliminate the core.

Regarding permanent magnet synchronous motors, IPM (Interior Permanent Magnet) motors are the recent mainstream motors. Therefore, unless for special reasons, large-scale permanent magnet synchronous motors are IPM motors in most cases.

IPM motors can generate both magnet torque and reluctance torque. Moreover, IPM motors are operated with the ratio between the generated magnet and reluctance torques suitably adjusted by an inverter control. Therefore, IPM motors are small in size and superior in controllability.

Figure 51:
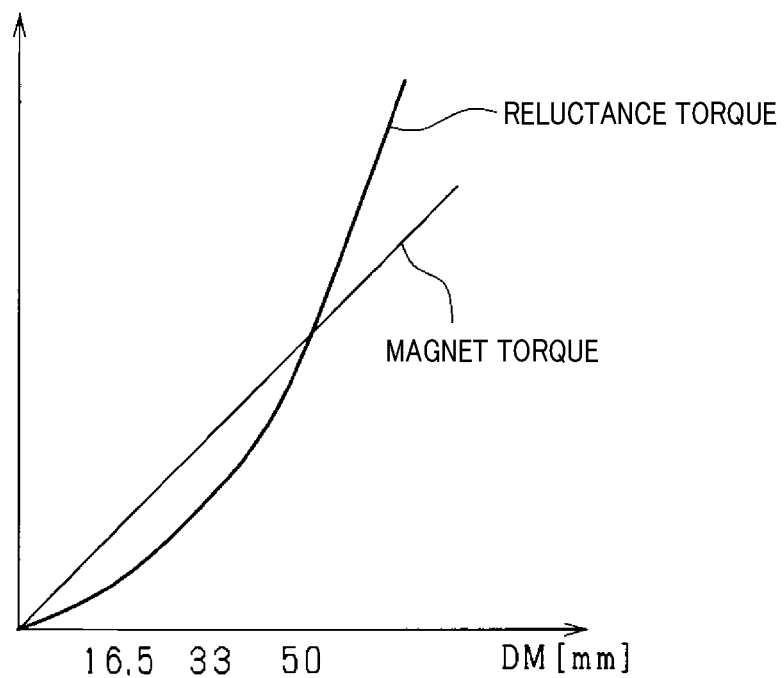
FIG. 51 is a diagram illustrating the relationships between reluctance torque, magnet torque and radial distance DM.

According to an analysis by the inventor of the present application, the relationships between magnet torque, reluctance torque and the radial distance DM from the armature-side surface of the magnet unit 42 to the axis of the rotor (i.e., the radius of the stator core in the case of the rotating electric machine being of an inner rotor type) are as shown in FIG. 51.

The magnet torque has its potential determined by the strength of the magnetic field created by the permanent magnets as shown in the following equation (eq1). In contrast, the reluctance torque has its potential determined by the amplitudes of the inductances, in particular the amplitude of the q-axis inductance as shown in the following equation (eq2).

$$\text{Magnet torque} = k \cdot \Psi \cdot Iq \quad (eq1)$$

$$\text{Reluctance torque} = k \cdot (Lq - Ld) \cdot Iq \cdot Id \quad (eq2)$$

Here, a comparison is made between the strength of the magnetic field created by the permanent magnets and the amplitudes of the inductances of the coil using the radial distance DM. The strength of the magnetic field created by the permanent magnets, i.e., the amount of magnetic flux $\Psi$, is proportional to the total surface area of the permanent magnets facing the stator. In the case of the rotor being cylindrical in shape, the total surface area is represented by the surface area of the cylinder. Strictly speaking, due to the presence of N and S poles, the amount of magnetic flux $\Psi$ is proportional to half the surface area of the cylinder. Moreover, the surface area of the cylinder is proportional to both the radius of the cylinder and the length of the cylinder. That is, with the length of the cylinder being constant, the amount of magnetic flux $\Psi$ is proportional to the radius of the cylinder.

Figure 52:
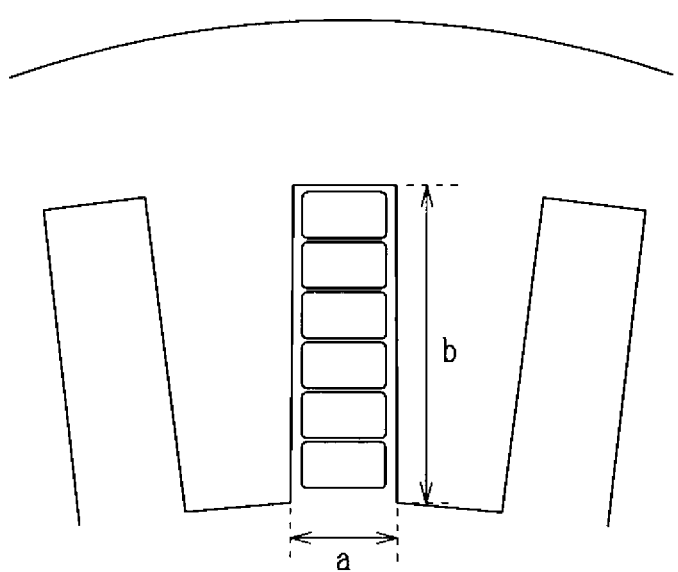
FIG. 52 is a diagram showing teeth.

On the other hand, the inductance Lq of the coil is dependent on, but less sensitive to the core shape. The inductance Lq is proportional to the square of the number of turns of the stator coil, i.e., highly dependent on the number of turns of the stator coil. Moreover, the inductance L can be determined by the following equation: $L = \mu \times N^2 \times S/\delta$, where $\mu$ is the permeability of the magnetic circuit, N is the number of turns, S is the cross-sectional area of the magnetic circuit and $\delta$ is the effective length of the magnetic circuit. The number of turns of the coil depends on the volume of the coil space. In the case of the rotating electric machine being a cylindrical motor, the number of turns depends on the coil space of the stator, i.e., depends on the slot area. As shown in FIG. 52, in the case of the slots having a substantially rectangular shape, the slot area is proportional to the product of the circumferential dimension a and the radial dimension b of each slot (i.e., a×b).

The circumferential dimension of each slot increases in proportion to the diameter of the cylinder. The radial dimension of each slot also increases in proportion to the diameter of the cylinder. Therefore, the slot area is proportional to the square of the diameter of the cylinder. Moreover, as can be seen from above (eq2), the reluctance torque is proportional to the square of the stator current. Therefore, the performance of the rotating electric machine depends on the amplitude of the stator current and thus on the slot area of the stator. As above, with the length of the cylinder being constant, the reluctance torque is proportional to the square of the diameter of the cylinder. The relationships between the magnet torque, the reluctance torque and the radial distance DM are determined based on the above observations and illustrated in FIG. 51.

As can be seen from FIG. 51, the magnet torque linearly increases with the radial distance DM while the reluctance torque quadratically increases with the radial distance DM. When the radial distance DM is relatively small, the magnet torque is dominant. However, with increase in the radial distance DM, the reluctance torque becomes dominant. The inventor of the present application has concluded that the intersection point between the magnet torque and the reluctance torque in FIG. 51 is in the vicinity of DM=50 mm under predetermined conditions. That is, in 10 kW-class electric motors where the stator core radius sufficiently exceeds 50 mm, the current mainstream technique is to utilize the reluctance torque; therefore, it is difficult to eliminate the core. This can be considered to be one of the reasons why the slot-less structure is not employed in large-scale rotating electric machines.

In the case of rotating electric machines including a stator core, magnetic saturation of the stator core is always a problem to be solved. In particular, in radial-gap type rotating electric machines, the rotating shaft has a longitudinal cross section which has one fan-shaped sector per magnetic pole. The magnetic path width decreases in a radially inward direction and the performance limit of the rotating electric machine is determined by the radially inner-side dimensions of the stator teeth forming the slots. Even when high-performance permanent magnets are employed, upon occurrence of magnetic saturation at radially inner portions of the stator teeth, it becomes impossible to sufficiently utilize the high performance of the permanent magnets. To prevent magnetic saturation from occurring at the radially inner portions of the stator teeth, it is necessary to increase the inner diameter of the stator core. However, with increase in the inner diameter of the stator core, the size of the entire rotating electric machine is increased.

For example, in a distributed-winding rotating electric machine which includes a three-phase coil, there are provided, for each magnetic pole, three to six teeth through which magnetic flux flows. However, magnetic flux tends to concentrate on those of the teeth located on the front side in the circumferential direction; i.e., magnetic flux is unevenly distributed to the three to six teeth. In this case, magnetic flux concentratedly flows to some (e.g., one or two) of the three to six teeth; with rotation of the rotor, the magnetically-saturated teeth also move in the circumferential direction, causing slot ripple to occur.

As above, in slot-less rotating electric machines where the radial distance DM is greater than or equal to 50 mm, to prevent occurrence of magnetic saturation, it is desirable to eliminate teeth. However, when teeth are eliminated, magnetic reluctance of the magnetic circuit in the rotor and the stator may increase, thereby lowering the torque of the rotating electric machine. This is because without teeth, the air gap between the rotor and the stator may increase. Therefore, there is room to increase torque in slot-less rotating electric machines where the radial distance DM is greater than or equal to 50 mm. Consequently, significant advantages can be achieved by applying the above-described torque-increasing configurations to slot-less rotating electric machines where the radial distance DM is greater than or equal to 50 mm.

In addition, the radial distance DM from the armature-side surface of the magnet unit to the axis of the rotor may be preferably set to be greater than or equal to 50 mm not only in outer rotor type rotating electric machines but also in inner rotor type rotating electric machines.

In the stator coil 51 of the rotating electric machine 10, the straight portions 83 of the electrical conductors 82 may be arranged in a single layer in the radial direction. Otherwise, in the case of arranging the straight portions 83 of the electrical conductors 82 in a plurality of layers in the radial direction, the number of the layers may be set to any arbitrary number, such as 3, 4, 5 or 6.

In the configuration shown in FIG. 2, the rotating shaft 11 protrudes to both axial sides of the rotating electric machine 10. As an alternative, the rotating shaft 11 may protrude to only one axial side of the rotating electric machine 10. For example, the rotating shaft 11 may have an end portion supported in a cantilever fashion by the bearing unit 20; the remainder of the rotating shaft 11 protrudes, on the opposite axial side of the bearing unit 20 to the inverter unit 60, axially outside the rotating electric machine 10. In this case, the rotating shaft 11 does not protrude inside the inverter unit 60. Consequently, the available internal space of the inverter unit 60, more specifically the available internal space of the cylindrical portion 71 is increased.

In the rotating electric machine 10 configured as described above, non-electrically conductive grease is used in the bearings 21 and 22. As an alternative, electrically conductive grease may be used in the bearings 21 and 22. For example, electrically conductive grease which contains metal particles or carbon particles may be used in the bearings 21 and 22.

The rotating shaft 11 may be rotatably supported by bearings provided at two locations respectively on opposite axial sides of the rotor 40. More specifically, in the configuration shown in FIG. 1, the rotating shaft 11 may alternatively be rotatably supported by bearings provided at two locations respectively on opposite axial sides of the inverter unit 60.

In the rotating electric machine 10 configured as described above, the intermediate portion 45 of the magnet holder 41 of the rotor 40 has both the annular inner shoulder part 49a and the annular outer shoulder part 49b formed therein. As an alternative, the intermediate portion 45 may be configured to have a flat surface without the shoulder parts 49a and 49b formed therein.

In the rotating electric machine 10 configured as described above, each of the electrical conductors 82 forming the stator coil 51 has its conductor body 82a constituted of a bundle of wires 86. As an alternative, each of the electrical conductors 82 may be configured with a single flat wire which has a rectangular cross-sectional shape. As another alternative, each of the electrical conductors 82 may be configured with a single round wire which has a circular or elliptical cross-sectional shape.

In the rotating electric machine 10 configured as described above, the inverter unit 60 is provided radially inside the stator 50. As an alternative, the inverter unit 60 may not be provided radially inside the stator 50. In this case, the internal space of the stator 50, which was occupied by the inverter unit 60, may remain as a hollow space or be occupied by a different component from the inverter unit 60.

In the rotating electric machine 10 configured as described above, the housing 30 may be omitted from the configuration of the rotating electric machine 10. In this case, both the rotor 40 and the stator 50 may be held by, for example, a wheel or other vehicle components.

Fourth Embodiment

In the above-described first embodiment, the axial length (or height) of the magnets 91 and 92 is set to be larger than that of the coil side part 53 of the stator coil 51. Consequently, at least part of magnetic flux emanating from both axial end portions can be concentrated on an axial central portion, thereby enhancing the magnet magnetic flux.

However, in the case of setting the axial length of the magnets 91 and 92 to be larger than that of the coil side part 53, despite the fact that the coil ends 54 and 55 hardly contribute to rotational torque, the rotating magnetic field generated by the magnets 91 and 92 will be directly applied to the coil ends 54 and 55. In this case, the magnetic field from the viewpoint of the stator coil 51 is a wave-like alternating magnetic field; therefore eddy current will be induced to flow in the electrical conductors 82 forming the stator coil 51. As a result, eddy current loss will occur and thus the temperature and/or vibration of the stator 50 may increase. In view of the above, in the present embodiment, the following configuration is employed to reduce the magnetic flux (i.e., leakage magnetic flux) applied to the coil ends 54 and 55.

Figure 53:
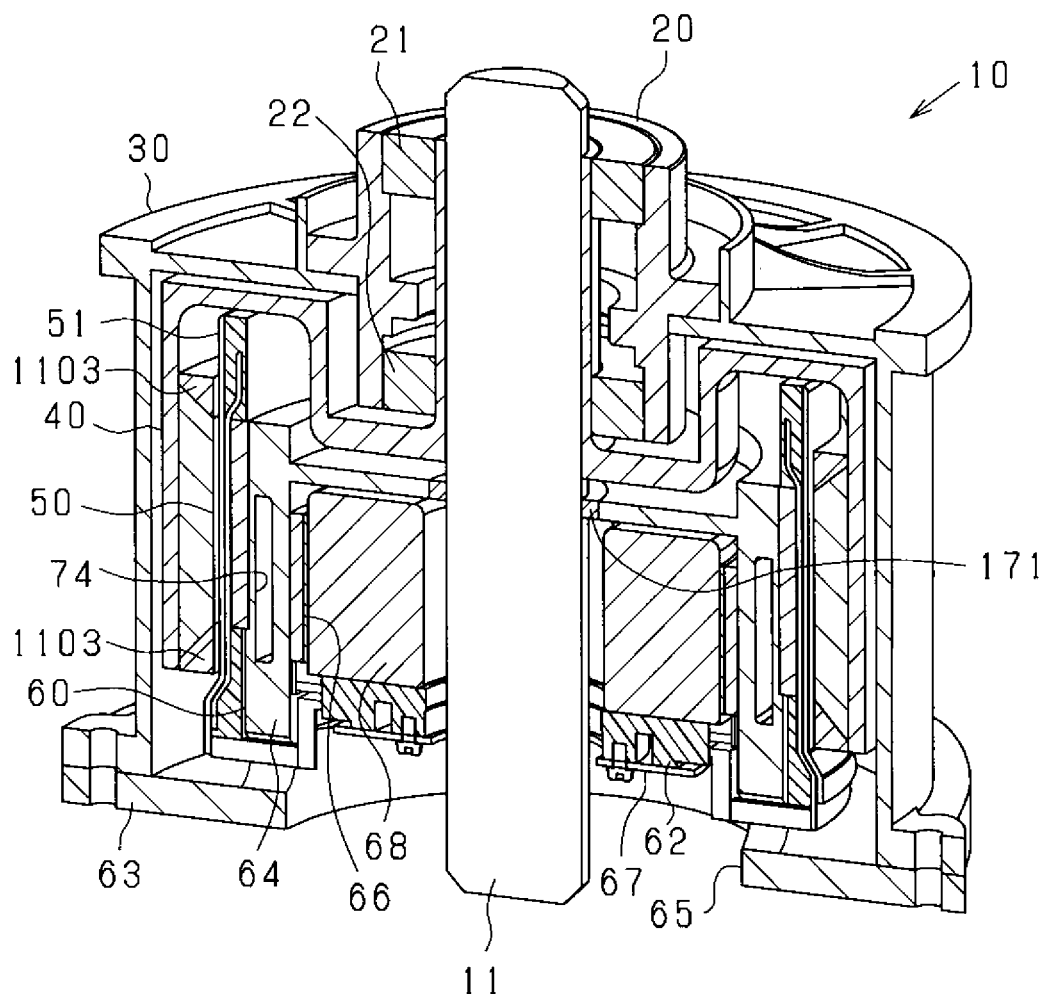
FIG. 53 is a perspective longitudinal cross-sectional view of a rotating electric machine in a fourth embodiment.
Figure 54:
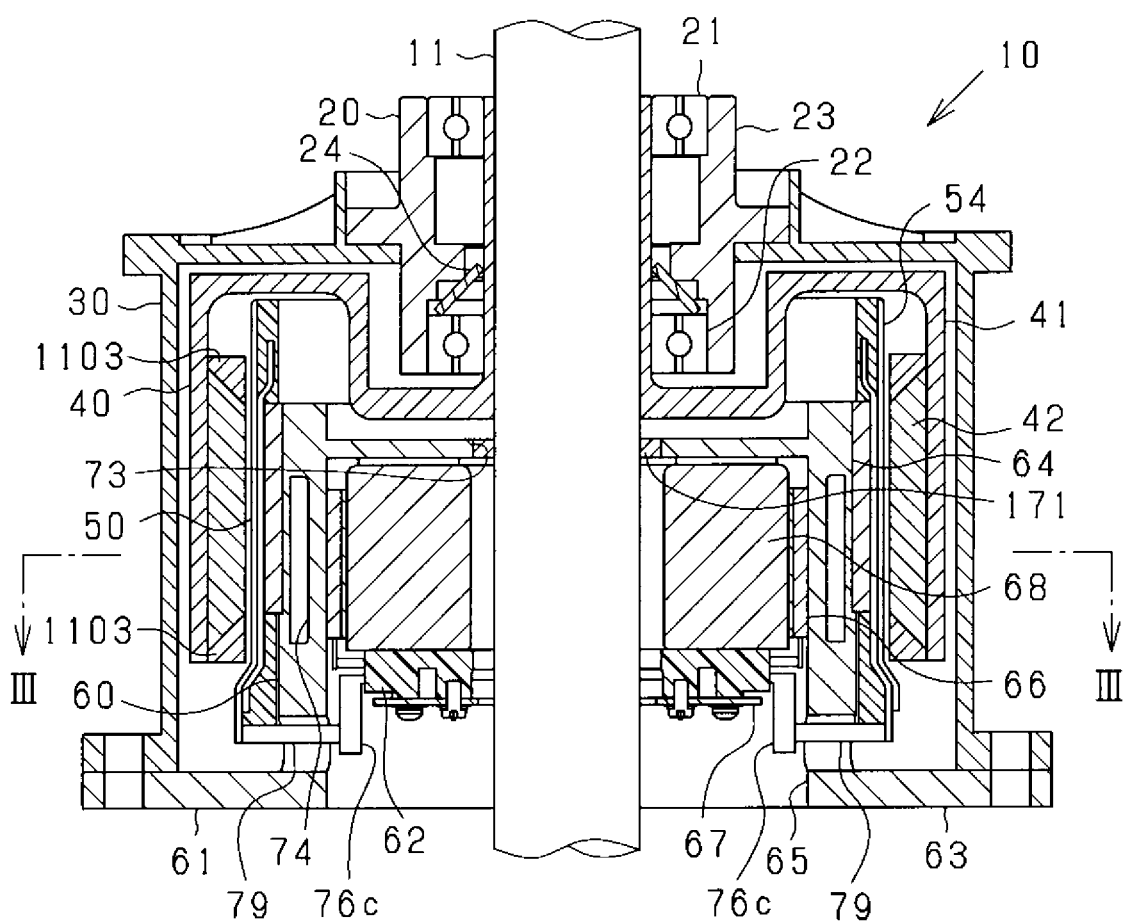
FIG. 54 is a longitudinal cross-sectional view of the rotating electric machine in the fourth embodiment.
Figure 55:
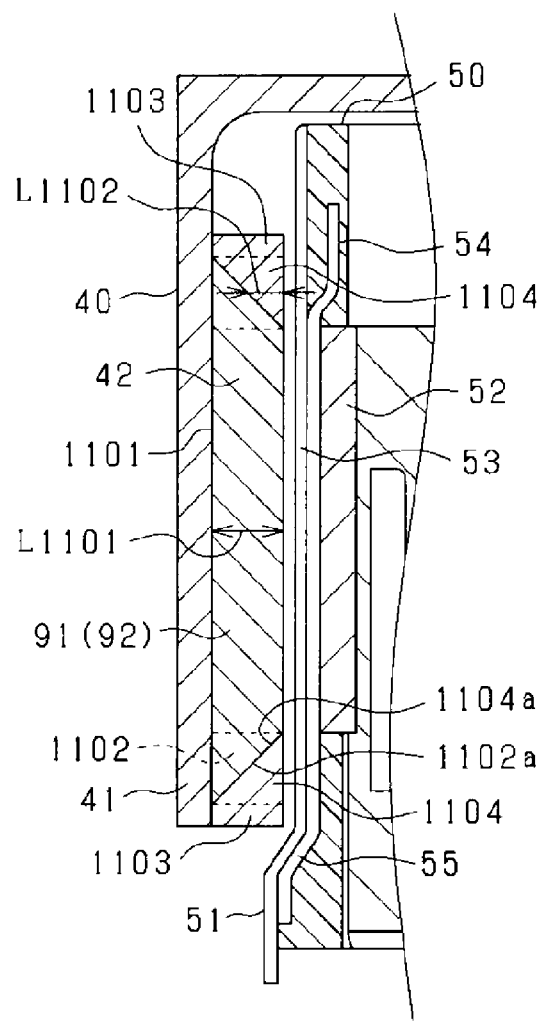
FIG. 55 is a longitudinal cross-sectional view showing one of magnets and both holding rings in the fourth embodiment.

FIGS. 53-55 each show a longitudinal cross section of the magnets 91 and 92 and the stator coil 51 along the axial direction. As shown in FIG. 55, a cross section of each of the magnets 91 and 92 along the axial direction of the rotating shaft 11 is shaped to be convex toward the stator coil 51 side. In addition, the vertical direction in FIG. 55 coincides with the axial direction. More particularly, in the present embodiment, the longitudinal cross section of each of the magnets

91 and 92 along the axial direction is trapezoidal-shaped such that the axial length of the longitudinal cross section decreases from the rotor 40 side to the stator 50 size. That is, the radial thickness (L1102) of smaller-thickness portions 1102 at both axial ends of the magnet unit 42 (more specifically, each of the magnets 91 and 92) is smaller than the radial thickness (L1101) of an axial central portion 1101. Moreover, the radial thickness (L1102) of the smaller-thickness portions 1102 is set to be smaller (or shorter) on the axially outer side than on the axially inner side.

The shape of the magnet unit 42 will be described in more detail. Both the outer peripheral surfaces (i.e., rotor-side peripheral surfaces) and the inner peripheral surfaces (i.e., stator-side peripheral surfaces) of the magnets 91 and 92 constituting the magnet unit 42 are formed to be parallel to the axial direction. The axial central portion 1101 faces the coil side part 53; the radial thickness (L1101) of the axial central portion 1101 is set to be constant. Of the peripheral surfaces of the magnets 91 and 92, the rotor-side peripheral surfaces correspond to the field-system-side peripheral surfaces while the stator-side peripheral surfaces correspond to the armature-side peripheral surfaces.

Of the stator coil 51, the coil side part 53 is a part where the electrical conductors 82 are provided straight along the axial direction. Moreover, the coil side part 53 is located within the axial range of the stator core 52. Furthermore, the coil side part 53 is opposed to the stator-side peripheral surface of the magnet unit 42.

On the other hand, each of the smaller-thickness portions 1102 at both the axial ends of each of the magnets 91 and 92 has an oblique surface 1102a that is oblique to a direction perpendicular to the axial direction. The axial length (or height) of each of the smaller-thickness portions 1102 gradually becomes shorter (or lower) in the direction toward the stator 50 side. That is, each of the smaller-thickness portions 1102 has a substantially right-angled triangular cross section; the axial length (or height) of each of the smaller-thickness portions 1102 is shorter (or lower) on the stator 50 side than on the rotor 40 side. In other words, the radial length (or thickness) of each of the smaller-thickness portions 1102 gradually decreases in an axially outward direction. In addition, during the compression shaping, the shaping pressure may vary at the length-varying portion due to the taper. Therefore, considering the fact that the magnets are generally made within the Br error range of about 3.5%, the maximum angle which the length-varying portion at each axial end makes with a plane whose normal direction coincides with the axial direction should be less than or equal to 15°.

In addition, each of the smaller-thickness portions 1102 with the above-described cross-sectional shape is provided from one circumferential end to the other circumferential end of each of the magnets 91 and 92. That is, when the magnet unit 42 is viewed along the axial direction, each of the smaller-thickness portions 1102 is arc-shaped.

Moreover, each of the smaller-thickness portions 1102 is located at an axial position radially overlapping the coil end 54 or 55. That is, at least part of each of the coil ends 54 and 55 is located within an axial range radially overlapping the corresponding the smaller-thickness portions 1102. In the present embodiment, at least part of each of the coil ends 54 and 55 protrudes axially outward from the magnet unit 42.

The coil ends 54 and 55 are constituted of portions of the stator coil 51 which extend obliquely with respect to the axial direction or make turns on the axially outside of the coil side part 53 so as to extend the electrical conductors 82 in the circumferential direction, i.e., to fold back the electrical conductors 82. In the present embodiment, the coil ends 54 and 55 are located axially outside the stator core 52. Moreover, the coil ends 54 and 55 are located axially outside the stator-side peripheral surface of the magnet unit 42.

In the present embodiment, the axial length of the stator coil 51 is set to be larger than that of the magnet unit 42. However, the axial length of the stator coil 51 may be set to be smaller than that of the magnet unit 42. In this case, it is preferable to set the axial length of the stator-side peripheral surfaces of the magnets 91 and 92 to be smaller than the axial length of the stator coil 51 and to set the axial length of the rotor-side peripheral surfaces of the magnets 91 and 92 to be larger than the axial length of the stator coil 51. Moreover, in this case, it is preferable for the coil ends 54 and 55 to be respectively located within the axial ranges of the corresponding smaller-thickness portions 1102.

Next, referring to FIG. 56, explanation will be given of the directions of easy axes of magnetization and magnet magnetic paths on a longitudinal cross section of the magnets 91 and 92 constituting the magnet unit 42. In addition, the vertical direction in FIG. 56 coincides with the axial direction.

In each of the magnets 91 and 92, magnet magnetic paths (or magnetization directions) extend in an arc shape between the axial central portion 1101 and the smaller-thickness portions 1102 on both the axial sides of the axial central portion 1101. In FIG. 56, the magnetization directions are indicated with arrows. In each of the magnets 91 and 92, in the axial central portion 1101, the magnetization direction is perpendicular (or near perpendicular) to the axial direction. On the other hand, in the smaller-thickness portions 1102, the magnetization directions are more parallel to the axial direction than the magnetization direction in the axial central portion 1101 is.

In terms of orientation directions, in each of the magnets 91 and 92, the directions of easy axes of magnetization are different between the axial central portion 1101 and the smaller-thickness portions 1102 on both the axial sides of the axial central portion 1101. Each of the magnets 91 and 92 is constituted of a magnet which is oriented such that the directions of the easy axes of magnetization in the smaller-thickness portions 1102 are more parallel to the axial direction than the direction of the easy axis of magnetization in the axial central portion 1101 is.

More specifically, the direction of the easy axis of magnetization in the axial central portion 1101 is near perpendicular to the axial direction while the directions of the easy axes of magnetization in the smaller-thickness portions 1102 are near parallel to the axial direction. Moreover, the arc-shaped magnet magnetic paths are formed according to the directions of the easy axes of magnetization. In addition, each of the magnets 91 and 92 may alternatively be oriented such that: the direction of the easy axis of magnetization in the axial central portion 1101 is perpendicular to the axial direction; and the directions of the easy axes of magnetization in the smaller-thickness portions 1102 are parallel to the axial direction.

Moreover, in each of the magnets 91 and 92, of the peripheral surfaces of the magnet, the stator-side peripheral surface on the stator 50 side (i.e., on the right side in FIG. 56) and the axially outer end surfaces (i.e., the oblique surfaces 1102a) constitute magnetic flux acting surfaces through which magnetic flux flows into or out of the magnet. The arc-shaped magnet magnetic paths are formed to connect these magnetic flux acting surfaces (i.e., the stator-side peripheral surface and the axially outer end surfaces).

In the magnet unit 42, magnetic flux flows in an arc shape between the stator-side peripheral surface and the axially outer end surfaces of each of the magnets 91 and 92; thus magnet magnetic paths become longer in comparison with, for example, radial isotropic magnets. Consequently, it becomes possible to have magnetic flux concentrated on the axial central portions 1101 of the magnets 91 and 92. As the same, it also becomes possible to suppress magnetic flux (i.e., leakage magnetic flux) flowing from the smaller-thickness portions 1102 on both the axial sides of the axial central portions 1101 to the coil ends 54 and 55. That is, with the above configuration of the magnets 91 and 92, it becomes possible to increase the torque of the rotating electric machine 10 while suppressing eddy current loss in the coil ends 54 and 55.

The oblique surfaces 1102a are magnetic flux acting surfaces. The more the magnetic flux is perpendicular to the magnetic flux acting surfaces, the higher the strength of the magnetic flux is. In contrast, the more the magnetic flux is oblique to the magnetic flux acting surfaces, the lower the strength of the magnetic flux is. The coil ends 54 and 55 are opposed the corresponding oblique surfaces 1102a so as to be oblique to the corresponding oblique surfaces 1102a. Consequently, it becomes possible to more effectively suppress magnetic flux flowing from the end portions 1102 to the coil ends 54 and 55.

Figure 56:
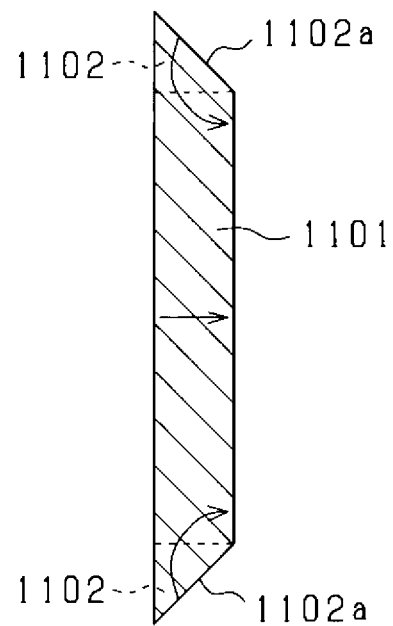
FIG. 56 is a longitudinal cross-sectional view of one of the magnets in the fourth embodiment.

In addition, in FIG. 56, arrows represent magnetization vectors in the case of the polarity on the stator 50 side (i.e., the right side in FIG. 56) being N. It should be noted that in the case of the polarity on the stator 50 side being S, the directions of the arrows would become opposite to those shown in FIG. 56.

In the case of small-scale rotating electric machines, the magnet unit can be fixed only by an adhesive. However, in the case of large-scale rotating electric machines, if the magnet unit is fixed only by an adhesive, it may be detached due to vibration and acceleration/deceleration shock under the design condition. Moreover, to suitably locate the smaller-thickness portions 1102 formed at both the axial ends of the magnet unit 42 so as to radially overlap the corresponding coil ends 54 and 55, it is necessary to suitably restrict axial displacement of the magnet unit 42. That is, in the case of large-scale rotors having a diameter greater than or equal to 100 mm, it is necessary to ensure the robustness of the magnet unit.

Figure 57:
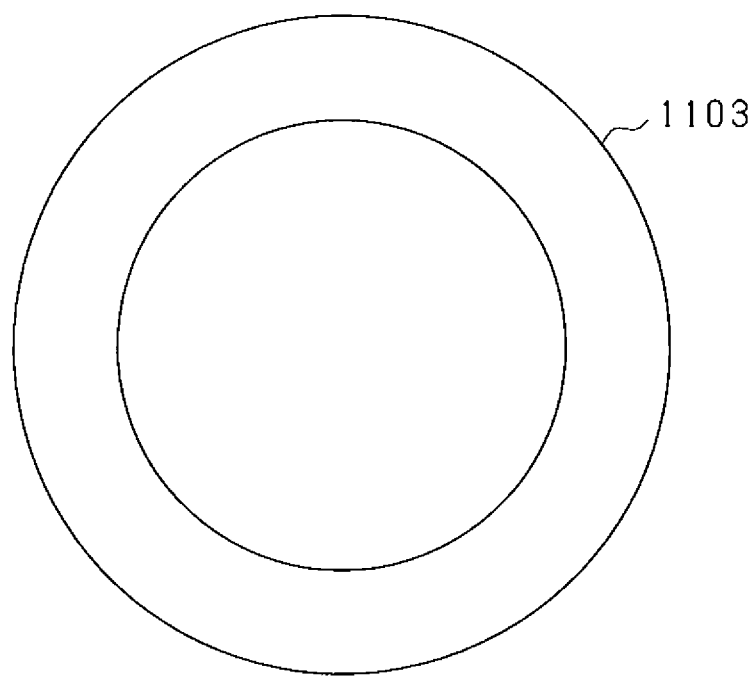
FIG. 57 is a plan view of one of the holding rings in the fourth embodiment.

In view of the above, in the present embodiment, a pair of holding rings 1103 are provided as holding members of the magnet unit 42. FIG. 57 shows one of the holding rings 1103 in plan view. Each of the holding rings 1103 is annular-shaped and has an outer diameter substantially equal to the inner diameter of the magnet holder 41. Moreover, as shown in FIGS. 53-55, each of the holding rings 1103 is fixed to the inner periphery of the magnet holder 41. The fixing method may be an arbitrary method, such as adhesive bonding, screw fastening or press fitting.

The pair of holding rings 1103 are provided respectively at opposite axial ends of the magnet unit 42 so as to sandwich the magnet unit 42 from both the axial sides thereof. The inner diameter of the holding rings 1103 is set to be substantially equal to the inner diameter (or the position of the stator-side peripheral surface) of the magnet unit 42. Consequently, the magnet unit 42 engages with the holding rings 1103 in the axial direction, thereby being restricted in axial displacement.

Moreover, each of the holding rings 1103 has an engaging portion 1104 protruding in the axial direction toward the magnet unit 42 side. In the state where the holding rings 1103 and the magnet unit 42 are together fixed to the magnet holder 41, the axial distance between the pair of engaging portions 1104 (or the gap between the distal ends of the engaging portions 1104) is at least shorter than the axial length (or length on the rotor 40 side) of the magnet unit 42. Consequently, the engaging portions 1104 radially engage with the corresponding smaller-thickness portions 1102 provided at the axial ends of the magnet unit 42, thereby restricting displacement of the magnets 91 and 92 toward the stator 50 side.

Furthermore, in the present embodiment, the engaging portions 1104 are formed to have a shape conforming to the shape of the smaller-thickness portions 1102. Specifically, as shown in FIG. 55, each of the engaging portions 1104 has an oblique surface 1104a that is shaped, according to the shape of the oblique surfaces 1102a of the smaller-thickness portions 1102, to be oblique to a direction perpendicular to the axial direction. Moreover, the oblique angle and the oblique direction of the oblique surface 1104a with respect to the direction perpendicular to the axial direction are equal to those of the oblique surfaces 1102a of the smaller-thickness portions 1102 located axially outside the oblique surface 1104a.

Consequently, when the pair of holding rings 1103 are arranged to sandwich the magnet unit 42 from both the axial sides thereof, the oblique surfaces 1102a of the smaller-thickness portions 1102 are respectively in contact with the oblique surfaces 1104a of the corresponding engaging portions 1104. That is, the shape of the engaging portions 1104 conforms to the shape of the smaller-thickness portions 1102 so that there are almost no gaps between the smaller-thickness portions 1102 and the corresponding engaging portions 1104. In this state, the engaging portions 1104 radially engage with the corresponding smaller-thickness portions 1102, thereby restricting the magnets 91 and 92 from being displaced toward the stator 50 side. Consequently, the magnets 91 and 92 are prevented from dropping or being detached.

In addition, when viewed along the axial direction, each of the engaging portions 1104 is formed in an annular shape over the entire circumference of the holding ring 1103. That is, each of the engaging portions 1104 of the holding rings 1103 radially engages with the magnets 91 and 92 over the entire circumference of the magnet unit 42, thereby restricting the magnets 91 and 92 from being displaced toward the stator 50 side.

Although the holding rings 1103 are non-magnetic members, it is preferable for them to be formed of a metal. In this case, eddy current loss may occur with magnetic flux passing through the holding rings 1103. In the present embodiment, in the smaller-thickness portions 1102, the magnet magnetic paths are arc-shaped as described above. Consequently, it becomes difficult for magnetic flux emanating from the axial end portions (i.e., the smaller-thickness portions 1102) to cross the holding rings 1103; thus it becomes possible to have the magnetic flux effectively crossing the stator 50. Moreover, the magnetic flux emanating from the smaller-thickness portions 1102 and crossing the stator 50 has an axial component; thus the direction of the magnetic flux is not perpendicular to the axial direction. However, the distance between the stator core 52 and the magnets 91 and 92 is three or more times that in a conventional motor. Further, no sufficient iron core is arranged between the stator core 52 and the magnets 91 and 92; instead, the space between the stator core 52 and the magnets 91 and 92 is mostly occupied by the electrical conductors 82. Consequently, although the magnetic flux is axially oriented in the so-called slot-less or core-less rotating electric machine according to the present embodiment, the magnetic flux will lose its axial component within the sufficient distance between the stator core 52 and the magnets 91 and 92. As a result, when crossing the stator core 52, the magnetic flux has its axial component already minimized. On the other hand, the magnetic steel sheets (i.e., the stator core 52) generally cause high eddy current loss when axial magnetic flux is applied thereto, but can effectively suppress eddy current loss when horizontal magnetic flux is applied thereto. Consequently, with the magnetic steel sheets, it becomes possible to considerably suppress eddy current loss, thereby making it possible to provide a motor which can generate higher torque and has a higher efficiency than a conventional motor.

According to the fourth embodiment, it is possible to achieve the following advantageous effects.

As shown in FIG. 55, in the present embodiment, the cross section of the magnet unit 42 along the axial direction is shaped to be convex toward the stator 50 side; the smaller-thickness portions 1102 at the axial ends of the magnet unit 42 are located to radially overlap the corresponding coil ends 54 and 55 of the stator coil 51. With this configuration, the radial distances (or air gaps) from the coil ends 54 and 55 to the corresponding smaller-thickness portions 1102 become longer than the radial distance from the coil side part 53 to the axial central portion 1101 of the magnet unit 42. Consequently, it becomes possible to lower the density of the magnetic flux flowing from the smaller-thickness portions 1102 to the corresponding coil ends 54 and 55, thereby suppressing eddy current loss in the coil ends 54 and 55.

In addition, it becomes possible to reduce the radial length of the magnet unit 42 at the smaller-thickness portions 1102. Therefore, even if the magnet magnetic paths in the smaller-thickness portions 1102 were formed along a direction perpendicular to the axial direction, it would still be possible to lower the density of the magnetic flux flowing from the smaller-thickness portions 1102 to the corresponding coil ends 54 and 55.

Moreover, with the cross section of the magnet unit 42 shaped to be convex toward the stator 50 side, at least part of the magnetic flux emanating from the smaller-thickness portions 1102 can be concentrated on the axial central portion 1101 of the magnet unit 42. Consequently, it becomes possible to enhance the magnetic flux flowing from the axial central portion 1101 to the coil side part 53 and thereby increase the torque in comparison with the case of no magnet unit radially overlapping the coil ends 54 and 55 and the case of the cross section of the magnet unit 42 being non-convex.

Moreover, in the magnet unit 42, the magnetization directions in the smaller-thickness portions 1102 are more parallel to the axial direction than the magnetization direction in the axial central portion 1101 is. Therefore, magnetic flux from the smaller-thickness portions 1102 can be concentrated on the axial central portion 1101. Furthermore, in the magnet unit 42, the stator-side peripheral surface and the axial end surfaces (or the oblique surfaces 1102a) constitute magnetic flux inflow/outflow surfaces; the arc-shaped magnet magnetic paths are formed to connect the stator-side peripheral surface and the oblique surfaces 1102a. Consequently, the magnet magnetic paths from the smaller-thickness portions 1102 to the axial central portion 1101 are lengthened, thereby enhancing the density of the magnetic flux emanating from the axial central portion 1101. As a result, it becomes possible to further increase the torque. At the same time, it also becomes possible to lower the density of the magnetic flux flowing from the smaller-thickness portions 1102 to the corresponding coil ends 54 and 55 in a direction perpendicular to the axial direction, thereby reducing eddy current loss in the coil ends 54 and 55.

In the present embodiment, the pair of holding rings 1103 are provided respectively at opposite axial ends of the magnet unit 42. Each of the holding rings 1103 has the engaging portion 1104 that radially engages with the corresponding smaller-thickness portions 1102 of the magnets 91 and 92. Consequently, with the holding rings 1103, it becomes possible to suppress radial and axial displacement and/or detachment of the magnets 91 and 92. Moreover, since the engaging portions 1104 of the holding rings 1103 engage with the corresponding smaller-thickness portions 1102 whose radial thickness is small, it becomes possible to suppress the radial thickness of the entire rotor 40 from being increased due to the provision of the holding rings 1103. That is, it becomes possible to prevent the holding rings 1103 from being radially located on the stator 50 side of the inner circumferential surface of the magnet unit 42. Consequently, it becomes possible to set the distance between the magnet unit 42 and the stator coil 51 to a suitable distance.

The axial end surfaces of the magnet unit 42 are constituted of the oblique surfaces 1102a that are oblique to a direction perpendicular to the axial direction. Consequently, the magnet unit 42 can be more easily shaped by compression shaping in comparison with the case of shaping steps. This configuration is effective particularly in the case of employing sintered magnets as in the present embodiment.

In the present embodiment, the magnet unit 42 is constituted of the magnets 91 and 92 whose intrinsic coercive force is higher than or equal to 400 [kA/m] and residual flux density is higher than or equal to 1.0 [T]. However, even with employment of the magnets 91 and 92 whose magnet magnetic flux is strong as above, by arranging the coil ends 54 and 55 to radially overlap the corresponding smaller-thickness portions 1102, it is still possible to increase the torque while suitably reducing eddy current loss in the coil ends 54 and 55.

Moreover, the magnet unit 42 is constituted of the magnets 91 and 92 whose easy axes of magnetization are oriented such that at locations closer to the d-axis, the directions of the easy axes of magnetization are more parallel to the d-axis than at locations closer to the q-axis; the d-axis represents the centers of the magnetic poles of the magnet unit 42 while the q-axis represents the boundaries between the magnetic poles. In the magnets 91 and 92, the directions of the easy axes of magnetization are parallel or near parallel to the d-axis in the d-axis-side portions and perpendicular or near perpendicular to the q-axis in the q-axis-side portions; and the arc-shaped magnet magnetic paths are formed. More specifically, in each of the magnets 91 and 92, of the peripheral surfaces of the magnet, the stator-side peripheral surface and the q-axis-side end surfaces in the circumferential direction constitute magnetic flux inflow/outflow surfaces; and the arc-shaped magnet magnetic paths are formed to connect the stator-side peripheral surface and the q-axis-side end surfaces.

Consequently, the magnet magnetic flux on the d-axis is intensified, thereby making it possible to increase the torque. Moreover, in each of the magnetic poles of the magnet unit 42, the surface magnetic flux change (i.e., increase or decrease in the magnetic flux) from the q-axis to the d-axis becomes gentle. Consequently, it becomes possible to suppress occurrence of sharp voltage change due to unbalanced switching and thus becomes possible to suppress eddy current loss and/or vibration of the stator. Furthermore, since magnetic flux can be collected from the q-axis-side portions as well as from the axial end portions (i.e., the smaller-thickness portions 1102), it becomes possible to further intensify the magnet magnetic flux on the d-axis.

In the present embodiment, each of the electrical conductors 82 is formed of a plurality of wires 86. Specifically, each of the electrical conductors 82 is constituted of a wire bundle in which the wires 86 are covered with an insulating member. Moreover, in each of the electrical conductors 82, the wires 86 are twisted together. With the above configuration, it becomes possible to further reduce eddy current loss in the coil ends 54 and 55.

Modifications of Fourth Embodiment

Figure 58:
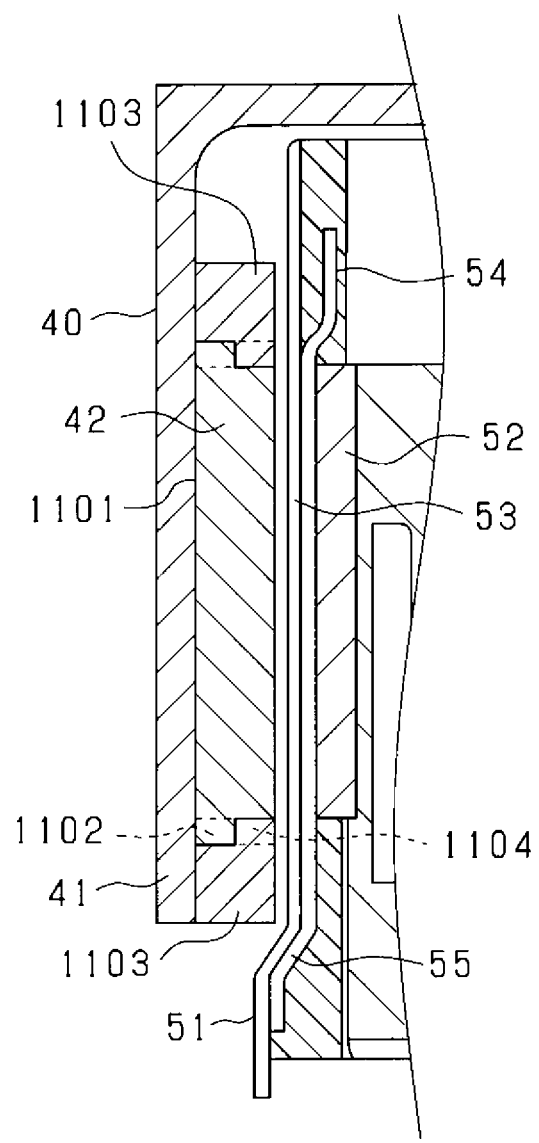
FIG. 58 is a longitudinal cross-sectional view showing one of magnets and both holding rings in another example.
Figure 59:
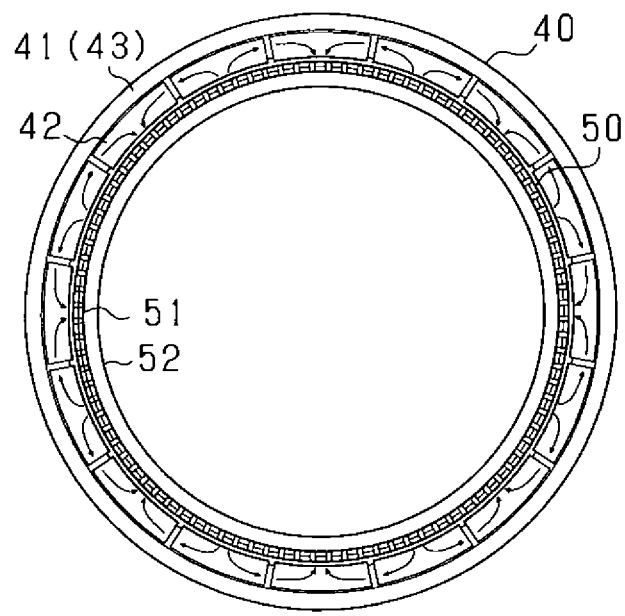
FIG. 59 is a transverse cross-sectional view of a rotor and a stator in a fifth embodiment.

In the above-described fourth embodiment, provided that the longitudinal cross-sectional shape of the magnets 91 and 92 is convex toward the stator 50 side, the shape of the axial end portions (i.e., the smaller-thickness portions 1102) may be arbitrarily modified. For example, as shown in FIG. 58, the smaller-thickness portions 1102 may be stepped such that the axial length (or height) thereof is reduced in steps as the position approaches the stator 50. Moreover, the axially outer end surfaces (i.e., the oblique surfaces 1102a) of the smaller-thickness portions 1102 may be formed as curved surfaces.

In the above-described fourth embodiment, the easy axes of magnetization (or magnetization directions) and the magnet magnetic paths on the longitudinal cross section of the magnets 91 and 92 may be arbitrarily modified. For example, the easy axes of magnetization and the magnet magnetic paths on the longitudinal cross section of the magnets 91 and 92 may be formed along a direction perpendicular to the axial direction.

In the above-described fourth embodiment, the holding rings 1103 may be omitted. Otherwise, the shape of the holding rings 1103 may be modified. For example, in the fourth embodiment, each of the holding rings 1103 has one engaging portion 1104 formed over the entire circumference thereof. Alternatively, each of the holding rings 1103 may have a plurality of engaging portions 1104 formed at predetermined angular intervals.

In the above-described fourth embodiment, the coil ends 54 and 55 are configured so as not to radially overlap the axial central portion 1101 of the magnet unit 42. Alternatively, the coil ends 54 and 55 may be configured such that part of each of the coil ends 54 and 55 radially overlaps the axial central portion 1101 of the magnet unit 42. Moreover, in the fourth embodiment, the coil side part 53 is configured so as to radially overlap none of the smaller-thickness portions 1102. Alternatively, the coil side part 53 may be configured such that part of the coil side part 53 radially overlaps any of the smaller-thickness portions 1102.

In the above-described fourth embodiment, in the case of the rotating electric machine being of an inner rotor type, the radial thickness of both axial end portions of the magnet unit 42 may be set to be smaller than the radial thickness of an axial central portion of the magnet unit 42 so that a cross section of the magnet unit 42 along the axial direction is convex toward the stator 50 side (i.e., radially outward). Moreover, in this case, the smaller-thickness portions 1102 may be axially located to radially overlap the corresponding coil ends 54 and 55 of the stator coil 51. Furthermore, in this case, the holding rings 1103 may be employed.

Fifth Embodiment

In the above-described embodiments, the magnetic field generated by the stator coil 51 passes through the magnet unit 42. During rotation of the rotor 40 relative to the stator 50, the magnetic field of the stator coil 51 from the viewpoint of the magnet unit 42 is a wave-like alternating magnetic field; therefore eddy current will be induced to flow in the magnet unit 42. When the eddy current loss is high, the temperature of the magnet unit 42 may be increased, thereby lowering the magnetic flux density and thus causing the torque to drop. In view of the above, in the present embodiment, the following configuration is employed to reduce eddy current loss in the magnet unit 42.

Figure 60:
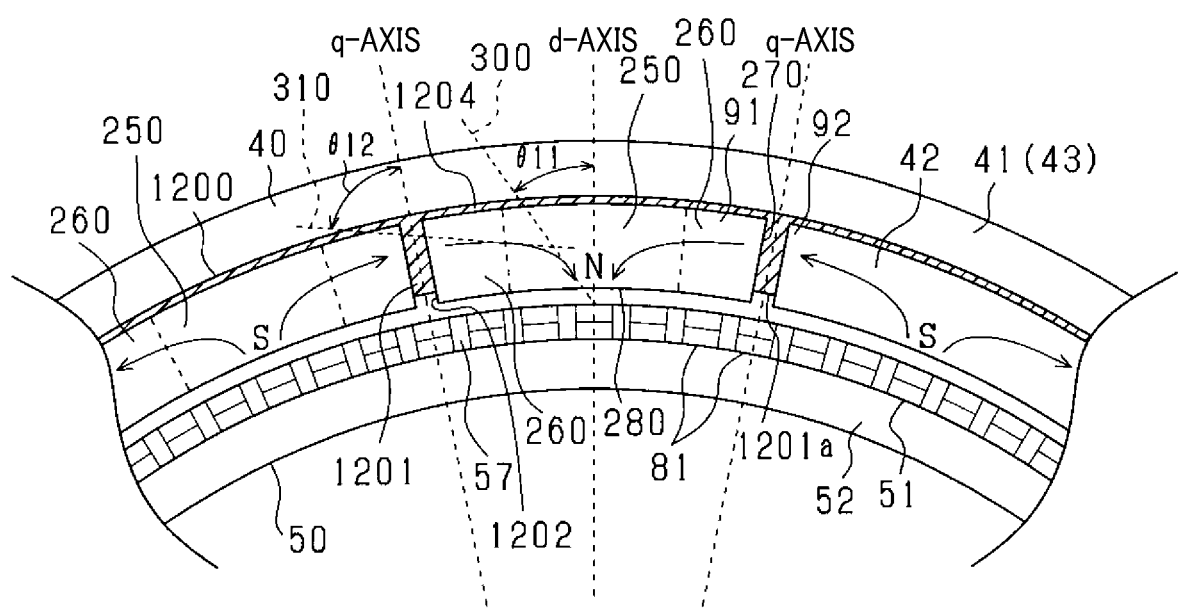
FIG. 60 is an enlarged view of part of FIG. 59.
Figure 61:
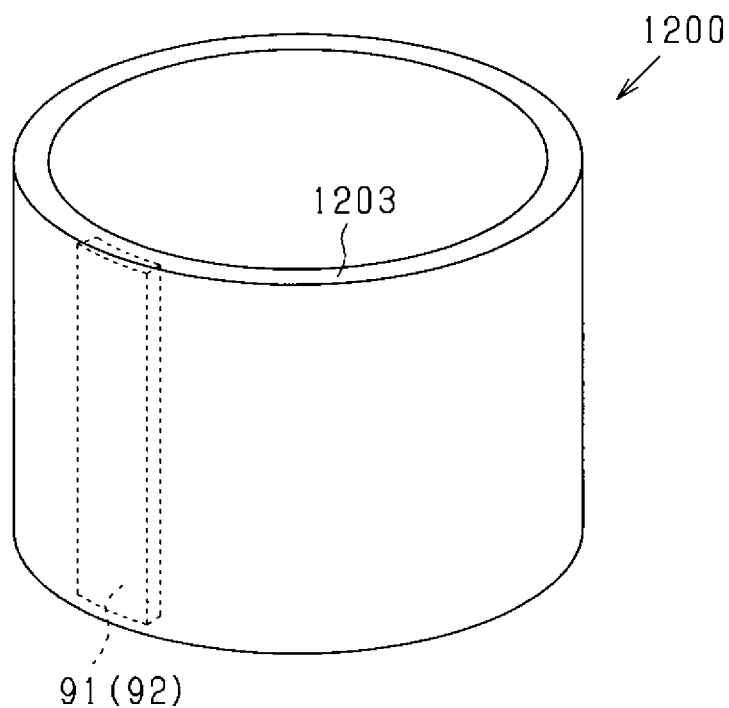
FIG. 61 is a perspective view of a magnet sealing section in the fifth embodiment.
Figure 62:
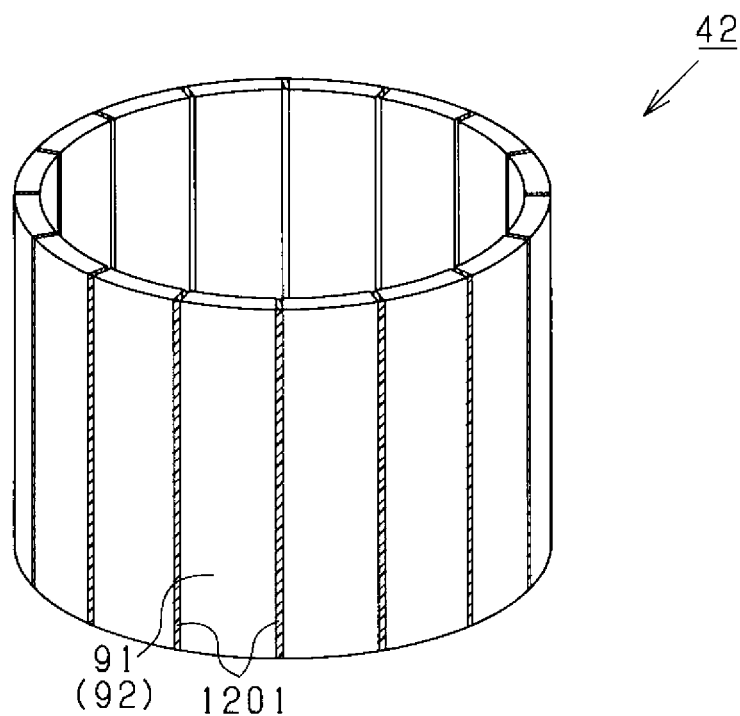
FIG. 62 is a perspective view showing a magnet section and inter-magnet members in the fifth embodiment.
Figure 63:
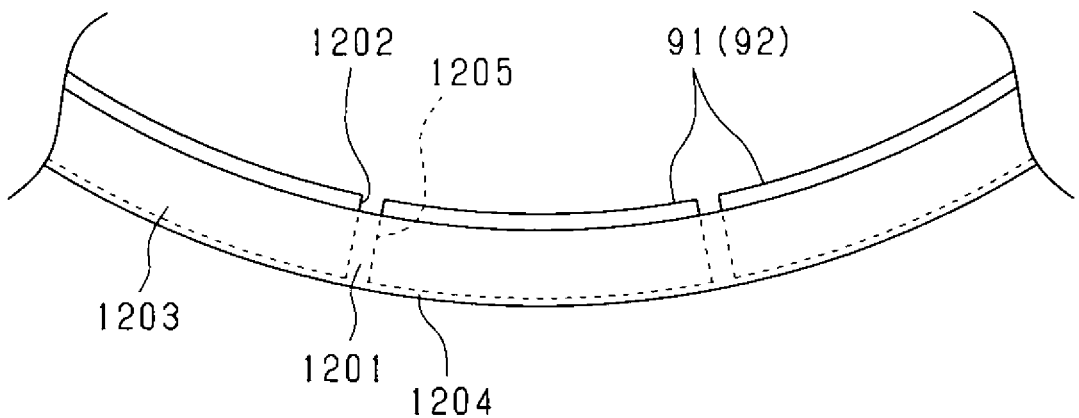
FIG. 63 is a plan view of the magnet sealing section in the fifth embodiment.
Figure 64:
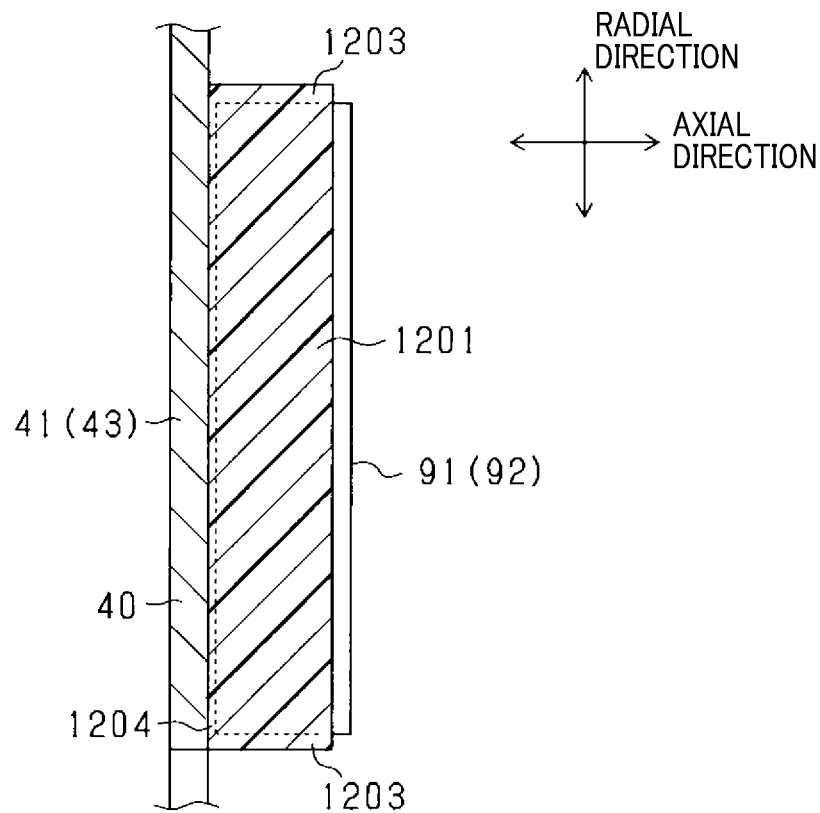
FIG. 64 is a cross-sectional view of the magnet sealing section in the fifth embodiment.

FIG. 61 is a perspective view of a magnet sealing section 1200. FIG. 62 is a perspective view of the magnet unit 42 and part of the magnet sealing section 1200. FIG. 63 is a plan view of the magnet sealing section 1200 and the magnet unit 42. FIG. 64 shows a longitudinal cross section of the magnet unit 42. As shown in FIGS. 59-64, the magnet unit 42 has its surfaces molded with an insulating material such as a synthetic resin. In addition, in the case of the rotating electric machine 10 being used as a vehicular power source, it is preferable that the magnet sealing section 1200 is formed of a highly heat-resistant fluorocarbon resin, epoxy resin, PPS resin, PEEK resin, LCP resin, silicon resin, PAI resin or PI resin.

The magnet insulating member covering the magnet unit 42 will be illustrated as the magnet sealing section 1200 hereinafter. The magnet sealing section 1200 is formed of an electrically-insulative and nonmagnetic material. Moreover, the magnet sealing section 1200 is formed of a non-electrically-conductive material which has a lower Young's modulus than the cylindrical portion 43.

The magnet sealing section 1200 is formed to substantially completely cover the magnet unit 42 where the magnets 91 and 92 are arranged in alignment with each other in the circumferential direction. Consequently, the positional relationship between the magnets 91 and 92 is fixed by the magnet sealing section 1200. In the present embodiment, the magnet sealing section 1200 is substantially cylindrical-shaped. As shown in FIG. 60, the magnet sealing section 1200 is fixed to the inner circumferential surface of the cylindrical portion 43 that serves as a field-system core member. Upon arrangement of the rotor 40 to face the stator 50, an inner circumferential surface of the magnet sealing section 1200 faces the stator coil 51. Hereinafter, the configuration of the magnet sealing section 1200 will be described in detail.

As shown in FIGS. 60 and 62, the magnet sealing section 1200 includes the inter-magnet members 1201 that are arranged between the circumferentially-adjacent magnets 91 and 92. It should be noted that FIG. 62 is a perspective view showing only the magnet unit 42 and the inter-magnet members 1201. The inter-magnet members 1201 are formed of an electrically insulative material. As shown in FIG. 60, the gaps 1202 between the circumferentially-adjacent magnets 91 and 92 are formed straight along the axial direction. The inter-magnet members 1201 are provided to respectively fill the gaps 1202. That is, the inter-magnet members 1201 are formed to extend respectively along the gaps 1202 in the axial direction.

Moreover, as shown in FIG. 60, the inter-magnet members 1201 are formed straight to radially extend from the magnet holder side to the rotation center, i.e., to the stator side. In addition, the inter-magnet members 1201 have a constant circumferential width.

Furthermore, as shown in FIG. 60, each of the inter-magnet members 1201 is provided to abut, at its circumferential ends, those end surfaces of the magnets 91 and 92 which face the inter-magnet member 1201. The circumferential width of the inter-magnet members 1201 is set to a predetermined value. That is, the inter-magnet members 1201 have a circumferential width such that they engage with the end surfaces of the magnets 91 and 92 to function as a rotational-displacement stopper of the magnets 91 and 92.

Each of the gaps 1202 between the magnets 91 and 92 is located closer to the q-axis that represents the boundaries between the magnetic poles of the magnet unit 42, more particularly along the q-axis in the present embodiment. That is, each of the inter-magnet members 1201 is located closer to the q-axis than to the d-axis.

As shown in FIGS. 61, 63 and 64, the magnet sealing section 1200 includes a pair of end plates 1203 that are located respectively at opposite axial ends of the magnet unit 42 to respectively cover opposite axial end surfaces of the magnet unit 42. Each of the end plates 1203 is formed as an annular plate. Moreover, each of the end plates 1203 has an outer diameter substantially equal to the inner diameter of the cylindrical portion 43 and an inner diameter less than or equal to the inner diameter of the magnet unit 42. The end plates 1203 are provided to sandwich the magnet unit 42 from both the axial sides thereof. Consequently, axial displacement of the magnet unit 42 is restricted by the end plates 1203.

As shown in FIGS. 62 and 64, the axial length of the inter-magnet members 1201 is set to be larger than the axial length of the magnet unit 42. Moreover, each of the inter-magnet members 1201 has opposite axial ends thereof fixed respectively to the end plates 1203. That is, the inter-magnet members 1201 are formed integrally with the end plates 1203 into one piece. In other words, each of the inter-magnet members 1201 is formed to extend along the axial direction so as to connect the end plates 1203 arranged respectively on opposite axial sides of the magnet unit 42.

Moreover, axial ends of the circumferentially-adjacent inter-magnet members 1201 are connected with each other by the end plates 1203. In other words, the end plates 1203 are formed to extend along the circumferential direction so as to connect the axial ends of the circumferentially-adjacent inter-magnet members 1201 with each other.

As shown in FIGS. 60, 61 and 64, the magnet sealing section 1200 includes an insulating layer 1204 that is formed to cover the outer circumferential surface (or the magnet holder 41-side circumferential surface, i.e., the non-armature-side circumferential surface) of the magnet unit 42 which is located on the radially outer side. That is, with the insulating layer 1204 covering the outer circumferential surface of the magnet unit 42, the magnet sealing section 1200 is fixed, together with the magnet unit 42, to the cylindrical portion 43 of the magnet holder 41. In other words, the magnet unit 42 is fixed to the cylindrical portion 43 via the insulating layer 1204 in the radial direction of the rotor 40. The insulating layer 1204 is radially interposed between the inner circumferential surface of the cylindrical portion 43 and the outer peripheral surfaces of the magnets 91 and 92.

More specifically, the insulating layer 1204 has its inner circumferential surface provided along the outer circumferential surface of the magnet unit 42 so as to cover the outer circumferential surface. Moreover, the insulating layer 1204 has its outer circumferential surface provided along the inner circumferential surface of the cylindrical portion 43. That is, the insulating layer 1204 is formed in a cylindrical shape between the cylindrical portion 43 and the magnet unit 42. Moreover, to the inner circumferential surface of the insulating layer 1204, there are fixed the inter-magnet members 1201. That is, the inter-magnet members 1201 are provided to radially extend from the inner circumferential surface of the insulating layer 1204. In addition, in the present embodiment, the insulating layer 1204 is formed integrally with the inter-magnet members 1201 into one piece.

Moreover, as shown in FIGS. 61, 63 and 64, the insulating layer 1204 has opposite axial ends thereof fixed respectively to outer edges of the end plates 1203. That is, the insulating layer 1204 is provided along the outer edges of the end plates 1203 to connect the end plates 1203 in the axial direction. In addition, in the present embodiment, the insulating layer 1204 is also formed integrally with the end plates 1203 into one piece.

As shown in FIGS. 60, 63 and 64, the magnet sealing section 1200 has openings 1205 that open to the radially inner side so as to have the stator-side peripheral surfaces (or the armature-side peripheral surfaces) of the magnets 91 and 92 exposed to the stator coil 51. That is, the magnet sealing section 1200 is configured so as not to cover the stator-side peripheral surfaces of the magnets 91 and 92; and thus there is no insulating member between the magnets 91 and 92 and the stator coil 51.

Moreover, the magnet sealing section 1200 has its stator-side circumferential surface (i.e., opening peripheral surface) radially located on the non-stator side (i.e., the cylindrical portion side or the radially outer side) of the stator-side circumferential surface of the magnet unit 42. More specifically, radially inner peripheral surfaces 1201a of the inter-magnet members 1201 are radially located on the magnet holder 41 side of the stator-side circumferential surface of the magnet unit 42. That is, the magnets 91 and 92 radially protrude from the inter-magnet members 1201 to the stator 50 side. In the present embodiment, the radial thickness of the inter-magnet members 1201 is set to be smaller (or thinner) than the radial thickness of the magnets 91 and 92.

According to the fifth embodiment, it is possible to achieve the following advantageous effects.

In the present embodiment, the magnet unit 42 is constituted of the magnets 91 and 92. Between the circumferentially-adjacent magnets 91 and 92, there are arranged the inter-magnet members 1201 that are formed of an electrically-insulative material. Consequently, it becomes possible to suppress eddy current from flowing between the circumferentially-adjacent magnets 91 and 92, thereby suppressing eddy current loss.

Moreover, the circumferential end surfaces of the magnets 91 and 92 are arranged to respectively abut the inter-magnet members 1201 provided between the magnets 91 and 92. The inter-magnet members 1201 have such a width as to function as a rotational-displacement stopper of the magnets 91 and 92. Consequently, it becomes possible to enable the inter-magnet members 1201 to function as a rotational-displacement stopper of the magnets 91 and 92 while electrically insulating between the magnets 91 and 92. Accordingly, it becomes possible to prevent the magnets 91 and 92 from being displaced in the circumferential direction and thereby causing contact between the circumferentially-adjacent magnets 91 and 92; thus it becomes possible to suitably perform electrical insulation between the magnets 91 and 92.

In the case of providing the inter-magnet members 1201 (or the gaps 1202), which have such a width as to function as a rotational-displacement stopper, along the d-axis, it would become easier for the magnetic flux density on the d-axis to be lowered in comparison with the case of providing the same along the q-axis. In view of the above, in the present embodiment, the inter-magnet members 1201 are provided on the q-axis side of the magnets 91 and 92. That is, the gaps 1202 between the magnets 91 and 92 are provided along the q-axis.

With the gaps 1202 provided along the q-axis in the magnet unit 42, it becomes easy for magnetic flux density to be lowered on the q-axis. However, even if magnetic flux density is lowered on the q-axis, the influence on the torque is smaller than in the case of magnetic flux density being lowered on the d-axis. Moreover, by lowering magnetic flux density on the q-axis, it becomes possible to suppress sharp change in magnetic flux in the vicinity of the q-axis. Further, by suppressing sharp change in magnetic flux in the vicinity of the q-axis, it becomes possible to suppress eddy current from being induced in the stator coil 51.

In the present embodiment, the magnet unit 42 has the easy axes of magnetization thereof oriented such that at locations closer to the d-axis, the directions of the easy axes of magnetization are more parallel to the d-axis than at locations closer to the q-axis; the d-axis represents the centers of the magnetic poles of the magnet unit 42 while the q-axis represents the boundaries between the magnetic poles. More specifically, the magnets 91 and 92 are oriented to form the arc-shaped magnet magnetic paths such that the directions of the easy axes of magnetization are parallel or near parallel to the d-axis in the d-axis-side portions and perpendicular or near perpendicular to the q-axis in the q-axis-side portions. Consequently, the magnet magnetic flux on the d-axis is intensified and magnetic flux change in the vicinity of the q-axis is suppressed. As a result, it becomes possible to increase the torque while reducing eddy current loss in the stator coil 51.

Moreover, with employment of the magnets 91 and 92 as above, in the case of providing the inter-magnet members 1201, which have such a width as to function as a rotational-displacement stopper, on the q-axis side, the lowering of magnetic flux density can be more effectively suppressed than in the case of providing the same on the d-axis side. More specifically, with the arc-shaped magnet magnetic paths formed as shown in FIG. 60, in the case of providing the gaps 1202 on the q-axis side, it is more difficult for the magnet magnetic paths to be shortened and thus the lowering of magnetic flux density can be more effectively suppressed than in the case of providing the same on the d-axis side.

In the present embodiment, the openings 1205 are formed in the magnet sealing section 1200 so as to have the stator-side circumferential surface of the magnet unit 42 exposed to the stator coil 51. That is, the magnet sealing section 1200 is configured so as not to cover the stator-side peripheral surfaces of the magnets 91 and 92. Consequently, there is no insulating member between the magnets 91 and 92 and the stator 50; thus it becomes possible for magnetic flux to flow therebetween without any hindrance thereto. Moreover, without any insulating member provided between the magnets 91 and 92 and the stator 50, it becomes possible to reduce the air gap between the magnets 91 and 92 and the stator 50 in comparison with the case of providing an insulating member therebetween.

In general, an insulating member formed of a synthetic resin or the like has a higher expansion coefficient (or coefficient of linear expansion) than the magnets 91 and 92. For example, the magnets 91 and 92 have a coefficient of linear expansion not much different from the coefficient of linear expansion of steel formed of Nd—Fe—B and Sm—Fe—N. That is, the magnets 91 and 92 have a higher coefficient of linear expansion than a resin. In the present embodiment, in consideration of the expansion coefficients as above, the stator-side peripheral surfaces of the inter-magnet members 1201 are located on the non-stator side (i.e., the radially outer side) of the stator-side peripheral surfaces of the magnets 91 and 92. That is, the magnets 91 and 92 are configured to radially protrude from the inter-magnet members 1201 to the stator side. Consequently, the radial thickness of the inter-magnet members 1201 becomes smaller than the radial thickness of the magnets 91 and 92. As a result, when thermal expansion occurs, the inter-magnet members 1201 can be prevented from protruding from the magnets 91 and 92 to the stator side and thus from becoming a hindrance to rotation.

In the present embodiment, between the cylindrical portion 43 of the magnet holder 41 and the magnets 91 and 92, there is provided the insulating layer 1204. Consequently, it becomes possible to suppress eddy current from flowing between the magnets 91 and 92 and the magnet holder 41. As a result, it becomes possible to suppress eddy current loss in the rotor 40.

Moreover, in the case of the rotating electric machine 10 being of an outer rotor type, the insulating layer 1204 provided between the inner circumferential surface of the cylindrical portion 43 and the outer peripheral surfaces of the magnets 91 and 92 can function as a damper. Consequently, even when centrifugal force is generated in the magnets 91 and 92, with the insulating layer 1204, it is still possible to prevent the magnets 91 and 92 from making contact with the cylindrical portion 43, thereby reliably performing electrical insulation between the magnets 91 and 92 and the cylindrical portion 43. In addition, it is also possible to suppress occurrence of chipping and/or cracking in the magnets 91 and 92.

In the present embodiment, the magnet sealing section 1200 includes the pair of annular end plates 1203 arranged respectively on opposite axial sides of the magnet unit 42; and each of the inter-magnet members 1201 adjacent to one another in the circumferential direction has its axial ends fixed respectively to the pair of end plates 1203. Consequently, with the end plates 1203, it becomes possible to enhance the strength of the inter-magnet members 1201, thereby suitably preventing rotational displacement of the magnets 91 and 92.

Moreover, the magnet sealing section 1200 is formed to substantially completely cover the magnets 91 and 92; and the plurality of inter-magnet members 1201, the pair of end plates 1203 and the insulating layer 1204 are integrally formed into one piece. Consequently, compared to the case of forming these members separately from each other, it becomes possible to enhance the strength of the inter-magnet members 1201, thereby enabling the inter-magnet members 1201 to suitably function as a rotational-displacement stopper of the magnets 91 and 92. In addition, it also becomes possible to enhance the strength of the end plates 1203, thereby suitably preventing detachment of the magnets 91 and 92.

Modifications of Fifth Embodiment

In the second embodiment, there is provided no magnet sealing section 1200. As an alternative, in the second embodiment, a magnet sealing section 1200 may be provided as in the fifth embodiment.

In the tenth modification, there is provided no magnet sealing section 1200. As an alternative, in the rotating electric machine having the inner rotor structure (i.e., inner rotating structure) in the tenth modification, a magnet sealing section 1200 may be provided as in the fifth embodiment. Specifically, in the case of providing a magnet sealing section 1200 in the inner rotor type rotating electric machine, the inner diameter of a pair of end plates 1203 may be set to be substantially equal to the outer diameter of the cylindrical portion 43 (or the magnet holder 41); the outer diameter of the pair of end plates 1203 may be set to be smaller than or equal to the outer diameter of the magnet unit 42. Moreover, in the case of the magnet sealing section 1200 having an insulating layer 1204, the insulating layer 1204 may be formed to cover the inner circumferential surface (or the magnet holder 41-side circumferential surface, i.e., the non-armature-side circumferential surface) of the magnet unit 42 which is located on the radially inner side.

In the above-described embodiment, the magnet sealing section 1200 may be arbitrarily modified. For example, the insulating layer 1204 may be omitted from the magnet sealing section 1200. Moreover, one or both of the end plates 1203 may be omitted from the magnet sealing section 1200. Otherwise, the magnet sealing section 1200 may be formed to cover the stator-side circumferential surface of the magnet unit 42 as well. In the above-described embodiment, the inter-magnet members 1201 and the end plates 1203 are integrally formed into one piece. As an alternative, the inter-magnet members 1201 and the end plates 1203 may be formed separately from each other. Moreover, in the above-described embodiment, the inter-magnet members 1201 and the insulating layer 1204 are integrally formed into one piece. As an alternative, the inter-magnet members 1201 and the insulating layer 1204 may be formed separately from each other. Furthermore, in the above-described embodiment, the end plates 1203 and the insulating layer 1204 are integrally formed into one piece. As an alternative, the end plates 1203 and the insulating layer 1204 may be formed separately from each other.

In the above-described embodiment, the shape of the inter-magnet members 1201 may be arbitrarily modified. For example, the radial dimension of the inter-magnet members 1201 may be modified so that the inter-magnet members 1201 have the same thickness as the magnets 91 and 92 in the radial direction. Moreover, the circumferential width of the inter-magnet members 1201 may be set to be smaller (or shorter) than the circumferential width of the gaps 1002 between the magnets 91 and 92.

Figure 65:
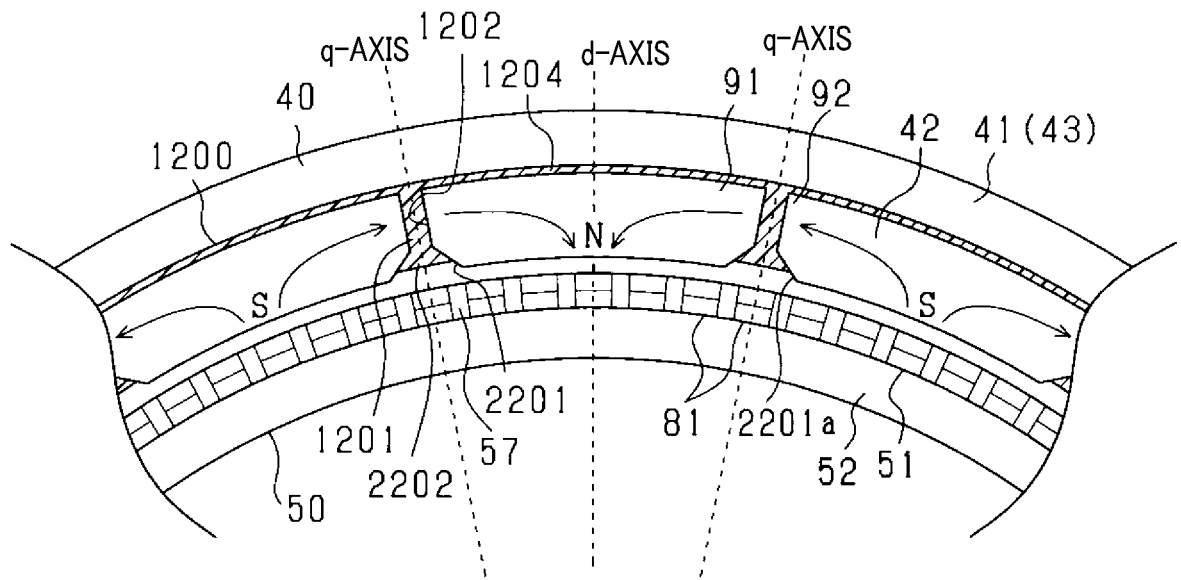
FIG. 65 is a transverse cross-sectional view showing a magnet sealing section in another example.
Figure 66:
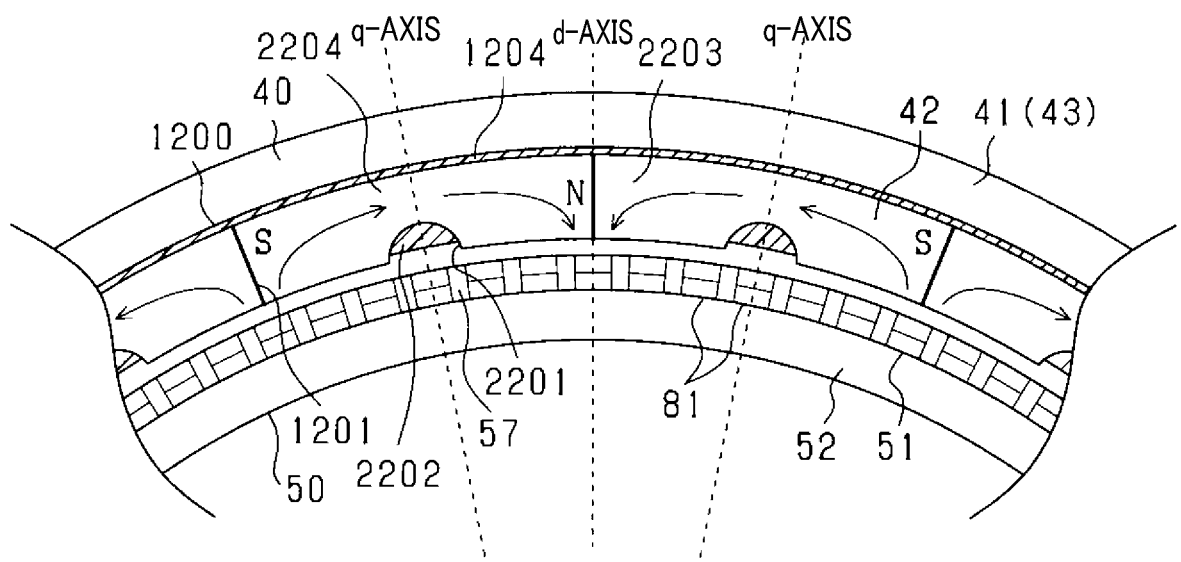
FIG. 66 is a transverse cross-sectional view showing a magnet sealing section in yet another example.

In the above-described embodiment, the shapes of the magnet sealing section 1200 and the magnet unit 42 may be arbitrarily modified. For example, as shown in FIGS. 65 and 66, in the stator-side circumferential surface (i.e., the armature-side circumferential surface) of the magnet unit 42, there may be formed recesses 2201 that open to the stator side. Moreover, the recesses 2201 may be located closer to the q-axis than to the d-axis. In addition, in FIGS. 65 and 66, the recesses 2201 are configured to open centering on the q-axis.

In the rotor 40 shown in FIG. 65, each of the gaps 1202 between the magnets 91 and 92 is formed to circumferentially expand, from an intermediate position in the radial direction, so as to form one of the recesses 2201 on the stator side. Specifically, the stator-side corners of the magnets 91 and 92 are chamfered to form oblique surfaces 2201a that are oblique (e.g., at an angle of 45°) to the radial direction; consequently, between each circumferentially-facing pair of the oblique surfaces 2201 of the magnets 91 and 92, there is formed one of the recesses 2201.

Moreover, as shown in FIGS. 65 and 66, the magnet sealing section 1200 may have engaging portions 2202 provided as insulating members respectively in the recesses 2201. Each of the engaging portions 2202 is formed to extend along the axial direction and has its axial ends fixed respectively to the end plates 1203.

In the magnet sealing section 1200 shown in FIG. 65, the circumferential widths of the inter-magnet members 1201 are increased along the recesses 2201 from the intermediate position in the radial direction, thereby forming the engaging portions 2202 respectively in the recesses 2201. The engaging portions 2202 radially engage with the magnets 91 and 92, thereby suppressing radially inward displacement, i.e., detachment of the magnets 91 and 92.

Moreover, in each of the magnets 91 and 92 shown in FIG. 65, the arc-shaped magnet magnetic paths are formed, as indicated with arrows, between the stator-side peripheral surface and the q-axis-side end surfaces in the circumferential direction. Therefore, at the q-axis-side ends, the magnet magnetic paths are shorter in stator-side portions of the magnets 91 and 92 than in non-stator-side portions (i.e., magnet-holder-side portions) of the magnets 91 and 92; thus, the stator-side portions may be more easily demagnetized than the non-stator-side portions. That is, the influence of removal of the stator-side portions of the magnets 91 and 92 at the q-axis-side ends on the magnetic flux density is small. On the other hand, removal of these portions has an advantageous effect of allowing reduction in the volume of the magnets. In view of the above, the recesses 2201 are provided on the q-axis side.

In the above-described embodiment, the gaps 1202 between the magnets may be provided on the d-axis. That is, the magnets constituting the magnet unit 42 may be configured to be divided (or separated) at the d-axis. For example, as shown in FIG. 66, the magnets 2203 and 2204 constituting the magnet unit 42 may be configured symmetrically with respect to the d-axis between the q-axis positions. In this case, in the magnets 2203 and 2204, as shown in FIG. 66, the arc-shaped magnet magnetic paths are formed which center on respective center points set on the q-axis and extend from one d-axis position to the other d-axis position so as to be convex radially outward. In addition, the magnetization directions of a first magnet 2203 and a second magnet 2204 are opposite to each other.

In the case of forming the recesses 2201 in the stator-side circumferential surface of the magnet unit 42, it is preferable to form the recesses 2201 on the q-axis side than on the d-axis, as shown in FIG. 66. This is because on the stator-side circumferential surface of the magnet unit 42, the density of the magnetic flux directed to the stator 50 is more easily influenced by d-axis-side portions of the magnets 2203 and 2204 than by q-axis-side portions of the same; therefore, it is undesirable to form the recesses 2201 in the d-axis-side portions. More specifically, if the recesses 2201 were formed in the stator-side circumferential surface of the magnet unit 42 on the d-axis side, the distance between the stator 50 and the magnet unit 42 would be increased on the d-axis side. In other words, the air gap between the stator 50 and the magnet unit 42 would be increased on the d-axis side. Consequently, the density of the magnetic flux directed to the stator 50 might be lowered. Moreover, if the recesses 2201 were formed on the d-axis side, the magnet magnetic paths of the magnets 2203 and 2204 would be shortened; consequently, the density of the magnetic flux directed to the stator 50 might be lowered. Accordingly, it is undesirable to form the recesses 2201 in the d-axis-side portions of the magnets 2203 and 2204. Hence, it is preferable to form the recesses 2201 on the q-axis side.

In addition, in the case of the recesses 2201 being provided on the q-axis side in the magnets 2203 and 2204, it becomes easy for the density of the magnetic flux directed to the stator coil 51 to be lowered on the q-axis. However, the lowering of the density of the magnetic flux directed to the stator coil 51 on the q-axis affects the torque less than the lowering of the density of the magnetic flux directed to the stator coil 51 on the d-axis does in the case of providing the recesses 2201 on the d-axis side. On the other hand, with the recesses 2201 provided on the q-axis side, it becomes possible to suppress sharp change in magnetic flux in the vicinity of the q-axis. Further, by suppressing sharp change in magnetic flux in the vicinity of the q-axis, it becomes possible to suppress eddy current from being induced in the stator coil 51.

Moreover, in the case of providing the gaps 1202 between the magnets 2203 and 2204 on the d-axis side, it is preferable to reduce the circumferential widths of the gaps 1202 and the inter-magnet members 1201 to such a degree as to be still capable of maintaining electrical insulation between the magnets 2203 and 2204. This is because if gaps having a large circumferential width were provided on the d-axis side, the magnetic flux density would be lowered. In addition, even when the circumferential widths of the gaps 1202 and the inter-magnet members 1201 are reduced as above, the engaging portions 2202 arranged in the recesses 2201 can engage with the magnets 2203 and 2204 in the circumferential direction, thereby functioning as a rotational-displacement stopper of the magnets 2203 and 2204.

In the magnet unit 42 of the above-described embodiment, the gaps 1202 may be provided on both the q-axis side and the d-axis side.

In the above-described embodiment, the inter-magnet members 1201 have such a circumferential width as to function as a rotational-displacement stopper of the magnets. However, the circumferential width of the inter-magnet members 1201 may be arbitrarily modified. For example, the circumferential width of the inter-magnet members 1201 may be reduced. In this case, it preferable for the circumferential width of the inter-magnet members 1201 to be reduced to such a degree as to be still capable of maintaining electrical insulation between the magnets 2203 and 2204.

Figure 67:
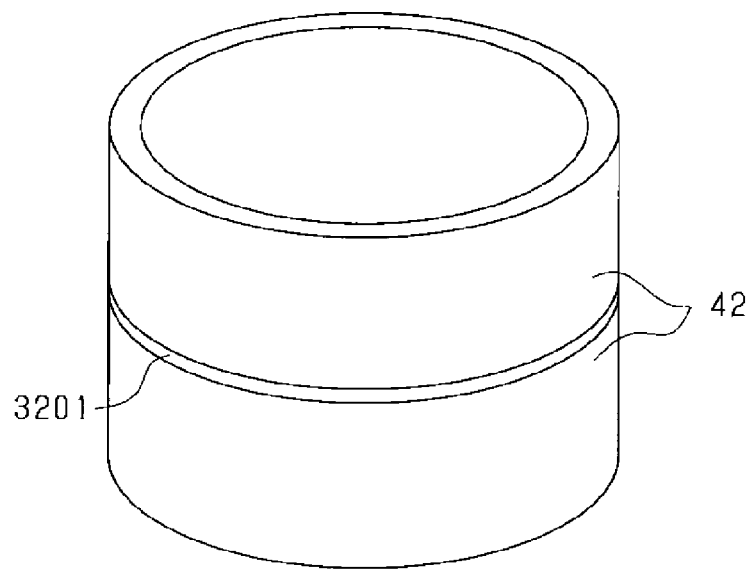
FIG. 67 is a perspective view showing magnets and an inter-magnet member in still another example.

In the above-described embodiment, the magnet unit 42 (i.e., the magnets 91 and 92) may be axially divided into a plurality of segments and insulating member(s) 3201 may be provided in axial gap(s) between the segments, as shown in FIG. 67. In this case, eddy current loss occurring in the magnets can be suppressed by an eddy current loss reduction method of cutting eddy current in the axial direction in the same manner as in general magnetic steel sheets.

In the above-described embodiment, for preventing detachment of the magnets 91 and 92, detachment prevention members, which are formed of a magnetic or nonmagnetic metal or a high-strength resin, may be provided on the stator-side peripheral surfaces of the magnets 91 and 92. In this case, in terms of suppressing eddy current loss in the detachment prevention members, it is preferable to employ a configuration of having a plurality of detachment prevention members staked in the axial direction.

In the above-described embodiments other than the fifth embodiment, there may also be provided a magnet sealing section 1200 as in the fifth embodiment. For example, in the case of the rotating electric machine having an inner rotor structure (i.e., inner rotating structure), the magnet sealing section 1200 can be provided in the same manner as described above.

In the above-described embodiments, of peripheral surfaces of the magnet unit 42, in the rotor-side circumferential surface (i.e., the field-system-side circumferential surface), there may be formed field-system-side recesses, which open to the rotor 40 side, along the axial direction. In this case, it is preferable for the field-system-side recesses to be formed closer to the d-axis than to the q-axis. That is, it is preferable for the field-system-side recesses to be formed in non-stator-side portions of the magnets at the d-axis. In the case of employing the above-described magnets 91 and 92 where the arc-shaped magnet magnetic paths are formed, these portions (i.e., the non-stator-side portions at the d-axis) may be easily demagnetized. Moreover, it is preferable to provide, in the magnet sealing section 1200, field-system-side engaging portions as insulating members so as to respectively fill the field-system-side recesses. In this case, the field-system-side engaging portions engage with the magnets 91 and 92 in the circumferential direction, thereby functioning as a rotational-displacement stopper of the magnets 91 and 92.

Sixth Embodiment

In the above-described embodiments, the magnetic field generated by the stator coil 51 passes through the magnet unit 42. During rotation of the rotor 40 relative to the stator 50, the magnetic field of the stator coil 51 from the viewpoint of the magnet unit 42 is a wave-like alternating magnetic field; therefore eddy current will be induced to flow in the magnet unit 42. Consequently, with the flow of eddy current therein, the temperature of the magnet unit 42 may be increased, thereby lowering the magnetic flux density and thus causing the torque to drop.

Moreover, in the rotating electric machines 10 according to the above-described embodiments, as the first measure, the slot-less structure is employed in the stator 50 and the SPM rotor is employed. As the third measure, the flat conductor structure is employed in which the radial thickness of the electrical conductors in the coil side part 53 of the stator coil 51 is reduced. Consequently, in the receiving space (i.e., the space between the stator core 52 and the magnet unit 42) on the stator 50 side, while the space factor of the electrical conductors 82 is increased, gaps through which air or the like can pass tend to be reduced. That is, it becomes difficult to increase such gaps on the stator 50 side and thereby improve the cooling performance in comparison with cases where a slot structure and/or round electrical conductors are employed. In other words, it becomes difficult to perform cooling of the magnet unit 42 by a cooling mechanism of the stator 50. In view of the above, in the present embodiment, the following configuration is employed to improve cooling performance in the magnet unit 42.

Figure 68:
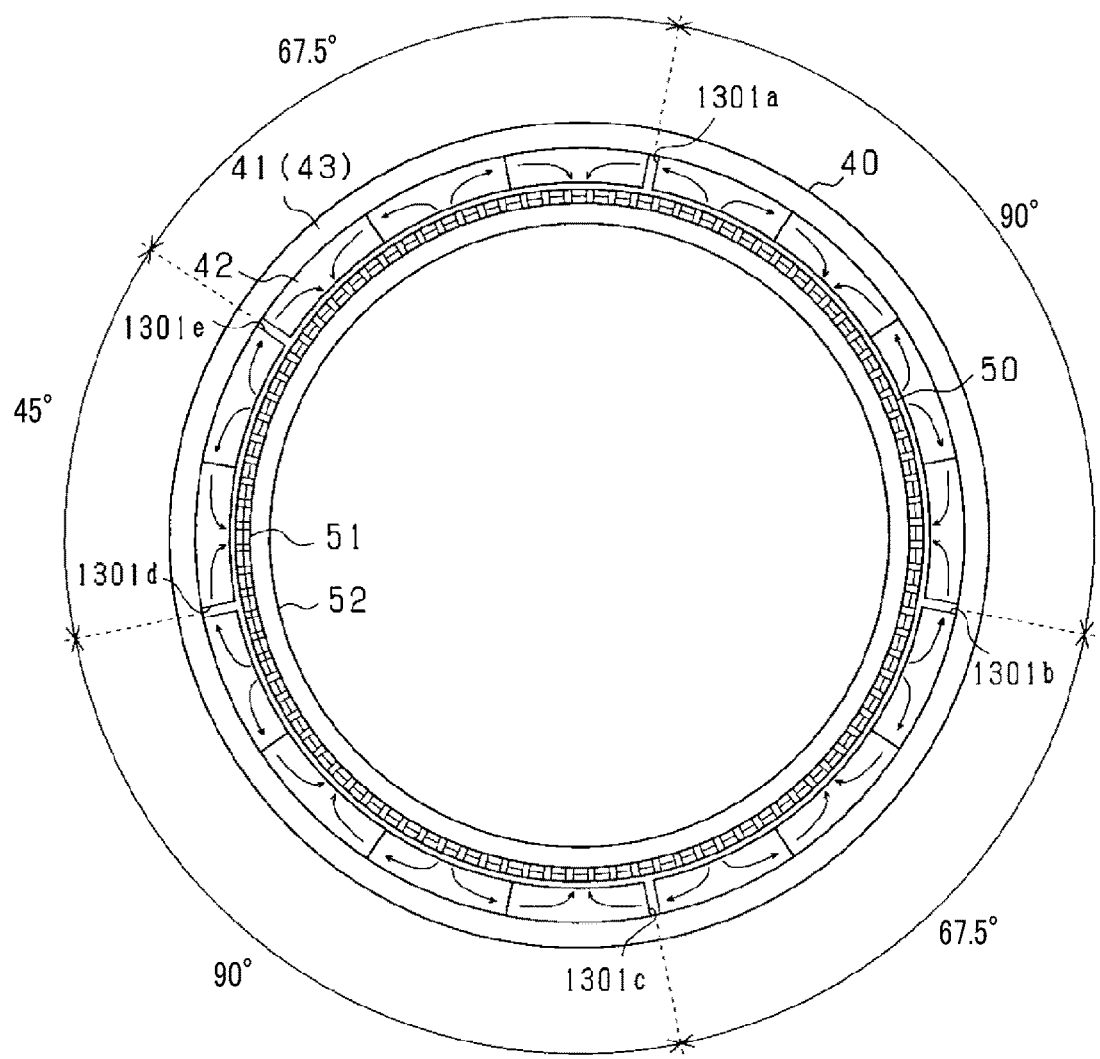
FIG. 68 is a transverse cross-sectional view of a rotor and a stator in a sixth embodiment.
Figure 69:
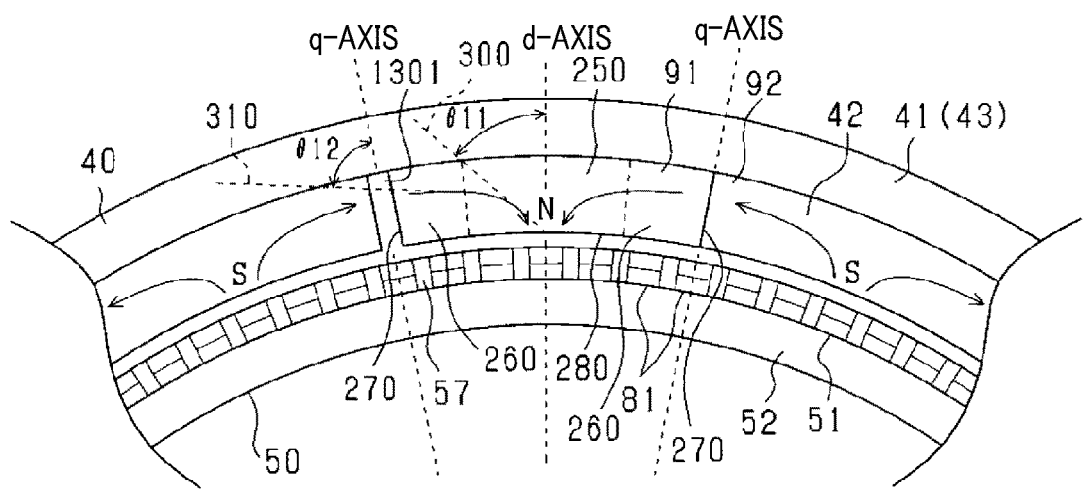
FIG. 69 is an enlarged view of part of FIG. 68.

The magnet unit 42 according to the sixth embodiment is constituted of a plurality of magnets 91 and 92 arranged in the circumferential direction. Moreover, as shown in FIGS. 68 and 69, the plurality of magnets 91 and 92 include magnets 91 and 92 each of which is spaced, on at least one of circumferential sides thereof, from an adjacent one of the magnets 91 and 92. Consequently, between the magnets 91 and 92, there are formed gaps 1301 each axially penetrating the magnet unit 42 in the axial direction. That is, after the magnets 91 and 92 are fixed to the cylindrical portion 43 and the rotor 40 is arranged to face the stator 50, there are formed the gaps 1301 as passages surrounded by the inner circumferential surface of the cylindrical portion 43, circumferential end surfaces 270 of the magnets 91 and 92 and the stator 50 (more specifically, the stator coil 51). The magnet unit 42 is cooled by fluid, such as air, flowing through the gaps 1301.

On the other hand, as described previously, in the magnet unit 42, it is desirable for the magnetic flux density distribution to be approximate to a sine waveform; and it is also desirable for the magnetic flux density on the d-axis to be as high as possible. Therefore, in the present embodiment, the magnets 91 and 92 are implemented by magnets with a polar anisotropic structure where: easy axes of magnetization are oriented such that at locations closer to the d-axis, the directions of the easy axes of magnetization are more parallel to the d-axis than at locations closer to the q-axis; and arc-shaped magnet magnetic paths are formed along the easy axes of magnetization. Here, the d-axis represents the centers of the magnetic poles of the magnet unit 42 while the q-axis represents the boundaries between the magnetic poles.

With employment of the above magnets 91 and 92, to make the magnetic flux density distribution approximate to a sine waveform and increase the magnetic flux density on the d-axis, it is desirable to arrange the magnets 91 and 92 in alignment with each other in the circumferential direction so as to minimize both the size and the number of gaps between the adjacent magnets 91 and 92. In addition, in the case of arranging radially-oriented magnets or parallel-oriented magnets in the circumferential direction without any gaps therebetween, the magnetic flux density changes sharply in the vicinity of the q-axis as shown in FIG. 18. Therefore, in the case of employing radially-oriented magnets or parallel-oriented magnets, the employed magnets are generally arranged at predetermined intervals in the circumferential direction.

In view of the above, in the magnet unit 42 according to the sixth embodiment, there are provided magnets 91 and 92 each of which abuts, on at least one of circumferential sides thereof, an adjacent one of the magnets 91 and 92 as well as magnets 91 and 92 each of which is spaced, on at least one of circumferential sides thereof, from an adjacent one of the magnets 91 and 92. That is, the gaps 1301 are not provided between all the magnets 91 and 92. Instead, in the magnet unit 42, there are provided both those magnets 91 and 92 which abut each other and those magnets 91 and 92 which are spaced from each other. Consequently, it becomes possible to improve the performance of cooling the magnet unit 42 while making the magnetic flux density distribution approximate to a sine waveform and suppressing the density of magnetic flux generated from the d-axis from being lowered.

Moreover, in the magnet unit 42 according to the sixth embodiment, each of the gaps 1301 is provided along the q-axis. The magnetic flux density on the q-axis is low since the magnetic flux density distribution in the magnet unit 42 is approximate to a sine waveform. Therefore, providing each of the gaps 1301 along the q-axis, it becomes possible to suppress the magnetic flux density from changing sharply in the vicinity of the q-axis. Moreover, by suppressing the magnetic flux density from changing sharply, it also becomes possible to suppress eddy current loss in the stator coil 51.

Hereinafter, the arrangement of the gaps 1301 will be described in more detail. In the present embodiment, the number of the gaps 1301 between the magnets 91 and 92 is set to a prime number different from the number of the magnetic poles and the number of phases. In the example shown in FIG. 68, there are five gaps 1301*a*-1301*e* provided respectively at five locations in the magnet unit 42. That is, in this example, the number of the gaps 1301 is set to 5 that is a prime number different from the number of the magnetic poles (i.e., 16) and the number of phases (i.e., 3). Moreover, the number of the locations (i.e., 5) where the gaps 1301*a*-1301*e* are respectively provided is different from any multiple of the number of the magnetic poles (i.e., 16) and any multiple of the number of phases (i.e., 3).

In the present embodiment, the gaps 1301*a*-1301*e* are arranged at unequal intervals in the circumferential direction. Specifically, as shown in FIG. 68, the interval between the gap 1301*a* and the gap 1301*b* adjacent to and offset clockwise from the gap 1301*a* is equal to 90°. The interval between the gap 1301*b* and the gap 1301*c* adjacent to and offset clockwise from the gap 1301*b* is equal to 67.5°. The interval between the gap 1301*c* and the gap 1301*d* adjacent to and offset clockwise from the gap 1301*c* is equal to 90°. The interval between the gap 1301*d* and the gap 1301*e* adjacent to and offset clockwise from the gap 1301*d* is equal to 45°. The interval between the gap 1301*e* and the gap 1301*a* adjacent to and offset clockwise from the gap 1301*e* is equal to 67.5°. With the above arrangement, it becomes possible to suppress resonance between the rotor 40 and the stator 50. It should be noted that in FIG. 68, the circumferential center positions of the gaps 1301*a*-1301*e* are designated by dashed lines.

It is preferable for the circumferential widths of the gaps 1301 to be as small as possible to the extent that fluid can flow through them. For example, the circumferential widths of the gaps 1301 may be set to be 0.5 mm-1.5 mm. Moreover, in the case of providing a plurality of gaps 1301 in the magnet unit 42, the circumferential widths of the gaps 1301 may be set to be different from each other.

Figure 70:
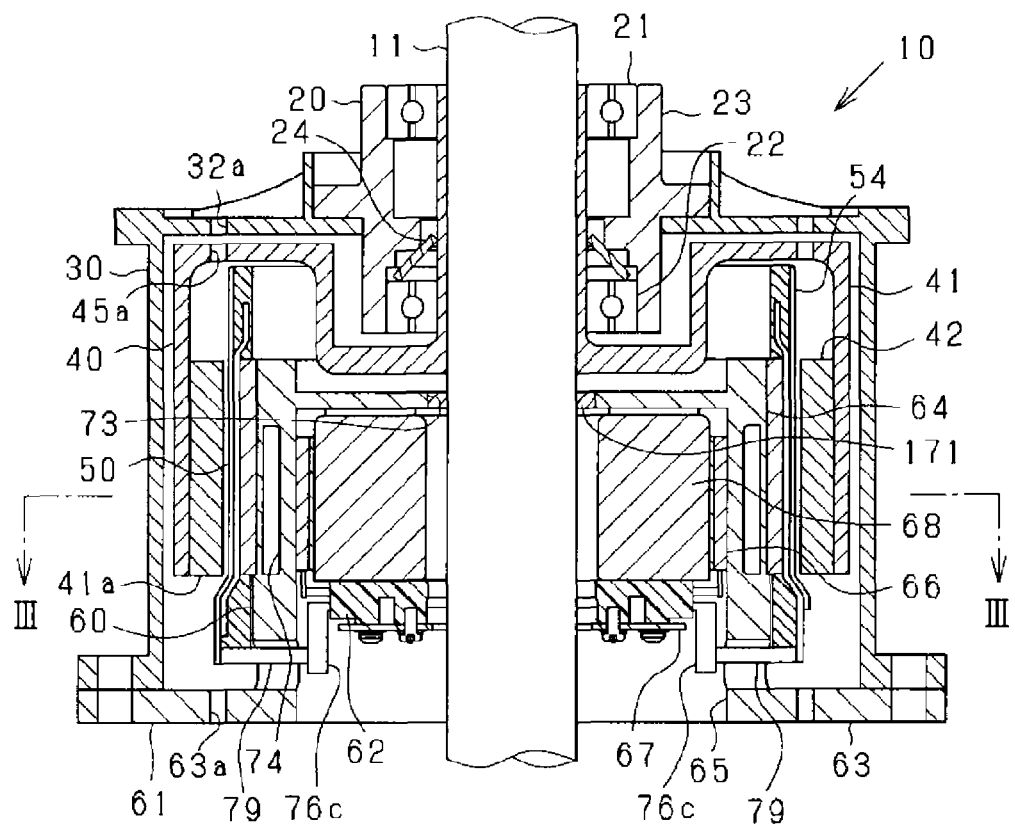
FIG. 70 is a longitudinal cross-sectional view of a rotating electric machine in the sixth embodiment.
Figure 71:
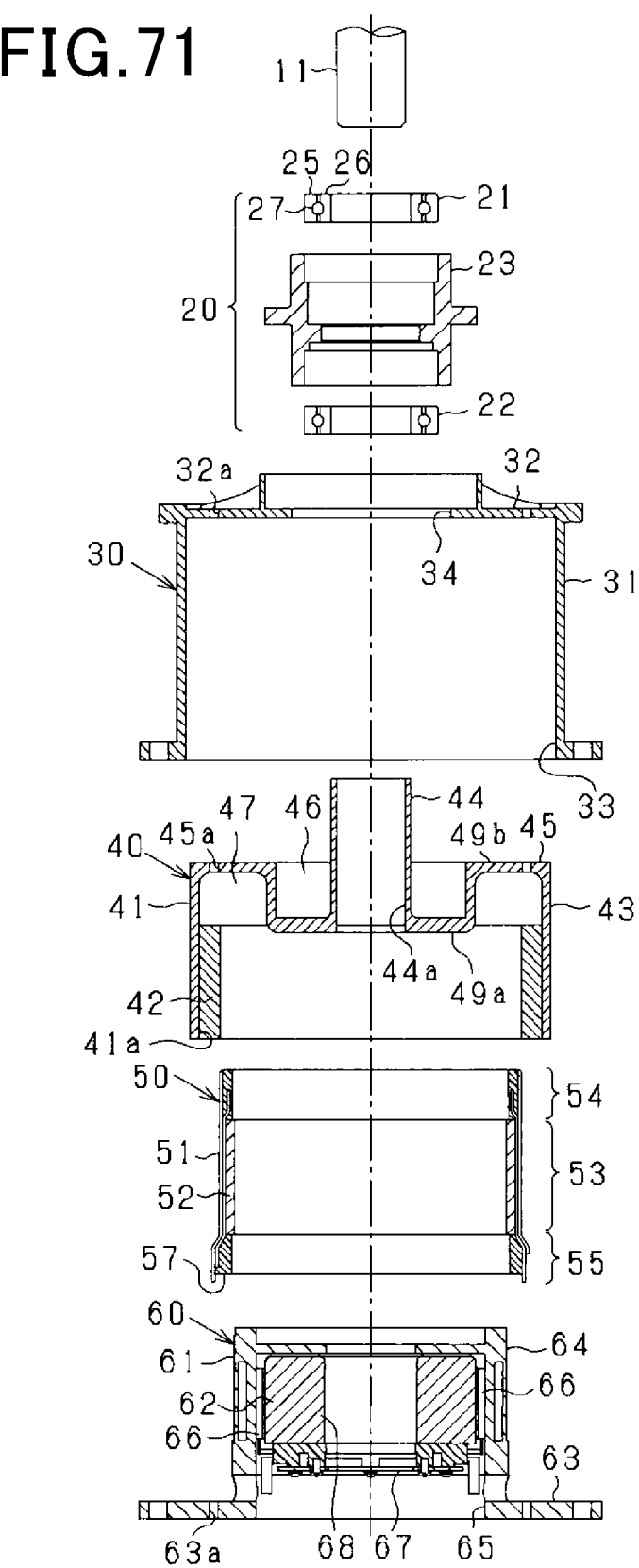
FIG. 71 is an exploded view of the rotating electric machine in the sixth embodiment.

As shown in FIGS. 70 and 71, in the end surface 32 of the housing 30, there are formed through-holes 32*a* to axially penetrate the end surface 32. Moreover, in the magnet holder 41, in the intermediate portion 45 connecting the cylindrical portion 43 and the attaching portion 44, there are formed through-holes 45*a* to axially penetrate the intermediate portion 45. The magnet holder 41 is cup-shaped to have an opening 41*a* that opens to the end plate 63 side. Moreover, in the end plate 63, there are formed through-holes 63*a* to axially penetrate the end plate 63. The through-holes 32*a*, 45*a* and 63*a* and the opening 41*a* of the magnet holder 41 are radially located close to the magnet unit 42. It is preferable that the through-holes 32*a*, 45*a* and 63*a* and the opening 41*a* of the magnet holder 41 are radially located within the range of the magnet unit 42. Moreover, the corresponding through-holes 32*a*, 45*a* and 63*a* are circumferentially located close to each other. It is preferable that the circumferential positions of the corresponding through-holes 32*a*, 45*a* and 63*a* are substantially coincident with each other.

Consequently, during rotation of the rotor 40, air from the axially outer side (i.e., the lower side in FIG. 70) of the end plate 63 flows, through the through-holes 63*a* of the end plate 63, the opening 41*a* of the magnet holder 41, the gaps 1301 in the magnet unit 42, the through-holes 45*a* of the intermediate portion 45 and the through-holes 32*a* of the end surface 32, to the axially outer side (i.e., the upper side in FIG. 70) of the housing 30. Alternatively, during rotation of the rotor 40, air from the axially outer side of the housing 30 flows, through the through-holes 32a of the end surface 32, the through-holes 45a of the intermediate portion 45, the gaps 1301 in the magnet unit 42, the opening 41a of the magnet holder 41 and the through-holes 63a of the end plate 63, to the axially outer side of the end plate 63. As a result, the magnet unit 42 is cooled.

According to the sixth embodiment, it is possible to achieve the following advantageous effects.

In the present embodiment, the magnet unit 42 employs the magnets 91 and 92 where: the easy axes of magnetization are oriented such that at locations closer to the d-axis, the directions of the easy axes of magnetization are more parallel to the d-axis than at locations closer to the q-axis; and the magnet magnetic paths are formed along the easy axes of magnetization. Here, the d-axis represents the centers of the magnetic poles of the magnet unit 42 while the q-axis represents the boundaries between the magnetic poles. With employment of the above magnets 91 and 92, to make the magnetic flux density distribution approximate to a sine waveform, it is desirable to arrange the magnets 91 and 92 in the circumferential direction so as to minimize gaps between the adjacent magnets 91 and 92. This is because by minimizing gaps between the adjacent magnets 91 and 92, the magnet magnetic paths can be lengthened, thereby increasing the magnetic flux density. However, if no gaps were provided between the adjacent magnets 91 and 92, there would be formed no passages (or flow paths) through which fluid, such as air, can flow in the axial direction. Consequently, the performance of cooling the magnet unit 42 would be lowered.

In view of the above, in the present embodiment, the magnets 91 and 92 constituting the magnet unit 42 include both those magnets 91 and 92 each of which abuts, on at least one of circumferential sides thereof, an adjacent one of the magnets 91 and 92 and those magnets 91 and 92 each of which is spaced, on at least one of circumferential sides thereof, from an adjacent one of the magnets 91 and 92. That is, the gaps 1301 are provided not between all the magnets 91 and 92. Instead, in the magnet unit 42, there are provided both those magnets 91 and 92 which abut each other and those magnets 91 and 92 which are spaced from each other. Consequently, it becomes possible to utilize the gaps 1301 provided between the adjacent magnets 91 and 92 as flow paths and thereby improve the performance of cooling the magnet unit 42 while making the magnetic flux density distribution approximate to a sine waveform.

Moreover, in the present embodiment, each of the gaps 1301 between the magnets 91 and 92 is provided along the q-axis. In the case of the magnetic flux density distribution being approximate to a sine waveform, the magnetic flux density becomes lowest at the q-axis. Therefore, providing each of the gaps 1301 along the q-axis, the influence of the gaps 1301 on the magnetic flux density distribution is small. Consequently, it becomes possible to suppress the torque from being lowered due to the gaps 1301. Moreover, it also becomes possible to suppress sharp change in the magnetic flux density, thereby suppressing eddy current loss (i.e., generation of heat) from occurring on the stator 50 side (e.g., in the stator coil 51).

If the number of the gaps 1301 between the magnets was set to be equal to the number of the magnetic poles or the number of phases, it might become easy for resonance to occur between the rotor 40 and the stator 50. In view of the above, in the present embodiment, the number of the gaps 1301 between the magnets is set to a prime number different from the number of the magnetic poles and the number of phases. Consequently, it becomes possible to suppress resonance from occurring between the rotor 40 and the stator 50. Moreover, since the number of the gaps 1301 is set to be different from any multiple of the number of the magnetic poles and any multiple of the number of phases, it becomes possible to more reliably suppress occurrence of resonance in comparison with the case of the number of the gaps 1301 being set to a multiple of the number of the magnetic poles or to a multiple of the number of phases.

Moreover, in the present embodiment, there are provided a plurality of gaps 1301 between the magnets 91 and 92; and the gaps 1301 are arranged in the circumferential direction such that not all the intervals between adjacent ones of the gaps 1301 are equal. Consequently, it becomes possible to more reliably suppress occurrence of resonance in comparison with the case of all the gaps 1301 being arranged at equal intervals in the circumferential direction.

Furthermore, in the present embodiment, the slot-less structure is employed in the stator 50. Consequently, it becomes possible to overcome torque limitation due to magnetic saturation. On the other hand, with employment of the slot-less structure, in the receiving space for receiving the electrical conductors 82, gaps are reduced while the space factor of the electrical conductors 82 is increased. That is, the cross-sectional areas of flow paths on the stator 50 side, through which fluid can flow, are reduced, thereby lowering the cooling performance. Therefore, in the present embodiment, the gaps 1301 are provided in the magnet unit 42 to serve as flow paths, thereby improving the cooling performance to compensate the cooling performance drop on the stator 50 side. As a result, in the rotating electric machine 10 as a whole, it becomes possible to maintain or even improve the performance of cooling the magnet unit 42.

In the present embodiment, the radial thickness of the electrical conductor groups 81 (i.e., the electrical conductors 82) is set to be smaller than the circumferential width of the electrical conductor groups 81 per phase in each magnetic pole. Consequently, it becomes possible to increase the torque while suppressing eddy current loss in the electrical conductors 82. On the other hand, with the above configuration, in the receiving space for receiving the electrical conductors 82, gaps are reduced while the space factor of the electrical conductors 82 is increased. That is, the cross-sectional areas of flow paths on the stator 50 side, through which fluid can flow, are reduced, thereby lowering the cooling performance. Therefore, in the present embodiment, the gaps 1301 are provided in the magnet unit 42 to serve as flow paths, thereby improving the cooling performance. As a result, in the rotating electric machine 10 as a whole, it becomes possible to maintain or even improve the performance of cooling the magnet unit 42.

Moreover, with the gaps 1301 provided between the magnets 91 and 92, it becomes difficult for eddy current to flow between the magnets 91 and 92. Consequently, it becomes possible to suppress eddy current loss and thus generation of heat in the magnets 91 and 92.

Seventh Embodiment

Figure 72:
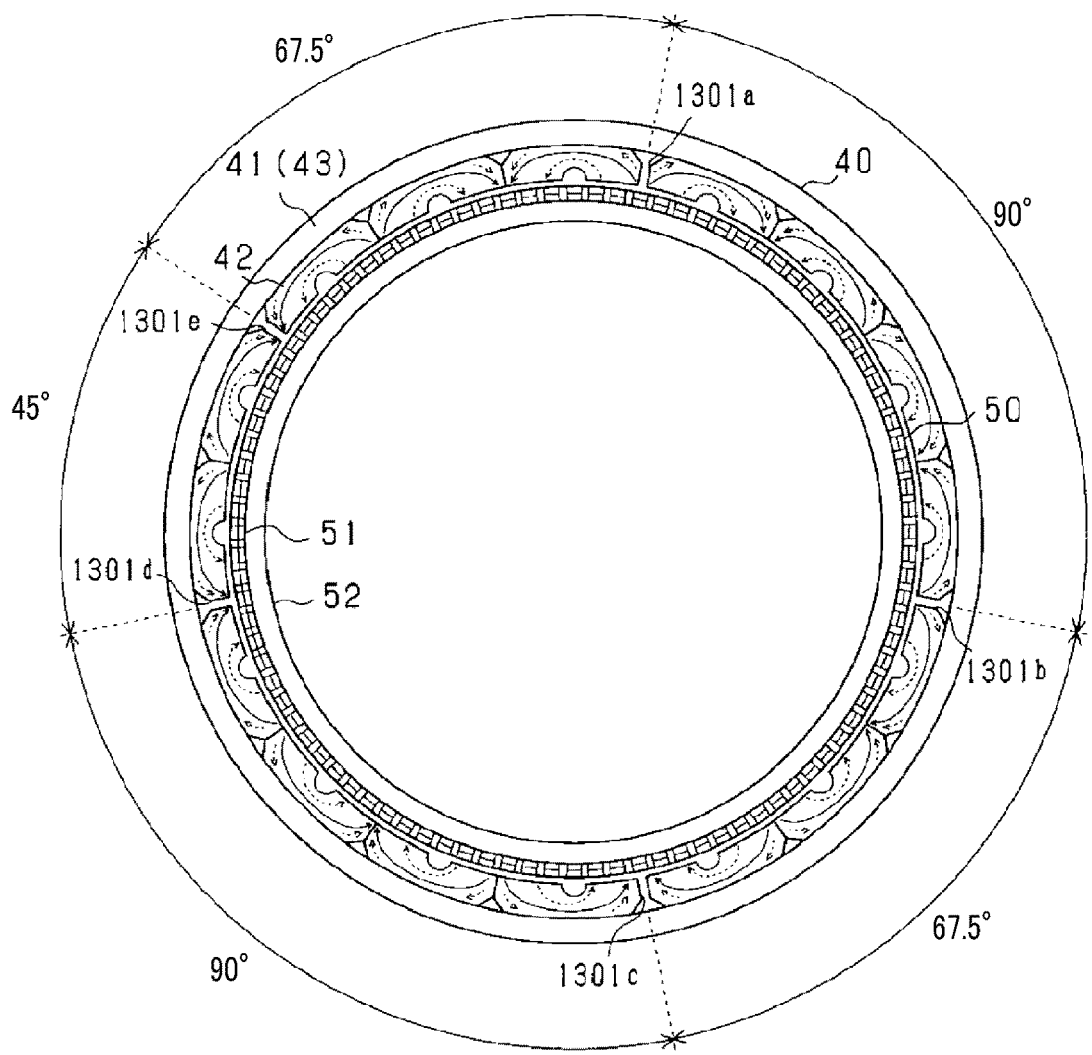
FIG. 72 is a transverse cross-sectional view of a rotor and a stator in a seventh embodiment.
Figure 73:
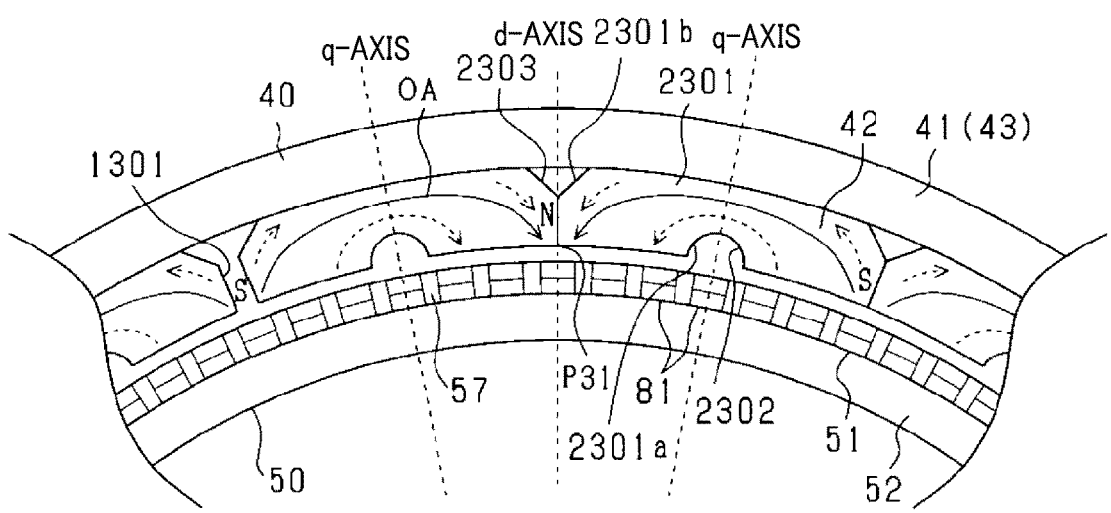
FIG. 73 is an enlarged view of part of FIG. 72.

In the seventh embodiment, the configuration of the magnet unit 42 according to the first embodiment is modified. Hereinafter, the configuration of the magnet unit 42 according to the seventh embodiment will be mainly described in detail. As shown in FIGS. 72 and 73, in the present embodiment, the magnet unit 42 has a plurality of magnets 2301 arranged in alignment with each other in the circumferential direction. The magnets 2301 have their respective easy axes of magnetization oriented such that at locations closer to the d-axis, the directions of the easy axes of magnetization are more parallel to the d-axis than at locations closer to the q-axis; and a plurality of arc-shaped magnet magnetic paths are formed along the easy axes of magnetization. Here, the d-axis represents the centers of the magnetic poles of the magnet unit 42 while the q-axis represents the boundaries between the magnetic poles.

Moreover, in the magnet unit 42, to make the polarities of the d-axis at each circumferentially-adjacent pair of d-axis positions different from each other, the magnetization directions (or polarization directions) of each circumferentially-adjacent pair of the magnets 2301 are set to be opposite (or inverse) to each other. That is, the polarization directions of each circumferentially-adjacent pair of the magnets 2301 are set to be different from each other so that in the circumferential direction, those d-axis positions on which the magnetic flux converges and where the polarity of the d-axis becomes N alternate with those d-axis positions from which the magnetic flux diverges and where the polarity of the d-axis becomes S.

The configuration of the magnets 2301 will be described in more detail. As shown in FIG. 73, in each of the magnets 2301, a plurality of arc-shaped magnet magnetic paths are formed which center on a center point set on the q-axis. The magnet magnetic paths include a magnet magnetic path on an orientation arc OA; the orientation arc OA centers on the center point and passes through a first intersection point P31 between the d-axis representing the magnetic pole center of the magnet 2301 and the stator-side peripheral surface (i.e., the armature-side peripheral surface) among the peripheral surfaces of the magnet 2301. In addition, it is preferable for the orientation arc OA to be set such that a tangent line to the orientation arc OA at the first intersection point P31 is near parallel to the d-axis.

Moreover, each of the magnets 2301 is provided to center on the q-axis and extend between two circumferentially-adjacent positions of the d-axis. In other words, each of the magnets 2301 is provided in an arc shape between one circumferentially-adjacent pair of the d-axis positions.

Consequently, in each of the magnets 2301, of the magnet magnetic paths of the magnet 2301, the magnet magnetic path on the orientation arc OA is longest. The further the magnet magnetic paths from the orientation arc OA, the shorter the magnet magnetic paths become. For example, in a q-axis-side portion of the magnet 2301, the magnet magnetic paths extending on the stator side (shown with a dashed line) are shorter than those extending on the non-stator side. Moreover, in d-axis-side portions of the magnet 2301, the magnet magnetic paths extending on the non-stator side (shown with dashed lines) are shorter than those extending on the stator side. In addition, the magnet magnetic paths (or the orientation arc OA) may have the shape of an arc which is a part of a perfect circle or a part of an ellipse. Moreover, though the center of the arc is set to be on the q-axis in the present embodiment, it may alternatively be set to be not on the q-axis.

The magnets 2301, each of which has the magnet magnetic paths formed therein as described above, are arranged in alignment with each other in the circumferential direction, thereby forming the magnet unit 42 in an annular shape. In addition, in the magnet unit 42 according to the seventh embodiment, there are provided both those magnets 2301 each of which abuts, on at least one of circumferential sides thereof, an adjacent one of the magnets 2301 and those magnets 2301 each of which is spaced, on at least one of circumferential sides thereof, from an adjacent one of the magnets 2301.

That is, gaps 1301 are provided between the circumferentially-adjacent magnets 2301. More specifically, the gaps 1301 are provided not between all the magnets 2301. Instead, in the magnet unit 42, there are provided both those magnets 2301 which abut each other and those magnets 2301 which are spaced from each other. Consequently, it becomes possible to improve the performance of cooling the magnet unit 42 while suppressing the density of magnetic flux generated from the d-axis from being lowered. In addition, in the present embodiment, as shown in FIG. 72, the number and the arrangement of the gaps 1301a-1301e are the same as described in the sixth embodiment; therefore repeated description thereof will be omitted hereinafter.

Moreover, in the present embodiment, as shown in FIGS. 72 and 73, in the magnet unit 42, there are further provided, in addition to the gaps 1301 between the magnets 2301, a plurality of flow paths 2302 and 2303 each of which is a passage axially penetrating the magnet unit 42. The cross-sectional areas of the flow paths 2302 and 2303 are set so as to allow fluid, such as air, to flow through them. The flow paths 2302 and 2303 are formed by modifying the shape of the magnet unit 42 according to the sixth embodiment.

Specifically, in the stator-side circumferential surface (i.e., the armature-side circumferential surface) of the magnet unit 42, there are formed first recesses 2301a along the axial direction. The first recesses 2301a open to the stator side. Moreover, each of the first recesses 2301a is located closer to the q-axis than to the d-axis. In the example shown in FIG. 73, each of the first recesses 2301a is configured to open centering on the q-axis. In this case, each of the first recesses 2301a is formed away from the orientation arc OA.

After the rotor 40 is arranged to face the stator 50, the stator 50 (i.e., the stator coil 51 and the like) is located inside the radially inner periphery of the magnet unit 42. Consequently, in the magnet unit 42, there are formed the flow paths 2302 which are defined by the first recesses 2301a and the stator 50.

In addition, as described above, in the q-axis-side portions of the magnets 2301, the magnet magnetic paths extending on the stator side (shown with the dashed lines) are shorter than those extending on the non-stator side. Moreover, those stator-side parts of the q-axis-side portions where the shorter magnet magnetic paths are formed may be easily demagnetized by the influence of an external magnetic field (e.g., the magnetic field from the stator coil 51). Therefore, forming the first recesses 2301a in the q-axis-side portions of the magnets 2301 on the stator side, the magnetic flux density on the d-axis is hardly affected (i.e., hardly lowered) by the first recesses 2301a.

In the non-stator-side circumferential surface (i.e., the non-armature-side circumferential surface) of the magnet unit 42, there are formed second recesses 2301b along the axial direction. The second recesses 2301b open to the non-stator side (i.e., the cylindrical portion 43 side). Moreover, each of the second recesses 2301b is located closer to the d-axis than to the q-axis. In the example shown in FIG. 73, each of the second recesses 2301b is configured to open centering on the d-axis. More specifically, the non-stator-side corners of the magnets 2301 are chamfered to form oblique surfaces that are oblique (e.g., at an angle of 45°) to the radial direction. Consequently, upon arrangement of the magnets 2301 in alignment with each other in the circumferential direction, in the magnet unit 42, there are formed the second recesses 2301*b* that center on the d-axis and open to the non-stator side.

After the magnet unit 42 is fixed to the inner circumferential surface of the cylindrical portion 43, there are formed, in the magnet unit 42, the flow paths 2303 which are defined by the second recesses 2301*b* and the inner circumferential surface of the cylindrical portion 43.

In addition, as described above, in the d-axis-side portions of the magnets 2301, the magnet magnetic paths extending on the non-stator side (shown with the dashed lines) are shorter than those extending on the stator side. Moreover, those non-stator-side parts of the d-axis-side portions where the shorter magnet magnetic paths are formed may be easily demagnetized by the influence of an external magnetic field (e.g., the magnetic field from the stator coil 51). Therefore, forming the second recesses 2301*b* in the d-axis-side portions of the magnets 2301 on the non-stator side, the magnetic flux density on the d-axis is hardly affected (i.e., hardly lowered) by the second recesses 2301*b*.

In the seventh embodiment, at each q-axis position, there is formed one flow path 2302. However, the number and the arrangement of the flow paths 2302 on the stator side may be arbitrarily modified. Moreover, in the seventh embodiment, at each d-axis position, there is formed one flow path 2303. However, the number and the arrangement of the flow paths 2303 on the non-stator-side may be arbitrarily modified. For example, the numbers of the flow paths 2302 and 2303 may be set to a prime number different from the number of the magnetic poles and the number of phases of the stator coil 51. Moreover, the numbers of the flow paths 2302 and 2303 may also be set to a prime number different from any multiple of the number of the magnetic poles and any multiple of the number of phases of the stator coil 51. Furthermore, the flow paths 2302 may be arranged in the circumferential direction such that not all the intervals between adjacent ones of the flow paths 2302 are equal; and the flow paths 2303 may be arranged in the circumferential direction such that not all the intervals between adjacent ones of the flow paths 2303 are equal. With the above arrangement, it becomes possible to suppress resonance between the rotor 40 and the stator 50.

According to the seventh embodiment, it is possible to achieve the following advantageous effects.

In the q-axis-side portions of the magnets 2301, it is easy for the magnet magnetic paths to become short on the stator side; thus it is easy for the q-axis-side portions to become demagnetized on the stator side. On the other hand, in the d-axis-side portions of the magnets 2301, it is easy for the magnet magnetic paths to become short on the non-stator side; thus it is easy for the d-axis-side portions to become demagnetized on the non-stator side. Therefore, the influence of removal of parts of the q-axis-side portions on the stator side and parts of the d-axis-side portions on the non-stator side on the density of magnetic flux generated from the d-axis is small.

In view of the above, in the present embodiment, the first recesses 2301*a* are formed in the q-axis-side portions of the magnets 2301 on the stator side; and the second recesses 2301*b* are formed in the d-axis-side portions of the magnets 2301 on the non-stator side. Moreover, each of the first recesses 2301*a* and the second recesses 2301*b* is formed along the axial direction. Consequently, after the magnets 2301 are fixed to the inner circumferential surface of the cylindrical portion 43 and the rotor 40 is arranged to face the stator 50, there are formed the flow paths 2302 and 2303 each axially penetrating the magnet unit 42. During rotation of the rotor 40, fluid, such as air, will flow through the flow paths 2302 and 2303, thereby cooling the magnet unit 42. As a result, it becomes possible to improve the performance of cooling the magnet unit 42.

In addition, as described above, since the first and second recesses 2301*a* and 2301*b* are formed respectively in those parts of the q-axis-side and d-axis-side portions of the magnets 2301 which may be easily demagnetized, the magnetic flux density is hardly affected by the first and second recesses 2301*a* and 2301*b*.

Consequently, it becomes possible to improve the performance of cooling the magnet unit 42 while suppressing the torque from being lowered. Moreover, it also becomes possible to suitably reduce the volume of the magnets of the magnet unit 42 while suppressing the torque from being lowered.

Modifications of Sixth and Seventh Embodiments

In the above-described embodiments, a resin coat may be provided around the magnets 91, 92, 131, 132 or 2301 to cover them. Consequently, with the resin coat, it will become possible to prevent eddy current from flowing between the adjacent magnets 91, 92, 131, 132 or 2301, thereby suppressing eddy current loss. That is, it becomes possible to suppress generation of heat in the magnet unit 42. In addition, in the case of providing a resin coat, it is preferable to cover only the non-stator-side peripheral surfaces and circumferential end surfaces of the magnets with the resin coat, so as to have the magnet unit 42 exposed on the stator side. With the stator-side peripheral surfaces of the magnets exposed, it will become possible to suppress the magnetic flux density from being lowered due to the resin coat; it will also become possible to reduce the air gap between the magnet unit 42 and the stator 50. In addition, the axial end surfaces of the magnet unit 42 may or may not be covered with the resin coat.

In the magnet unit 42 according to the sixth embodiment, the magnets 91 and 92 are divided at each q-axis position. Alternatively, the magnets 91 and 92 may be divided at each d-axis position. Moreover, the magnets 91 and 92 may be divided at each q-axis position and each d-axis position. On the other hand, in the magnet unit 42 according to the seventh embodiment, the magnets 2301 may be divided at each q-axis position. That is, the magnets of the magnet unit 42 may be divided at arbitrary positions in the circumferential direction.

In the above-described seventh embodiment, there are provided the gaps 1301 between the magnets 2301. Alternatively, there may be no gaps 1301 provided between the magnets 2301. Even in this case, it would still be possible to cool the magnet unit 42 by the flow paths 2302 and 2303. Moreover, in the seventh embodiment, of the flow paths 2302 and 2303, it is possible to provide only the stator-side flow paths 2302 or only the non-stator-side flow paths 2303 in the magnet unit 42.

Figure 74:
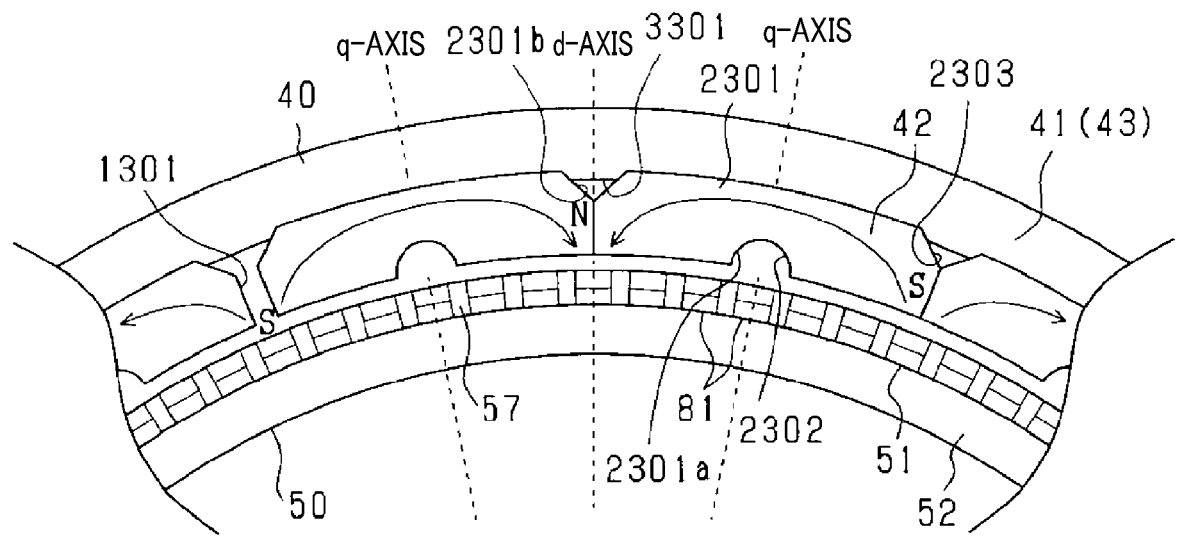
FIG. 74 is an enlarged transverse cross-sectional view of a rotor and a stator in another example.

In the above-described seventh embodiment, engaging portions may be provided in the cylindrical portion 43 to engage with the second recesses 2301*b* of the magnets 2301 in the circumferential direction. Specifically, in the example shown in FIG. 74, on the inner circumferential surface of the cylindrical portion 43, engaging portions 3301 are formed to radially protrude to the magnet unit 42 side. The engaging portions 3301 are configured to engage with opening portions of the second recesses 2301*b* in the circumferential direction. Moreover, the radial dimension (height) of the engaging portions 3301 is set to be smaller than the radial dimension (depth) of the second recesses 2301*b* so as not to completely fill the second recesses 2301*b* with the engaging portions 3301. Consequently, even with the engaging portions 3301 engaging with the second recesses 2301*b*, it still becomes possible to provide the flow paths 2303 in the magnet unit 42.

The engaging portions 3301 may be formed in at least part of the axial range of the magnet unit 42. For example, the engaging portions 3301 may be formed along the axial direction over the entire axial range of the magnet unit 42. Moreover, it is unnecessary to provide one engaging portion 3301 for each second recess 2301*b*. That is, the number of the engaging portions 3301 may be set to be smaller than the number of the second recesses 2301*b*. For example, the engaging portions 3301 may be provided at angular intervals of 90°.

Figure 75:
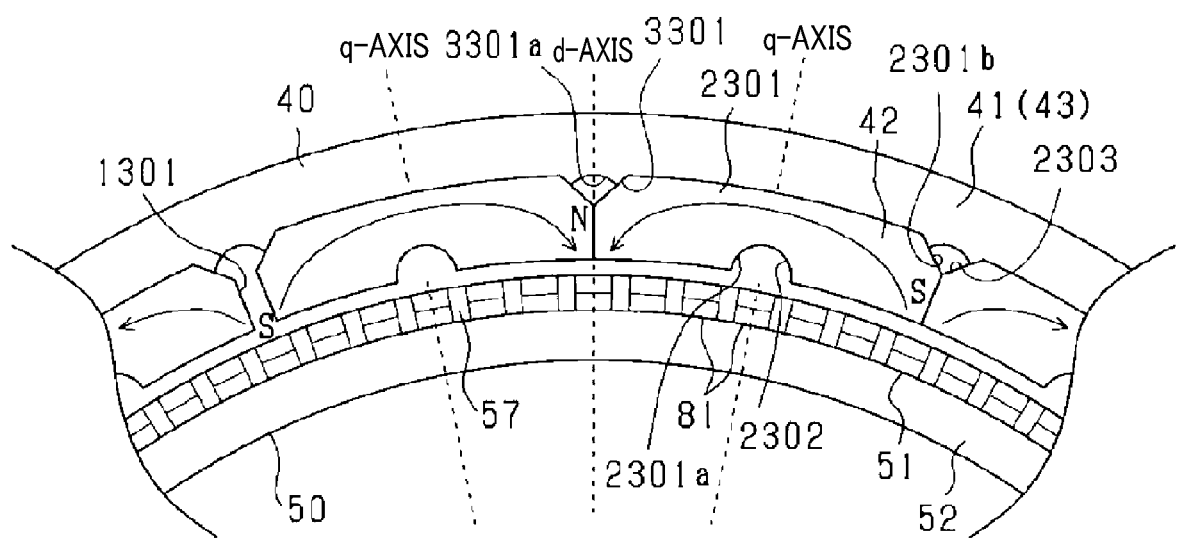
FIG. 75 is an enlarged transverse cross-sectional view of a rotor and a stator in yet another example.

In addition, as shown in FIG. 75, in each of the engaging portions 3301, there may be formed a groove 3301*a* along the axial direction; the groove 3301*a* opens to the stator side in the radial direction. In this case, the cross-sectional areas of the flow paths 2303 are increased, thereby making it possible to improve the cooling performance.

In the above-described embodiments, the position and shape of the through-holes 32*a* formed in the end surface 32 of the housing 30 may be arbitrarily modified. The through-holes 32*a* may alternatively be formed in the circumferential wall 31 of the housing 30. In this case, the through-holes 32*a* may be formed to radially penetrate the circumferential wall 31. Similarly, through-holes may be formed at arbitrary positions in the magnet holder 41 so as to allow fluid to flow through the through-holes. Still similarly, the position and shape of the through-holes 63*a* formed in the end plate 63 may be arbitrarily modified.

In the above-described embodiments, fluid which flows through the gaps 1301 and the flow paths 2302 and 2303 is not limited to gas such as air, but may be liquid.

In the above-described embodiments, a cooling fan may be provided in the rotor 40, thereby improving the cooling performance.

Eighth Embodiment

In the eighth embodiment, the configuration of the magnet unit 42 in the rotor 40 is modified. Hereinafter, the configuration of the magnet unit 42 according to the eighth embodiment will be mainly described in detail.

Figure 76:
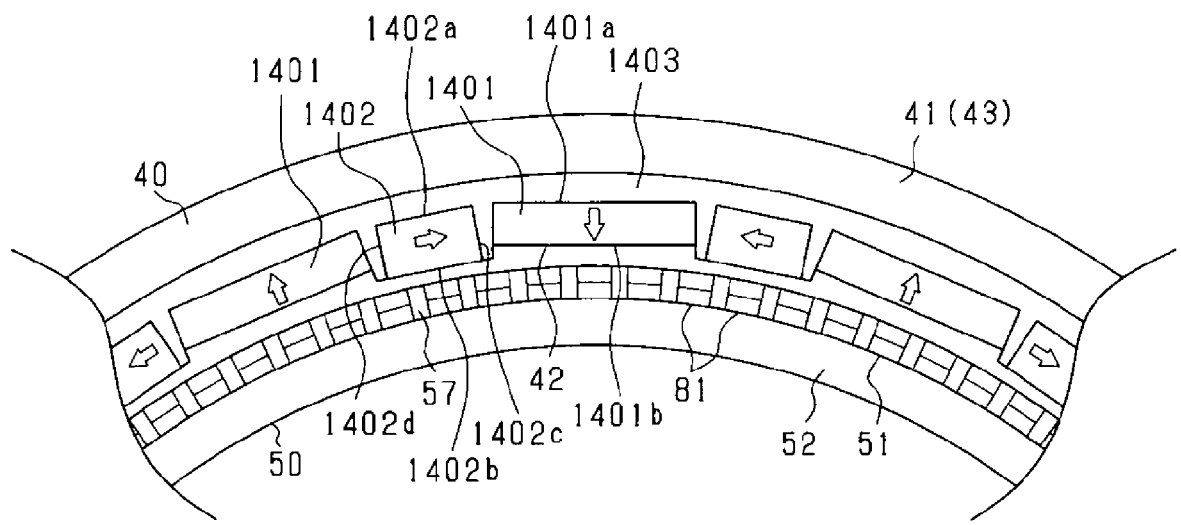
FIG. 76 is a transverse cross-sectional view of a rotor and a stator in an eighth embodiment.
Figure 77:
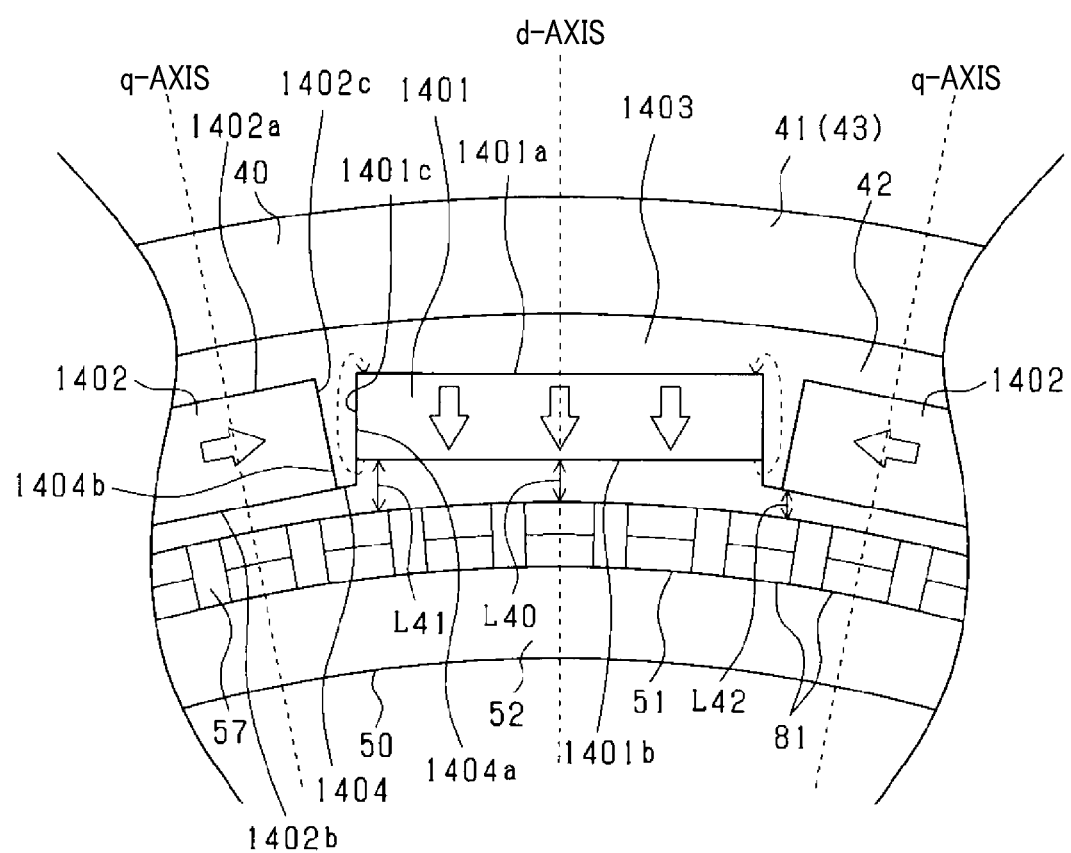
FIG. 77 is an enlarged view of part of FIG. 76.

As shown in FIGS. 76 and 77, in the present embodiment, the magnet unit 42 is configured with a magnet array called a Halbach array. It should be noted that FIG. 77 is an enlarged view of part of FIG. 76. Specifically, in the present embodiment, the magnet unit 42 includes first magnets 1401 each having its magnetization direction (or the direction of the magnetization vector thereof) coincident with a radial direction and second magnets 1402 each having its magnetization direction (or the direction of the magnetization vector thereof) coincident with the circumferential direction. The first magnets 1401 are arranged at predetermined intervals in the circumferential direction. Each of the second magnets 1402 is arranged between one circumferentially-adjacent pair of the first magnets 1401. In addition, the first and second magnets 1401 and 1402 are permanent magnets constituted of rare-earth magnets such as neodymium magnets.

Each of the magnets 1401 and 1402 is formed to have a rectangular cross-sectional shape. Moreover, each of the magnets 1401 and 1402 is arranged such that at a longitudinal center (i.e., circumferential center) of the magnet, a lateral direction of the magnet is coincident with the radial direction. In other words, each of the magnets 1401 and 1402 is arranged such that at the longitudinal center of the magnet, the longitudinal direction of the magnet is perpendicular to the radial direction.

In the eighth embodiment, the longitudinal length of the first magnets 1401 is set to be larger than the longitudinal length of the second magnets 1402. However, the longitudinal length of the first magnets 1401 may alternatively be set to equal to or smaller than the longitudinal length of the second magnets 1402. Moreover, in the eighth embodiment, each of the magnets 1401 and 1402 is arranged to have its longitudinal direction perpendicular to the radial direction. However, each of the magnets 1401 and 1402 may alternatively be arranged to have its lateral direction perpendicular to the radial direction.

Moreover, in the eighth embodiment, the lateral dimension (or thickness) of the second magnets 1402 is set to be larger than the lateral dimension (or thickness) of the first magnets 1401. All of the radial distances (or dimensions) from the stator 50 to the non-stator-side peripheral surfaces (i.e., the radially outer surfaces) 1401*a* and 1402*a* of the magnets 1401 and 1402 at the longitudinal centers thereof are set to be equal to each other. On the other hand, the radial distances (or dimensions) from the stator 50 to the stator-side peripheral surfaces (i.e., the radially inner surfaces) 1401*b* of the first magnets 1401 at the longitudinal centers thereof are set to be larger (or longer) than the radial distances (or dimensions) from the stator 50 to the stator-side peripheral surfaces (i.e., the radially inner surfaces) 1402*b* of the second magnets 1402 at the longitudinal centers thereof. That is, the air gaps from the first magnets 1401 to the stator 50 are larger than the air gaps from the second magnets 1402 to the stator 50.

The first magnets 1401 are arranged apart from each other in the circumferential direction so that the poles of the first magnets 1401 on the side facing the stator 50 (i.e., on the radially inner side) alternately become N poles and S poles in the circumferential direction. The second magnets 1402 are arranged adjacent to the first magnets 1401 in the circumferential direction so that the polarities of the second magnets 1402 alternate in the circumferential direction. In the magnet unit 42, with the alternate arrangement of the first magnets 1401 and the second magnets 1402, it becomes possible to increase the magnetic flux density in the first magnets 1401. Consequently, it becomes possible to cause one-side concentration of magnetic flux to occur in the magnetic unit 42, thereby intensifying magnetic flux on the side closer to the stator 50.

Moreover, in the eighth embodiment, the first magnets 1401 and the second magnets 1402 are spaced at predetermined intervals from each other in the circumferential direction. Consequently, as shown in FIG. 77, the d-axis representing the centers of the magnetic poles of the magnetic unit 42 coincides with the longitudinal centers of the first magnets 1401 while the q-axis representing the boundaries between the magnetic poles coincides with the longitudinal centers of the second magnets 1402. That is, the longitudinal centers of the first magnets 1401 are located on the d-axis while the longitudinal ends of the first magnets 1401 are located closer to the q-axis. In addition, in the present embodiment, the longitudinal centers of the magnets 1401 and 1402 correspond to the circumferential centers of the same; and the longitudinal ends of the magnets 1401 and 1402 correspond to the circumferential ends of the same.

With the above configuration, for each of the first magnets 1401, the radial air gap between the stator-side peripheral surface 1401*b* (i.e., the armature-side peripheral surface) of the first magnet 1401 and the rotor-side circumferential surface of the stator 50 gradually increases as the position becomes, from the d-axis representing the centers of the magnetic poles of the magnet unit 42, closer to the q-axis representing the boundaries between the magnetic poles. That is, the air gap (i.e., dimension L40) between the first magnet 1401 and the stator 50 on the d-axis (i.e., at the longitudinal center of the first magnet 1401) is smaller than the air gap (i.e., dimension L41) between the first magnet 1401 and the stator 50 on the q-axis side (i.e., at the longitudinal ends of the first magnet 1401). Moreover, the air gap increases as the position becomes closer to the q-axis (i.e., approaches the longitudinal ends of the first magnet 1401). With increase in the air gap, the density of the magnetic flux reaching the stator 50 is lowered. As a result, the surface magnetic flux density distribution of the magnet unit 42 becomes approximate to a sine waveform.

In each of the first magnets 1401, there are formed a plurality of straight magnet magnetic paths between the non-stator-side peripheral surface 1401*a* and the stator-side peripheral surface 1401*b* of the first magnet 1401; that one of the magnet magnetic paths which is formed at the longitudinal center of the first magnet 1401 becomes parallel to the radial direction. On the other hand, in each of the second magnets 1402, there are formed a plurality of straight magnet magnetic paths between the longitudinal end surfaces 1402*c* and 1402*d* of the second magnet 1402; the magnet magnetic paths become parallel to the circumferential direction at the longitudinal center of the second magnet 1402. That is, the magnet magnetic paths become perpendicular to the radial direction at the longitudinal center of the second magnet 1402. It should be noted that a direction parallel to the radial direction encompasses directions making acute angles with the radial direction. It also should be noted that a direction parallel to the circumferential direction encompasses directions making acute angles with the circumferential direction.

In each of the second magnets 1402 of the eighth embodiment, there may alternatively be formed arc-shaped magnet magnetic paths along the circumferential direction. On the other hand, in each of the first magnets 1401 of the eighth embodiment, there may alternatively be formed a plurality of magnet magnetic paths in a radial fashion. That is, each of the first magnets 1401 may alternatively be implemented by a radially-oriented magnet having magnet magnetic paths formed such that the closer the position to the q-axis, the more they become oblique to the lateral direction of the first magnet 1401.

In the eighth embodiment, the rotor 40 has a magnet holding portion 1403 that holds the magnets 1401 and 1402 and functions as a back core. The magnet holding portion 1403 is a field-system core member which is cylindrical-shaped and formed of a soft-magnetic material. The magnet holding portion 1403 is fixed to the inner circumferential surface of the cylindrical portion 43. Moreover, the magnet holding portion 1403 has the magnets 1401 and 1402 fixed to the inner circumferential surface thereof, thereby holding them. More specifically, the magnets 1401 and 1402 are fixed to the inner circumferential surface of the magnet holding portion 1403 so as to be spaced at predetermined intervals and aligned with each other in the circumferential direction. In the inner circumferential surface of the magnet holding portion 1403, there are provided planar mounting surfaces respectively for the magnets 1401 and 1402; and the non-stator-side peripheral surfaces 1401*a* and 1402*a* of the magnets 1401 and 1402 are respectively arranged to abut and fixed to the planar mounting surfaces. In this way, the magnets 1401 and 1402 have the magnet holding portion 1403 arranged in a stacked state on the non-stator side thereof.

Moreover, the magnet holding portion 1403 has protrusions 1404 formed to protrude radially inward from the inner circumferential surface thereof. Each of the protrusions 1404 is located between one circumferentially-adjacent pair of the magnets 1401 and 1402. That is, each of the protrusions 1404 is located between the d-axis and the q-axis.

Moreover, each of the protrusions 1404 is formed to taper from its proximal end to its distal end (i.e., radially inner end). Furthermore, each of the protrusions 1404 is formed over the entire axial range of the magnets 1401 and 1402.

Each of the protrusions 1404 has a circumferential end surface 1404*a* (i.e., first-magnet-side end surface) abutting a longitudinal end surface 1401*c* of an adjacent one of the first magnets 1401. More specifically, the circumferential end surface 1404*a* is formed to abut the longitudinal end surface 1401*c* of the adjacent first magnet 1401 from the non-stator-side peripheral surface 1401*a* to the stator-side peripheral surface 1401*b* of the adjacent first magnet 1401. In other words, the circumferential end surface 1404*a* is formed to abut the longitudinal end surface 1401*c* of the adjacent first magnet 1401 over the entire radial range of the longitudinal end surface 1401*c*.

Moreover, each of the protrusions 1404 also has a circumferential end surface 1404*b* (i.e., second-magnet-side end surface) abutting a longitudinal end surface 1402*c* of an adjacent one of the second magnets 1402. The circumferential end surface 1404*b* is formed to abut the longitudinal end surface 1402*c* of the adjacent second magnet 1402 in a similar manner to the circumferential end surface 1404*a* abutting the longitudinal end surface 1401*c* of the adjacent first magnet 1401. Consequently, the protrusions 1404 engage with the magnets 1401 and 1402 in the circumferential direction, thereby functioning as a rotational-displacement stopper of the magnets 1401 and 1402 during rotation of the rotor 40. In addition, in the present embodiment, the longitudinal end surfaces 1401*c* of the first magnets 1401 correspond to the circumferential end surfaces of the first magnets 1401; and the longitudinal end surfaces 1402*c* of the second magnets 1402 correspond to the circumferential end surfaces of the second magnets 1402.

As described above, in the eighth embodiment, the magnet holding portion 1403 abuts the non-stator-side peripheral surfaces 1401*a* and the longitudinal end surfaces 1401*c* of the first magnets 1401. That is, the magnet holding portion 1403 is formed to cover all the peripheral surfaces of the first magnets 1401 except for the stator-side peripheral surfaces 1401*b*. Consequently, at the longitudinal ends of the first magnets 1401, magnetic flux is self-short-circuited (or self-completed) between the stator-side peripheral surfaces 1401*b* and the non-stator-side peripheral surfaces 1401*a* of the first magnets 1401 through the protrusions 1404.

More specifically, as shown in FIG. 77, the longitudinal end surfaces 1401*c* of the first magnets 1401 respectively abut the protrusions 1404 that are formed of a soft-magnetic material. Consequently, at the longitudinal ends of the first magnets 1401, at least part of magnetic flux generated from the stator-side peripheral surfaces 1401*b* of the first magnets 1401 (i.e., in the case of the stator-side peripheral surfaces 1401*b* forming N poles) is guided by the protrusions 1404, which have low magnetic reluctance, to flow through the protrusions 1404 to the non-stator-side peripheral surfaces 1401*a* of the first magnets 1401, thereby being self-completed (or short-circuited). It should be noted that in FIG. 77, the flow of the magnetic flux is illustrated with dashed lines. Moreover, in the case of the stator-side peripheral surfaces 1401b forming S poles, magnetic flux is also self-short-circuited in a similar manner to the above-described case. Therefore, it becomes easy for the density of the magnetic flux directed to the stator 50 to be lowered as the position approaches the longitudinal ends of the first magnets 1401 (i.e., the q-axis side) from the longitudinal centers of the first magnets 1401 (i.e., from the d-axis). As a result, the surface magnetic flux density distribution of the magnet unit 42 becomes approximate to a sine waveform.

Moreover, in the eighth embodiment, the protrusions 1404 are formed to have their respective distal ends protruding radially inward from the first magnets 1401. That is, the distances (i.e., dimension L42) from the stator 50 to the distal ends of the protrusions 1404 are shorter than the distances (i.e., dimension L40) from the stator 50 to the stator-side peripheral surfaces 1401b of the first magnets 1401. In addition, the distances from the stator 50 to the stator-side peripheral surfaces 1401b of the first magnets 1401 at the longitudinal centers of the first magnets 1401 are different from those at the longitudinal ends of the first magnets 1401; and the distances (i.e., dimension L40) at the longitudinal centers of the first magnets 1401 are used for the above comparison.

On the other hand, the distances from the stator 50 to the distal ends of the protrusions 1404 are substantially equal to the distances from the stator 50 to the stator-side peripheral surfaces (i.e., the radially inner surfaces) 1402b of the second magnets 1402. In addition, the distances from the stator 50 to the stator-side peripheral surfaces 1402b of the second magnets 1402 at the longitudinal centers of the second magnets 1402 are different from those at the longitudinal ends of the second magnets 1402; and the distances at the longitudinal ends of the second magnets 1402 are used for the above comparison.

As above, arranging the protrusions 1404, which can function as an iron core, between the d-axis and the q-axis, inductance is increased in the protrusions 1404. Consequently, it becomes possible to realize inverse saliency in the protrusions 1404, thereby making it possible to perform field-weakening control and increase the reluctance torque.

Moreover, with the magnet magnetic paths of the second magnets 1402 oriented in the circumferential direction, it becomes easy to guide the magnetic flux from the stator 50 to the q-axis. Consequently, though the rotor 40 is an SPM rotor, it still becomes possible to realize inverse saliency and thereby output reluctance torque. As a result, it becomes possible to realize high-speed rotation during a phase-advancing control and achieve high torque.

On the other hand, the magnet magnetic paths of the first magnets 1401 are formed straight along the lateral directions of the first magnets 1401. Therefore, magnetic flux is generated from the stator-side peripheral surfaces 1401b of the first magnets 1401 in directions perpendicular to the longitudinal directions of the first magnets 1401. Consequently, with the protrusions 1404 formed to protrude from the stator-side peripheral surfaces 1401b of the first magnets 1401 to the stator side, it becomes easier for the magnetic flux generated from the stator-side peripheral surfaces 1401b to be guided to the protrusions 1404 in comparison with the case of forming the protrusions 1404 to be shorter than the position of the stator-side peripheral surfaces 1401b.

That is, at the longitudinal ends of the first magnets 1401, it becomes easy for the magnetic flux to be self-short-circuited; thus it becomes easy to lower the magnetic flux density. Moreover, the amount of the self-short-circuited magnetic flux (i.e., the amount of the magnetic flux flowing through the protrusions 1404) depends on the minimum circumferential width of the magnetic paths through which the self-short-circuited magnetic flux flows. Therefore, by adjusting the width of the protrusions 1404, it is possible to adjust the amount of decrease in the magnetic flux density and thereby make the magnetic flux density distribution approximate to a sine waveform.

Moreover, in the eighth embodiment, the magnets 1401 and 1402 are fixed to the magnet holding portion 1403 by a resin adhesive. As described above, each of the magnets 1401 and 1402 has a rectangular cross-sectional shape. Therefore, when the magnets 1401 and 1402 are inserted and fixed between the protrusions 1404, the resin adhesive (not shown in the figures) will be extruded to protrude from the longitudinal ends to the longitudinal centers on the stator-side peripheral surfaces 1401b of the first magnets 1401. Consequently, with the resin adhesive protruding on the stator-side peripheral surfaces 1401b, it becomes possible to suppress the first magnets 1401 from being detached radially inward. In addition, though the protrusions 1404 are provided to abut the magnets 1401 and 1402 in the eighth embodiment, they may alternatively be provided apart from the magnets 1401 and 1402.

According to the eighth embodiment, it is possible to achieve the following advantageous effects.

In the present embodiment, the radial air gap between each of the first magnets 1401 and the stator 50 gradually increases as the position becomes, from the d-axis representing the centers of the magnetic poles of the magnet unit 42, closer to the q-axis representing the boundaries between the magnetic poles. In other words, the air gap gradually decreases as the position approaches the d-axis from the q-axis side. The first magnets 1401 are magnets (i.e., parallel-oriented magnets) where the magnet magnetic paths are formed parallel to the radial direction. Consequently, it becomes possible to have the magnetic flux density gradually increasing as the position approaches the d-axis from the q-axis side; thus it becomes possible to make the surface magnetic flux density distribution of the magnet unit 42 approximate to a sine waveform. As a result, it becomes possible to make change in the magnetic flux gentle, thereby suppressing eddy current loss in the stator 50. Moreover, it also becomes possible to reduce cogging torque or torque ripple.

Moreover, in the present embodiment, the protrusions 1404 of the magnet holding portion 1403 are arranged respectively in the gaps between the magnets 1401 and 1402. The protrusions 1404 protrude from the first magnets 1401 to the stator side. Consequently, at the longitudinal ends of the first magnets 1401, it becomes easy for the magnetic flux generated from the stator-side peripheral surfaces 1401b of the first magnets 1401 to be self-short-circuited through the protrusions 1404; thus it becomes possible to lower the magnetic flux density at the longitudinal ends of the first magnets 1401. As a result, it becomes possible to make the surface magnetic flux density distribution of the magnet unit 42 closer to a sine waveform.

In the present embodiment, the protrusions 1404 are each located between the d-axis and the q-axis and formed to protrude from the first magnets 1401 to the stator side. Consequently, it becomes easy for magnetic flux to flow through those regions where the protrusions 1404 are formed while it becomes difficult for magnetic flux to flow along the d-axis. That is, the inductance in those regions where the protrusions 1404 are formed is increased while the inductance along the d-axis is lowered; thus it becomes possible to realize inverse saliency. Consequently, though the magnetic flux is self-short-circuited and thus the magnet torque is lowered, it becomes possible to generate reluctance torque (or iron-core torque) and thereby increase the total torque.

In the present embodiment, each of the magnets 1401 and 1402 has a rectangular transverse cross section with a lateral direction thereof parallel to the radial direction. Moreover, each of the magnets 1401 and 1402 is a parallel-oriented magnet which has a single magnetization direction and in which a plurality of magnet magnetic paths are formed parallel to each other. Therefore, compared to magnets having a polar anisotropic structure and arc-shaped magnets, the magnets 1401 and 1402 can be more easily manufactured. In addition, since the magnets 1401 and 1402 have a rectangular cross-sectional shape, cancellation of magnetic flux hardly occurs and it is easy to lengthen the magnet magnetic paths.

In the present embodiment, the rotating electric machine 10 has the outer rotor structure. Each of the rectangular first magnets 1401 is arranged so as to have its longitudinal direction perpendicular to the radial direction. With the above arrangement, it becomes possible to easily have the radial air gap between each of the first magnets 1401 and the armature gradually narrowed as the position approaches the d-axis from the q-axis side.

Moreover, with employment of the Halbach array, though the magnetic flux is self-short-circuited through the protrusions 1404 and the air gap on the q-axis side are increased, it still becomes possible to increase, by the second magnets 1402, the magnetic flux density on the d-axis and thus the torque.

Moreover, in the present embodiment, the tooth-less structure (or slot-less structure) is employed in the rotating electric machine 10. Consequently, it becomes possible to eliminate, on the stator side, inter-conductor members which distort the flow of magnetic flux generated by the stator coil 51 or the magnet unit 42. As a result, it becomes easy to maintain the surface magnetic flux density distribution of the magnet unit 42 in a sine waveform. In addition, in the case of providing the protrusions 1404 in the rotor 40, it is possible to have the magnetic flux generated by the stator coil 51 suitably flow through the protrusions 1404, thereby increasing the reluctance torque.

The first magnets 1401, which are linearly-oriented magnets (or parallel-oriented magnets), have a larger maximum energy product than radially-oriented magnets and polar-anisotropically-oriented magnets. In the case of the first magnets 1401 being constituted of neodymium magnets, the maximum energy product of the first magnets 1401 is about 1.2 times those of radially-oriented magnets and polar-anisotropically-oriented magnets. Therefore, with employment of the linearly-oriented first magnets 1401, it becomes possible to design both the residual flux density and the coercive force to be high.

In the present embodiment, the protrusions 1404, which are formed of a soft-magnetic material, are arranged between the first magnets 1401 and the second magnets 1402. Consequently, it becomes possible to bypass the magnetic flux generated from the circumferential end surfaces of the second magnets 1402 to the non-stator-side peripheral surfaces 1401a of the first magnets 1401 via the protrusions 1404. As a result, it becomes possible to enhance the magnetic flux density on the d-axis.

Modifications of Eighth Embodiment

Figure 78:
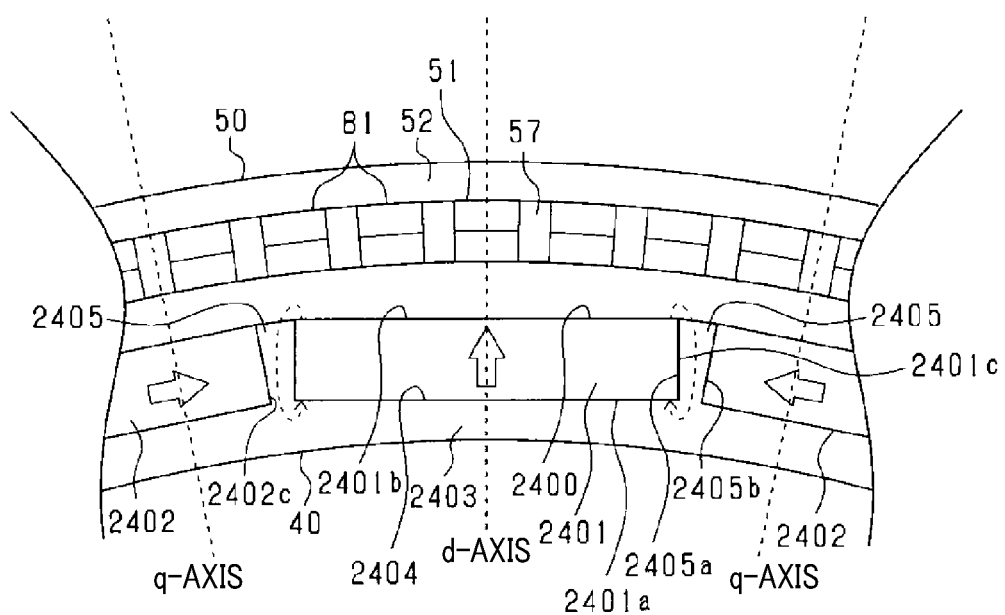
FIG. 78 is a transverse cross-sectional view illustrating the configuration of a rotor and a stator in another example.

In a rotating electric machine having an inner rotor structure, it is possible to employ a magnet unit 2400 as described below. As shown in FIG. 78, the magnet unit 2400 is configured with a magnet array called a Halbach array. Specifically, the magnet unit 2400 includes first magnets 2401 each having its magnetization direction coincident with a radial direction and second magnets 2402 each having its magnetization direction coincident with the circumferential direction. The first magnets 2401 are arranged at predetermined intervals in the circumferential direction. Each of the second magnets 2402 is arranged between one circumferentially-adjacent pair of the first magnets 2401.

Each of the magnets 2401 and 2402 is formed to have a rectangular cross-sectional shape. Moreover, each of the magnets 2401 and 2402 is arranged such that at a longitudinal center of the magnet, the longitudinal direction of the magnet is perpendicular to the radial direction. Moreover, the lateral dimension (or thickness) of the second magnets 2402 is set to be substantially equal to the lateral dimension (or thickness) of the first magnets 2401. It should be noted that in this modification, the lateral directions of the magnets 2401 and 2402 may be replaced with the longitudinal directions of the same.

The first magnets 2401 are arranged apart from each other in the circumferential direction so that the poles of the first magnets 2401 on the side facing the stator 50 (i.e., on the radially outer side) alternately become N poles and S poles in the circumferential direction. The second magnets 2402 are arranged adjacent to the first magnets 2401 in the circumferential direction so that the polarities of the second magnets 2402 alternate in the circumferential direction. With the above arrangement of the magnets 2401 and 2402, it becomes possible to increase the magnetic flux density in the first magnets 2401. Moreover, as shown in FIG. 78, the d-axis representing the centers of the magnetic poles of the magnet unit 2400 coincides with the longitudinal centers of the first magnets 2401 while the q-axis representing the boundaries between the magnetic poles coincides with the longitudinal centers of the second magnets 2402. In addition, in this modification, the longitudinal centers of the magnets 2401 and 2402 correspond to the circumferential centers of the same; and the longitudinal ends of the magnets 2401 and 2402 correspond to the circumferential ends of the same.

In each of the first magnets 2401, there are formed a plurality of straight magnet magnetic paths between the non-stator-side peripheral surface 2401a and the stator-side peripheral surface 2401b of the first magnet 2401; that one of the magnet magnetic paths which is formed at the longitudinal center of the first magnet 2401 becomes parallel to the radial direction. On the other hand, in each of the second magnets 2402, there are formed a plurality of straight magnet magnetic paths between the longitudinal end surfaces 2402c of the second magnet 2402; the magnet magnetic paths become parallel to the circumferential direction at the longitudinal center of the second magnet 2402. That is, the magnet magnetic paths become perpendicular to the radial direction at the longitudinal center of the second magnet 2402. It should be noted that a direction parallel to the radial direction encompasses directions making acute angles with the radial direction. It also should be noted that a direction parallel to the circumferential direction encompasses directions making acute angles with the circumferential direction. In addition, in each of the second magnets 2402, there may alternatively be formed arc-shaped magnet magnetic paths along the circumferential direction. On the other hand, in each of the first magnets 2401, there may alternatively be formed a plurality of magnet magnetic paths in a radial fashion.

In this modification, the rotor 40 has a motor core 2403 that holds the magnets 2401 and 2402 and functions as a back core. The motor core 2403 is a field-system core member which is cylindrical-shaped and formed of a soft-magnetic material. The motor core 2403 is fixed to the rotating shaft 11. Moreover, the motor core 2403 has receiving recesses 2404 formed in the outer circumferential surface thereof. The magnets 2401 and 2402 are respectively received and fixed in the receiving recesses 2404. Consequently, the non-stator-side peripheral surfaces 2401a and 2402a of the magnets 2401 and 2402 are located to respectively abut the bottom surfaces of the receiving recesses 2404 of the motor core 2403.

Moreover, gaps between the first magnets 2401 and the second magnets 2402 are respectively filled with side walls 2405 of the receiving recesses 2404. That is, in this modification, the side walls 2405 correspond to protrusions that radially protrude, respectively in the gaps between the magnets 2401 and 2402, to the stator side. Each of the side walls 2405 is located between the d-axis and the q-axis.

Moreover, each of the side walls 2405 is formed so as to become thicker as the position approaches its distal end (i.e., radially outer end) from its proximal end. Furthermore, each of the side walls 2405 is formed over the entire axial range of the magnets 2401 and 2402.

Each of the side walls 2405 has a circumferential end surface 2405a (i.e., first-magnet-side end surface) abutting a longitudinal end surface 2401c of an adjacent one of the first magnets 2401. More specifically, the circumferential end surface 2405a is formed to abut the longitudinal end surface 2401c of the adjacent first magnet 2401 from the non-stator-side peripheral surface 2401a to the stator-side peripheral surface 2401b of the adjacent first magnet 2401. In other words, the circumferential end surface 2405a is formed to abut the longitudinal end surface 2401c of the adjacent first magnet 2401 over the entire radial range of the longitudinal end surface 2401c. Moreover, each of the side walls 2405 also has a circumferential end surface 2405b (i.e., second-magnet-side end surface) abutting a longitudinal end surface 2402c of an adjacent one of the second magnets 2402 in a similar manner to the circumferential end surface 2405a abutting the longitudinal end surface 2401c of the adjacent first magnet 2401. Consequently, the side walls 2405 engage with the magnets 2401 and 2402 in the circumferential direction, thereby functioning as a rotational-displacement stopper of the magnets 2401 and 2402 during rotation of the rotor 40.

As described above, in this modification, the motor core 2403 abuts the non-stator-side peripheral surfaces 2401a and the longitudinal end surfaces 2401c of the first magnets 2401. That is, the motor core 2403 is formed to cover all the peripheral surfaces of the first magnets 2401 except for the stator-side peripheral surfaces 2401b. Consequently, at the longitudinal ends of the first magnets 2401, it becomes easy for magnetic flux to be self-short-circuited (as illustrated with dashed lines) between the stator-side peripheral surfaces 2401b and the non-stator-side peripheral surfaces 2401a of the first magnets 2401 through the side walls 2405. Thus, it becomes easy for the density of the magnetic flux directed to the stator 50 to be lowered as the position approaches the longitudinal ends of the first magnets 2401 (i.e., the q-axis side) from the longitudinal centers of the first magnets 2401 (i.e., from the d-axis). As a result, the surface magnetic flux density distribution of the magnet unit 2400 becomes approximate to a sine waveform.

Moreover, in this modification, arranging the side walls 2405, which can function as an iron core, between the d-axis and the q-axis, inductance is increased in the side walls 2405. Consequently, it becomes possible to realize inverse saliency in the side walls 2405, thereby increasing the reluctance torque.

Furthermore, in this modification, the magnet magnetic paths of the first magnets 2401 are formed straight along the lateral directions of the first magnets 2401. Therefore, magnetic flux is generated from the stator-side peripheral surfaces 2401b of the first magnets 2401 in directions perpendicular to the longitudinal directions of the first magnets 2401. Consequently, with the radial height of the side walls 2405 set to be substantially equal to the thickness of the first magnets 2401, it becomes easy for the magnetic flux generated from the stator-side peripheral surfaces 2401b of the first magnets 2401 to be guided to the side walls 2405 in comparison with the case of setting the radial height of the side walls 2405 to be smaller than the thickness of the first magnets 2401. This is because the surfaces from which the magnetic flux is generated and the distal ends of the side walls 2405 are located close to each other. Hence, at the longitudinal ends of the first magnets 2401, it becomes easy for the magnetic flux to be self-short-circuited; thus it becomes easy to lower the magnetic flux density.

Moreover, the amount of the self-short-circuited magnetic flux (i.e., the amount of the magnetic flux flowing through the side walls 2405) depends on the minimum circumferential width of the magnetic paths through which the self-short-circuited magnetic flux flows. Therefore, by adjusting the width of proximal end portions of the side walls 2405, it is possible to adjust the amount of decrease in the magnetic flux density and thereby make the magnetic flux density distribution approximate to a sine waveform.

Figure 79:
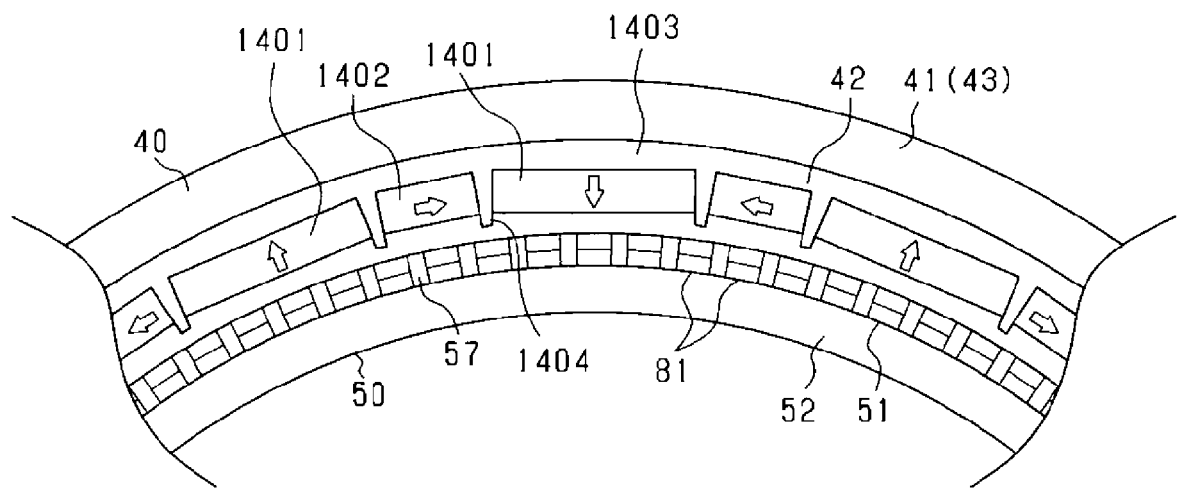
FIG. 79 is a transverse cross-sectional view illustrating the configuration of a rotor and a stator in yet another example.

In the above-described eighth embodiment, the lateral thickness of the first magnets 1401 is set to be smaller than the lateral thickness of the second magnets 1402. However, the lateral thickness of the first magnets 1401 may alternatively be set to be substantially equal to the lateral thickness of the second magnets 1402, for example as shown in FIG. 79. In this case, it would also be possible to enhance the magnetic flux density on the d-axis. Moreover, with the protrusions 1404, it would be possible to restrict circumferential displacement of the second magnets 1402, thereby suitably stopping rotational-displacement of the second magnets 1402.

Figure 80:
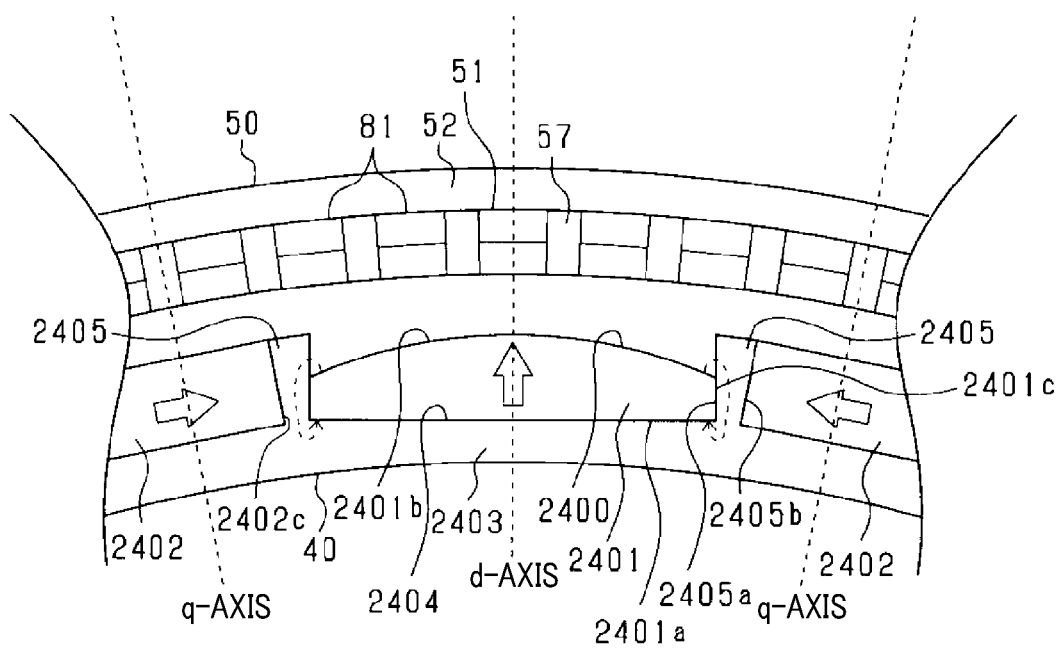
FIG. 80 is a transverse cross-sectional view illustrating the configuration of a rotor and a stator in still another example.

In the magnet unit 2400 according to the above-described modification, the stator-side peripheral surface 2401b of the first magnets 2401 may alternatively be formed to be convex toward the stator side, as shown in FIG. 80, so that the air gap gradually increases as the position becomes, from the d-axis, closer to the q-axis. Consequently, it would become possible to make the surface magnetic flux density distribution approximate to a sine waveform. Moreover, as shown in FIG. 80, it is preferable for the side walls 2405 to be formed as protrusions to protrude from the first magnets 2401 to the stator side. Consequently, inductance would be increased in the side walls 2405, thereby realizing inverse saliency. As a result, it would become possible to generate reluctance torque, thereby increasing the total torque. Moreover, in this case, it would be possible to form the stator-side peripheral surfaces 1401b of the first magnets 1401 in an arc shape along the circumferential direction, facilitating the design of the rotating electric machine 10.

Ninth Embodiment

In the ninth embodiment, the configuration of the magnet unit 42 according to the first embodiment is modified.

Figure 81:
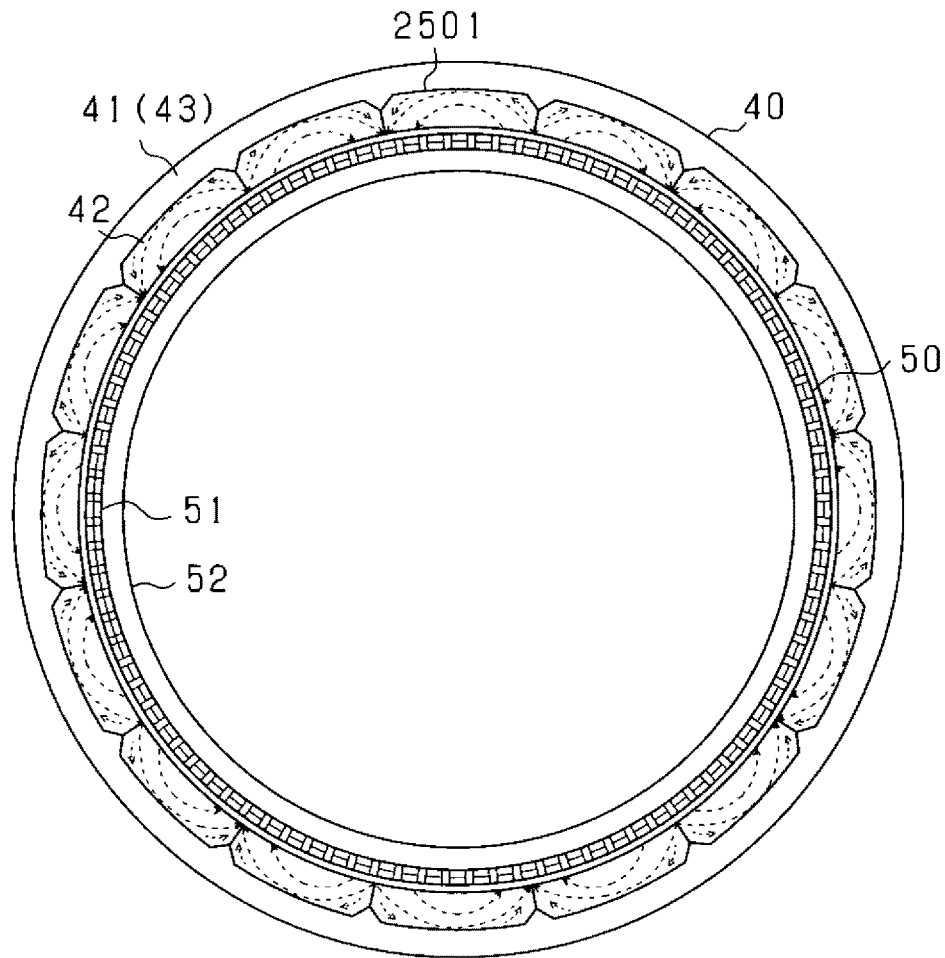
FIG. 81 is a transverse cross-sectional view of a rotor and a stator in a ninth embodiment.
Figure 82:
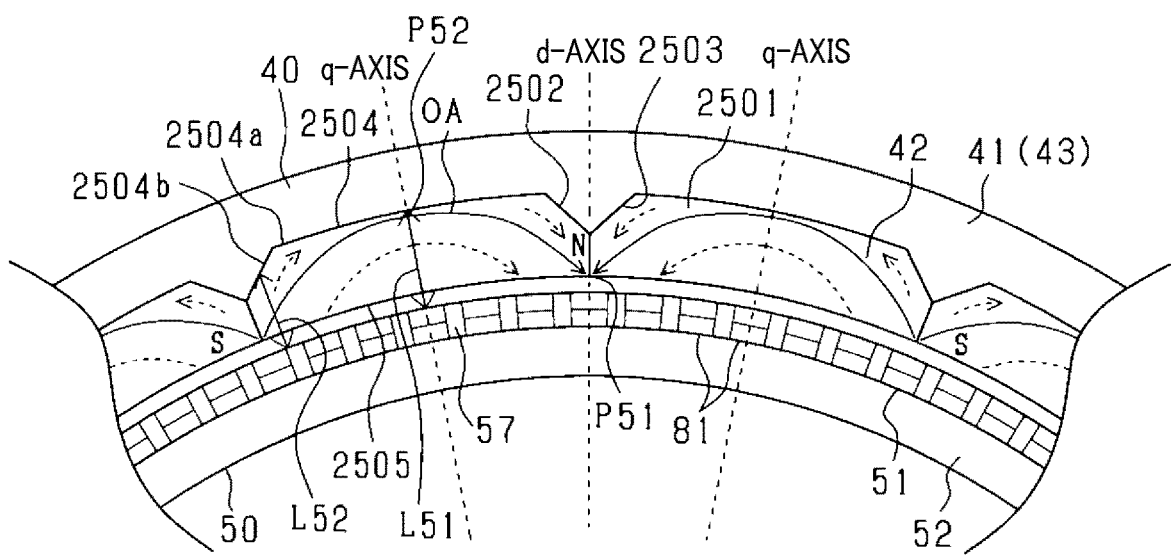
FIG. 82 is an enlarged view of part of FIG. 81.

Hereinafter, the configuration of the magnet unit 42 according to the ninth embodiment will be mainly described in detail. As shown in FIGS. 81 and 82, in the present embodiment, the magnet unit 42 has a plurality of magnets 2501 arranged in alignment with each other in the circumferential direction. The magnets 2501 have their respective easy axes of magnetization oriented in an arc shape such that at locations closer to the d-axis, the directions of the easy axes of magnetization are more parallel to the d-axis than at locations closer to the q-axis; and arc-shaped magnet magnetic paths are formed along the easy axes of magnetization. Here, the d-axis represents the centers of the magnetic poles of the magnet unit 42 while the q-axis represents the boundaries between the magnetic poles.

Moreover, in the magnet unit 42, to make the polarities of the d-axis at each circumferentially-adjacent pair of the d-axis positions different from each other, the magnetization directions (or polarization directions) of each circumferentially-adjacent pair of the magnets 2501 are set to be opposite (or inverse) to each other. That is, the polarization directions of each circumferentially-adjacent pair of the magnets 2501 are set to be different from each other so that in the circumferential direction, those d-axis positions on which the magnetic flux converges and where the polarity of the d-axis becomes N alternate with those d-axis positions from which the magnetic flux diverges and where the polarity of the d-axis becomes S.

The configuration of the magnets 2501 will be described in more detail. Each of the magnets 2501 is formed symmetrically with respect to the q-axis. Moreover, the magnets 2501 are oriented to form the arc-shaped magnet magnetic paths such that the directions of the easy axes of magnetization are parallel or near parallel to the d-axis in the d-axis-side portions and perpendicular or near perpendicular to the q-axis in the q-axis-side portions. Furthermore, as shown in FIG. 82, in each of the magnets 2501, a plurality of arc-shaped magnet magnetic paths are formed which center on a center point set on the q-axis. The magnet magnetic paths include a magnetic path on an orientation arc OA; the orientation arc OA centers on the center point set on the q-axis and passes through a first intersection point P51 between the d-axis and the stator-side peripheral surface 2505 (i.e., the armature-side peripheral surface) of the magnet 2501. In addition, it is preferable for the orientation arc OA to be set such that a tangent line to the orientation arc OA at the first intersection point P51 is near parallel to the d-axis. Moreover, it is also preferable for the orientation arc OA to be set so as to be tangent to the non-stator-side peripheral surface 2504 of the magnet 2501 at the q-axis or so as to pass through the vicinity (more particularly, the radially inner side in the present embodiment) of the non-stator-side peripheral surface 2504 at the q-axis.

Moreover, each of the magnets 2501 is provided to center on the q-axis and extend between two circumferentially-adjacent positions of the d-axis. In other words, each of the magnets 2501 is formed in an arc shape along the circumferential direction between one circumferentially-adjacent pair of the d-axis positions. More specifically, in each of the magnets 2501, the orientation arc OA extends between one circumferentially-adjacent pair of the d-axis positions. Each of the magnets 2501 is formed between one circumferentially-adjacent pair of the d-axis positions such that the magnetic paths are formed, at least, over the entire range of the orientation arc OA.

Consequently, in each of the magnets 2501, of the magnet magnetic paths of the magnet 2501, the magnet magnetic path on the orientation arc OA is longest. The further the magnet magnetic paths from the orientation arc OA, the shorter the magnet magnetic paths become. For example, in a q-axis-side portion of the magnet 2501, the magnet magnetic paths extending on the stator side (shown with a dashed line) are shorter than those extending on the non-stator side. Moreover, in d-axis-side portions of the magnet 2501, the magnet magnetic paths extending on the non-stator side (shown with dashed lines) are shorter than those extending on the stator side. In addition, the magnet magnetic paths (or the orientation arc OA) may have the shape of an arc which is a part of a perfect circle or a part of an ellipse. Moreover, though the center of the arc is set to be on the q-axis in the present embodiment, it may alternatively be set to be not on the q-axis.

The arc-shaped magnets 2501, each of which has the magnet magnetic paths formed therein as described above, are arranged in alignment with each other in the circumferential direction, thereby forming the magnet unit 42 in an annular shape.

On the other hand, as described previously, in the magnet unit 42, it is desirable for the surface magnetic flux density distribution to be approximate to a sine waveform; and it is also desirable for the magnetic flux density on the d-axis to be as high as possible. Therefore, it is preferable to employ the above-described magnets 2501 each of which extends between one circumferentially-adjacent pair of the d-axis positions and where the arc-shaped magnet magnetic paths are formed between the d-axis positions.

Moreover, in the case of employing the above-described magnets 2501, to suppress magnetic flux leakage from the non-stator side (i.e., the radially outer side) of the magnet unit 42, it is preferable to set the radial thickness of the magnets 2501 such that each of the magnets 2501 radially extends up to a second intersection point P52 between the q-axis and the orientation arc OA of the magnet 2501. However, to enable the magnets 2501 to have high magnetic flux density such that the intrinsic coercive force is higher than or equal to 400 [kA/m] and the residual flux density is higher than or equal to 1.0 [T], it is generally necessary for the magnets 2501 to include expensive rare-earth substances. Therefore, if the radial thickness of each of the magnets 2501 was set to be constant over the entire circumferential range thereof and to such a large value as to suppress magnetic flux leakage as described above, the volume of the magnets 2501 would become large, resulting in high cost of the magnets 2501. In view of the above, in the ninth embodiment, the magnets 2501 of the magnet unit 42 are configured as described below.

As shown in FIG. 82, in the ninth embodiment, the magnets 2501 are configured so that the radial distances from the stator 50 to the non-stator-side peripheral surfaces 2504 (i.e., the non-armature-side peripheral surfaces) of the magnets 2501 are shorter on the d-axis than on the q-axis side. More specifically, each of the non-stator-side peripheral surfaces 2504 of the magnets 2501 is configured to have a curved part 2504*a* formed in an arc shape along the inner circumferential surface of the cylindrical portion 43 and a pair of planar parts 2504*b* formed to make a predetermined angle (e.g., 45°) with the radial direction.

In each of the magnets 2501, the planar parts 2504*b* are formed respectively at the d-axis-side ends of the magnet 2501 in the circumferential direction, i.e., at the circumferential ends of the magnet 2501. Moreover, the planar parts 2504*b* are formed to be more parallel to the radial direction than the curved part 2504*a* is. That is, the planar parts 2504*b* are oblique radially inward. Specifically, the non-stator-side corners of the magnet 2501 are chamfered to form oblique surfaces that are oblique to the radial direction; and the oblique surfaces respectively constitute the planar parts 2504b. The radial thickness L52 of circumferential end portions of the magnet 2501 becomes smaller (or thinner) as the position approaches the circumferential ends.

Moreover, the planar parts 2504b are formed so as to maintain the magnet magnetic path on the orientation arc OA and be apart from (i.e., not intersecting) the orientation arc OA. That is, in the ninth embodiment, in each of the magnets 2501, the non-stator-side peripheral surface 2504 is located radially outside the orientation arc OA and formed along the orientation arc OA. In addition, the planar parts 2504b may alternatively be constituted of curved surfaces oblique to the radial direction, for example curved surfaces formed along the orientation arc OA.

On the other hand, the outer diameter of the stator 50 (i.e., the outer diameter of the stator coil 51) is constant. Therefore, with the planar parts 2504b formed in the magnets 2501, the radial distances from the stator 50 to the non-stator-side peripheral surfaces 2504 of the magnets 2501 become shorter on the d-axis side than on the q-axis side. That is, the radial thickness L52 of each of the magnets 2501 from the stator 50 to the planar parts 2504b is smaller than the radial thickness L51 of the same from the stator 50 to the curved part 2504a.

Moreover, in the ninth embodiment, each of the magnets 2501 is formed to have its radial thickness larger on the q-axis than on the d-axis side. Specifically, each of the magnets 2501 has its stator-side peripheral surface 2505 shaped in an arc concentric with the curved part 2504a of the non-stator-side peripheral surface 2504 (i.e., concentric with the inner circumferential surface of the cylindrical portion 43). Consequently, the radial thickness of each of the magnets 2501 from the stator-side peripheral surface 2505 to the planar parts 2504b of the non-stator-side peripheral surface 2504 becomes smaller (or thinner) than the radial thickness of the same from the stator-side peripheral surface 2505 to the curved part 2504a of the non-stator-side peripheral surface 2504.

In addition, in the ninth embodiment, the radial thickness of each of the magnets 2501 on the q-axis is equal to the radial distance from the stator-side peripheral surfaces 2505 to the curved part 2504a of the non-stator-side peripheral surface 2504. Moreover, the radial thickness of each of the magnets 2501 from the stator-side peripheral surface 2505 to the planar parts 2504b of the non-stator-side peripheral surface 2504 decreases as its position approaches the d-axis. Consequently, in each of the magnets 2501, there are formed a plurality of arc-shaped magnet magnetic paths that are concentric with the orientation arc OA and different in length from each other.

Moreover, upon arrangement of the above-described magnets 2501 in alignment with each other in the circumferential direction, there are formed recesses 2502 along the axial direction in the magnet unit 42; each of the recesses 2502 centers on the d-axis and opens to the non-stator side (i.e., to the cylindrical portion 43 side). Moreover, as shown in FIG. 82, each of the recesses 2502 is located closer to the d-axis than to the q-axis. In addition, the recesses 2502 are formed away from the orientation arcs OA of the magnets 2501.

In addition, as described above, in the d-axis-side portions of the magnets 2501, the magnet magnetic paths extending on the non-stator side (shown with the dashed lines) are shorter than those extending on the stator side. More specifically, those magnet magnetic paths which are located on the non-stator side of the orientation arc OA are shorter than the orientation arc OA and hardly contribute to increase in the magnetic flux density on the d-axis. Moreover, those non-stator-side parts of the d-axis-side portions of the magnets 2501 where the shorter magnet magnetic paths are formed may be easily demagnetized by the influence of an external magnetic field (e.g., the magnetic field from the stator coil 51). Therefore, forming the recesses 2502 in the d-axis-side portions of the magnets 2501 on the non-stator side, the magnetic flux density on the d-axis is hardly affected (i.e., hardly lowered) by the recesses 2502.

On the other hand, in the cylindrical portion 43, there are formed protrusions 2503 to respectively engage with the recesses 2502 of the magnets 2501 in the circumferential direction. More specifically, as shown in FIG. 82, on the inner circumferential surface of the cylindrical portion 43, there are formed the protrusions 2503 to radially protrude to the magnet unit 42 side (i.e., to the stator side). The protrusions 2503 have respective triangular-shaped transverse cross sections conforming to the shape of the recesses 2502. The circumferential width of each of the protrusions 2503 becomes smaller as the position becomes closer to the stator side in the radial direction. That is, in each of the protrusions 2503, there are formed a pair of oblique surfaces extending from the inner circumferential surface of the cylindrical portion 43 to the vertex of the protrusion 2503. The oblique surfaces are formed at angles (i.e., angles of 45° with respect to the radial direction) set according to the angles of the oblique surfaces (i.e., the planar parts 2504b) of the recesses 2502. Moreover, the radial dimension (or height) of the protrusions 2503 is set to be equal to the radial dimension (or depth) of the recesses 2502. Consequently, it becomes possible to have the protrusions 2503 and the recesses 2502 suitably engage with each other.

In addition, each of the protrusions 2503 and the recesses 2502 may be formed in at least part of the axial range of the magnet unit 42. For example, each of the protrusions 2503 and the recesses 2502 may be formed along the axial direction over the entire axial range of the magnet unit 42. Moreover, it is unnecessary to provide one protrusion 2503 and one recess 2502 at each d-axis position. That is, the number of the protrusions 2503 and the number of the recesses 2502 may be set to be smaller than the number of the d-axis positions. For example, pairs of the protrusions 2503 and the recesses 2502 may be provided at angular intervals of 90°. In addition, the number of the protrusions 2503 and the number of the recesses 2502 may be arbitrarily set such that the number of the recesses 2502 is larger than the number of the protrusions 2503.

According to the ninth embodiment, it is possible to achieve the following advantageous effects.

In the present embodiment, with the magnet unit 42 having a surface magnetic flux density distribution approximate to a sine waveform, it becomes possible to increase the torque; it also becomes possible to make change in the magnetic flux gentler and thereby more effectively suppress eddy current loss in comparison with radial magnets. Moreover, it also becomes possible to reduce torque ripple. On the other hand, in the case of the magnets 2501 being designed to have an intrinsic coercive force higher than or equal to 400 [kA/m] and a residual flux density higher than or equal to 1.0 [T] (i.e., to increase the magnetic flux density on the d-axis), to make the surface magnetic flux density distribution of the magnet unit 42 approximate to a sine waveform, it is desirable to provide each of the magnets 2501 between one circumferentially-adjacent pair of the d-axis positions and have the arc-shaped magnet magnetic paths formed in the magnets 2501.

Moreover, in the case of employing the magnets 2501 as above, to suppress magnetic flux leakage from the non-stator side of the magnet unit 42, it is desirable to set the radial thickness of the magnets 2501 so as to have magnet magnetic paths formed on the orientation arcs OA of the magnets 2501. However, to enable the magnets 2501 to have an intrinsic coercive force higher than or equal to 400 [kA/m] and a residual flux density higher than or equal to 1.0 [T], it is generally necessary for the magnets 2501 to include expensive rare-earth substances. Consequently, the cost of the magnets 2501 may become high.

On the other hand, in the magnet unit 42 where each of the magnets 2501 is provided between one circumferentially-adjacent pair of the d-axis positions and the arc-shaped magnet magnetic paths are formed in the magnets 2501, it is easy for the magnet magnetic paths to become short in the non-stator-side parts of the d-axis-side portions of the magnets 2501. Therefore, the non-stator-side parts of the d-axis-side portions of the magnets 2501 may be easily demagnetized and hardly contribute to increase in the magnetic flux density on the d-axis. Accordingly, removal of the non-stator-side parts of the d-axis-side portions from the magnets 2501 hardly affects the density of magnetic flux generated from the d-axis (i.e., hardly causes the magnetic flux density to be lowered) and hardly causes the torque to drop.

In view of the above, in the ninth embodiment, the magnets 2501 are configured so that the radial dimension from the stator 50 to the non-stator-side peripheral surfaces 2504 of the magnets 2501 is shorter on the d-axis side than on the q-axis side. Consequently, it becomes possible to reduce the non-stator-side parts of the d-axis-side portions of the magnets 2501. That is, it becomes possible to reduce those parts of the magnets 2501 which may be easily demagnetized, thereby making it possible to reduce the volume of the magnets 2501 without affecting the magnetic flux density. Hence, compared to the case of magnets having a given radial thickness over the entire circumferential range thereof, those parts of the magnets 2501 which may be easily demagnetized become smaller, allowing the recesses 2502 to be formed in the magnet unit 42. As a result, it becomes possible to reduce the volume of the magnets 2501 while suppressing the magnetic flux density on the d-axis from being lowered.

Moreover, even with reduction in the radial thickness of the magnets 2501, it still becomes possible to lengthen the magnet magnetic paths by providing each of the magnets 2501 between one circumferentially-adjacent pair of the d-axis positions and having the magnet magnetic paths formed in the arc shape between the d-axis positions across the q-axis. That is, the magnet magnetic paths in the magnets 2501 become longer compared to radial magnets having straight magnet magnetic paths formed therein. Consequently, it becomes possible to increase the magnetic flux density on the d-axis while minimizing the radial thickness of the magnets 2501.

In the present embodiment, each of the magnets 2501 is formed symmetrically with respect to the q-axis. Moreover, each of the magnets 2501 is formed between one circumferentially-adjacent pair of the d-axis positions so as to have the magnet magnetic paths formed along the orientation arc OA; the orientation arc OA centers on the center point set on the q-axis and passes through the first intersection point P51 between the d-axis and the stator-side peripheral surface 2505 of the magnet 2501. Consequently, it becomes possible to sufficiently increase the lengths of those magnet magnetic paths which are located on the orientation arcs OA of the magnets 2501 and contribute to the magnetic flux density on the d-axis. As a result, it becomes possible to further increase the magnetic flux density on the d-axis.

In the present embodiment, each of the magnets 2501 is formed to have its radial thickness larger on the q-axis than on the d-axis side. Consequently, in each of the magnets 2501, there are formed a plurality of arc-shaped magnet magnetic paths that are concentric with and different in length from each other. As a result, it becomes possible to make the surface magnetic flux density distribution of the magnet unit 42 closer to a sine waveform.

In the present embodiment, in the non-stator-side parts (i.e., the cylindrical portion 43-side parts) of the magnet unit 42, there are formed the recesses 2502 closer to the d-axis than to the q-axis; the recesses 2502 open to the non-stator side, i.e., to the cylindrical portion 43 side. Moreover, in the cylindrical portion 43, there are formed the protrusions 2503 to respectively engage with the recesses 2502. Consequently, it becomes possible to restrict rotational displacement of the magnet unit 42 while making the surface magnetic flux density distribution of the magnet unit 42 approximate to a sine waveform and increasing the magnetic flux density on the d-axis.

Moreover, the circumferential widths of the recesses 2502 and the protrusions 2503 (more specifically, the circumferential width of opening portions of the recesses 2502 and the circumferential width of proximal end portions of the protrusions 2503) are set so as to ensure sufficient strength to suitably restrict rotational displacement of the magnet unit 42. Consequently, it becomes possible to suitably restrict rotational displacement of the magnet unit 42. In addition, the recesses 2502 are formed in those parts of the magnet unit 42 which may be easily demagnetized; therefore, even with the circumferential widths of the recesses 2502 and the protrusions 2503 set as above, it still becomes possible to suppress the magnetic flux density on the d-axis from being lowered in comparison with the case of no recesses 2502 being formed in the magnet unit 42.

Modifications of Ninth Embodiment

In the above-described ninth embodiment, the shape of the magnets 2501 may be modified. It is desirable to modify the shape of the magnets 2501 such that: each of the magnets 2501 is provided between one circumferentially-adjacent pair of the d-axis positions; and the radial dimension from the stator 50 to the non-stator-side peripheral surfaces 2504 of the magnets 2501 is shorter on the d-axis side than on the q-axis side. For example, as shown in FIG. 83, the shape of the magnets may be modified such that transverse cross-sections of the magnets are shaped in a convex lens. More specifically, in the modification shown in FIG. 83, each of the magnets 3501 is formed to extend between one circumferentially-adjacent pair of the d-axis positions. Moreover, each of the magnets 3501 is formed symmetrically with respect to the q-axis. The non-stator-side peripheral surfaces 3502 of the magnets 3501 are formed as curved surfaces. In each of the magnets 3501, a plurality of magnet magnetic paths are formed in an arc shape along the non-stator-side peripheral surface 3502 of the magnet 3501.

Moreover, in the modification shown in FIG. 83, in the magnet unit 42, to make the polarities of the d-axis at each circumferentially-adjacent pair of d-axis positions different from each other, the magnetization directions (or polarization directions) of each circumferentially-adjacent pair of the magnets 3501 are set to be opposite (or inverse) to each other. That is, the polarization directions of each circumferentially-adjacent pair of the magnets 3501 are set to be different from each other so that in the circumferential direction, those d-axis positions on which the magnetic flux converges and where the polarity of the d-axis becomes N alternate with those d-axis positions from which the magnetic flux diverges and where the polarity of the d-axis becomes S.

Furthermore, in the modification shown in FIG. 83, in each of the magnets 3501, the magnet magnetic paths include, at least, a magnet magnetic path on an orientation arc OA; the orientation arc OA extends along the non-stator-side peripheral surface 3502 of the magnet 3501. More specifically, the orientation arc OA centers on a center point O set on the q-axis and passes through a first intersection point P51 between the d-axis and the stator-side peripheral surface 3503 of the magnet 3501; the orientation arc OA is convex radially outward. The non-stator-side peripheral surface 3502 of the magnet 3501 is formed along the orientation arc OA. As above, the magnets 3501 are configured so that the radial dimension from the stator 50 to the non-stator-side peripheral surfaces 3502 of the magnets 3501 is shorter on the d-axis side than on the q-axis side.

In addition, in the above modification, in each of the magnets 3501, the non-stator-side peripheral surface 3502 may alternatively be formed along an arc that is located radially outside and concentric with the orientation arc OA. Moreover, as shown in FIG. 84(*a*), each of the magnets 3501 may alternatively have a cross section shaped in crescent moon. Furthermore, as shown in FIG. 84(*b*), each of the magnets 3501 may alternatively be formed to have circumferential end surfaces each extending in a radial direction.

On the other hand, in the modification shown in FIG. 83, in each of the magnets 3501, the stator-side peripheral surface 3503 is formed as a curved surface convex toward the stator side. The circumferential ends of the stator-side peripheral surface 3503 are connected respectively with the circumferential ends of the non-stator-side peripheral surface 3502. That is, the peripheral surfaces of the magnet 3501 consist of the stator-side peripheral surface 3503 and the non-stator-side peripheral surface 3502. Moreover, the curvature of the stator-side peripheral surface 3503 is set to be smaller than the curvature of the non-stator-side peripheral surface 3502 (i.e., the radius of curvature of the stator-side peripheral surface 3503 is set to be larger than the radius of curvature of the non-stator-side peripheral surface 3502). With the above configuration, the radial thickness of each of the magnets 3501 is larger on the q-axis side and on the d-axis side; each of the magnets 3501 becomes thinner as the position becomes, from the q-axis, closer to the d-axis. Consequently, in each of the magnets 3501, there are formed a plurality of arc-shaped magnet magnetic paths that are concentric with and different in length from each other. As a result, it becomes possible to make the surface magnetic flux density distribution of the magnet unit 42 closer to a sine waveform.

Figure 85:
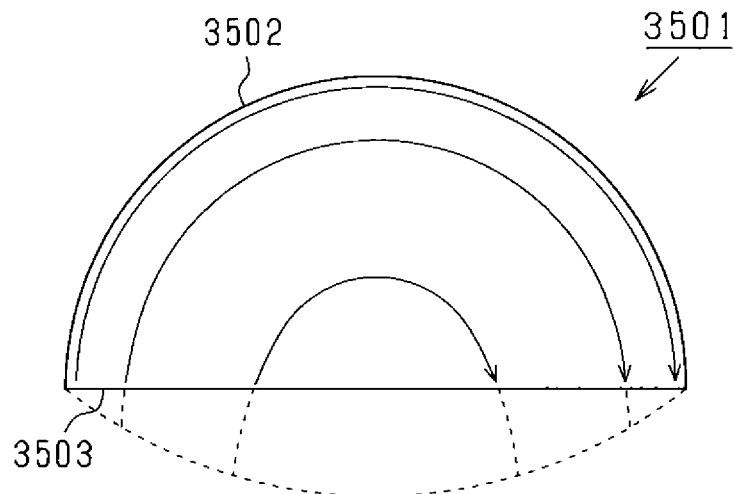
FIG. 85 is a transverse cross-sectional view of a magnet in another example.

Moreover, as shown in FIG. 85, by setting the radial thickness of each of the magnets 3501 to be larger on the q-axis side, it becomes possible to lengthen the magnet magnetic paths. Consequently, it becomes difficult for each of the magnets 3501 to be demagnetized; thus it becomes possible to make the surface magnetic flux density distribution of the magnet unit 42 closer to a sine waveform.

In the modification shown in FIG. 83, the magnet unit 42 has a magnet holding portion 3504 that receives and holds magnets 3501 configured as described above. The magnet holding portion 3504 receives the magnets 3501 therein so as to have the magnets 3501 arranged in alignment with each other in the circumferential direction. More specifically, the magnet holding portion 3504 is cylindrical-shaped and formed of a soft-magnetic material. Between inner and outer circumferential surfaces of the magnet holding portion 3504, there are formed magnet-receiving holes 3505 each extending along the axial direction. The magnet-receiving holes 3505 have a cross-sectional shape conforming to the shape of the magnets 3501. The magnets 3501 are respectively received in the magnet-receiving holes 3505 and fixed therein by an adhesive or resin. Moreover, the magnet holding portion 3504 is fixed to the inner circumferential surface of the cylindrical portion 43. Consequently, the magnet unit 42 is arranged to face the stator 50. Accordingly, in the modification shown in FIG. 83, the rotating electric machine may be regarded as an IPM rotating electric machine.

Figure 86:
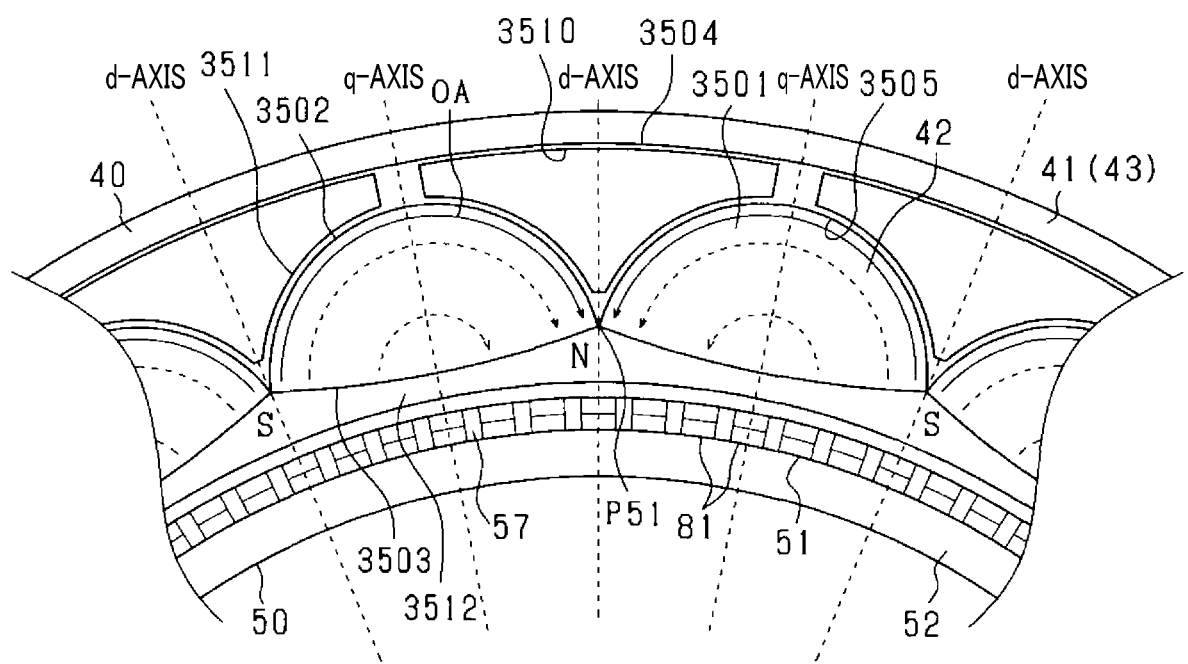
FIG. 86 is a transverse cross-sectional view of a rotor and a stator in yet another example.

In addition, the shape of the above-described magnet holding portion 3504 may be arbitrarily modified. For example, as shown in FIG. 86, the magnet holding portion 3504 may have through-holes 3510 formed radially outside the non-stator-side peripheral surfaces 3502 of the magnets 3501 so as to axially penetrate the magnet holding portion 3504. Through the through-holes 3510, fluid, such as air, can flow, thereby suitably cooling the magnet unit 42. In the case of forming the through-holes 3510 in the magnet holding portion 3504, the thickness of non-armature-side covering parts 3511 of the magnet holding portion 3504 may be set to be smaller than the thickness of armature-side covering parts 3512 of the magnet holding portion 3504; the non-armature-side covering parts 3511 cover the non-stator-side peripheral surfaces 3502 of the magnets 3501 while the armature-side covering parts 3512 cover the stator-side peripheral surfaces 3503 of the magnets 3501. It is preferable to set the thickness of the non-armature-side covering parts 3511, which cover the non-stator-side peripheral surfaces 3502, to a value ensuring strength sufficient to hold the magnets 3501 and allowing the non-armature-side covering parts 3511 to be magnetically saturated by the magnetic flux from the stator 50 during rotation of the rotor 40. Setting the thickness of the non-armature-side covering parts 3511 as above, it becomes possible to suppress occurrence of magnetic flux leakage from the side of the non-stator-side peripheral surfaces 3502. Moreover, the magnet holding portion 3504 may alternatively be formed of a nonmagnetic material. Furthermore, the magnet holding portion 3504 may alternatively be formed so as to have the stator-side peripheral surfaces 3503 of the magnets 3501 exposed. In other words, there may be no magnet holding portion 3504 (more specifically, no armature-side covering parts 3512) interposed between the magnets 3501 and the stator 50. That is, the rotating electric machine may alternatively be configured as an SPM rotating electric machine.

Moreover, the magnets 2501 in the ninth embodiment and the magnets 3501 in the above modification may also be employed in a rotating electric machine having an inner rotor structure (i.e., inner rotating structure). In addition, in the case of the magnets 3501 being employed in a rotating electric machine having an inner rotor structure, the curvature of the stator-side peripheral surfaces 3503 of the magnets 3501 may be set so as to have the stator-side peripheral surfaces 3503 formed along the circumferential direction. Consequently, the magnets 3501 will not protrude to the stator side, facilitating the design of the rotating electric machine.

Figure 87A:
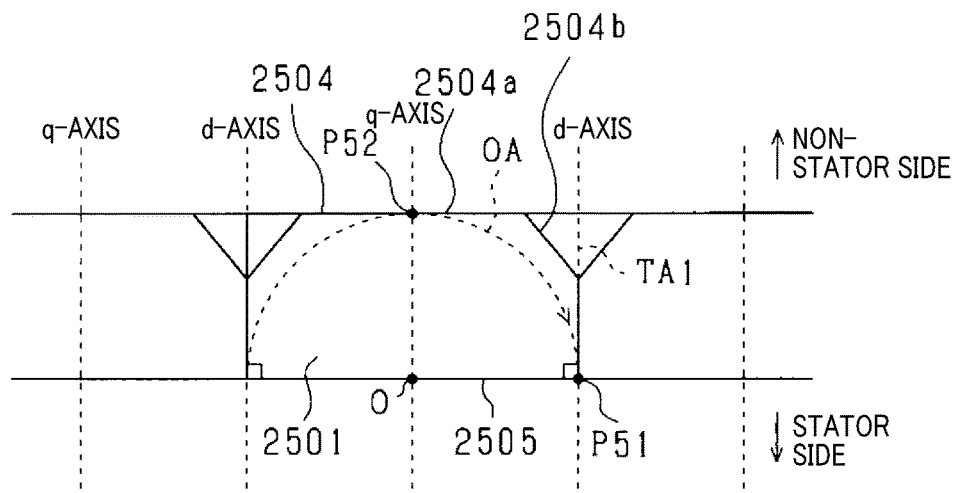
FIGS. 87(a) and 87(b) are schematic diagram illustrating a comparative example of a magnet unit.
Figure 87B:
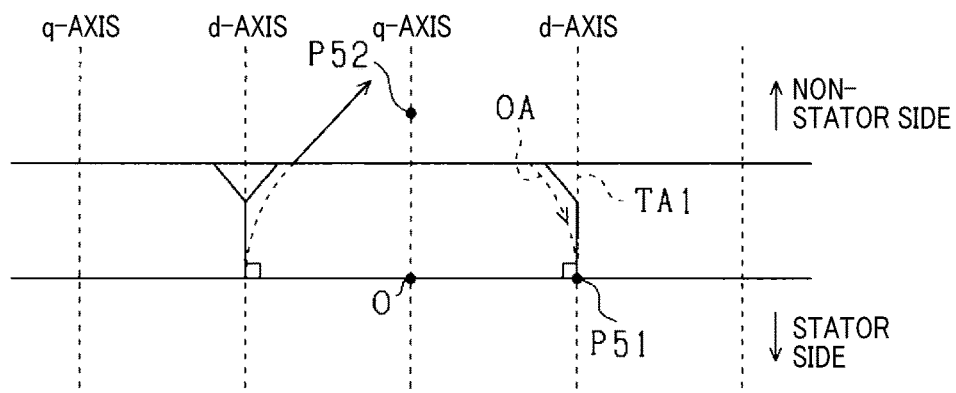

In the above-described ninth embodiment, to suppress magnetic flux leakage, the radial thickness of the magnets 2501 (more particularly, the radial thickness on the q-axis) is set such that each of the magnets 2501 radially extends up to the second intersection point P52 between the q-axis and the orientation arc OA of the magnet 251 (see also FIG. 87(a)). The radial thickness of the magnets 3501 in the above-described modification may also be set in a similar manner to the setting of the radial thickness of the magnets 2501. This is because if each of the magnets did not radially extend up to the second intersection point P52 between the q-axis and the orientation arc OA, as shown in FIG. 87(b), magnetic flux leakage (indicated with a solid-line arrow) would occur from the non-stator-side of the magnet unit 42. In addition, in FIG. 87, the magnets are shown developed in a straight line; the lower side in the figure coincides with the stator side whereas the upper side in the figure coincides with the non-stator side.

In another modification, a rotor core, which serves as a field-system core member, may be radially stacked on the magnets; and part or the whole of the rotor core may be radially located on the stator side (i.e., the armature side) of the second intersection point P52 between the q-axis and the orientation arc OA. This modification will be described hereinafter with reference to FIG. 88. In addition, in FIG. 88, both the cylindrical portion 43 and the magnet unit 42 are shown developed in a straight line; the lower side in the figure coincides with the stator side (i.e., the armature side) whereas the upper side in the figure coincides with the non-stator side (i.e., the non-armature side).

Figure 88:
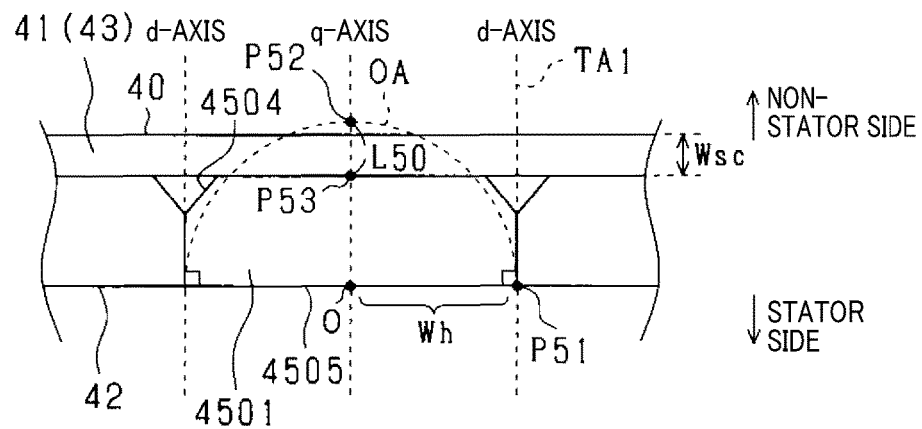
FIG. 88 is a schematic diagram showing a transverse cross section of a magnet unit in another example.

As shown in FIG. 88, similar to the magnets 2501 in the ninth embodiment, each of magnets 4501 of the magnet unit 42 in this modification is formed symmetrically with respect to the q-axis; the magnets 4501 have easy axes of magnetization oriented in an arc shape such that at locations closer to the d-axis, the directions of the easy axes of magnetization are more parallel to the d-axis than at locations closer to the q-axis; and arc-shaped magnet magnetic paths are formed along the easy axes of magnetization. In each of the magnets 4501, there are formed a plurality of concentric arc-shaped magnet magnetic paths centering on a center point O set on the q-axis. The magnet magnetic paths include a magnet magnetic path on an orientation arc OA; the orientation arc OA centers on the center point O set on the q-axis and passes through a first intersection point P51 between the d-axis and the stator-side peripheral surface 4505 (i.e., the armature-side peripheral surface) of the magnet 4501.

Moreover, in this modification, the orientation arc OA is set such that a tangent line TA1, which is tangent to the orientation arc OA at the first intersection point P51, is parallel to the d-axis. In FIG. 88, the center point O coincides with an intersection point between the q-axis and the stator-side peripheral surface 4505 of the magnet 4501. However, each of the magnets 4501 actually extends in an arc shape along the circumferential direction of the rotor 40. Therefore, considering the curvature of each of the magnets 4501, the center point O is actually located radially outside the stator-side peripheral surface 4505.

Moreover, as shown in FIG. 88, the magnet unit 42 is fixed to the inner circumferential surface of the cylindrical portion 43 that is formed of a soft-magnetic material. That is, the cylindrical portion 43, which corresponds to a field-system core member (or rotor core), is radially stacked on the magnets 4501. Moreover, in the modification shown in FIG. 88, the entire cylindrical portion 43 is radially located on the stator side of a second intersection point P52 between the q-axis and the orientation arc OA. That is, compared to the magnets shown in FIG. 87(a), the radial thickness of the magnets 4501 in this modification is reduced allowing the cylindrical portion 43, which is formed of a soft-magnetic material, to be radially located as above.

Moreover, in this modification, the saturation flux density of the cylindrical portion 43 is substantially equal to 2.0 [T] while the residual flux density of the magnets 4501 is substantially equal to 1.0 [T]. That is, the saturation flux density of the cylindrical portion 43 is higher than the residual flux density of the magnets 4501. In this case, even with the radial thickness Wsc of the cylindrical portion 43 set to be smaller than the radial dimension L50 from a third intersection point P53 to the second intersection point P52, it is still possible to suppress magnetic flux leakage from the non-stator side of the magnet unit 42. Here, the third intersection point P53 is defined as an intersection point between the q-axis and the non-stator-side peripheral surface in each of the magnets 4501.

More specifically, the magnets 4501 and the cylindrical portion 43 are designed to satisfy the following relationship: Br×Wh≤Bs×Wsc, where Br is the residual flux density of the magnets 4501, Wh is the distance from the center point O to the first intersection point P51, Bs is the saturation flux density of the cylindrical portion 43 and Wsc is the radial thickness of the cylindrical portion 43. Satisfying the relationship of Br×Wh≤Bs×Wsc, it is possible to suitably suppress magnetic flux leakage even when the radial thickness of the cylindrical portion 43 is set to be smaller than the radial dimension L50 from the third intersection point P53 to the second intersection point P52. That is, setting the radial thickness of the cylindrical portion 43 to be larger than or equal to half the distance Wh from the center point O to the first intersection point P51, it is possible to suitably suppress magnetic flux leakage.

In addition, it is necessary for the radial thickness of the magnets 4501 to be, at least, such a thickness as to allow the easy axes of magnetization of the magnets 4501 to be oriented to form the arc-shaped magnet magnetic paths. Moreover, it is preferable for the radial thickness of the magnets 4501 to be a thickness that can be manufactured and has been determined taking into account the strength of the magnets 4501. In addition, in terms of the strength of the cylindrical portion 43, it is preferable to set the radial thickness Wsc of the cylindrical portion 43 to be larger than half the distance Wh.

As above, in the modification shown in FIG. 88, the radial thickness of the magnets 4501 is reduced; and instead the cylindrical portion 43, which is formed of a soft-magnetic material, is provided as a back yoke. Consequently, though the magnets 4501 are made thinner, it still becomes possible to suppress magnetic flux leakage since magnetic flux can flow through the cylindrical portion 43 that is formed of a soft-magnetic material. That is, it becomes difficult for the magnetic flux density on the d-axis to be lowered. As a result, it becomes possible to reduce the volume of the magnets without lowering the magnetic flux density on the d-axis.

Moreover, in the modification shown in FIG. 88, in each of the magnets 4501, the orientation arc OA is set such that the tangent line TA1, which is tangent to the orientation arc OA at the first intersection point P51, is parallel to the d-axis. The easy axes of magnetization of the magnets 4501 are oriented along the orientation arcs OA of the magnets 4501; and the arc-shaped magnet magnetic paths are formed along the easy axes of magnetization. Consequently, at the first intersection point P51, the magnet magnetic paths become perpendicular to the stator-side peripheral surfaces 4505 of the magnets 4501, thereby making it possible to increase the magnetic flux density on the d-axis. Moreover, the torque of the rotating electric machine depends on the magnetic flux density on the d-axis; therefore, by increasing the magnetic flux density on the d-axis, it also becomes possible to increase the torque.

In the magnets 4501 configured as described above, the non-stator-side parts of the d-axis-side portions may be easily demagnetized as in the magnets 2501 and 3501. More specifically, those parts of the magnets 4501 which are located radially outside the orientation arcs OA of the magnets 4501 may be easily demagnetized. Therefore, in the modification shown in FIG. 88, to reduce the non-stator-side parts of the d-axis-side portions which may be easily demagnetized, curved surfaces 4504 are formed along the orientation arc OA at both the circumferential ends in each of the magnets 4501. Consequently, it becomes possible to further reduce the volume of the magnets without lowering the magnetic flux density on the d-axis.

Figure 89:
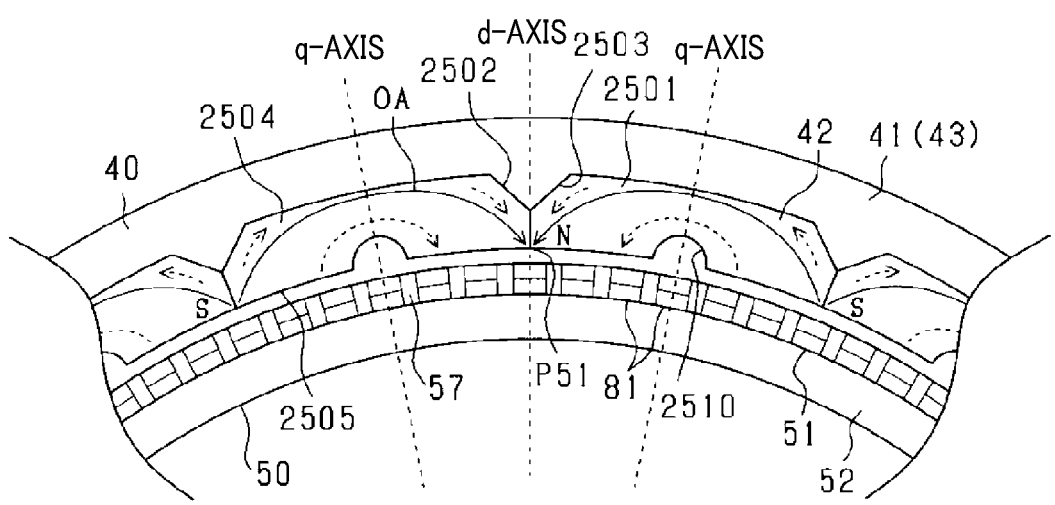
FIG. 89 is a transverse cross-sectional view of a rotor and a stator in still another example.

In the above-described ninth embodiment, in the stator-side circumferential surface (i.e., the armature-side circumferential surface) of the magnet unit 42, there may be formed recesses close to the q-axis and along the axial direction. For example, as shown in FIG. 89, grooves 2510 may be formed as recesses respectively in the stator-side peripheral surfaces 2505 of the magnets 2501 of the magnet unit 42. Each of the grooves 2510 opens to the stator side and is located closer to the q-axis than to the d-axis. More particularly, in the modification shown in FIG. 89, each of the grooves 2510 is configured to open centering on the q-axis. Moreover, each of the grooves 2510 is formed away from the orientation arc OA. In addition, it is preferable to adjust the radial and circumferential dimensions of the grooves 2510 so as to make the surface magnetic flux density distribution of the magnet unit 42 approximate to a sine waveform.

After the rotor 40 is arranged to face the stator 50, the stator 50 (i.e., the stator coil 51 and the like) is located radially inside the inner diameter of the magnet unit 42. Consequently, in the magnet unit 42, there are formed flow paths which are defined by the grooves 2510 and the stator 50. The flow paths server as passages axially penetrating the magnet unit 42; and fluid, such as air, can flow through the passages. That is, the cross-sectional areas of the grooves 2510 are set so as to allow fluid, such as air, to flow through the grooves 2510.

Moreover, as described above, in the q-axis-side portions of the magnets 2501 in the ninth embodiment, the magnet magnetic paths extending on the stator side (shown with the dashed lines) are shorter than those extending on the non-stator side. Moreover, those stator-side parts of the q-axis-side portions where the shorter magnet magnetic paths are formed may be easily demagnetized by the influence of an external magnetic field (e.g., the magnetic field from the stator coil 51). Therefore, forming the grooves 2510 in the q-axis-side portions of the magnets 2501 on the stator side, the magnetic flux density on the d-axis is hardly affected (i.e., hardly lowered) by the grooves 2510.

With the above configuration, during rotation of the rotor 40, fluid, such as air, will flow through the grooves 2510, thereby cooling the magnet unit 42. As a result, it becomes possible to improve the performance of cooling the magnet unit 42. In addition, as described above, since the grooves 2510 are formed in those parts of the magnets 2501 which may be easily demagnetized, the magnetic flux density is hardly affected by the grooves 2510. Consequently, it becomes possible to improve the performance of cooling the magnet unit 42 while suppressing the torque from being lowered. Moreover, it also becomes possible to suitably reduce the volume of the magnets of the magnet unit 42 while suppressing the torque from being lowered.

In the above-described ninth embodiment, gaps may be formed between the magnets 2501 in the circumferential direction, i.e., formed along the d-axis; and magnetic steel members (or iron cores) may be arranged respectively in the gaps. With the magnetic steel members arranged on the d-axis, it becomes possible to enhance magnetic flux above the residual flux density Br of the magnets 2501. In addition, in the case of the magnetic steel members being arranged without magnet magnetic paths of the magnets 2501 directed to the stator side, the magnet magnetic paths will be completed within the rotor through the magnetic steel members, resulting in ineffective magnetic flux. Consequently, in this case, the magnetic flux density will not be increased.

Tenth Embodiment

In the above-described embodiments and modifications, the configurations of the magnet holder 41 and the magnet unit 42 may be modified as follows. Hereinafter, the configurations of the magnet holder 41 and the magnet unit 42 according to the tenth embodiment will be mainly described in detail.

Figure 90:
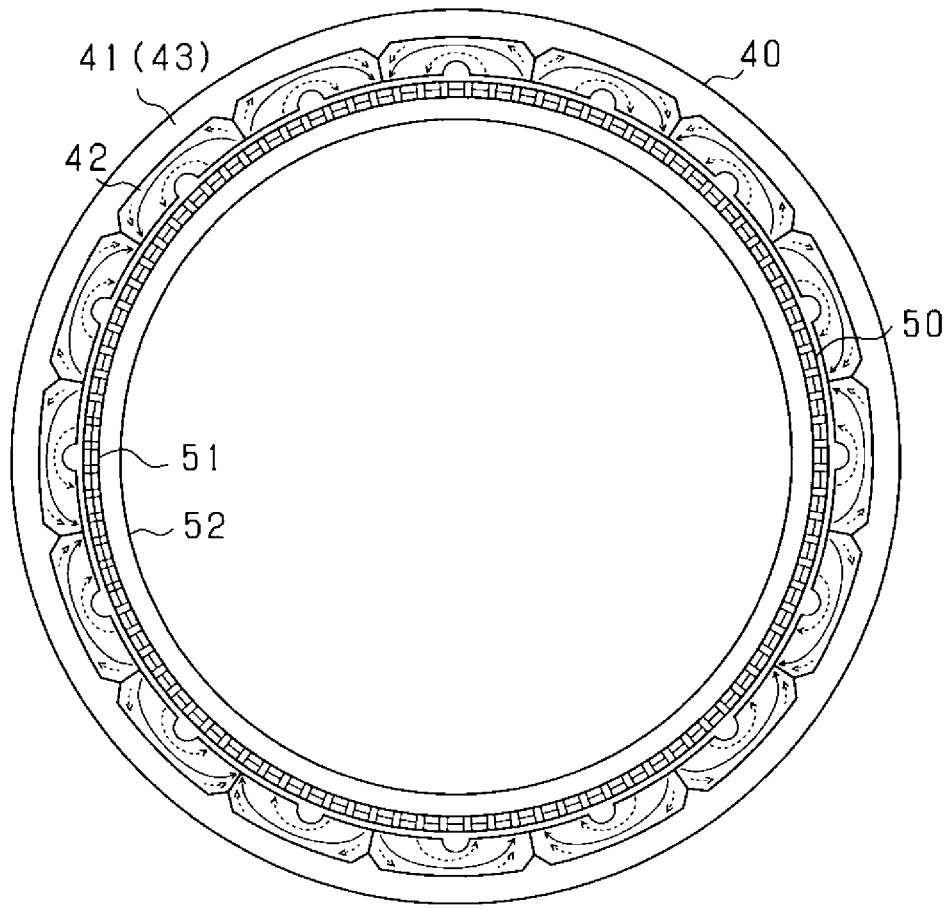
FIG. 90 is a transverse cross-sectional view of a rotor and a stator in a tenth embodiment.
Figure 91:
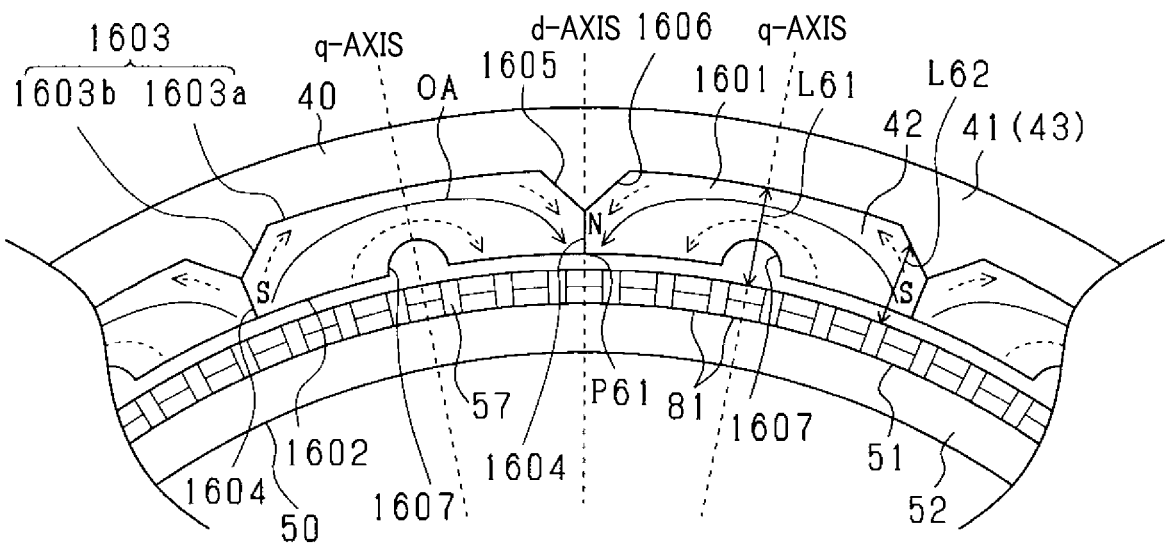
FIG. 91 is an enlarged view of part of FIG. 90.

As shown in FIGS. 90 and 91, in the present embodiment, the magnet unit 42 has a plurality of the magnets 1601 arranged in alignment with each other in the circumferential direction. Each of the magnets 1601 has a substantially arc-shaped transverse cross section. Specifically, each of the magnets 1601 has an arc-shaped stator-side peripheral surface 1602 (i.e., armature-side peripheral surface) on the radially inner side (i.e., on the stator 50 side) and an approximately arc-shaped non-stator-side peripheral surface 1603 (i.e., non-armature-side peripheral surface) on the radially outer side (i.e., on the cylindrical portion 43 side). Moreover, each of the magnets 1601 has a pair of end surfaces 1604 formed respectively at circumferential ends thereof to extend along the radial direction. Each of the end surfaces 1604 is formed to connect one circumferential end of the stator-side peripheral surface 1602 and one circumferential end of the non-stator-side peripheral surface 1603. Moreover, each of the magnets 1601 is formed to have a predetermined height in the axial direction.

The magnets 1601 have their respective easy axes of magnetization oriented such that at locations closer to the d-axis, the directions of the easy axes of magnetization are more parallel to the d-axis than at locations closer to the q-axis; and magnet magnetic paths are formed along the easy axes of magnetization. Here, the d-axis represents the centers of the magnetic poles of the magnet unit 42 while the q-axis represents the boundaries between the magnetic poles. Moreover, in the magnet unit 42, to make the polarities of the d-axis at each circumferentially-adjacent pair of the d-axis positions different from each other, the magnetization directions (or polarization directions) of each circumferentially-adjacent pair of the magnets 1601 are set to be opposite (or inverse) to each other. That is, the polarization directions of each circumferentially-adjacent pair of the magnets 1601 are set to be different from each other so that in the circumferential direction, those d-axis positions on which the magnetic flux converges and where the polarity of the d-axis becomes N alternate with those d-axis positions from which the magnetic flux diverges and where the polarity of the d-axis becomes S.

The magnet magnetic paths will be described in more detail. As shown in FIG. 91, in each of the magnets 1601, a plurality of arc-shaped magnet magnetic paths are formed which center on a center point set on the q-axis. The magnet magnetic paths include a magnetic path on an orientation arc OA; the orientation arc OA centers on the center point set on the q-axis and passes through a first intersection point P61 between the d-axis and the stator-side peripheral surface 1602 of the magnet 1601. In addition, it is preferable for the orientation arc OA to be set such that a tangent line to the orientation arc OA at the first intersection point P61 is near parallel to the d-axis.

That is, the magnets 1601 are oriented to form the arc-shaped magnet magnetic paths such that the directions of the easy axes of magnetization are parallel or near parallel to the d-axis in the d-axis-side portions and perpendicular or near perpendicular to the q-axis in the q-axis-side portions.

Moreover, each of the magnets 1601 is formed symmetrically with respect to the q-axis so as to extend between two circumferentially-adjacent positions of the d-axis. In other words, each of the magnets 1601 is formed in an arc shape along the circumferential direction between one circumferentially-adjacent pair of the d-axis positions. More specifically, in each of the magnets 1601, the orientation arc OA extends between one circumferentially-adjacent pair of the d-axis positions. Each of the magnets 1601 is formed between one circumferentially-adjacent pair of the d-axis positions such that the magnetic paths are formed, at least, over the entire range of the orientation arc OA.

Consequently, in each of the magnets 1601, of the magnet magnetic paths of the magnet 1601, the magnet magnetic path on the orientation arc OA is longest. The further the magnet magnetic paths from the orientation arc OA, the shorter the magnet magnetic paths become. For example, in a q-axis-side portion of the magnet 1601, the magnet magnetic paths extending on the stator side (shown with a dashed line) are shorter than those extending on the non-stator side. Moreover, in d-axis-side portions of the magnet 1601, the magnet magnetic paths extending on the non-stator side (shown with dashed lines) are shorter than those extending on the stator side. In addition, the magnet magnetic paths (or the orientation arc OA) may have the shape of an arc which is a part of a perfect circle or a part of an ellipse. Moreover, though the center of the arc is set to be on the q-axis in the present embodiment, it may alternatively be set to be not on the q-axis.

With the magnet magnetic paths formed therein as above, each of the magnets 1601 has an N pole at one circumferential end thereof and an S pole at the other circumferential end thereof. In other words, each of the magnets 1601 has the arc-shaped magnet magnetic paths formed therein so as to have one pole pair.

Moreover, each of the end surfaces 1604 of the magnets 1601 is formed to extend along the d-axis. That is, the magnets 1601 are divided with the d-axis as the boundaries therebetween. Furthermore, the magnets 1601 are arranged such that the polarities of each adjoining pair of the circumferential ends of the magnets 1601 are the same. The arc-shaped magnets 1601, each of which has the magnet magnetic paths formed therein as described above, are arranged in alignment with each other in the circumferential direction, thereby forming the magnet unit 42 in an annular shape.

On the other hand, as described previously, in the magnet unit 42, it is desirable for the surface magnetic flux density distribution to be approximate to a sine waveform; and it is also desirable for the magnetic flux density on the d-axis to be as high as possible. Therefore, it is desirable to arrange the magnets 1601 in alignment with each other in the circumferential direction so as to minimize both the size and the number of gaps between the adjacent magnets 1601. In addition, in the case of arranging radially-oriented magnets or parallel-oriented magnets in the circumferential direction without any gaps therebetween, the magnetic flux density changes sharply in the vicinity of the q-axis as shown in FIG. 18. Therefore, in the case of employing radially-oriented magnets or parallel-oriented magnets, the employed magnets are generally arranged at predetermined intervals in the circumferential direction.

In the case of the magnets 1601 being arranged without any gaps therebetween, there will be no spaces available for arrangement of engaging portions (e.g., side walls or the like) that engage with the circumferential ends of the magnets 1601. On the other hand, in the case of the magnets 1601 being arranged with gaps therebetween, to make the surface magnetic flux density distribution approximate to a sine waveform and increase the magnetic flux density on the d-axis, it is desirable to set the circumferential width of the gaps as small (or thin) as possible. However, in this case, due to the small circumferential width of the gaps, it will be difficult to arrange, in the gaps, engaging portions that have sufficient strength (or width) to stop rotational displacement of the magnets 1601. In view of the above, in the present embodiment, the magnets 1601 and the cylindrical portion 43 are configured as described below. In addition, in the present embodiment, the cylindrical portion 43 of the magnet holder 41 corresponds to a magnet holding portion.

As shown in FIG. 91, in the present embodiment, the magnets 1601 are configured so that the radial dimension from the stator 50 to the non-stator-side peripheral surfaces 1603 of the magnets 1601 is shorter on the d-axis side than on the q-axis side. More specifically, each of the non-stator-side peripheral surfaces 1603 of the magnets 1601 is configured to have a curved part 1603a formed in an arc shape along the inner circumferential surface of the cylindrical portion 43 and a pair of planar parts 1603b formed to make a predetermined angle (e.g., 45°) with the radial direction.

In each of the magnets 1601, the planar parts 1603b are formed respectively at the d-axis-side ends of the magnet 1601 in the circumferential direction, i.e., at the circumferential ends of the magnet 1601. Moreover, the planar parts 1603b are formed to be more parallel to the radial direction than the curved part 1603a is. That is, the planar parts 1603b are oblique radially inward (i.e., toward the stator side). Specifically, the non-stator-side corners of the magnet 1601 are chamfered to form oblique surfaces that are oblique to the radial direction; and the oblique surfaces respectively constitute the planar parts 1603b. The radial thickness of circumferential end portions of the magnet 1601 becomes smaller (or thinner) as the position approaches the circumferential ends. Consequently, the planar parts 1603b are formed as the oblique surfaces that are oblique toward the stator side with respect to the circumferential direction.

Moreover, the planar parts 1603b are formed so as to maintain the magnet magnetic path on the orientation arc OA and be apart from (i.e., not intersecting) the orientation arc OA. That is, in the present embodiment, in each of the magnets 1601, the non-stator-side peripheral surface 1603 is located radially outside the orientation arc OA and formed along the orientation arc OA. In addition, the planar parts 1603b may alternatively be constituted of curved surfaces oblique to the circumferential direction, for example curved surfaces formed along the orientation arc OA.

On the other hand, the outer diameter of the stator 50 (i.e., the outer diameter of the stator coil 51) is substantially constant. Therefore, with the planar parts 1603b formed in the magnets 1601, the radial dimension from the stator 50 to the non-stator-side peripheral surfaces 1603 of the magnets 1601 becomes shorter on the d-axis side than on the q-axis side. That is, the radial thickness L62 of each of the magnets 1601 from the stator 50 to the planar parts 1603b is smaller than the radial thickness L61 of the same from the stator 50 to the curved part 1603a.

Moreover, in the present embodiment, each of the magnets 1601 is formed to have its radial thickness larger on the q-axis than on the d-axis side. Specifically, each of the magnets 1601 has its stator-side peripheral surface 1602 shaped in an arc concentric with the curved part 1603a of the non-stator-side peripheral surface 1603 (i.e., concentric with the inner circumferential surface of the cylindrical portion 43). Consequently, the radial thickness of each of the magnets 1601 from the stator-side peripheral surface 1602 to the planar parts 1603b of the non-stator-side peripheral surface 1603 becomes smaller (or thinner) than the radial thickness of the same from the stator-side peripheral surface 1602 to the curved part 1603a of the non-stator-side peripheral surface 1603.

Moreover, upon arrangement of the above-described magnets 1601 in alignment with each other in the circumferential direction, there are formed recesses 1605 respectively at the d-axis positions and along the axial direction in the magnet unit 42; each of the recesses 1605 centers on the d-axis and opens to the non-stator side (i.e., to the cylindrical portion 43 side). That is, with the end surfaces 1604 of each circumferentially-adjacent pair of the magnets 1601 arranged to abut each other, there are defined, by the planar parts 1603b of each circumferentially-adjacent pair of the magnets 1601, the recesses 1605 each centering on the d-axis and opening to the non-stator side. Moreover, as shown in FIG. 91, each of the recesses 1605 is located closer to the d-axis than to the q-axis and opens centering on the d-axis. In addition, the recesses 1605 are formed away from the orientation arcs OA of the magnets 1601.

In addition, as described above, in the d-axis-side portions of the magnets 1601, the magnet magnetic paths extending on the non-stator side (shown with the dashed lines) are shorter than those extending on the stator side. More specifically, those magnet magnetic paths which are located on the non-stator side of the orientation arc OA are shorter than the orientation arc OA and hardly contribute to increase in the magnetic flux density on the d-axis. Moreover, those non-stator-side parts of the d-axis-side portions of the magnets 1601 where the shorter magnet magnetic paths are formed may be easily demagnetized by the influence of an external magnetic field (e.g., the magnetic field from the stator coil 51). Therefore, forming the recesses 1605 in the d-axis-side portions of the magnets 1601 on the non-stator side, the magnetic flux density on the d-axis is hardly affected (i.e., hardly lowered) by the recesses 1605.

On the other hand, in the cylindrical portion 43, there are formed protrusions 1606 to respectively engage with the recesses 1605 of the magnets 1601 in the circumferential direction. More specifically, as shown in FIG. 91, on the inner circumferential surface of the cylindrical portion 43, there are formed the protrusions 1606 to radially protrude to the magnet unit 42 side (i.e., to the stator side). The protrusions 1606 have respective transverse cross sections triangular-shaped conforming to the shape of the recesses 1605. The circumferential width of each of the protrusions 1606 becomes smaller as the position becomes closer to the stator side in the radial direction. That is, in each of the protrusions 1606, there are formed a pair of oblique surfaces extending from the inner circumferential surface of the cylindrical portion 43 to the vertex of the protrusion 1606. The oblique surfaces are formed at angles (i.e., angles of 45° with respect to the radial direction) set according to the angles of the oblique surfaces (i.e., the planar parts 1603b) of the recesses 1605. Moreover, the radial dimension (or height) of the protrusions 1606 is set to be equal to the radial dimension (or depth) of the recesses 1605. Consequently, it becomes possible to have the protrusions 1606 and the recesses 1605 suitably engage with each other.

In addition, the circumferential widths of the recesses 1605 and the protrusions 1606 (more specifically, the circumferential width of opening portions of the recesses 1605 and the circumferential width of proximal end portions of the protrusions 1606) are set so as to ensure sufficient strength to suitably restrict rotational displacement of the magnet unit 42.

Moreover, in the present embodiment, grooves 1607 are formed, along the axial direction, respectively in the stator-side peripheral surfaces 1602 of the magnets 1601 of the magnet unit 42. Each of the grooves 1607 is an armature-side recess which opens to the stator side. Moreover, each of the grooves 1607 is located closer to the q-axis than to the d-axis. More particularly, in the present embodiment, as shown in FIG. 91, each of the grooves 1607 is configured to open centering on the q-axis. Moreover, each of the grooves 1607 is formed away from the orientation arc OA.

After the rotor 40 is arranged to face the stator 50, the stator 50 (i.e., the stator coil 51 and the like) is located radially inside the magnet unit 42. Consequently, in the magnet unit 42, there are formed flow paths which are defined by the grooves 1607 and the stator 50. The flow paths serve as passages axially penetrating the magnet unit 42; and fluid, such as air, can flow through the passages. That is, the cross-sectional areas of the grooves 1607 are set so as to allow fluid, such as air, to flow through the grooves 1607.

In addition, as described above, in the q-axis-side portions of the magnets 1601, the magnet magnetic paths extending on the stator side (shown with the dashed lines) are shorter than those extending on the non-stator side. Moreover, those stator-side parts of the q-axis-side portions where the shorter magnet magnetic paths are formed may be easily demagnetized by the influence of an external magnetic field (e.g., the magnetic field from the stator coil 51). Therefore, forming the grooves 1607 in the q-axis-side portions of the magnets 1601 on the stator side, the magnetic flux density on the d-axis is hardly affected (i.e., hardly lowered) by the grooves 1607. On the other hand, by forming the grooves 1607 in the magnets 1601, it becomes possible to reduce the volume of the magnets 1601.

Figure 92:
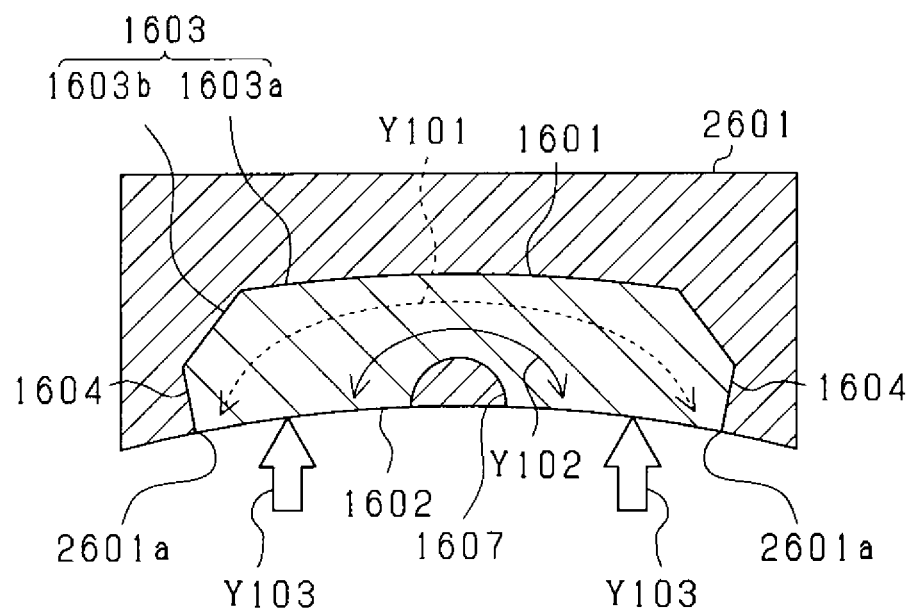
FIG. 92 is a cross-sectional view illustrating a die for magnets.

Next, the outline of a method of manufacturing the magnets 1601 will be described. In the present embodiment, each of the magnets 1601 is a sintered magnet manufactured by sintering. Specifically, in the manufacturing method, produced raw materials, such as neodymium, boron and iron, are melted and alloyed (a first step). Next, the alloy obtained in the first step is pulverized into particles (a second step). Then, as shown in FIG. 92, the powder obtained in the second step is placed into a die 2601 that has a substantially U-shaped transverse cross section, and compression-shaped under a magnetic field (a third step). More specifically, the die 2601 has opening portions 2601a at both ends of the U-shape thereof. The powder is placed into the die 2601 via the opening portions 2601a and then compressed (the compression directions from the outside are indicated with arrows Y103) from both the ends (i.e., the opening portions 2601a). Therefore, the compression direction (indicated with an arrow Y102) in each of the resultant magnets 1601 is oriented along an arc conforming to the shape of the die 2601. Moreover, the direction (indicated with an arrow Y101) of the magnetic field applied during the shaping is also oriented along an arc conforming to the shape of the die 2601. That is, each of the compression direction and the magnetic field direction is oriented along an arc. Consequently, the easy axes of magnetization of the resultant magnets 1601 are arc-shaped.

After the compression shaping, the resultant compact is sintered (a fourth step) and then undergoes a heat treatment (a fifth step). More specifically, in the heat treatment, the compact is repeatedly heated and cooled several times. Thereafter, mechanical processing, such as grinding, and surface treatment are performed (a sixth step). Finally, polarization is performed (a seventh step). As a result, the magnets 1601 are obtained.

According to the tenth embodiment, it is possible to achieve the following advantageous effects.

In the present embodiment, the magnet unit 42 employs the magnets 1601 where: the easy axes of magnetization are oriented such that at locations closer to the d-axis, the directions of the easy axes of magnetization are more parallel to the d-axis than at locations closer to the q-axis; and the magnet magnetic paths are formed along the easy axes of magnetization. Here, the d-axis represents the centers of the magnetic poles of the magnet unit 42 while the q-axis represents the boundaries between the magnetic poles. With employment of the above magnets 1601, to make the magnetic flux density distribution approximate to a sine waveform and increase the magnetic flux density on the d-axis, it is desirable to minimize gaps between the magnets 1601 adjacent to one another in the circumferential direction. However, with reduction in gaps between the adjacent magnets 1601, engaging portions arranged in the gaps become thinner, making it impossible to suitably restrict rotational displacement of the magnet unit 42.

On the other hand, it is easy for the magnet magnetic paths to become short in the non-stator-side parts of the d-axis-side portions of the magnets 1601; thus the non-stator-side parts of the d-axis-side portions of the magnets 1601 may be easily demagnetized. Accordingly, removal of the non-stator-side parts of the d-axis-side portions from the magnets 1601 hardly affects the density of magnetic flux generated from the d-axis. That is, removal of these parts hardly causes the density of magnetic flux generated from the d-axis to be lowered and hardly causes the torque to drop.

In view of the above, in the present embodiment, in the non-stator-side parts (i.e., the cylindrical portion 43-side parts) of the magnet unit 42, there are formed the recesses 1605 closer to the d-axis than to the q-axis; the recesses 1605 open to the non-stator side, i.e., to the cylindrical portion 43 side. Moreover, in the cylindrical portion 43, there are formed the protrusions 1606 to respectively engage with the recesses 1605. Consequently, it becomes possible to restrict rotational displacement of the magnet unit 42 while making the surface magnetic flux density distribution of the magnet unit 42 approximate to a sine waveform and increasing the magnetic flux density on the d-axis. In addition, it also becomes possible to reduce the volume of the magnets 1601.

Moreover, in the present embodiment, the circumferential widths of the recesses 1605 and the protrusions 1606 (more specifically, the circumferential width of opening portions of the recesses 1605 and the circumferential width of proximal end portions of the protrusions 1606) are set so as to ensure sufficient strength to suitably restrict rotational displacement of the magnet unit 42. Consequently, it becomes possible to suitably restrict rotational displacement of the magnet unit 42. In addition, the recesses 1605 are formed in those parts of the magnet unit 42 which may be easily demagnetized; therefore, even with the circumferential widths of the recesses 1605 and the protrusions 1606 set as above, it still becomes possible to suppress the magnetic flux density on the d-axis from being lowered in comparison with the case of no recesses 1605 being formed in the magnet unit 42. In addition, it becomes possible to reduce the volume of the magnets 1601 of the magnet unit 42.

Moreover, it is easy for the magnet magnetic paths to become short in the stator-side parts of the q-axis-side portions of the magnets 1601; thus the stator-side parts of the q-axis-side portions of the magnets 1601 may be easily demagnetized. Accordingly, removal of the stator-side parts of the q-axis-side portions from the magnets 1601 hardly affects the density of magnetic flux generated from the d-axis.

In view of the above, in the present embodiment, in the stator-side parts of the q-axis-side portions of the magnets 1601, there are formed the grooves 1607 along the axial direction. Consequently, after the magnets 1601 are fixed to the inner circumferential surface of the cylindrical portion 43 and the rotor 40 is arranged to face the stator 50, there are formed the flow paths each axially penetrating the magnet unit 42. During rotation of the rotor 40, fluid, such as air, will flow through the flow paths, thereby cooling the magnet unit 42. As a result, it becomes possible to improve the performance of cooling the magnet unit 42.

In addition, as described above, since the grooves 1607 are formed in the stator-side parts of the q-axis-side portions of the magnets 1601 which may be easily demagnetized, the magnetic flux density is hardly affected by the grooves 1607. Consequently, it becomes possible to improve the performance of cooling the magnet unit 42 while suppressing the torque from being lowered. Moreover, it also becomes possible to suitably reduce the volume of the magnets 1601 of the magnet unit 42 while suppressing the torque from being lowered.

In the present embodiment, with the magnet unit 42 having a surface magnetic flux density distribution approximate to a sine waveform, it becomes possible to increase the torque; it also becomes possible to make change in the magnetic flux gentler and thereby more effectively suppress eddy current loss in comparison with radial magnets. Moreover, it also becomes possible to reduce torque ripple. On the other hand, in the case of the magnets 1601 being designed to have an intrinsic coercive force higher than or equal to 400 [kA/m] and a residual flux density higher than or equal to 1.0 [T] (i.e., to increase the magnetic flux density on the d-axis), to make the surface magnetic flux density distribution of the magnet unit 42 approximate to a sine waveform, it is desirable to provide each of the magnets 1601 between one circumferentially-adjacent pair of the d-axis positions and have the arc-shaped magnet magnetic paths formed in the magnets 1601.

Moreover, in the case of employing the magnets 1601 as above, to suppress magnetic flux leakage from the non-stator side of the magnet unit 42, it is desirable to set the radial thickness of the magnets 1601 so as to have magnet magnetic paths formed on the orientation arcs OA of the magnets 1601. However, to enable the magnets 1601 to have an intrinsic coercive force higher than or equal to 400 [kA/m] and a residual flux density higher than or equal to 1.0 [T], it is generally necessary for the magnets 1601 to include expensive rare-earth substances. Consequently, the cost of the magnets 1601 may become high.

In view of the above, in the present embodiment, the magnets 1601 are configured so that the radial dimension from the stator 50 to the non-stator-side peripheral surfaces 1603 of the magnets 1601 is shorter on the d-axis side than on the q-axis side. Consequently, it becomes possible to reduce the non-stator-side parts of the d-axis-side portions of the magnets 1601. That is, it becomes possible to reduce those parts of the magnets 1601 which may be easily demagnetized, thereby making it possible to reduce the volume of the magnets 1601 without affecting the magnetic flux density. Hence, compared to the case of magnets having a given radial thickness over the entire circumferential range thereof, those parts of the magnets 1601 which may be easily demagnetized become smaller, allowing the recesses 1605 to be formed in the magnet unit 42. As a result, it becomes possible to reduce the volume of the magnets 1601 while suppressing the magnetic flux density on the d-axis from being lowered.

Moreover, even with reduction in the radial thickness of the magnets 1601, it still becomes possible to lengthen the magnet magnetic paths by providing each of the magnets 1601 between one circumferentially-adjacent pair of the d-axis positions and having the magnet magnetic paths formed in the arc shape between the d-axis positions across the q-axis. That is, the magnet magnetic paths in the magnets 1601 become longer compared to radial magnets having straight magnet magnetic paths formed therein. Consequently, it becomes possible to increase the magnetic flux density on the d-axis while minimizing the radial thickness of the magnets 1601.

In the present embodiment, each of the magnets 1601 is formed symmetrically with respect to the q-axis. Moreover, each of the magnets 1601 is formed between one circumferentially-adjacent pair of the d-axis positions so as to have the magnet magnetic paths formed along the orientation arc OA; the orientation arc OA centers on the center point set on the q-axis and passes through the first intersection point P61 between the d-axis and the stator-side peripheral surface 1602 of the magnet 1601. Consequently, it becomes possible to sufficiently increase the lengths of those magnet magnetic paths which are located on the orientation arcs OA of the magnets 1601 and contribute to the magnetic flux density on the d-axis. As a result, it becomes possible to further increase the magnetic flux density on the d-axis.

In the present embodiment, to impart the above-described shape to the magnets 1601, in the third step of the manufacturing process of the magnets 1601, the powder is compression-shaped by the U-shaped die 2601 in a magnetic field. Consequently, it becomes possible to have each of the magnetic field direction and the compression direction oriented along an arc conforming to the shape of the die 2601. As a result, it becomes possible to have the easy axes of magnetization of the resultant magnets 1601 arc-shaped; thus it also becomes possible to easily form the magnet magnetic paths in an arc shape. That is, it becomes possible to easily manufacture the magnets 1601 having the above-described magnet magnetic paths formed therein.

In the present embodiment, each of the protrusions 1606 and the recesses 1605 may be formed in at least part of the axial range of the magnet unit 42. For example, each of the protrusions 1606 and the recesses 1605 may be formed along the axial direction over the entire axial range of the magnet unit 42. Moreover, it is unnecessary to provide one protrusion 1606 and one recess 1605 at each d-axis position. That is, the number of the protrusions 1606 and the number of the recesses 1605 may be set to be smaller than the number of the d-axis positions. For example, pairs of the protrusions 1606 and the recesses 1605 may be provided at angular intervals of 90°. In addition, the number of the protrusions 1606 and the number of the recesses 1605 may be arbitrarily set such that the number of the recesses 1605 is larger than the number of the protrusions 1606.

In the above-described tenth embodiment, a resin layer may be provided, as a resin member, between the cylindrical portion 43 and the magnets 1601; and the magnets 1601 may be fixed to the cylindrical portion 43 via the resin layer.

Figure 93:
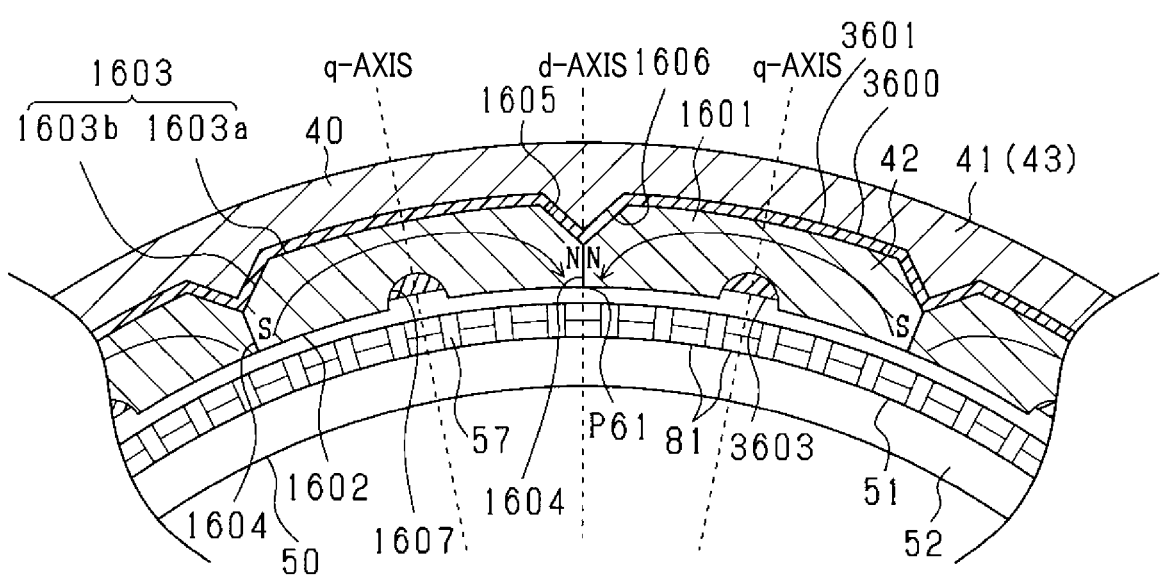
FIG. 93 is a transverse cross-sectional view of a rotor and a stator in another example.

Specifically, in a modification shown in FIG. 93, the rotor 40 includes an insulation unit 3600 that has a resin layer 3601 covering the outer circumferential surface of the magnet unit 42. The resin layer 3601 is formed in a cylindrical shape to cover the non-stator-side peripheral surfaces 1603 of the magnets 1601 that are arranged in an annular shape to abut one another in the circumferential direction. That is, the magnets 1601 are radially fixed to an inner circumferential surface of the resin layer 3601. In addition, the resin layer 3601 is formed so as to cover the non-stator-side peripheral surfaces 1603 of the magnets 1601 over the entire axial range of the magnets 1601.

Figure 94:
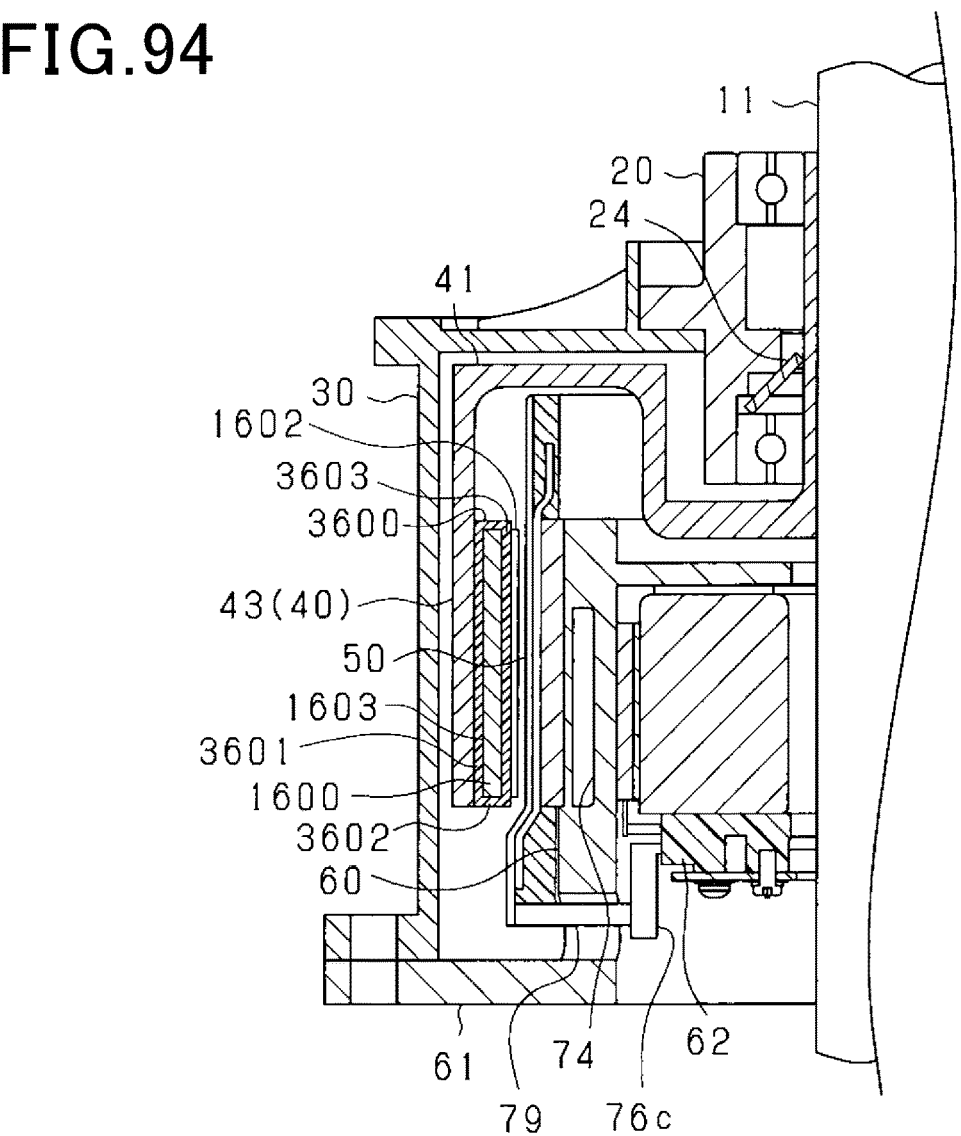
FIG. 94 is a longitudinal cross-sectional view of a rotor and a stator in yet another example.

Moreover, as shown in FIG. 94, the insulation unit 3600 further has a pair of end-surface covering parts 3602 formed respectively at opposite axial ends thereof; the end-surface covering parts 3602 respectively cover opposite axial end surfaces of each of the magnets 1601. Each of the end-surface covering parts 3602 is formed in an annular shape. Moreover, each of the end-surface covering parts 3602 has an outer diameter substantially equal to the inner diameter of the cylindrical portion 43, and has an inner diameter smaller than the outer diameter of the magnet unit 42 and larger than the inner diameter of the magnet unit 42.

Furthermore, as shown in FIG. 93, the insulation unit 3600 further has restricting members 3603 received respectively in the grooves 1607 of the magnets 1601. The restricting members 3603 are bar-shaped to axially extend respectively along the grooves 1607. Moreover, each of the restricting members 3603 has a pair of axial ends fixed respectively to the end-surface covering parts 3602. Therefore, with the restricting members 3603, it is possible to restrict radial displacement of the magnets 1601.

Moreover, the restricting members 3603 are received respectively in the grooves 1607 and radially located on the non-stator side of the stator-side peripheral surfaces 1602 of the respective grooves 1607. Therefore, even when the restricting members 3603 are thermally expanded, they can still be prevented from radially protruding from the stator-side peripheral surfaces 1602 of the respective grooves 1607 to the stator side.

The insulation unit 3600, which is composed of the resin layer 3601, the end-surface covering parts 3602 and the restricting members 3603, is formed of an electrically-insulative resin into one piece. For example, the insulation unit 3600 may be formed by resin-molding the magnets 1601 in a state of being arranged in alignment with each other in the circumferential direction. Moreover, the insulation unit 3600 is fixed to the inner circumferential surface of the cylindrical portion 43. For example, the insulation unit 3600 may be press-fitted into the cylindrical portion 43, thereby being fixed to the inner circumferential surface thereof.

As described above, with the resin layer 3601 interposed as a resin member between the cylindrical portion 43 and the magnets 1601, it becomes possible to electrically insulate the cylindrical portion 43 and the magnets 1601 from each other. Consequently, it becomes possible to suppress occurrence of eddy current between the cylindrical portion 43 and the magnets 1601, thereby suppressing eddy current loss in the rotor 40. Moreover, by press-fitting the insulation unit 3600 together with the magnets 1601 into the cylindrical portion 43, it becomes possible to radially apply pressure to the non-stator-side peripheral surfaces 1603 of the magnets 1601, thereby suitably suppressing detachment of the magnets 1601.

In addition, the insulation unit 3600 may be modified to have only the resin layer 3601. Moreover, as an alternative, a resin adhesive may be provided, as a resin member, between the cylindrical portion 43 and the magnets 1601, thereby fixing the magnets 1601 to the cylindrical portion 43 via the resin adhesive. Consequently, with the resin adhesive, it would become possible to suitably suppress detachment of the magnets 1601.

Figure 95:
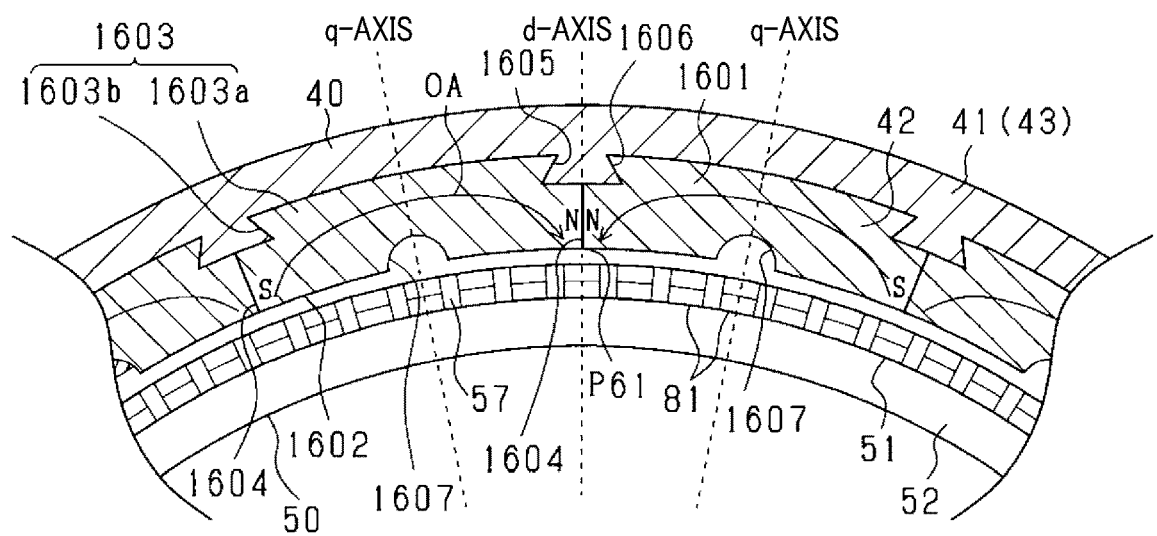
FIG. 95 is a transverse cross-sectional view of a rotor and a stator in still another example.

In the above-described tenth embodiment, the shapes of the protrusions 1606 and the recesses 1605 may be arbitrarily modified. For example, as shown in FIG. 95, each of the protrusions 1606 may be shaped to have its width larger at its distal end than at its proximal end. In other words, each of the protrusions 1606 may be shaped such that its width increases as the position approaches its radially inner end. Moreover, in this case, the recesses 1605 may be accordingly modified to conform to the shape of the protrusions 1606. Specifically, each of the recesses 1605 may be shaped to have its width smaller at its opening than at its bottom. In other words, each of the recesses 1605 may be shaped such that its width decreases as the position approaches its radially outer end.

Consequently, it becomes possible to have the protrusions 1606 radially engaging with the recesses 1605 to restrict radially inward displacement of the magnets 1601, thereby suppressing detachment of the magnets 1601.

Moreover, though the above modifications are applied to the outer rotor type rotating electric machine, these modifications can also be applied to an inner rotor type rotating electric machine.

The disclosure in this specification is not limited to the embodiments illustrated above. The disclosure encompasses not only the embodiments illustrated above, but also modifications of the embodiments which can be derived by one of ordinary skill in the art from the embodiments. For example, the disclosure is not limited to the combinations of components and/or elements illustrated in the embodiments. Instead, the disclosure may be implemented by various combinations. The disclosure may include additional parts which can be added to the embodiments. The disclosure encompasses components and/or elements omitted from the embodiments. The disclosure also encompasses any replacement or combination of components and/or elements between one and another of the embodiments. The disclosed technical ranges are not limited to the description of the embodiments. Instead, the disclosed technical ranges should be understood as being shown by the recitation of the claims and as encompassing all modifications within equivalent meanings and ranges to the recitation of the claims.

While the disclosure has been described pursuant to the embodiments, it should be appreciated that the disclosure is not limited to the embodiments and the structures. Instead, the disclosure encompasses various modifications and changes within equivalent ranges. In addition, various combinations and modes are also included in the category and the scope of technical idea of the disclosure.

What is claimed is:

1. A rotating electric machine comprising:
an armature including a multi-phase armature coil; and
a field system including:
a magnet section having:
a plurality of magnetic poles whose polarities alternate in a circumferential direction;
a plurality of magnets that are arranged at predetermined intervals and in alignment with each other in the circumferential direction, the magnets having easy axes of magnetization oriented such that at locations closer to a d-axis, directions of the easy axes of magnetization are more parallel to the d-axis than at locations closer to a q-axis, the d-axis representing centers of the magnetic poles of the magnet section, the q-axis representing boundaries between the magnetic poles;
in the magnets, magnet magnetic paths that are formed along the easy axes of magnetization;
auxiliary magnets arranged between circumferentially-adjacent magnets, the auxiliary magnets having easy axes of magnetization oriented to be parallel to the circumferential direction at the q-axis, the auxiliary magnets having a smaller radial dimension than the magnets; and
in the auxiliary magnets, magnet magnetic paths that are formed along the easy axes of magnetization; and
a field-system core located on a non-armature side of the magnet section and formed of a soft-magnetic material, the field-system core having protrusions that radially protrude, respectively in gaps between the magnets, to an armature side, the protrusions having a smaller radial dimension the magnets, each of the protrusions being located closer to the q-axis than to the d-axis in the circumferential direction, circumferential end surfaces of the protrusions respectively abutting circumferential end surfaces of the magnets,
wherein either of the field system and the armature is configured as a rotor, and the auxiliary magnets are arranged on an armature side of the protrusions in a radial direction, and
circumferential end surfaces of the auxiliary magnets are respectively in contact with the circumferential end surfaces of the magnets.

2. The rotating electric machine as set forth in claim 1, wherein in each of the magnets, an armature-side peripheral surface and the circumferential end surfaces of the magnet constitute magnetic flux inflow/outflow surfaces, and
the magnet magnetic paths are arc-shaped to connect the armature-side peripheral surface and the circumferential end surfaces in each of the magnets.

3. The rotating electric machine as set forth in claim 1, wherein the circumferential end surfaces of the magnets are formed to be perpendicular to respective magnet magnetic paths, and
the circumferential end surfaces of the protrusions are formed according to angles of the circumferential end surfaces of the magnets which they respectively abut.

4. The rotating electric machine as set forth in claim 1, wherein the armature coil has electrical conductor sections opposed to the field system and arranged at predetermined intervals in the circumferential direction,
in the armature, there are provided inter-conductor members between the electrical conductor sections in the circumferential direction or no inter-conductor members are provided between the electrical conductor sections in the circumferential direction, and
the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

* * * * *